United States Patent
Fabri et al.

(10) Patent No.: US 12,369,585 B2
(45) Date of Patent: Jul. 29, 2025

(54) FUNGICIDAL COMBINATIONS

(71) Applicant: UPL LTD, Haldia (IN)

(72) Inventors: Carlos Eduardo Fabri, Sao Paulo (BR); Rajju Devidas Shroff, Mumbai (IN); Jaidev Rajnikant Shroff, Dubai (AE); Vikram Rajnikant Shroff, Dubai (AE)

(73) Assignee: UPL LTD, Haldia (IN)

( * ) Notice: Subject to any disclaimer, the term of this patent is extended or adjusted under 35 U.S.C. 154(b) by 566 days.

(21) Appl. No.: 16/491,639

(22) PCT Filed: Feb. 16, 2018

(86) PCT No.: PCT/IB2018/050964
§ 371 (c)(1),
(2) Date: Sep. 6, 2019

(87) PCT Pub. No.: WO2018/162999
PCT Pub. Date: Sep. 13, 2018

(65) Prior Publication Data
US 2021/0127679 A1    May 6, 2021

(30) Foreign Application Priority Data
Mar. 7, 2017    (IN) .............................. 201731008009

(51) Int. Cl.
| A01N 47/14 | (2006.01) |
| A01N 43/54 | (2006.01) |
| A01N 43/56 | (2006.01) |
| A01N 43/653 | (2006.01) |

(52) U.S. Cl.
CPC ............. *A01N 47/14* (2013.01); *A01N 43/54* (2013.01); *A01N 43/56* (2013.01); *A01N 43/653* (2013.01)

(58) Field of Classification Search
CPC ........ A01N 47/14; A01N 43/54; A01N 43/56; A01N 43/653; A01N 37/34; A01N 45/02; A01N 59/20
See application file for complete search history.

(56) References Cited

U.S. PATENT DOCUMENTS

| 8,044,084 | B2 | 10/2011 | Rademacher et al. |
| 8,822,521 | B2 * | 9/2014 | Taggi .................. C07D 231/12 548/375.1 |
| 9,314,022 | B2 | 4/2016 | Tobler |
| 9,445,601 | B2 | 9/2016 | Dutzmann et al. |
| 9,788,544 | B2 | 10/2017 | Oliveira et al. |
| 10,362,782 | B2 | 7/2019 | Oliveira et al. |
| 10,448,636 | B2 | 10/2019 | Oliveira |
| 10,537,101 | B2 | 6/2020 | Oliveira |
| 10,694,744 | B2 | 6/2020 | Oliveira et al. |
| 10,694,745 | B2 | 6/2020 | Oliveira et al. |
| 11,445,727 | B2 | 9/2022 | Fabri |

| 2005/0101639 | A1 | 5/2005 | Ammermann et al. |
| 2006/0004070 | A1 | 1/2006 | Wachendorff-Neumann et al. |
| 2007/0244121 | A1 | 10/2007 | Walter et al. |
| 2007/0270601 | A1 | 11/2007 | Oberholzer |
| 2008/0004177 | A1 | 1/2008 | Pfeiffer et al. |
| 2008/0113979 | A1 | 5/2008 | Foor |
| 2008/0153824 | A1 | 6/2008 | Speakman et al. |
| 2008/0287299 | A1 | 11/2008 | Dos Santos |
| 2009/0124679 | A1 | 5/2009 | Mitani |
| 2009/0131462 | A1 | 5/2009 | Gewehr et al. |
| 2010/0197741 | A1 | 8/2010 | Brix et al. |
| 2010/0216640 | A1 | 8/2010 | Tobler et al. |
| 2011/0082160 | A1 | 4/2011 | Owen et al. |
| 2011/0082162 | A1 | 4/2011 | Lorsbach et al. |
| 2011/0152097 | A1 | 6/2011 | Stenzel et al. |
| 2011/0312493 | A1 | 12/2011 | Oostendorp et al. |
| 2012/0003199 | A1 | 1/2012 | Scherer et al. |
| 2012/0088665 | A1 | 4/2012 | Dietz et al. |
| 2012/0322654 | A1 | 12/2012 | Gewehr |
| 2013/0184152 | A1 | 7/2013 | Gary |
| 2013/0267545 | A1 | 10/2013 | Myers et al. |
| 2014/0024532 | A1 * | 1/2014 | Tobler .................... A01N 43/40 514/357 |
| 2014/0371066 | A1 | 12/2014 | Wachendorff-Neumann et al. |
| 2015/0164076 | A1 * | 6/2015 | Pellacini ................ A01N 43/84 514/266.3 |
| 2015/0181870 | A1 | 7/2015 | Kemmitt et al. |
| 2015/0181874 | A1 | 7/2015 | Owen et al. |
| 2015/0366203 | A1 | 12/2015 | Godwin et al. |

(Continued)

FOREIGN PATENT DOCUMENTS

| CA | 2862939 A1 | 5/2005 |
| CA | 2969545 A1 | 6/2016 |

(Continued)

OTHER PUBLICATIONS

Pandey, Rajesh Kumar. "Studies on management of early blight disease caused by Alternaria solani on tomato crops through fungicides, crude plant extracts and bio control agents." Journal of Natural Resource and Development 9.2 (2014): 1-12. (Year: 2014).*
International Search Report and Written Opinion; International Application No. PCT/IB2018/050964; International Filing Date Feb. 16, 2018; Date of Mailing Apr. 24, 2018; 10 pages.
Brighenti, Alexandre M., et al. "Temporary Inhibition of Volunteer Soybean Plants in Sunflower Crop," ANAIS Plant Health, 2015, 4 pages.
Burke, I. C., et al. Purple and yellow nutsedge (*Cyperus rotundus* and *C. esculentus*) response to postemergence herbicides in cotton, Weed Technology 22:515-621, 2009, 8 pages.
Cahoon, Chares W. et al., "Weed Science", The Journal of Cotton Science 19:622-630 (2015), 9 pages.

(Continued)

*Primary Examiner* — Mina Haghighatian
*Assistant Examiner* — Nathan W Schlientz
(74) *Attorney, Agent, or Firm* — CANTOR COLBURN LLP

(57) ABSTRACT

A combination comprising a multi-site contact fungicide, a succinate dehydrogenase inhibitor fungicide and a second systemic fungicide and a method using the same.

6 Claims, No Drawings

(56) References Cited

U.S. PATENT DOCUMENTS

| | | |
|---|---|---|
| 2016/0360751 A1 | 12/2016 | Oliveira et al. |
| 2018/0014541 A1 | 1/2018 | Suty-Heinze et al. |
| 2019/0274307 A1 | 9/2019 | Fabri et al. |
| 2020/0170251 A1 | 6/2020 | Oliveira et al. |
| 2021/0007355 A1 | 1/2021 | Gongora et al. |
| 2021/0022343 A1 | 1/2021 | Gongora et al. |
| 2021/0106006 A1 | 4/2021 | Fabri et al. |
| 2021/0137119 A1 | 5/2021 | Fabri et al. |
| 2022/0039388 A1 | 2/2022 | Fabri et al. |
| 2023/0042776 A1 | 2/2023 | Fabri |
| 2023/0126092 A1 | 4/2023 | Fabri et al. |

FOREIGN PATENT DOCUMENTS

| | | |
|---|---|---|
| CN | 1465249 A | 1/2004 |
| CN | 1930969 A | 3/2007 |
| CN | 1930981 A | 3/2007 |
| CN | 101019535 A | 8/2007 |
| CN | 101222847 A | 7/2008 |
| CN | 101253864 A | 9/2008 |
| CN | 101366378 A | 2/2009 |
| CN | 101379979 A | 3/2009 |
| CN | 101406191 A | 4/2009 |
| CN | 101444217 A | 6/2009 |
| CN | 101658179 A | 3/2010 |
| CN | 101677558 A | 3/2010 |
| CN | 101700028 A | 5/2010 |
| CN | 101700032 A | 5/2010 |
| CN | 101755842 A | 6/2010 |
| CN | 101779674 A | 7/2010 |
| CN | 101779677 A | 7/2010 |
| CN | 101810192 A | 8/2010 |
| CN | 101849546 A | 10/2010 |
| CN | 101971839 A | 2/2011 |
| CN | 102113511 A | 7/2011 |
| CN | 102187867 A | 9/2011 |
| CN | 102204535 A | 10/2011 |
| CN | 102210309 A | 10/2011 |
| CN | 102232382 A | 11/2011 |
| CN | 102239863 A | 11/2011 |
| CN | 102258039 A | 11/2011 |
| CN | 102273475 A | 12/2011 |
| CN | 102334503 A | 2/2012 |
| CN | 102379304 A | 3/2012 |
| CN | 102428856 A | 5/2012 |
| CN | 102640748 A | 8/2012 |
| CN | 102696646 A | 10/2012 |
| CN | 102742584 A | 10/2012 |
| CN | 102763656 A | 11/2012 |
| CN | 102835407 A | 12/2012 |
| CN | 102885054 A | 1/2013 |
| CN | 102960347 A | 3/2013 |
| CN | 102972420 A | 3/2013 |
| CN | 103141484 A | 6/2013 |
| CN | 103271037 A | 9/2013 |
| CN | 103355343 A | 10/2013 |
| CN | 103385244 A | 11/2013 |
| CN | 103385256 A | 11/2013 |
| CN | 103392720 A | 11/2013 |
| CN | 103843800 A | 6/2014 |
| CN | 105744834 A | 7/2016 |
| CN | 106852342 A | 12/2016 |
| CN | 107251900 A | 10/2017 |
| CN | 107027787 A | 11/2017 |
| CN | 107912437 A | 4/2018 |
| CN | 108289456 A | 7/2018 |
| DE | 102016008444 A1 | 1/2018 |
| EP | 0609099 A1 | 8/1994 |
| EP | 1776864 A1 | 4/2007 |
| EP | 2783569 A1 | 1/2014 |
| EP | 2826367 A1 | 1/2015 |
| EP | 2885970 A1 | 6/2015 |
| FR | 2740005 A1 | 4/1997 |
| HU | 194695 B | 3/1988 |
| JP | H04128204 A | 4/1992 |
| JP | H04264010 A | 9/1992 |
| JP | H04264011 A | 9/1992 |
| JP | H05238911 A | 9/1993 |
| JP | 2001206806 A | 7/2001 |
| JP | 2005272310 A | 10/2005 |
| JP | 2008143875 A | 6/2008 |
| JP | 2008290993 | 12/2008 |
| WO | 2006037632 | 4/2006 |
| WO | 2006037634 A1 | 4/2006 |
| WO | 2006096949 A2 | 9/2006 |
| WO | 2007009356 A1 | 1/2007 |
| WO | 2007068367 A1 | 6/2007 |
| WO | 2007045455 A1 | 8/2007 |
| WO | 2007104677 A1 | 9/2007 |
| WO | 2007128541 A2 | 11/2007 |
| WO | 2008095913 A2 | 8/2008 |
| WO | 2008113654 A2 | 9/2008 |
| WO | 2008131901 A1 | 11/2008 |
| WO | 2009040397 A1 | 4/2009 |
| WO | 2009135834 A2 | 11/2009 |
| WO | 2010025832 A1 | 3/2010 |
| WO | 2010046927 A2 | 4/2010 |
| WO | 2010095151 A2 | 8/2010 |
| WO | 2010132169 A1 | 11/2010 |
| WO | 2011038747 A1 | 4/2011 |
| WO | 2011151261 A2 | 12/2011 |
| WO | 2012110464 A1 | 8/2012 |
| WO | 2012117572 | 9/2012 |
| WO | 2013106566 A1 | 7/2013 |
| WO | 2013127818 A1 | 9/2013 |
| WO | 2014016279 A1 | 1/2014 |
| WO | 2014095994 A1 | 6/2014 |
| WO | 2015062358 A1 | 5/2015 |
| WO | 2015079334 A1 | 6/2015 |
| WO | 2015083017 A1 | 6/2015 |
| WO | 2015121802 A1 | 8/2015 |
| WO | 2018025192 A1 | 2/2018 |
| WO | 2018026468 A1 | 2/2018 |
| WO | 2018083577 A1 | 5/2018 |
| WO | 2018162999 A1 | 9/2018 |
| WO | 2019186356 A1 | 10/2019 |
| WO | 2019186359 A1 | 10/2019 |
| WO | 2019244084 A2 | 12/2019 |
| WO | 2020012445 A1 | 1/2020 |

OTHER PUBLICATIONS

Koger, Clifford H., et al. "MSMA Antagonizes Glphosate and Glufosinate Efficacy on Broadleaf and Grass Weeds," Weed Technology 2007 21:15-165, 7 pages.

Merchant, Rand M. et al., Controlling Glyphosate-Resistant Palmer Amaranth (Amaranthus palmeri) in Coton with Resistance to Glyphosate, 2,4-D, and Glufosinate, Weed Technology, 28(2):291-297, 8 pages.

Trezzi, M., et al. "Interactions of Saflufenacil with Other Herbicides Promoters of Oxidative Stress to Control Joyweed," Planta Daninha, Vicosa-MG, v. 34, n.2, p. 319-326, 2016, 8 pages.

Anonymous; "Nimbus WG Fungicide/Miticide" [Product Label]; APVMA Approval No. 68631/114843; 2018; 5 pages.

Anonymous; "Nimbus WG Fungicide/Miticide" [Registration Information]; Australian Pesticides and Veterinary Medicines Authority; Product No. 68631; 2022; 2 pages.

Anonymous; "Nimbus, Provisional Marketing Authorization No. 3814" [Data Sheet]; UPL Europe Ltd, Distributed by IQV Agro Portugal S.A.; 2019; 6 pages.

Anonymous; "Nimbus, Registration No. 24412" [Registration Information]; Ministry of Agriculture, Fisheries, and Food; Spain; 2008; 5 pages.

Anonymous; "Nimbus" [Safety Data Sheet]; Product Code FCG02; UPL Iberia S.A.; 2015; 23 pages.

Bravo De Souza, M. et al.; "Protective and Systemic Fungicides in the Management of Corynespora cassiicola in Soybeans"; Neotropical Agriculture Journal, vol. 5, Issue No. 3; 2018; pp. 65-69.

Brent K. J. et al.; "Fungicide Resistance in Crop Pathogens: How Can It Be Managed?"; 2nd Revised Edition, Fungicide Resistance Action Committee, 2007, ISBN 90-72398-07-6; 60 pages.

(56) References Cited

OTHER PUBLICATIONS

Clark, A.; "Elatus Fungicide" [EPA Label]; U.S. Environmental Protection Agency Notice of Registration; Registration No. 100-1480; 2015; 39 pages.
Colby, S.; "Calculating Synergistic and Antagonistic Responses of Herbicide Combinations"; Weeds, vol. 15, Issue No. 1; 1967; pp. 20-22.
Della Vechia, J. et al.; "Physical characteristics of insecticide spraying liquids with mineral oil and droplets formed on citrus leaves"; Citrus Research & Technology, vol. 37, Issue No. 1; 2016; pp. 102-107; DOI: https;//dx.doi.org/10.4322/crt.ICC083.
Emery, K. et al.; "Assessment of interactions between components of fungicide mixtures against Monilinia fructicola"; Crop Protection, vol. 21; 2002; pp. 41-47.
European Search Report for the corresponding European Application No. 21189040, Date of completion: Nov. 25, 2021; 9 pages.
European Search Report for the corresponding European Application No. 22153607, Date of completion: May 13, 2022; 5 pages.
European Search Report for the corresponding European Application No. 22153615, Date of completion: May 13, 2022; 8 pages.
European Search Report for the corresponding European Application No. 22153617, Date of completion: May 13, 2022; 3 pages.
European Search Report for the corresponding European Application No. 22153638, Date of completion: May 17, 2022; 6 pages.
European Search Report for the corresponding European Application No. 22153646, Date of completion: May 17, 2022; 5 pages.
First Search Report for the corresponding Chinese Application No. 201480063556, Dated: Mar. 14, 2017; 2 pages. (Original).
First Search Report for the corresponding Chinese Application No. 202010211388, Dated: May 17, 2021; 2 pages. (Original).
Gisi, U. et al.; "Synergistic Interactions of Fungicides with Different Modes of Action"; Transactions of the British Mycological Society, vol. 85, Part 2; 1985; pp. 299-306.
Gisi, U., "Synergistic Interaction of Fungicides in Mixtures", The American Phytopathological Society, vol. 86, No. 11, 1996; pp. 1273-1279.
Godoy, C. et al.; "Efficiency of multisite fungicides in controlling Asian soybean rust, *Phakopsora pachyrhizi*, in the 2015/16 harvest: summarized results of cooperative trials"; Brazilian Agricultural Research Corporation, Technical Circular 121; 2016; 7 pages.
Gullino, M. et al.; "Mancozeb Past, Present, and Future"; Plant Disease, vol. 94, Issue No. 9; 2010; pp. 1076-1087; DOI: 10.1094/PDIS-94-9-1076.
International Search Report and Written Opinion for International Application PCT/GB2021/052757; International Filing Date: Oct. 25, 2021; Date of Mailing: Feb. 1, 2022; 11 pages.
International Search Report and Written Opinion for International Application PCT/IB2019/052390; International Filing Date: Mar. 25, 2019; Date of Mailing: Jul. 9, 2019; 15 pages.
International Search Report and Written Opinion for International Application PCT/IB2019/052393; International Filing Date: Mar. 25, 2019; Date of Mailing: Jul. 12, 2019; 18 pages.
International Search Report and Written Opinion for the corresponding International Application No. PCT/IB2014/064891, International Filing Date: Sep. 27, 2014; Date of Mailing: Feb. 23, 2015; 20 pages.
International Search Report and Written Opinion; International Application No. PCT/IB2017/056710; International Filing Date Oct. 30, 2017; Date of Mailing Jan. 12, 2018; 10 pages.
Köller, W. et al.; "Evaluation Tactics for Managing Resistance of Venturia inaequalis to Sterol Demethylation Inhibitors"; Plant Disease, vol. 83; 1999; pp. 857-863.
Lalancette, Norman, "New Fungicide for Apple Disease Control" Plant & Pest Advisory, Rutgers Cooperative Extension, Mar. 17, 2016, 2 pages.
Levy, Y. et al.; "The joint action of fungicides in mixtures: comparison of two methods for synergy calculation"; EPPO Bulletin, vol. 16; 1986; pp. 651-657.
Moura, P. et al.; "Effects of cyproconazole, azoxystrobin and mineral oil on soybean leaf anatomy"; Dourados, vol. 6, Issue No. 20; 2013; pp. 154-160.
Partial European Search Report for the corresponding European Application No. 18189515, Date of completion: Oct. 11, 2018; 22 pages.
Rosenberger Presentation "Fire Blight and NEWA—How to Control Blight in 2015"; 70th North Jersey Commercial Fruit Growers Meeting; Mar. 4, 2015, Flemington, NJ; 43 pages.
Rosenberger, David; "Apple Scab Models & Suggestions for Scab Control in 2015"; 70th North Jersey Commercial Fruit Growers Meeting, Flemington, NJ, Mar. 4, 2015.
Scherm, H. et al., "Quantitative review of fungicide efficacy trials for managing soybean rust in Brazil", Crop Protection, vol. 28, 2009; pp. 774-782.
Spiers, A.G., "Fungicides for control of poplar leaf rust and effects of control on growth of Populus nigra cv Sempervirens' and P. . . . times. euramericana cv 'I-214", New Zealand Journal of Experimental Agriculture, vol. 4, No. 2, 1976; pp. 249-254; DOI: 10.1080/03015521.1976.10425878.
Supplementary European Search Report for the corresponding European Application No. 14865506, Date of completion: Aug. 31, 2016; 5 pages.
Supplementary Search Report for the corresponding Chinese Application No. 201480063556, Dated: Dec. 8, 2017; 1 page.
Turner, J. (Ed.); The Pesticide Manual (17th Edition); British Crop Production Council, Hampshire, UK; 2015; pp. 66-67, 93-94, 277-278, 409-410, 689-691, 887-888, 930-933, 944-945, 950, 1054-1056.
Venancio, W. S. et al., "Comparison of Asian Soybean Rust Chemical Control on a Susceptible and a Resistant Cultivar in Brazil", Plant Management Network, 2011 Field Crops Rust Symposium: Abstract; 1 page.
Wiglesworth, M. et al.; "Oxathiapiprolin: A new fungicide for control of Oomycete diseases" [Abstract]; Phytopathology, vol. 105, Issue No. 4, Supplement 2; 2015; 13 pages; DOI: dx.doi.org/10.1094/PHYTO-105-4-S2.1.

* cited by examiner

FUNGICIDAL COMBINATIONS

CROSS REFERENCE TO RELATED APPLICATIONS

This application is a National Stage application of PCT/IB2018/050964, filed Feb. 16, 2018, which claims the benefit of Indian Application No. 201731008009, filed on Mar. 7, 2017, both of which are incorporated by reference in their entirety herein.

TECHNICAL FIELD

The present invention relates to a combination of fungicides. More specifically, the present invention relates to fungicidal combinations comprising succinate dehydrogenase inhibitor fungicides for controlling a broad spectrum of fungal diseases.

BACKGROUND OF THE INVENTION

Fungicides are an integral and important tool yielded by farmers to control diseases, as well as to improve yields and quality of the crops. There are various fungicides that have been developed over the years with many desirable attributes such as specificity, systemicity, curative and eradicant action and high activity at low use rates.

Succinate dehydrogenase inhibitor (SDHI) fungicides are known in the art to be broad spectrum and have a high potency. Pyrazolecarboxamides are a group of active compounds within the SDHI family of fungicides that are known to be more potent than most other SDHI fungicides. These molecules specifically bind to the ubiquinone-binding site (Q-site) of the mitochondrial complex II, thereby inhibiting fungal respiration. These fungicides are known to control a broad spectrum of fungal diseases.

Various other classes of fungicides are also known in the art, such as Quinone outside inhibitors (QoIs), ergosterol-biosynthesis inhibitors, fungicides that act on multiple sites, fungicides that affect mitosis etc. These fungicides have been mixed with SDHI fungicides to achieve a broad spectrum of disease control.

WO2006037632 teaches combinations of SDHI fungicides with a second active compound. WO2013127818 teaches combinations of SDHI fungicides with various herbicides. WO2006037634 teaches methods of controlling fungi using a combination of SDHI fungicide with various fungicides. However, the prior art does not teach the use of ternary or higher combinations of SDHI fungicides.

Multi-site fungicides are known to attack fungi at multiple sites. These fungicides are used for broad-spectrum disease control. Multi-site fungicides are especially important in resistance management as well as in control of widespread diseases. Multi-site fungicides are particularly useful for disease control because of their broad spectrum of activity, high tolerance by crop plants, and general usefulness for controlling fungal plant diseases not controlled by active compounds that act on only a single target site in the fungus.

Many multi-site fungicides have been combined with various SDHI fungicides for disease control. There is a need in the art to improve on the disease spectrum provided by these combinations, particularly with a view to overcoming the resistance being developed to these fungicides.

There is therefore a need in the art for combinations of SDHIs with specific multi-site fungicides that helps improve spectrum and overcoming the resistance seen with these fungicides. As crop tolerances are decreasing, lower use rates being imposed and resistance being increasingly observed, there is a need for a combination of actives that allows for broader disease control spectrum that combines curative and preventive actives and has a lower dosage requirement for efficacious control of fungi.

Therefore, embodiments of the present invention may ameliorate one or more of the above mentioned problems:

ONE OR MORE ADVANTAGES OF THE PRESENT INVENTION

Therefore, embodiments of the present invention may provide combinations of fungicides that possess an enhanced efficacy over the individual fungicides used in isolation.

Another object of the present invention is to provide a fungicidal combination that causes an enhanced greening of the crops to which it is administered.

Another object of the present invention is to provide a fungicidal combination that causes late senescence to the crop to which it is applied thereby resulting into an increasing yield of the crop.

Yet another object of the present invention is to provide a fungicidal combination that results into reduced fungal disease incidence in the crops to which it is applied.

Another object of the present invention is to provide a fungicidal combination that achieves increased yield in the crops to which it is applied.

Some or all these and other objects of the invention are can be achieved by way of the invention described hereinafter.

SUMMARY OF THE INVENTION

Thus, an aspect of the present invention can provide a fungicidal combination comprising at least one succinate dehydrogenase inhibitor fungicide, at least one multi-site fungicide, and at least another fungicide.

Another aspect of the present invention can provide a fungicidal combination comprising at least one succinate dehydrogenase inhibitor fungicide, at least multi-site fungicide and at least two other fungicides.

Another aspect of the present invention can provide synergistic compositions comprising at least one succinate dehydrogenase inhibitor fungicide, at least multi-site fungicide, and at least one other fungicide.

Another aspect of the present invention can provide synergistic compositions comprising at least one succinate dehydrogenase inhibitor fungicide, at least one multi-site fungicide and at least two other fungicides.

DETAILED DESCRIPTION

The term 'disease control' as used herein denotes control and prevention of a disease. Controlling effects include all deviation from natural development, for example: killing, retardation, decrease of the fugal disease. The term 'plants' refers to all physical parts of a plant, including seeds, seedlings, saplings, roots, tubers, stems, stalks, foliage and fruits. The term "locus" of a plant as used herein is intended to embrace the place on which the plants are growing, where the plant propagation materials of the plants are sown or where the plant propagation materials of the plants will be placed into the soil. The term "plant propagation material" is understood to denote generative parts of a plant, such as seeds, vegetative material such as cuttings or tubers, roots, fruits, tubers, bulbs, rhizomes and parts of plants, germinated plants and young plants which are to be transplanted after germination or after emergence from the soil. These young plants may be protected before transplantation by a total or partial treatment by immersion. The term "agriculturally acceptable amount of active" refers to an amount of an active that kills or inhibits the plant disease for which control is desired, in an amount not significantly toxic to the plant being treated.

Succinate dehydrogenase inhibitor (SDHI) fungicides play an important role in plant protection against many phytopathogenic fungi. These molecules specifically bind to the ubiquinone-binding site (Q-site) of the mitochondrial complex II, thereby inhibiting fungal respiration. Multi-site contact fungicides attack multiple sites within the fugal cells.

It has surprisingly been found that the addition of a multi-site fungicide to the combinations of succinate dehydrogenase inhibitors with at least another fungicide resulted in surprising and unexpected advantages. It was surprising that the addition of a multi-site fungicide fungicide to the combination of a succinate dehydrogenase inhibitor with at least another fungicide resulted in an enhancement of the efficacy, and a surprising reduction in fungal disease incidence, seen only with the combination of succinate dehydrogenase inhibitors with at least multi-site fungicide and atleast one other fungicide that is not an SDHI. It has further been found that the addition of a multi-site fungicide to these combinations and application of these combinations during the flowering stage of the crop delayed the senescence in the crop to which they were applied, which led to better greening in the crop thereby increasing the level of photosynthesis occurring within the plant, thereby leading to a greater yield from the crop to which they were applied.

These surprising advantages of the combinations of the invention were not observed when the multi-site fungicide was not present in the combination. Therefore, these unexpected advantages of the combination of the present invention could be attributed to the inclusion of a multi-site fungicide to the combination of a succinate dehydrogenase inhibitor with at least one or two other fungicides.

The present inventors have found that in the absence of the multi-site fungicide of the present invention, the combination of SDHI fungicides+at least another fungicide or at least two other fungicides shows a reduction of control effectiveness by continuous use over successive years. It was found that the addition of the multi-site fungicide not only enhanced the percentage control, but also reverted the observed control to the original level, which was surprising. Thus, the gradual decay in the percentage efficacy seen by the use of "SDHIs+at least another fungicide+(optionally) at least another fungicide" over the years was reversed with the addition of the multi-site fungicide.

Thus, in an aspect, the present invention provides a fungicidal combination comprising:
(a) at least one multi-site fungicide;
(b) at least one succinate dehydrogenase inhibitor fungicide; and
(c) at least a third fungicide.

In an embodiment, the multi-site fungicide is selected from the group consisting of dithiocarbamates, phthalimides, chloronitriles, inorganic fungicides, sulfamides, bisguanidines, triazines, quinones, quinoxalines, dicoarboxamides and mixtures thereof.

In an embodiment, the multi-site fungicide is selected from the class of dithiocarbamate fungicides selected from asamobam, asomate, azithiram, carbamorph, cufraneb, cuprobam, disulfiram, ferbam, metam, nabam, tecoram, thiram, urbacide, ziram, dazomet, etem, milneb, mancopper, mancozeb, maneb, metiram, polycarbamate, propineb and zineb.

In an embodiment, the multi-site fungicide is a phthalimide fungicide selected from captan, captafol and folpet.

In an embodiment, the multi-site fungicide is a chloronitrile fungicide such as chlorothalonil.

In an embodiment, the multi-site fungicide is a sulfamide fungicide selected from dichlofluanid and tolylfluanid.

In an embodiment, the multi-site fungicide is a bisguanidine fungicide selected from guazatine and iminoctadine.

In an embodiment, the multi-site fungicide is a triazine fungicide selected from anilazine.

In an embodiment, the multi-site fungicide is a quinone fungicide selected from dithianon.

In an embodiment, the multi-site fungicide is a quinoxaline fungicide selected from quinomethionate and chlorquinox.

In an embodiment, the multi-site fungicide is a dicarboxamide fungicide selected from fluoroimide.

In an embodiment, the multi-site fungicide is an inorganic fungicide selected from copper fungicides including copper (II) hydroxide, copper oxychloride, copper (II) sulfate, basic copper sulfate, Bordeaux mixture, copper salicylate $C_7H_4O_3$*Cu, cuprous oxide $CU_2O$; or sulphur.

In an embodiment, the succinate dehydrogenase inhibitor is selected from pyrazole carboxamide class of succinate dehydrogenase inhibitor fungicides. However, it should be understood that the choice of succinate dehydrogenase inhibitors is not understood to be limited to these pyrazole carboxamide fungicides alone.

In an embodiment, the pyrazole carboxamide class of succinate dehydrogenase inhibitor fungicide may be selected from benzovindiflupyr, bixafen, fluxapyroxad, furametpyr, isopyrazam, penflufen, penthiopyrad, 3-difluoromethyl-N-(7-fluoro-1, 1, 3-trimethyl-4-indanyl)-1-methyl-4-pyrazolecarboxamide and sedaxane.

Benzovindiflupyr has the chemical name N-[(1RS,4SR)-9-(dichloromethylene)-1,2,3,4-tetrahydro-1,4-methanonaphthalen-5-yl]-3-(difluoromethyl)-1-methylpyrazole-4-carboxamide and has the structure:

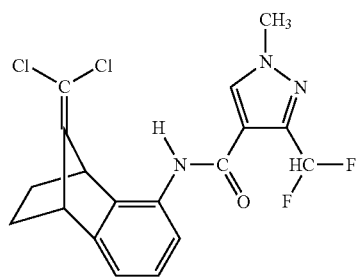 [SMILES: Cn1cc(C(=O)Nc2cccc3c2C2CCC3C2=C(Cl)Cl)c(C(F)F)n1]

Bixafen has the chemical name N-(3',4'-dichloro-5-fluorobiphenyl-2-yl)-3-(difluoromethyl)-1-methylpyrazole-4-carboxamide and the structure:

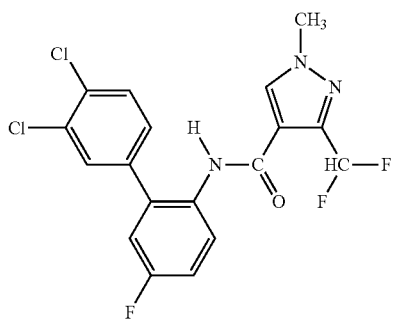 [SMILES: Cn1cc(C(=O)Nc2ccc(F)cc2-c2ccc(Cl)c(Cl)c2)c(C(F)F)n1]

Fluxapyroxad has the chemical name 3-(difluoromethyl)-1-methyl-N-(3',4',5'-trifluorobiphenyl-2-yl)pyrazole-4-carboxamide and has the structure:

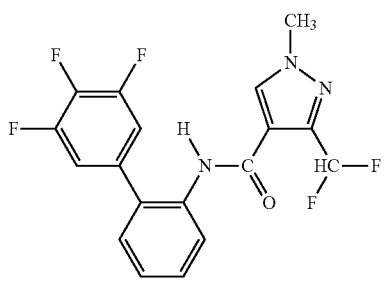 [SMILES: Cn1cc(C(=O)Nc2ccccc2-c2cc(F)c(F)c(F)c2)c(C(F)F)n1]

Furametpyr has the chemical name (RS)-5-chloro-N-(1,3-dihydro-1,1,3-trimethylisobenzofuran-4-yl)-1,3-dimethylpyrazole-4-carboxamide and has the structure:

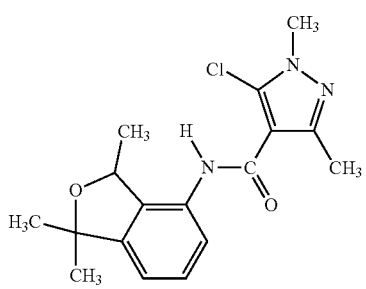

Isopyrazam is a mixture of 2 isomers 3-(difluoromethyl)-1-methyl-N-[(1RS,4SR,9RS)-1,2,3,4-tetrahydro-9-isopropyl-1,4-methanonaphthalen-5-yl]pyrazole-4-carboxamide and 2 aisomers 3-(difluoromethyl)-1-methyl-N-[(1RS,4SR,9SR)-1,2,3,4-tetrahydro-9-isopropyl-1,4-methanonaphthalen-5-yl]pyrazole-4-carboxamide and its tautomer's have the structure:

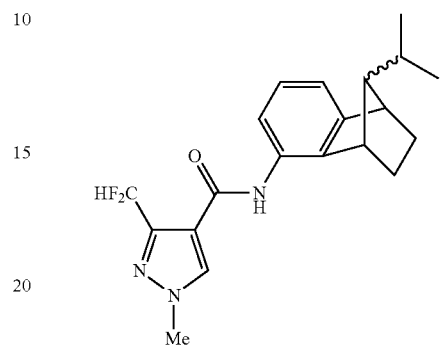

Penflufen has the chemical name N-[2-(1,3-dimethylbutyl)phenyl]-5-fluoro-1,3-dimethyl-1H-pyrazole-4-carboxamide, and has the following structure:

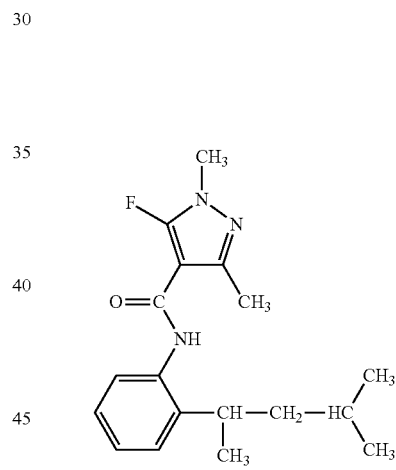

Penthiopyrad has the chemical name (RS)—N-[2-(1,3-dimethylbutyl)-3-thienyl]-1-methyl-3-(trifluoromethyl)pyrazole-4-carboxamide, and has the following structure:

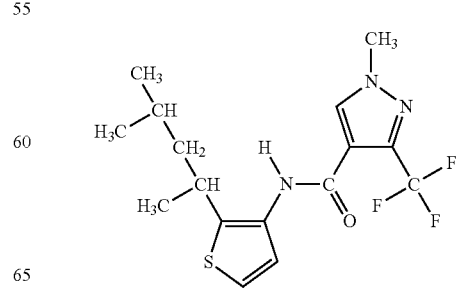

Sedaxane is a mixture of 2 cis-isomers 2'-[(1RS,2RS)-1,1'-bicycloprop-2-yl]-3-(difluoromethyl)-1-methylpyrazole-4-carboxanilide and 2 trans-isomers 2'-[(1RS,2SR)-1,1'-bicycloprop-2-yl]-3-(difluoromethyl)-1-methylpyrazole-4-carboxanilide, and its tautomers have the structure:

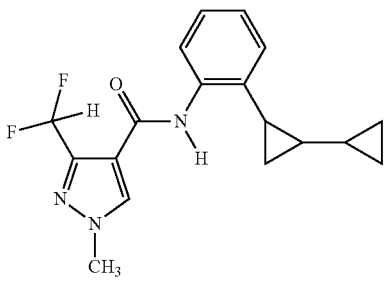 [SMILES: Cn1cc(C(=O)Nc2ccccc2C2CC2C2CC2)c(C(F)F)n1]

In an embodiment, the succinate dehydrogenase inhibitor fungicide may be selected from the group consisting of benodanil, flutolanil, mepronil, isofetamid, fluopyram, fenfuram, carboxin, oxycarboxin, thifluzamide, pydiflumetofen; isofetamid and boscalid.

In an embodiment, the third and/or fourth fungicides in the combinations of the present invention may be selected from nucleic acids synthesis inhibitors, cytoskeleton and motor protein inhibitors, amino acids and protein synthesis inhibitors, respiration process inhibitors, signal transduction inhibitors, lipid synthesis and membrane integrity distruptors, sterol biosynthesis inhibitors, melanin synthesis inhibitors, cell wall biosynthesis inhibitors, host plant defence inductors and/or fungicides with unknown modes of action.

Thus, in an embodiment, the nucleic acid synthesis inhibitor fungicides may be selected from acylalanines such as benalaxyl, benalaxyl-M (kiralaxyl), furalaxyl, metalaxyl, metalaxyl-M (mefenoxam), oxazolidinones such as oxadixyl, butyrolactones such as ofurace, hydroxy-(2-amino-)pyrimidines such as bupirimate, dimethirimol, ethirimol, isoxazoles such as hymexazole, isothiazolones such as octhilinone, carboxylic acids such as oxolinic acid.

In an embodiment, the cytoskeleton and motor protein inhibitors may be benzimidazoles such as benomyl, carbendazim, fuberidazole, thiabendazole; thiophanates such as thiophanate, thiophanate-methyl; N-phenyl carbamates such as diethofencarb; toluamides such as zoxamide; thiazole carboxamides such as ethaboxam; phenylureas such as pencycuron, benzamides such as fluopicolide; cyanoacrylates such as phenamacril.

In an embodiment, the respiration process inhibitor fungicides may be selected from pyrimidinamines such as diflumetorim; pyrazole-5-carboxamides such as tolfenpyrad, strobilurins such as azoxystrobin, coumoxystrobin, enoxastrobin, flufenoxystrobin, picoxystrobin, pyraoxystrobin, mandestrobin, pyraclostrobin, pyrametostrobin, triclopyricarb, kresoxim-methyl, dimoxystrobin, fenaminostrobin, metominostrobin, trifloxystrobin, famoxadone, fluoxastrobin, fenamidone, pyribencarb and mixtures thereof; oxazolidine-diones such as famoxadone; Imidazolinones such as fenamidone; benzyl-carbamates such as pyribencarb; N-methoxy-(phenyl-ethyl)-pyrazole-carboxamides such as Pyrimidinamines such as diflumetorim; cyano-imidazole such as cyazofamid;

sulfamoyl-triazole such as amisulbrom; dinitrophenyl crotonates such as binapacryl, meptyldinocap, dinocap; 2,6-dinitro-anilines such as fluazinam; pyr.-hydrazones such as ferimzone; tri-phenyl tin compounds such as fentin acetate, fentin chloride, fentin hydroxide; thiophene-carboxamides such as silthiofam; triazolo-pyrimidylamine such as ametoctradin.

In an embodiment, amino acids and protein synthesis inhibitor fungicides may be selected from anilino-pyrimidines such as cyprodinil, mepanipyrim, pyrimethanil, antibiotic fungicides such as blasticidin-S, kasugamycin, streptomycin, oxytetracycline and the like.

In an embodiment, signal transduction inhibitor fungicides may be selected from aryloxyquinolines such as quinoxyfen; quinazolinones such as proquinazid; phenylpyrroles such as fenpiclonil, fludioxonil; dicarboximides such as chlozolinate, dimethachlone, iprodione, procymidone and vinclozolin.

In an embodiment, the fungicide may be selected from lipid synthesis and membrane integrity distruptors such as phosphoro-thiolates such as edifenphos Iprobenfos, pyrazophos; dithiolanes such as isoprothiolane; aromatic hydrocarbons such as biphenyl, chloroneb, dicloran, quintozene (PCNB), tecnazene (TCNB), tolclofos-methyl and the like; 1,2,4-thiadiazoles such as etridiazole; carbamates such as iodocarb, propamocarb, prothiocarb and the like.

Thus in an embodiment, the sterol biosynthesis inhibitors may be selected from triazoles such as azaconazole, bitertanol, bromuconazole, cyproconazole, difenoconazole, diniconazole, epoxiconazole, etaconazole, fenbuconazole, fluquinconazole, flusilazole, flutriafol, hexaconazole, imibenconazole, Ipconazole, metconazole, myclobutanil, penconazole, Propiconazole, simeconazole, tebuconazole, tetraconazole, triadimefon, triadimenol, triticonazole, prothioconazole, piperazines such as triforine; pyridines such as pyrifenox, pyrisoxazole; pyrimidines such as fenarimol, nuarimol imidazoles such as imazalil, oxpoconazole, pefurazoate, prochloraz, triflumizole; morpholines such as aldimorph, dodemorph, fenpropimorph, tridemorph and the like; piperidines such as fenpropidin, piperalin; spiroketal-amines such as spiroxamine; hydroxyanilides such as fenhexamid; amino-pyrazolinones such as fenpyrazamine; thiocarbamates such as pyributicarb; allylamines such as naftifine, terbinafine and mixtrues thereof.

In an embodiment, cell wall biosynthesis inhibitor fungicides may be selected from peptidyl pyrimidine nucleoside fungicides such as polyoxin, cinnamic acid amides such as dimethomorph, flumorph, pyrimorph; valinamide carbamates such as benthiavalicarb, iprovalicarb, valifenalate; mandelic acid amides such as mandipropamid and mixtures thereof.

In an embodiment, melanin synthesis inhibitor fungicide may be selected from isobenzo-furanone such as fthalide; pyrrolo-quinolinones such as pyroquilon; triazolobenzo-thiazoles such as tricyclazole; cyclopropane-carboxamides such as carpropamid; carboxamides such as diclocymet; propionamides such as fenoxanil; trifluoroethyl-carbamates such as tolprocarb; and mixtures thereof.

In an embodiment, host plant defence inductors fungicides may be selected from benzo-thiadiazoles such as acibenzolar-S-methyl; benzisothiazoles such as probenazole; thiadiazole-carboxamides such as tiadinil, isotianil; polysaccharides such as laminarin; and mixtures thereof.

In an embodiment, the additional third or fourth fungicide is a fungicide with unknown mode of action and may be selected from cyanoacetamide-oximes such as cymoxanil; ethyl phosphonates such as foestyl —Al, phophorous acid and salts; phthalamic acids such as teclofthalam; benzotriazines such as triazoxide; benzene-sulphonamides such as flusulfamide; pyridazinones such as diclomezine; thiocarbamates such as methasulfocarb; phenyl-acetamides such as cyflufenamid; aryl-phenyl-ketones such as metrafenone, pyriofenone; guanidines such as dodine; cyano-methylene-thiazolidines such as flutianil; pyrimidinone-hydrazones such as ferimzone; piperidinyl-thiazole-isoxazolines such as oxathiapiprolin; 4-quinolyl-acetates such as tebufloquin; tetrazolyloximes such as picarbutrazox; glucopyranosyl antibiotics such as validamycin; fungicides such as mineral oil, organic oils, potassium bicarbonate and mixtures thereof.

In an embodiment, the preferred multi-site fungicide may be selected from mancozeb, folpet, copper salt e.g. tribasic copper sulfate (TBCS), chlorothalonil, and sulphur.

In an embodiment of the combinations of the present invention, the preferred succinate dehydrogenase inhibitor fungicide may be isopyrazam, benzovindyflupyr, benodanil, flutolanil, mepronil, isofetamid, fluopyram, fenfuram, carboxin, oxycarboxin, thifluzamide, boscalid and IR9792.

In a preferred embodiment, the third and/or fourth fungicides in the combinations of the present invention may be selected from ergosterol biosynthesis inhibitors, and/or Quinone outside (Qo) inhibitors or mixtures thereof.

Thus in an embodiment, the ergosterol biosynthesis inhibitors may be selected from the group consisting of azaconazole, bitertanol, bromuconazole, cyproconazole, difenoconazole, diniconazole, epoxiconazole, etaconazole, fenbuconazole, fluquinconazole, flusilazole, flutriafol, hexaconazole, imibenconazole, Ipconazole, metconazole, myclobutanil, penconazole, Propiconazole, simeconazole, tebuconazole, tetraconazole, triadimefon, triadimenol, triticonazole, prothioconazole, imazalil, oxpoconazole, pefurazoate, prochloraz, triflumizole, fenarimol, nuarimol, pyrifenox, pyrisoxazole, triforine and mixtures thereof.

In another embodiment, the ergosterol biosynthesis inhibitors may be selected from prothioconazole, tebuconazole, hexaconazole, cyroconazole or epoxiconazole.

In an embodiment, the third fungicide may be a Quinone outside (Qo) inhibitor fungicide selected from azoxystrobin, coumoxystrobin, enoxastrobin, flufenoxystrobin, picoxystrobin, pyraoxystrobin, mandestrobin, pyraclostrobin, pyrametostrobin, triclopyricarb, kresoxim-methyl, dimoxystrobin, fenaminostrobin, metominostrobin, trifloxystrobin, famoxadone, fluoxastrobin, fenamidone, pyribencarb and mixtures thereof.

In an embodiment, the Quinone outside (Qo) inhibitor fungicide may be selected from azoxystrobin, picoxystrobin, kresoxim-methyl, pyraclostrobin and trifloxystrobin.

In an embodiment of the combinations of the present invention, the preferred succinate dehydrogenase inhibitor fungicide is isopyrazam.

In an embodiment, the combinations of the present invention include the following preferred combinations.

In the exemplary combinations tabulated below, the term "Fungicide A" means at least one, and preferably individually each one of the fungicides selected from mancozeb (A1), folpet (A2), copper salt e.g. tribasic copper sulfate (TBCS (A3)), chlorothalonil (A4), or sulphur (A5) as being specifically combined herein with the remaining fungicides.

In the exemplary combinations tabulated below, the term "Fungicide B" means at least one, and preferably individually each one of the fungicides selected from isopyrazam (B1), benzovindiflupyr (B2), penthiopyrad (B3), boscalid (B4), IR9792 (fluindapyr (B5)), bixafen (B6), fluxapyroxad (B7), furametpyr (B8), penflufen (B9), 3-difluoromethyl-N-(7-fluoro-1, 1, 3-trimethyl-4-indanyl)-1-methyl-4-pyrazole-carboxamide (B10), sedaxane (B11), benodanil (B12), flutolanil (B13), mepronil (B14), isofetamid (B15), fluopyram (B16), fenfuram (B17), carboxin (B18), oxycarboxin (B19), thifluzamide (B20), pydiflumetofen (B21); isofetamid (B22) or boscalid (B23) as being specifically combined herein with the remaining fungicides.

In the exemplary combinations tabulated below, the term "Fungicide C" means at least one, and preferably individually each one of the fungicides selected from cyproconazole (C1), difenoconazole (C2), epoxiconazole (C3), hexaconazole (C4), tebuconazole (C5), tetraconazole (C6), prothioconazole (C7), metalaxyl (C8), metalaxyl-M (C9), benomyl (C10), carbendazim (C11), thiophanate-methyl (C12), zoxamide (C13), fluopicolide (C14), phenamacril (C15), cyazofamid (C16), amisulbrom (C17), tricyclazole (C18), oxathiapiprolin (C19), and picarbutrazox (C20).

In the exemplary combinations tabulated below, the term "Fungicide D" means at least one, and preferably individually each one of the fungicides selected from azoxystrobin (D1), picoxystrobin (D2), pyraclostrobin (D3), kresoxim-methyl (D4), trfloxystrobin (D5), cyproconazole (D6), difenoconazole (D7), hexaconazole (D8), epoxiconazole (D9), tebuconazole (D10), tetraconazole (D11), prothioconazole (D12), benomyl (D13), carbendazim (D14), thiphanate-methyl (D15), zoxamide (D16), fluopicolide (D17), phenamacril (D18), cyazofamid (D19), amisulbrom (D20), tricyclazole (D21), oxathiapiprolin (D22), picarbutrazox (D23), metalaxyl (D24), and metalaxyl-M (D25).

| S No. | A | B | C | D |
|---|---|---|---|---|
| 1 | Fungicide A | Fungicide B | Cyproconazole | — |
| 2 | Fungicide A | Fungicide B | Difenoconazole | — |
| 3 | Fungicide A | Fungicide B | Epoxiconazole | — |
| 4 | Fungicide A | Fungicide B | Hexaconazole | — |
| 5 | Fungicide A | Fungicide B | Tebuconazole | — |
| 6 | Fungicide A | Fungicide B | Tetraconazole | — |
| 7 | Fungicide A | Fungicide B | Prothioconazole | — |
| 8 | Fungicide A | Fungicide B | — | Azoxystrobin |
| 9 | Fungicide A | Fungicide B | — | Picoxystrobin |
| 10 | Fungicide A | Fungicide B | — | Pyraclostrobin |
| 11 | Fungicide A | Fungicide B | — | Kresoxim-methyl |
| 12 | Fungicide A | Fungicide B | — | Trifloxystrobin |
| 13 | Fungicide A | Fungicide B | Cyproconazole | Azoxystrobin |
| 14 | Fungicide A | Fungicide B | Cyproconazole | Picoxystrobin |
| 15 | Fungicide A | Fungicide B | Cyproconazole | Pyraclostrobin |
| 16 | Fungicide A | Fungicide B | Cyproconazole | Kresoxim-methyl |
| 17 | Fungicide A | Fungicide B | Cyproconazole | Trifloxystrobin |
| 18 | Fungicide A | Fungicide B | Difenoconazole | Azoxystrobin |
| 19 | Fungicide A | Fungicide B | Difenoconazole | Picoxystrobin |
| 20 | Fungicide A | Fungicide B | Difenoconazole | Pyraclostrobin |
| 21 | Fungicide A | Fungicide B | Difenoconazole | Kresoxim-methyl |
| 22 | Fungicide A | Fungicide B | Difenoconazole | Trifloxystrobin |
| 23 | Fungicide A | Fungicide B | Epoxiconazole | Azoxystrobin |
| 24 | Fungicide A | Fungicide B | Epoxiconazole | Picoxystrobin |
| 25 | Fungicide A | Fungicide B | Epoxiconazole | Pyraclostrobin |
| 26 | Fungicide A | Fungicide B | Epoxiconazole | Kresoxim-methyl |
| 27 | Fungicide A | Fungicide B | Epoxiconazole | Trifloxystrobin |
| 28 | Fungicide A | Fungicide B | Hexaconazole | Azoxystrobin |
| 29 | Fungicide A | Fungicide B | Hexaconazole | Picoxystrobin |
| 30 | Fungicide A | Fungicide B | Hexaconazole | Pyraclostrobin |
| 31 | Fungicide A | Fungicide B | Hexaconazole | Kresoxim-methyl |
| 32 | Fungicide A | Fungicide B | Hexaconazole | Trifloxystrobin |
| 33 | Fungicide A | Fungicide B | Tebuconazole | Azoxystrobin |
| 34 | Fungicide A | Fungicide B | Tebuconazole | Picoxystrobin |
| 35 | Fungicide A | Fungicide B | Tebuconazole | Pyraclostrobin |
| 36 | Fungicide A | Fungicide B | Tebuconazole | Kresoxim-methyl |
| 37 | Fungicide A | Fungicide B | Tebuconazole | Trifloxystrobin |
| 38 | Fungicide A | Fungicide B | Tetraconazole | Azoxystrobin |
| 39 | Fungicide A | Fungicide B | Tetraconazole | Picoxystrobin |
| 40 | Fungicide A | Fungicide B | Tetraconazole | Pyraclostrobin |

-continued

| S No. | A | B | C | D |
|---|---|---|---|---|
| 41 | Fungicide A | Fungicide B | Tetraconazole | Kresoxim-methyl |
| 42 | Fungicide A | Fungicide B | Tetraconazole | Trifloxystrobin |
| 43 | Fungicide A | Fungicide B | Prothioconazole | Azoxystrobin |
| 44 | Fungicide A | Fungicide B | Prothioconazole | Picoxystrobin |
| 45 | Fungicide A | Fungicide B | Prothioconazole | Pyraclostrobin |
| 46 | Fungicide A | Fungicide B | Prothioconazole | Kresoxim-methyl |
| 47 | Fungicide A | Fungicide B | Prothioconazole | Trifloxystrobin |
| 48 | Fungicide A | Fungicide B | Metalaxyl | — |
| 49 | Fungicide A | Fungicide B | Metalaxy-m | — |
| 50 | Fungicide A | Fungicide B | Benomyl | — |
| 51 | Fungicide A | Fungicide B | Carbendazim | — |
| 52 | Fungicide A | Fungicide B | Thiophanate methyl | — |
| 53 | Fungicide A | Fungicide B | Zoxamide | — |
| 54 | Fungicide A | Fungicide B | Fluopicolide | — |
| 55 | Fungicide A | Fungicide B | Phenamacril | — |
| 56 | Fungicide A | Fungicide B | Cyazofamid | — |
| 57 | Fungicide A | Fungicide B | Amisulbrom | — |
| 58 | Fungicide A | Fungicide B | Tricyclazole | — |
| 59 | Fungicide A | Fungicide B | Oxathiapiprolin | — |
| 60 | Fungicide A | Fungicide B | Picarbutrazox | — |
| 61 | Fungicide A | Fungicide B | Metalaxyl/Metalaxyl-M | Cyproconazole |
| 62 | Fungicide A | Fungicide B | Metalaxyl/Metalaxyl-M | Difenoconazole |
| 63 | Fungicide A | Fungicide B | Metalaxyl/Metalaxyl-M | Epoxiconazole |
| 64 | Fungicide A | Fungicide B | Metalaxyl/Metalaxyl-M | Hexaconazole |
| 65 | Fungicide A | Fungicide B | Metalaxyl/Metalaxyl-M | Tebuconazole |
| 66 | Fungicide A | Fungicide B | Metalaxyl/Metalaxyl-M | Tetraconazole |
| 67 | Fungicide A | Fungicide B | Metalaxyl/Metalaxyl-M | Prothioconazole |
| 68 | Fungicide A | Fungicide B | Metalaxyl/Metalaxyl-M | Azoxystrobin |
| 69 | Fungicide A | Fungicide B | Metalaxyl/Metalaxyl-M | Picoxystrobin |
| 70 | Fungicide A | Fungicide B | Metalaxyl/Metalaxyl-M | Pyraclostrobin |
| 71 | Fungicide A | Fungicide B | Metalaxyl/Metalaxyl-M | Kresoxim-methyl |
| 72 | Fungicide A | Fungicide B | Metalaxyl/Metalaxyl-M | Benomyl |
| 73 | Fungicide A | Fungicide B | Metalaxyl/Metalaxyl-M | Carbendazim |
| 74 | Fungicide A | Fungicide B | Metalaxyl/Metalaxyl-M | Thiophanate methyl |
| 75 | Fungicide A | Fungicide B | Metalaxyl/Metalaxyl-M | Zoxamide |
| 76 | Fungicide A | Fungicide B | Metalaxyl/Metalaxyl-M | Fluopicolide |
| 77 | Fungicide A | Fungicide B | Metalaxyl/Metalaxyl-M | Phenamacril |
| 78 | Fungicide A | Fungicide B | Metalaxyl/Metalaxyl-M | Cyazofamid |
| 79 | Fungicide A | Fungicide B | Metalaxyl/Metalaxyl-M | Amisulbrom |
| 80 | Fungicide A | Fungicide B | Metalaxyl/Metalaxyl-M | Tricyclazole |
| 81 | Fungicide A | Fungicide B | Metalaxyl/Metalaxyl-M | Oxathiapiprolin |
| 82 | Fungicide A | Fungicide B | Metalaxyl/Metalaxyl-M | Picarbutrazox |
| 83 | Fungicide A | Fungicide B | Benomyl | Cyproconazole |
| 84 | Fungicide A | Fungicide B | Benomyl | Difenoconazole |
| 85 | Fungicide A | Fungicide B | Benomyl | Epoxiconazole |
| 86 | Fungicide A | Fungicide B | Benomyl | Hexaconazole |
| 87 | Fungicide A | Fungicide B | Benomyl | Tebuconazole |
| 88 | Fungicide A | Fungicide B | Benomyl | Tetraconazole |
| 89 | Fungicide A | Fungicide B | Benomyl | Prothioconazole |
| 90 | Fungicide A | Fungicide B | Benomyl | Azoxystrobin |
| 91 | Fungicide A | Fungicide B | Benomyl | Picoxystrobin |
| 92 | Fungicide A | Fungicide B | Benomyl | Pyraclostrobin |
| 93 | Fungicide A | Fungicide B | Benomyl | Kresoxim-methyl |
| 94 | Fungicide A | Fungicide B | Benomyl | Metalaxyl/Metalaxyl-M |
| 95 | Fungicide A | Fungicide B | Benomyl | Carbendazim |
| 96 | Fungicide A | Fungicide B | Benomyl | Thiophanate methyl |
| 97 | Fungicide A | Fungicide B | Benomyl | Zoxamide |
| 98 | Fungicide A | Fungicide B | Benomyl | Fluopicolide |
| 99 | Fungicide A | Fungicide B | Benomyl | Phenamacril |
| 100 | Fungicide A | Fungicide B | Benomyl | Cyazofamid |
| 101 | Fungicide A | Fungicide B | Benomyl | amisulbrom |
| 102 | Fungicide A | Fungicide B | Benomyl | Tricyclazole |
| 103 | Fungicide A | Fungicide B | Benomyl | Oxathiapiprolin |
| 104 | Fungicide A | Fungicide B | Benomyl | Picarbutrazox |
| 105 | Fungicide A | Fungicide B | Carbendazim | Cyproconazole |
| 106 | Fungicide A | Fungicide B | Carbendazim | Difenoconazole |
| 107 | Fungicide A | Fungicide B | Carbendazim | Epoxiconazole |
| 108 | Fungicide A | Fungicide B | Carbendazim | Hexaconazole |
| 109 | Fungicide A | Fungicide B | Carbendazim | Tebuconazole |
| 110 | Fungicide A | Fungicide B | Carbendazim | Tetraconazole |
| 111 | Fungicide A | Fungicide B | Carbendazim | Prothioconazole |
| 112 | Fungicide A | Fungicide B | Carbendazim | Azoxystrobin |
| 113 | Fungicide A | Fungicide B | Carbendazim | Picoxystrobin |
| 114 | Fungicide A | Fungicide B | Carbendazim | Pyraclostrobin |
| 115 | Fungicide A | Fungicide B | Carbendazim | Kresoxim-methyl |
| 116 | Fungicide A | Fungicide B | Carbendazim | Benomyl |
| 117 | Fungicide A | Fungicide B | Carbendazim | Metalaxyl/Metalaxyl-M |
| 118 | Fungicide A | Fungicide B | Carbendazim | Thiophanate methyl |
| 119 | Fungicide A | Fungicide B | Carbendazim | Zoxamide |
| 120 | Fungicide A | Fungicide B | Carbendazim | Fluopicolide |
| 121 | Fungicide A | Fungicide B | Carbendazim | Phenamacril |
| 122 | Fungicide A | Fungicide B | Carbendazim | Cyazofamid |
| 123 | Fungicide A | Fungicide B | Carbendazim | Amisulbrom |
| 124 | Fungicide A | Fungicide B | Carbendazim | Tricyclazole |
| 125 | Fungicide A | Fungicide B | Carbendazim | Oxathiapiprolin |
| 126 | Fungicide A | Fungicide B | Carbendazim | Picarbutrazox |
| 127 | Fungicide A | Fungicide B | Thiophanate methyl | Cyproconazole |
| 128 | Fungicide A | Fungicide B | Thiophanate methyl | Difenoconazole |
| 129 | Fungicide A | Fungicide B | Thiophanate methyl | Epoxiconazole |
| 130 | Fungicide A | Fungicide B | Thiophanate methyl | Hexaconazole |
| 131 | Fungicide A | Fungicide B | Thiophanate methyl | Tebuconazole |
| 132 | Fungicide A | Fungicide B | Thiophanate methyl | Tetraconazole |
| 133 | Fungicide A | Fungicide B | Thiophanate methyl | Prothioconazole |
| 134 | Fungicide A | Fungicide B | Thiophanate methyl | Azoxystrobin |
| 135 | Fungicide A | Fungicide B | Thiophanate methyl | Picoxystrobin |
| 136 | Fungicide A | Fungicide B | Thiophanate methyl | Pyraclostrobin |
| 137 | Fungicide A | Fungicide B | Thiophanate methyl | Kresoxim-methyl |
| 138 | Fungicide A | Fungicide B | Thiophanate methyl | Benomyl |
| 139 | Fungicide A | Fungicide B | Thiophanate methyl | Carbendazim |
| 140 | Fungicide A | Fungicide B | Thiophanate methyl | Metalaxyl/Metalaxyl-M |
| 141 | Fungicide A | Fungicide B | Thiophanate methyl | Zoxamide |
| 142 | Fungicide A | Fungicide B | Thiophanate methyl | Fluopicolide |
| 143 | Fungicide A | Fungicide B | Thiophanate methyl | Phenamacril |
| 144 | Fungicide A | Fungicide B | Thiophanate methyl | Cyazofamid |

-continued

| S No. | A | B | C | D |
|---|---|---|---|---|
| 145 | Fungicide A | Fungicide B | Thiophanate methyl | Amisulbrom |
| 146 | Fungicide A | Fungicide B | Thiophanate methyl | Tricyclazole |
| 147 | Fungicide A | Fungicide B | Thiophanate methyl | Oxathiapiprolin |
| 148 | Fungicide A | Fungicide B | Thiophanate methyl | Picarbutrazox |
| 149 | Fungicide B | Fungicide B | Zoxamide | Cyproconazole |
| 150 | Fungicide A | Fungicide B | Zoxamide | Difenoconazole |
| 151 | Fungicide A | Fungicide B | Zoxamide | Epoxiconazole |
| 152 | Fungicide A | Fungicide B | Zoxamide | Hexaconazole |
| 153 | Fungicide A | Fungicide B | Zoxamide | Tebuconazole |
| 154 | Fungicide A | Fungicide B | Zoxamide | Tetraconazole |
| 155 | Fungicide A | Fungicide B | Zoxamide | Prothioconazole |
| 156 | Fungicide A | Fungicide B | Zoxamide | Azoxystrobin |
| 157 | Fungicide A | Fungicide B | Zoxamide | Picoxystrobin |
| 158 | Fungicide A | Fungicide B | Zoxamide | Pyraclostrobin |
| 159 | Fungicide A | Fungicide B | Zoxamide | Kresoxim-methyl |
| 160 | Fungicide A | Fungicide B | Zoxamide | Benomyl |
| 161 | Fungicide A | Fungicide B | Zoxamide | Carbendazim |
| 162 | Fungicide A | Fungicide B | Zoxamide | Metalaxyl/Metalaxyl-M |
| 163 | Fungicide A | Fungicide B | Zoxamide | Thiophanate methyl |
| 164 | Fungicide A | Fungicide B | Zoxamide | Fluopicolide |
| 165 | Fungicide A | Fungicide B | Zoxamide | Phenamacril |
| 166 | Fungicide A | Fungicide B | Zoxamide | Cyazofamid |
| 167 | Fungicide A | Fungicide B | Zoxamide | Amisulbrom |
| 168 | Fungicide A | Fungicide B | Zoxamide | Tricyclazole |
| 169 | Fungicide A | Fungicide B | Zoxamide | Oxathiapiprolin |
| 170 | Fungicide A | Fungicide B | Zoxamide | Picarbutrazox |
| 171 | Fungicide A | Fungicide B | Fluopicolide | Cyproconazole |
| 172 | Fungicide A | Fungicide B | Fluopicolide | Difenoconazole |
| 173 | Fungicide A | Fungicide B | Fluopicolide | Epoxiconazole |
| 174 | Fungicide A | Fungicide B | Fluopicolide | Hexaconazole |
| 175 | Fungicide A | Fungicide B | Fluopicolide | Tebuconazole |
| 176 | Fungicide A | Fungicide B | Fluopicolide | Tetraconazole |
| 177 | Fungicide A | Fungicide B | Fluopicolide | Prothioconazole |
| 178 | Fungicide A | Fungicide B | Fluopicolide | Azoxystrobin |
| 179 | Fungicide A | Fungicide B | Fluopicolide | Picoxystrobin |
| 180 | Fungicide A | Fungicide B | Fluopicolide | Pyraclostrobin |
| 181 | Fungicide A | Fungicide B | Fluopicolide | Kresoxim-methyl |
| 182 | Fungicide A | Fungicide B | Fluopicolide | Benomyl |
| 183 | Fungicide A | Fungicide B | Fluopicolide | Carbendazim |
| 184 | Fungicide A | Fungicide B | Fluopicolide | Metalaxyl/Metalaxyl-M |
| 185 | Fungicide A | Fungicide B | Fluopicolide | Thiophanate methyl |
| 186 | Fungicide A | Fungicide B | Fluopicolide | Zoxamide |
| 187 | Fungicide A | Fungicide B | Fluopicolide | Phenamacril |
| 188 | Fungicide A | Fungicide B | Fluopicolide | Cyazofamid |
| 189 | Fungicide A | Fungicide B | Fluopicolide | Amisulbrom |
| 190 | Fungicide A | Fungicide B | Fluopicolide | Tricyclazole |
| 191 | Fungicide A | Fungicide B | Fluopicolide | Oxathiapiprolin |
| 192 | Fungicide A | Fungicide B | Fluopicolide | Picarbutrazox |
| 193 | Fungicide A | Fungicide B | Phenamacril | Cyproconazole |
| 194 | Fungicide A | Fungicide B | Phenamacril | Difenoconazole |
| 195 | Fungicide A | Fungicide B | Phenamacril | Epoxiconazole |
| 196 | Fungicide A | Fungicide B | Phenamacril | Hexaconazole |
| 197 | Fungicide A | Fungicide B | Phenamacril | Tebuconazole |
| 198 | Fungicide A | Fungicide B | Phenamacril | Tetraconazole |
| 199 | Fungicide A | Fungicide B | Phenamacril | Prothioconazole |
| 200 | Fungicide A | Fungicide B | Phenamacril | Azoxystrobin |
| 201 | Fungicide A | Fungicide B | Phenamacril | Picoxystrobin |
| 202 | Fungicide A | Fungicide B | Phenamacril | Pyraclostrobin |
| 203 | Fungicide A | Fungicide B | Phenamacril | Kresoxim-methyl |
| 204 | Fungicide A | Fungicide B | Phenamacril | Benomyl |
| 205 | Fungicide A | Fungicide B | Phenamacril | Carbendazim |
| 206 | Fungicide A | Fungicide B | Phenamacril | Metalaxyl/Metalaxyl-M |
| 207 | Fungicide A | Fungicide B | Phenamacril | Thiophanate methyl |
| 208 | Fungicide A | Fungicide B | Phenamacril | Zoxamide |
| 209 | Fungicide A | Fungicide B | Phenamacril | Fluopicolide |
| 210 | Fungicide A | Fungicide B | Phenamacril | Cyazofamid |
| 211 | Fungicide A | Fungicide B | Phenamacril | Amisulbrom |
| 212 | Fungicide A | Fungicide B | Phenamacril | Tricyclazole |
| 213 | Fungicide A | Fungicide B | Phenamacril | Oxathiapiprolin |
| 214 | Fungicide A | Fungicide B | Phenamacril | Picarbutrazox |
| 215 | Fungicide A | Fungicide B | Cyazofamid | Cyproconazole |
| 216 | Fungicide A | Fungicide B | Cyazofamid | Difenoconazole |
| 217 | Fungicide A | Fungicide B | Cyazofamid | Epoxiconazole |
| 218 | Fungicide A | Fungicide B | Cyazofamid | Hexaconazole |
| 219 | Fungicide A | Fungicide B | Cyazofamid | Tebuconazole |
| 220 | Fungicide A | Fungicide B | Cyazofamid | Tetraconazole |
| 221 | Fungicide A | Fungicide B | Cyazofamid | Prothioconazole |
| 222 | Fungicide A | Fungicide B | Cyazofamid | Azoxystrobin |
| 223 | Fungicide A | Fungicide B | Cyazofamid | Picoxystrobin |
| 224 | Fungicide A | Fungicide B | cyazofamid | Pyraclostrobin |
| 225 | Fungicide A | Fungicide B | Cyazofamid | Kresoxim-methyl |
| 226 | Fungicide A | Fungicide B | Cyazofamid | Benomyl |
| 227 | Fungicide A | Fungicide B | Cyazofamid | Carbendazim |
| 228 | Fungicide A | Fungicide B | Cyazofamid | Metalaxyl/Metalaxyl-M |
| 229 | Fungicide A | Fungicide B | Cyazofamid | Thiophanate methyl |
| 230 | Fungicide A | Fungicide B | Cyazofamid | Zoxamide |
| 231 | Fungicide A | Fungicide B | Cyazofamid | Fluopicolide |
| 232 | Fungicide A | Fungicide B | Cyazofamid | Phenamacril |
| 233 | Fungicide A | Fungicide B | Cyazofamid | Amisulbrom |
| 234 | Fungicide A | Fungicide B | Cyazofamid | Tricyclazole |
| 235 | Fungicide A | Fungicide B | Cyazofamid | Oxathiapiprolin |
| 236 | Fungicide A | Fungicide B | Cyazofamid | Picarbutrazox |
| 237 | Fungicide A | Fungicide B | Amisulbrom | Cyproconazole |
| 238 | Fungicide A | Fungicide B | Amisulbrom | Difenoconazole |
| 239 | Fungicide A | Fungicide B | Amisulbrom | Epoxiconazole |
| 240 | Fungicide A | Fungicide B | Amisulbrom | Hexaconazole |
| 241 | Fungicide A | Fungicide B | Amisulbrom | Tebuconazole |
| 242 | Fungicide A | Fungicide B | Amisulbrom | Tetraconazole |
| 243 | Fungicide A | Fungicide B | Amisulbrom | Prothioconazole |
| 244 | Fungicide A | Fungicide B | Amisulbrom | Azoxystrobin |
| 245 | Fungicide A | Fungicide B | Amisulbrom | Picoxystrobin |
| 246 | Fungicide A | Fungicide B | Amisulbrom | Pyraclostrobin |
| 247 | Fungicide A | Fungicide B | Amisulbrom | Kresoxim-methyl |
| 248 | Fungicide A | Fungicide B | Amisulbrom | Benomyl |
| 249 | Fungicide A | Fungicide B | Amisulbrom | Metalaxyl/Metalaxyl-M |
| 250 | Fungicide A | Fungicide B | Amisulbrom | Carbendazim |
| 251 | Fungicide A | Fungicide B | Amisulbrom | Thiophanate methyl |
| 252 | Fungicide A | Fungicide B | Amisulbrom | Zoxamide |
| 253 | Fungicide A | Fungicide B | Amisulbrom | Fluopicolide |
| 254 | Fungicide A | Fungicide B | Amisulbrom | Cyazofamid |
| 255 | Fungicide A | Fungicide B | Amisulbrom | Tricyclazole |
| 256 | Fungicide A | Fungicide B | Amisulbrom | Oxathiapiprolin |
| 257 | Fungicide A | Fungicide B | Amisulbrom | Picarbutrazox |
| 258 | Fungicide A | Fungicide B | Tricyclazole | Cyproconazole |
| 259 | Fungicide A | Fungicide B | Tricyclazole | Difenoconazole |
| 260 | Fungicide A | Fungicide B | Tricyclazole | Epoxiconazole |
| 261 | Fungicide A | Fungicide B | Tricyclazole | Hexaconazole |
| 262 | Fungicide A | Fungicide B | Tricyclazole | Tebuconazole |
| 263 | Fungicide A | Fungicide B | Tricyclazole | Tetraconazole |
| 264 | Fungicide A | Fungicide B | Tricyclazole | Prothioconazole |
| 265 | Fungicide A | Fungicide B | Tricyclazole | Azoxystrobin |
| 266 | Fungicide A | Fungicide B | Tricyclazole | Picoxystrobin |
| 267 | Fungicide A | Fungicide B | Tricyclazole | Pyraclostrobin |
| 268 | Fungicide A | Fungicide B | Tricyclazole | Kresoxim-methyl |
| 269 | Fungicide A | Fungicide B | Tricyclazole | Benomyl |
| 270 | Fungicide A | Fungicide B | Tricyclazole | Carbendazim |
| 271 | Fungicide A | Fungicide B | Tricyclazole | Metalaxyl/Metalaxyl-M |
| 272 | Fungicide A | Fungicide B | Tricyclazole | Thiophanate methyl |
| 273 | Fungicide A | Fungicide B | Tricyclazole | Zoxamide |
| 274 | Fungicide A | Fungicide B | Tricyclazole | Fluopicolide |
| 275 | Fungicide A | Fungicide B | Tricyclazole | Cyazofamid |
| 276 | Fungicide A | Fungicide B | Tricyclazole | Amisulbrom |

-continued

| S No. | A | B | C | D |
|---|---|---|---|---|
| 277 | Fungicide A | Fungicide B | Tricyclazole | Oxathiapiprolin |
| 278 | Fungicide A | Fungicide B | Tricyclazole | Picarbutrazox |
| 279 | Fungicide A | Fungicide B | Picarbutrazox | Cyproconazole |
| 280 | Fungicide A | Fungicide B | Picarbutrazox | Difenoconazole |
| 281 | Fungicide A | Fungicide B | Picarbutrazox | Epoxiconazole |
| 282 | Fungicide A | Fungicide B | Picarbutrazox | Hexaconazole |
| 283 | Fungicide A | Fungicide B | Picarbutrazox | Tebuconazole |
| 284 | Fungicide A | Fungicide B | Picarbutrazox | Tetraconazole |
| 285 | Fungicide A | Fungicide B | Picarbutrazox | Prothioconazole |
| 286 | Fungicide A | Fungicide B | Picarbutrazox | Azoxystrobin |
| 287 | Fungicide A | Fungicide B | Picarbutrazox | Picoxystrobin |
| 288 | Fungicide A | Fungicide B | Picarbutrazox | Pyraclostrobin |
| 289 | Fungicide A | Fungicide B | Picarbutrazox | Kresoxim-methyl |
| 290 | Fungicide A | Fungicide B | Picarbutrazox | Benomyl |
| 291 | Fungicide A | Fungicide B | Picarbutrazox | Carbendazim |
| 292 | Fungicide A | Fungicide B | Picarbutrazox | Metalaxyl/Metalaxyl-M |
| 293 | Fungicide A | Fungicide B | Picarbutrazox | Thiophanate methyl |
| 294 | Fungicide A | Fungicide B | Picarbutrazox | Zoxamide |
| 295 | Fungicide A | Fungicide B | Picarbutrazox | Fluopicolide |
| 296 | Fungicide A | Fungicide B | Picarbutrazox | Cyazofamid |
| 297 | Fungicide A | Fungicide B | Picarbutrazox | Amisulbrom |
| 298 | Fungicide A | Fungicide B | Picarbutrazox | Oxathiapiprolin |
| 299 | Fungicide A | Fungicide B | Oxathiapiprolin | Cyproconazole |
| 300 | Fungicide A | Fungicide B | Oxathiapiprolin | Difenoconazole |
| 301 | Fungicide A | Fungicide B | Oxathiapiprolin | Epoxiconazole |
| 302 | Fungicide A | Fungicide B | Oxathiapiprolin | Hexaconazole |
| 303 | Fungicide A | Fungicide B | Oxathiapiprolin | Tebuconazole |
| 304 | Fungicide A | Fungicide B | Oxathiapiprolin | Tetraconazole |
| 305 | Fungicide A | Fungicide B | Oxathiapiprolin | Prothioconazole |
| 306 | Fungicide A | Fungicide B | Oxathiapiprolin | Azoxystrobin |
| 307 | Fungicide A | Fungicide B | Oxathiapiprolin | Picoxystrobin |
| 308 | Fungicide A | Fungicide B | Oxathiapiprolin | Pyraclostrobin |
| 309 | Fungicide A | Fungicide B | Oxathiapiprolin | Kresoxim-methyl |
| 310 | Fungicide A | Fungicide B | Oxathiapiprolin | Benomyl |
| 311 | Fungicide A | Fungicide B | Oxathiapiprolin | Carbendazim |
| 312 | Fungicide A | Fungicide B | Oxathiapiprolin | Metalaxyl/Metalaxyl-M |
| 313 | Fungicide A | Fungicide B | Oxathiapiprolin | Thiophanate methyl |
| 314 | Fungicide A | Fungicide B | Oxathiapiprolin | Zoxamide |
| 315 | Fungicide A | Fungicide B | Oxathiapiprolin | Fluopicolide |
| 316 | Fungicide A | Fungicide B | Oxathiapiprolin | Cyazofamid |
| 317 | Fungicide A | Fungicide B | Oxathiapiprolin | Amisulbrom |
| 318 | Fungicide A | Fungicide B | Oxathiapiprolin | Picarbutrazox |

In an embodiment, the exemplary combinations according to the present invention may be selected from the following combinations.

In a preferred embodiment, the preferred fungicide A is mancozeb (A1) and the preferred fungicide B is isopyrazam (B1).

In an embodiment, the preferred combinations according to the invention may be selected from the following specific combinations, which are intended to be exemplary:

A1B1C1; A1B1C1D1; A1B1C1D2; A1B1C1D3; A1B1C1D4; A1B1C1D5; A1B1C1D6; A1B1C1D7; A1B1C1D8; A1B1C1D9; A1B1C1D10; A1B1C1D11; A1B1C1D12; A1B1C1D13; A1B1C1D14; A1B1C1D15; A1B1C1D16; A1B1C1D17; A1B1C1D18; A1B1C1D19; A1B1C1D20; A1B1C1D21; A1B1C1D21; A1B1C1D22; A1B1C1D23; A1B1C1D24; A1B1C1D25;

A1B1C2; A1B1C2D1; A1B1C2D2; A1B1C2D3; A1B1C2D4; A1B1C2D5; A1B1C2D6; A1B1C2D7; A1B1C2D8; A1B1C2D9; A1B1C2D10; A1B1C2D11; A1B1C2D12; A1B1C2D13; A1B1C2D14; A1B1C2D15; A1B1C2D16; A1B1C2D17; A1B1C2D18; A1B1C2D19; A1B1C2D20; A1B1C2D21; A1B1C2D21; A1B1C2D22; A1B1C2D23; A1B1C2D24; A1B1C2D25;

A1B1C3; A1B1C3D1; A1B1C3D2; A1B1C3D3; A1B1C3D4; A1B1C3D5; A1B1C3D6; A1B1C3D7; A1B1C3D8; A1B1C3D9; A1B1C3D10; A1B1C3D11; A1B1C3D12; A1B1C3D13; A1B1C3D14; A1B1C3D15; A1B1C3D16; A1B1C3D17; A1B1C3D18; A1B1C3D19; A1B1C3D20; A1B1C3D21; A1B1C3D21; A1B1C3D22; A1B1C3D23; A1B1C3D24; A1B1C3D25;

A1B1C4; A1B1C4D1; A1B1C4D2; A1B1C4D3; A1B1C4D4; A1B1C4D5; A1B1C4D6; A1B1C4D7; A1B1C4D8; A1B1C4D9; A1B1C4D10; A1B1C4D11; A1B1C4D12; A1B1C4D13; A1B1C4D14; A1B1C4D15; A1B1C4D16; A1B1C4D17; A1B1C4D18; A1B1C4D19; A1B1C4D20; A1B1C4D21; A1B1C4D21; A1B1C4D22; A1B1C4D23; A1B1C4D24; A1B1C4D25;

A1B1C5; A1B1C5D1; A1B1C5D2; A1B1C5D3; A1B1C5D4; A1B1C5D5; A1B1C5D6; A1B1C5D7; A1B1C5D8; A1B1C5D9; A1B1C5D10; A1B1C5D11; A1B1C5D12; A1B1C5D13; A1B1C5D14; A1B1C5D15; A1B1C5D16; A1B1C5D17; A1B1C5D18; A1B1C5D19; A1B1C5D20; A1B1C5D21; A1B1C5D21; A1B1C5D22; A1B1C5D23; A1B1C5D24; A1B1C5D25;

A1B1C6; A1B1C6D1; A1B1C6D2; A1B1C6D3; A1B1C6D4; A1B1C6D5; A1B1C6D6; A1B1C6D7; A1B1C6D8; A1B1C6D9; A1B1C6D10; A1B1C6D11; A1B1C6D12; A1B1C6D13; A1B1C6D14; A1B1C6D15; A1B1C6D16; A1B1C6D17; A1B1C6D18; A1B1C6D19; A1B1C6D20; A1B1C6D21; A1B1C6D21; A1B1C6D22; A1B1C6D23; A1B1C6D24; A1B1C6D25;

A1B1C7; A1B1C7D1; A1B1C7D2; A1B1C7D3; A1B1C7D4; A1B1C7D5; A1B1C7D6; A1B1C7D7; A1B1C7D8; A1B1C7D9; A1B1C7D10; A1B1C7D11; A1B1C7D12; A1B1C7D13; A1B1C7D14; A1B1C7D15; A1B1C7D16; A1B1C7D17; A1B1C7D18; A1B1C7D19; A1B1C7D20; A1B1C7D21; A1B1C7D21; A1B1C7D22; A1B1C7D23; A1B1C7D24; A1B1C7D25;

A1B1C8; A1B1C8D1; A1B1C8D2; A1B1C8D3; A1B1C8D4; A1B1C8D5; A1B1C8D6; A1B1C8D7; A1B1C8D8; A1B1C8D9; A1B1C8D10; A1B1C8D11; A1B1C8D12; A1B1C8D13; A1B1C8D14; A1B1C8D15; A1B1C8D16; A1B1C8D17; A1B1C8D18; A1B1C8D19; A1B1C8D20; A1B1C8D21; A1B1C8D21; A1B1C8D22; A1B1C8D23; A1B1C8D24; A1B1C8D25;

A1B1C9; A1B1C9D1; A1B1C9D2; A1B1C9D3; A1B1C9D4; A1B1C9D5; A1B1C9D6; A1B1C9D7; A1B1C9D8; A1B1C9D9; A1B1C9D10; A1B1C9D11; A1B1C9D12; A1B1C9D13; A1B1C9D14; A1B1C9D15; A1B1C9D16; A1B1C9D17; A1B1C9D18; A1B1C9D19; A1B1C9D20; A1B1C9D21; A1B1C9D21; A1B1C9D22; A1B1C9D23; A1B1C9D24; A1B1C9D25;

A1B1C10; A1B1C10D1; A1B1C10D2; A1B1C10D3; A1B1C10D4; A1B1C10D5; A1B1C10D6; A1B1C10D7; A1B1C10D8; A1B1C10D9; A1B1C10D10; A1B1C10D11; A1B1C10D12; A1B1C10D13; A1B1C10D14; A1B1C10D15; A1B1C10D16; A1B1C10D17; A1B1C10D18; A1B1C10D19; A1B1C10D20; A1B1C10D21; A1B1C10D21; A1B1C10D22; A1B1C10D23; A1B1C10D24; A1B1C10D25;

A1B1C11; A1B1C11D1; A1B1C11D2; A1B1C11D3; A1B1C11D4; A1B1C11D5; A1B1C11D6; A1B1C11D7; A1B1C11D8; A1B1C11D9; A1B1C11D10; A1B1C11D11; A1B1C11D12; A1B1C11D13; A1B1C11D14; A1B1C11D15; A1B1C11D16; A1B1C11D17; A1B1C11D18; A1B1C11D19; A1B1C11D20; A1B1C11D21; A1B1C11D21; A1B1C11D22; A1B1C11D23; A1B1C11D24; A1B1C11D25;

A1B1C12; A1B1C12D1; A1B1C12D2; A1B1C12D3; A1B1C12D4; A1B1C12D5; A1B1C12D6; A1B1C12D7; A1B1C12D8; A1B1C12D9; A1B1C12D10; A1B1C12D11; A1B1C12D12; A1B1C12D13; A1B1C12D14; A1B1C12D15; A1B1C12D16; A1B1C12D17; A1B1C12D18; A1B1C12D19; A1B1C12D20; A1B1C12D21; A1B1C12D21; A1B1C12D22; A1B1C12D23; A1B1C12D24; A1B1C12D25;

A1B1C13; A1B1C13D1; A1B1C13D2; A1B1C13D3; A1B1C13D4; A1B1C13D5; A1B1C13D6; A1B1C13D7; A1B1C13D8; A1B1C13D9; A1B1C13D10; A1B1C13D11; A1B1C13D12; A1B1C13D13; A1B1C13D14; A1B1C13D15; A1B1C13D16; A1B1C13D17; A1B1C13D18; A1B1C13D19; A1B1C13D20; A1B1C13D21; A1B1C13D21; A1B1C13D22; A1B1C13D23; A1B1C13D24; A1B1C13D25;

A1B1C14; A1B1C14D1; A1B1C14D2; A1B1C14D3; A1B1C14D4; A1B1C14D5; A1B1C14D6; A1B1C14D7; A1B1C14D8; A1B1C14D9; A1B1C14D10; A1B1C14D11; A1B1C14D12; A1B1C14D13; A1B1C14D14; A1B1C14D15; A1B1C14D16; A1B1C14D17; A1B1C14D18; A1B1C14D19; A1B1C14D20; A1B1C14D21; A1B1C14D21; A1B1C14D22; A1B1C14D23; A1B1C14D24; A1B1C14D25;

A1B1C15; A1B1C15D1; A1B1C15D2; A1B1C15D3; A1B1C15D4; A1B1C15D5; A1B1C15D6; A1B1C15D7; A1B1C15D8; A1B1C15D9; A1B1C15D10; A1B1C15D11; A1B1C15D12; A1B1C15D13; A1B1C15D14; A1B1C15D15; A1B1C15D16; A1B1C15D17; A1B1C15D18; A1B1C15D19; A1B1C15D20; A1B1C15D21; A1B1C15D21; A1B1C15D22; A1B1C15D23; A1B1C15D24; A1B1C15D25;

A1B1C16; A1B1C16D1; A1B1C16D2; A1B1C16D3; A1B1C16D4; A1B1C16D5; A1B1C16D6; A1B1C16D7; A1B1C16D8; A1B1C16D9; A1B1C16D10; A1B1C16D11; A1B1C16D12; A1B1C16D13; A1B1C16D14; A1B1C16D15; A1B1C16D16; A1B1C16D17; A1B1C16D18; A1B1C16D19; A1B1C16D20; A1B1C16D21; A1B1C16D21; A1B1C16D22; A1B1C16D23; A1B1C16D24; A1B1C16D25;

A1B1C17; A1B1C17D1; A1B1C17D2; A1B1C17D3; A1B1C17D4; A1B1C17D5; A1B1C17D6; A1B1C17D7; A1B1C17D8; A1B1C17D9; A1B1C17D10; A1B1C17D11; A1B1C17D12; A1B1C17D13; A1B1C17D14; A1B1C17D15; A1B1C17D16; A1B1C17D17; A1B1C17D18; A1B1C17D19; A1B1C17D20; A1B1C17D21; A1B1C17D21; A1B1C17D22; A1B1C17D23; A1B1C17D24; A1B1C17D25;

A1B1C18; A1B1C18D1; A1B1C18D2; A1B1C18D3; A1B1C18D4; A1B1C18D5; A1B1C18D6; A1B1C18D7; A1B1C18D8; A1B1C18D9; A1B1C18D10; A1B1C18D11; A1B1C18D12; A1B1C18D13; A1B1C18D14; A1B1C18D15; A1B1C18D16; A1B1C18D17; A1B1C18D18; A1B1C18D19; A1B1C18D20; A1B1C18D21; A1B1C18D21; A1B1C18D22; A1B1C18D23; A1B1C18D24; A1B1C18D25;

A1B1C19; A1B1C19D1; A1B1C19D2; A1B1C19D3; A1B1C19D4; A1B1C19D5; A1B1C19D6; A1B1C19D7; A1B1C19D8; A1B1C19D9; A1B1C19D10; A1B1C19D11; A1B1C19D12; A1B1C19D13; A1B1C19D14; A1B1C19D15; A1B1C19D16; A1B1C19D17; A1B1C19D18; A1B1C19D19; A1B1C19D20; A1B1C19D21; A1B1C19D21; A1B1C19D22; A1B1C19D23; A1B1C19D24; A1B1C19D25;

A1B1C20; A1B1C20D1; A1B1C20D2; A1B1C20D3; A1B1C20D4; A1B1C20D5; A1B1C20D6; A1B1C20D7; A1B1C20D8; A1B1C20D9; A1B1C20D10; A1B1C20D11; A1B1C20D12; A1B1C20D13; A1B1C20D14; A1B1C20D15; A1B1C20D16; A1B1C20D17; A1B1C20D18; A1B1C20D19; A1B1C20D20; A1B1C20D21; A1B1C20D21; A1B1C20D22; A1B1C20D23; A1B1C20D24; A1B1C20D25.

In a preferred embodiment, the preferred fungicide A is mancozeb (A1) and the preferred fungicide B is benzovindiflupyr (B2).

A1B2C1; A1B2C1D1; A1B2C1D2; A1B2C1D3; A1B2C1D4; A1B2C1D5; A1B2C1D6; A1B2C1D7; A1B2C1D8; A1B2C1D9; A1B2C1D10; A1B2C1D11; A1B2C1D12; A1B2C1D13; A1B2C1D14; A1B2C1D15; A1B2C1D16; A1B2C1D17; A1B2C1D18; A1B2C1D19; A1B2C1D20; A1B2C1D21; A1B2C1D21; A1B2C1D22; A1B2C1D23; A1B2C1D24; A1B2C1D25;

A1B2C2; A1B2C2D1; A1B2C2D2; A1B2C2D3; A1B2C2D4; A1B2C2D5; A1B2C2D6; A1B2C2D7; A1B2C2D8; A1B2C2D9; A1B2C2D10; A1B2C2D11; A1B2C2D12; A1B2C2D13; A1B2C2D14; A1B2C2D15; A1B2C2D16; A1B2C2D17; A1B2C2D18; A1B2C2D19; A1B2C2D20; A1B2C2D21; A1B2C2D21; A1B2C2D22; A1B2C2D23; A1B2C2D24; A1B2C2D25;

A1B2C3; A1B2C3D1; A1B2C3D2; A1B2C3D3; A1B2C3D4; A1B2C3D5; A1B2C3D6; A1B2C3D7; A1B2C3D8; A1B2C3D9; A1B2C3D10; A1B2C3D11; A1B2C3D12; A1B2C3D13; A1B2C3D14; A1B2C3D15; A1B2C3D16; A1B2C3D17; A1B2C3D18; A1B2C3D19; A1B2C3D20; A1B2C3D21; A1B2C3D21; A1B2C3D22; A1B2C3D23; A1B2C3D24; A1B2C3D25;

A1B2C4; A1B2C4D1; A1B2C4D2; A1B2C4D3; A1B2C4D4; A1B2C4D5; A1B2C4D6; A1B2C4D7; A1B2C4D8; A1B2C4D9; A1B2C4D10; A1B2C4D11; A1B2C4D12; A1B2C4D13; A1B2C4D14; A1B2C4D15; A1B2C4D16; A1B2C4D17; A1B2C4D18; A1B2C4D19; A1B2C4D20; A1B2C4D21; A1B2C4D21; A1B2C4D22; A1B2C4D23; A1B2C4D24; A1B2C4D25;

A1B2C5; A1B2C5D1; A1B2C5D2; A1B2C5D3; A1B2C5D4; A1B2C5D5; A1B2C5D6; A1B2C5D7; A1B2C5D8; A1B2C5D9; A1B2C5D10; A1B2C5D11; A1B2C5D12; A1B2C5D13; A1B2C5D14; A1B2C5D15; A1B2C5D16; A1B2C5D17; A1B2C5D18; A1B2C5D19; A1B2C5D20; A1B2C5D21; A1B2C5D21; A1B2C5D22; A1B2C5D23; A1B2C5D24; A1B2C5D25;

A1B2C6; A1B2C6D1; A1B2C6D2; A1B2C6D3; A1B2C6D4; A1B2C6D5; A1B2C6D6; A1B2C6D7; A1B2C6D8; A1B2C6D9; A1B2C6D10; A1B2C6D11; A1B2C6D12; A1B2C6D13; A1B2C6D14; A1B2C6D15; A1B2C6D16; A1B2C6D17; A1B2C6D18; A1B2C6D19; A1B2C6D20; A1B2C6D21; A1B2C6D21; A1B2C6D22; A1B2C6D23; A1B2C6D24; A1B2C6D25;

A1B2C7; A1B2C7D1; A1B2C7D2; A1B2C7D3; A1B2C7D4; A1B2C7D5; A1B2C7D6; A1B2C7D7; A1B2C7D8; A1B2C7D9; A1B2C7D10; A1B2C7D11; A1B2C7D12; A1B2C7D13; A1B2C7D14; A1B2C7D15; A1B2C7D16; A1B2C7D17; A1B2C7D18; A1B2C7D19; A1B2C7D20; A1B2C7D21; A1B2C7D21; A1B2C7D22; A1B2C7D23; A1B2C7D24; A1B2C7D25;

A1B2C8; A1B2C8D1; A1B2C8D2; A1B2C8D3; A1B2C8D4; A1B2C8D5; A1B2C8D6; A1B2C8D7; A1B2C8D8; A1B2C8D9; A1B2C8D10; A1B2C8D11; A1B2C8D12; A1B2C8D13; A1B2C8D14; A1B2C8D15; A1B2C8D16; A1B2C8D17; A1B2C8D18; A1B2C8D19; A1B2C8D20; A1B2C8D21; A1B2C8D21; A1B2C8D22; A1B2C8D23; A1B2C8D24; A1B2C8D25;

A1B2C9; A1B2C9D1; A1B2C9D2; A1B2C9D3; A1B2C9D4; A1B2C9D5; A1B2C9D6; A1B2C9D7; A1B2C9D8; A1B2C9D9; A1B2C9D10; A1B2C9D11; A1B2C9D12; A1B2C9D13; A1B2C9D14; A1B2C9D15; A1B2C9D16; A1B2C9D17; A1B2C9D18; A1B2C9D19; A1B2C9D20; A1B2C9D21; A1B2C9D21; A1B2C9D22; A1B2C9D23; A1B2C9D24; A1B2C9D25;

A1B2C10; A1B2C10D1; A1B2C10D2; A1B2C10D3; A1B2C10D4; A1B2C10D5; A1B2C10D6; A1B2C10D7; A1B2C10D8; A1B2C10D9; A1B2C10D10; A1B2C10D11; A1B2C10D12; A1B2C10D13; A1B2C10D14; A1B2C10D15; A1B2C10D16; A1B2C10D17; A1B2C10D18; A1B2C10D19; A1B2C10D20; A1B2C10D21; A1B2C10D21; A1B2C10D22; A1B2C10D23; A1B2C10D24; A1B2C10D25;

A1B2C11; A1B2C11D1; A1B2C11D2; A1B2C11D3; A1B2C11D4; A1B2C11D5; A1B2C11D6; A1B2C11D7; A1B2C11D8; A1B2C11D9; A1B2C11D10; A1B2C11D11; A1B2C11D12; A1B2C11D13; A1B2C11D14; A1B2C11D15; A1B2C11D16; A1B2C11D17; A1B2C11D18; A1B2C11D19; A1B2C11D20; A1B2C11D21; A1B2C11D21; A1B2C11D22; A1B2C11D23; A1B2C11D24; A1B2C11D25;

A1B2C12; A1B2C12D1; A1B2C12D2; A1B2C12D3; A1B2C12D4; A1B2C12D5; A1B2C12D6; A1B2C12D7; A1B2C12D8; A1B2C12D9; A1B2C12D10; A1B2C12D11; A1B2C12D12; A1B2C12D13; A1B2C12D14; A1B2C12D15; A1B2C12D16; A1B2C12D17; A1B2C12D18; A1B2C12D19; A1B2C12D20; A1B2C12D21; A1B2C12D21; A1B2C12D22; A1B2C12D23; A1B2C12D24; A1B2C12D25;

A1B2C13; A1B2C13D1; A1B2C13D2; A1B2C13D3; A1B2C13D4; A1B2C13D5; A1B2C13D6; A1B2C13D7; A1B2C13D8; A1B2C13D9; A1B2C13D10; A1B2C13D11; A1B2C13D12; A1B2C13D13; A1B2C13D14; A1B2C13D15; A1B2C13D16; A1B2C13D17; A1B2C13D18; A1B2C13D19; A1B2C13D20; A1B2C13D21; A1B2C13D21; A1B2C13D22; A1B2C13D23; A1B2C13D24; A1B2C13D25;

A1B2C14; A1B2C14D1; A1B2C14D2; A1B2C14D3; A1B2C14D4; A1B2C14D5; A1B2C14D6; A1B2C14D7; A1B2C14D8; A1B2C14D9; A1B2C14D10; A1B2C14D11; A1B2C14D12; A1B2C14D13; A1B2C14D14; A1B2C14D15; A1B2C14D16; A1B2C14D17; A1B2C14D18; A1B2C14D19; A1B2C14D20; A1B2C14D21; A1B2C14D21; A1B2C14D22; A1B2C14D23; A1B2C14D24; A1B2C14D25;

A1B2C15; A1B2C15D1; A1B2C15D2; A1B2C15D3; A1B2C15D4; A1B2C15D5; A1B2C15D6; A1B2C15D7; A1B2C15D8; A1B2C15D9; A1B2C15D10; A1B2C15D11; A1B2C15D12; A1B2C15D13; A1B2C15D14; A1B2C15D15; A1B2C15D16; A1B2C15D17; A1B2C15D18; A1B2C15D19; A1B2C15D20; A1B2C15D21; A1B2C15D21; A1B2C15D22; A1B2C15D23; A1B2C15D24; A1B2C15D25;

A1B2C16; A1B2C16D1; A1B2C16D2; A1B2C16D3; A1B2C16D4; A1B2C16D5; A1B2C16D6; A1B2C16D7; A1B2C16D8; A1B2C16D9; A1B2C16D10; A1B2C16D11; A1B2C16D12; A1B2C16D13; A1B2C16D14; A1B2C16D15; A1B2C16D16; A1B2C16D17; A1B2C16D18; A1B2C16D19; A1B2C16D20; A1B2C16D21; A1B2C16D21; A1B2C16D22; A1B2C16D23; A1B2C16D24; A1B2C16D25;

A1B2C17; A1B2C17D1; A1B2C17D2; A1B2C17D3; A1B2C17D4; A1B2C17D5; A1B2C17D6; A1B2C17D7; A1B2C17D8; A1B2C17D9; A1B2C17D10; A1B2C17D11; A1B2C17D12; A1B2C17D13; A1B2C17D14; A1B2C17D15; A1B2C17D16; A1B2C17D17; A1B2C17D18; A1B2C17D19; A1B2C17D20; A1B2C17D21; A1B2C17D21; A1B2C17D22; A1B2C17D23; A1B2C17D24; A1B2C17D25;

A1B2C18; A1B2C18D1; A1B2C18D2; A1B2C18D3; A1B2C18D4; A1B2C18D5; A1B2C18D6; A1B2C18D7; A1B2C18D8; A1B2C18D9; A1B2C18D10; A1B2C18D11; A1B2C18D12; A1B2C18D13; A1B2C18D14; A1B2C18D15; A1B2C18D16; A1B2C18D17; A1B2C18D18; A1B2C18D19; A1B2C18D20; A1B2C18D21; A1B2C18D21; A1B2C18D22; A1B2C18D23; A1B2C18D24; A1B2C18D25;

A1B2C19; A1B2C19D1; A1B2C19D2; A1B2C19D3; A1B2C19D4; A1B2C19D5; A1B2C19D6; A1B2C19D7; A1B2C19D8; A1B2C19D9; A1B2C19D10; A1B2C19D11; A1B2C19D12; A1B2C19D13; A1B2C19D14; A1B2C19D15; A1B2C19D16; A1B2C19D17; A1B2C19D18; A1B2C19D19; A1B2C19D20; A1B2C19D21; A1B2C19D21; A1B2C19D22; A1B2C19D23; A1B2C19D24; A1B2C19D25;

A1B2C20; A1B2C20D1; A1B2C20D2; A1B2C20D3; A1B2C20D4; A1B2C20D5; A1B2C20D6; A1B2C20D7; A1B2C20D8; A1B2C20D9; A1B2C20D10; A1B2C20D11; A1B2C20D12; A1B2C20D13; A1B2C20D14; A1B2C20D15; A1B2C20D16; A1B2C20D17; A1B2C20D18; A1B2C20D19; A1B2C20D20; A1B2C20D21; A1B2C20D21; A1B2C20D22; A1B2C20D23; A1B2C20D24; A1B2C20D25.

In an embodiment, the preferred fungicide A is mancozeb (A1), and the preferred fungicide B is penthiopyrad (B3).

A1B3C1; A1B3C1D1; A1B3C1D2; A1B3C1D3; A1B3C1D4; A1B3C1D5; A1B3C1D6; A1B3C1D7; A1B3C1D8; A1B3C1D9; A1B3C1D10; A1B3C1D11; A1B3C1D12; A1B3C1D13; A1B3C1D14; A1B3C1D15; A1B3C1D16; A1B3C1D17; A1B3C1D18; A1B3C1D19; A1B3C1D20; A1B3C1D21; A1B3C1D21; A1B3C1D22; A1B3C1D23; A1B3C1D24; A1B3C1D25;

A1B3C2; A1B3C2D1; A1B3C2D2; A1B3C2D3; A1B3C2D4; A1B3C2D5; A1B3C2D6; A1B3C2D7; A1B3C2D8; A1B3C2D9; A1B3C2D10; A1B3C2D11; A1B3C2D12; A1B3C2D13; A1B3C2D14; A1B3C2D15; A1B3C2D16; A1B3C2D17; A1B3C2D18; A1B3C2D19; A1B3C2D20; A1B3C2D21; A1B3C2D21; A1B3C2D22; A1B3C2D23; A1B3C2D24; A1B3C2D25;

A1B3C3; A1B3C3D1; A1B3C3D2; A1B3C3D3; A1B3C3D4; A1B3C3D5; A1B3C3D6; A1B3C3D7; A1B3C3D8; A1B3C3D9; A1B3C3D10; A1B3C3D11; A1B3C3D12; A1B3C3D13; A1B3C3D14; A1B3C3D15; A1B3C3D16; A1B3C3D17; A1B3C3D18; A1B3C3D19; A1B3C3D20; A1B3C3D21; A1B3C3D21; A1B3C3D22; A1B3C3D23; A1B3C3D24; A1B3C3D25;

A1B3C4; A1B3C4D1; A1B3C4D2; A1B3C4D3; A1B3C4D4; A1B3C4D5; A1B3C4D6; A1B3C4D7; A1B3C4D8; A1B3C4D9; A1B3C4D10; A1B3C4D11; A1B3C4D12; A1B3C4D13; A1B3C4D14; A1B3C4D15; A1B3C4D16; A1B3C4D17; A1B3C4D18; A1B3C4D19; A1B3C4D20; A1B3C4D21; A1B3C4D21; A1B3C4D22; A1B3C4D23; A1B3C4D24; A1B3C4D25;

A1B3C5; A1B3C5D1; A1B3C5D2; A1B3C5D3; A1B3C5D4; A1B3C5D5; A1B3C5D6; A1B3C5D7; A1B3C5D8; A1B3C5D9; A1B3C5D10; A1B3C5D11; A1B3C5D12; A1B3C5D13; A1B3C5D14; A1B3C5D15; A1B3C5D16; A1B3C5D17; A1B3C5D18; A1B3C5D19; A1B3C5D20; A1B3C5D21; A1B3C5D21; A1B3C5D22; A1B3C5D23; A1B3C5D24; A1B3C5D25;

A1B3C6; A1B3C6D1; A1B3C6D2; A1B3C6D3; A1B3C6D4; A1B3C6D5; A1B3C6D6; A1B3C6D7; A1B3C6D8; A1B3C6D9; A1B3C6D10; A1B3C6D11; A1B3C6D12; A1B3C6D13; A1B3C6D14; A1B3C6D15; A1B3C6D16; A1B3C6D17; A1B3C6D18; A1B3C6D19; A1B3C6D20; A1B3C6D21; A1B3C6D21; A1B3C6D22; A1B3C6D23; A1B3C6D24; A1B3C6D25;

A1B3C7; A1B3C7D1; A1B3C7D2; A1B3C7D3; A1B3C7D4; A1B3C7D5; A1B3C7D6; A1B3C7D7; A1B3C7D8; A1B3C7D9; A1B3C7D10; A1B3C7D11; A1B3C7D12; A1B3C7D13; A1B3C7D14; A1B3C7D15; A1B3C7D16; A1B3C7D17; A1B3C7D18; A1B3C7D19; A1B3C7D20; A1B3C7D21; A1B3C7D21; A1B3C7D22; A1B3C7D23; A1B3C7D24; A1B3C7D25;

A1B3C8; A1B3C8D1; A1B3C8D2; A1B3C8D3; A1B3C8D4; A1B3C8D5; A1B3C8D6; A1B3C8D7; A1B3C8D8; A1B3C8D9; A1B3C8D10; A1B3C8D11; A1B3C8D12; A1B3C8D13; A1B3C8D14; A1B3C8D15; A1B3C8D16; A1B3C8D17; A1B3C8D18; A1B3C8D19; A1B3C8D20; A1B3C8D21; A1B3C8D21; A1B3C8D22; A1B3C8D23; A1B3C8D24; A1B3C8D25;

A1B3C9; A1B3C9D1; A1B3C9D2; A1B3C9D3; A1B3C9D4; A1B3C9D5; A1B3C9D6; A1B3C9D7; A1B3C9D8; A1B3C9D9; A1B3C9D10; A1B3C9D11; A1B3C9D12; A1B3C9D13; A1B3C9D14; A1B3C9D15; A1B3C9D16; A1B3C9D17; A1B3C9D18; A1B3C9D19; A1B3C9D20; A1B3C9D21; A1B3C9D21; A1B3C9D22; A1B3C9D23; A1B3C9D24; A1B3C9D25;

A1B3C10; A1B3C10D1; A1B3C10D2; A1B3C10D3; A1B3C10D4; A1B3C10D5; A1B3C10D6; A1B3C10D7; A1B3C10D8; A1B3C10D9; A1B3C10D10; A1B3C10D11; A1B3C10D12; A1B3C10D13; A1B3C10D14; A1B3C10D15; A1B3C10D16; A1B3C10D17; A1B3C10D18; A1B3C10D19; A1B3C10D20; A1B3C10D21; A1B3C10D21; A1B3C10D22; A1B3C10D23; A1B3C10D24; A1B3C10D25;

A1B3C11; A1B3C11D1; A1B3C11D2; A1B3C11D3; A1B3C11D4; A1B3C11D5; A1B3C11D6; A1B3C11D7; A1B3C11D8; A1B3C11D9; A1B3C11D10; A1B3C11D11; A1B3C11D12; A1B3C11D13; A1B3C11D14; A1B3C11D15; A1B3C11D16; A1B3C11D17; A1B3C11D18; A1B3C11D19; A1B3C11D20; A1B3C11D21; A1B3C11D21; A1B3C11D22; A1B3C11D23; A1B3C11D24; A1B3C11D25;

A1B3C12; A1B3C12D1; A1B3C12D2; A1B3C12D3; A1B3C12D4; A1B3C12D5; A1B3C12D6; A1B3C12D7; A1B3C12D8; A1B3C12D9; A1B3C12D10; A1B3C12D11; A1B3C12D12; A1B3C12D13; A1B3C12D14; A1B3C12D15; A1B3C12D16; A1B3C12D17; A1B3C12D18; A1B3C12D19; A1B3C12D20; A1B3C12D21; A1B3C12D21; A1B3C12D22; A1B3C12D23; A1B3C12D24; A1B3C12D25;

A1B3C13; A1B3C13D1; A1B3C13D2; A1B3C13D3; A1B3C13D4; A1B3C13D5; A1B3C13D6; A1B3C13D7; A1B3C13D8; A1B3C13D9; A1B3C13D10; A1B3C13D11; A1B3C13D12; A1B3C13D13; A1B3C13D14; A1B3C13D15; A1B3C13D16; A1B3C13D17; A1B3C13D18; A1B3C13D19; A1B3C13D20; A1B3C13D21; A1B3C13D21; A1B3C13D22; A1B3C13D23; A1B3C13D24; A1B3C13D25;

A1B3C14; A1B3C14D1; A1B3C14D2; A1B3C14D3; A1B3C14D4; A1B3C14D5; A1B3C14D6; A1B3C14D7; A1B3C14D8; A1B3C14D9; A1B3C14D10; A1B3C14D11; A1B3C14D12; A1B3C14D13; A1B3C14D14; A1B3C14D15; A1B3C14D16; A1B3C14D17; A1B3C14D18; A1B3C14D19; A1B3C14D20; A1B3C14D21; A1B3C14D21; A1B3C14D22; A1B3C14D23; A1B3C14D24; A1B3C14D25;

A1B3C15; A1B3C15D1; A1B3C15D2; A1B3C15D3; A1B3C15D4; A1B3C15D5; A1B3C15D6; A1B3C15D7; A1B3C15D8; A1B3C15D9; A1B3C15D10; A1B3C15D11; A1B3C15D12; A1B3C15D13; A1B3C15D14; A1B3C15D15; A1B3C15D16; A1B3C15D17; A1B3C15D18; A1B3C15D19; A1B3C15D20; A1B3C15D21; A1B3C15D21; A1B3C15D22; A1B3C15D23; A1B3C15D24; A1B3C15D25;

A1B3C16; A1B3C16D1; A1B3C16D2; A1B3C16D3; A1B3C16D4; A1B3C16D5; A1B3C16D6; A1B3C16D7; A1B3C16D8; A1B3C16D9; A1B3C16D10; A1B3C16D11; A1B3C16D12; A1B3C16D13; A1B3C16D14; A1B3C16D15; A1B3C16D16; A1B3C16D17; A1B3C16D18; A1B3C16D19; A1B3C16D20; A1B3C16D21;

A1B3C16D21; A1B3C16D22; A1B3C16D23; A1B3C16D24; A1B3C16D25;

A1B3C17; A1B3C17D1; A1B3C17D2; A1B3C17D3; A1B3C17D4; A1B3C17D5; A1B3C17D6; A1B3C17D7; A1B3C17D8; A1B3C17D9; A1B3C17D10; A1B3C17D11; A1B3C17D12; A1B3C17D13; A1B3C17D14; A1B3C17D15; A1B3C17D16; A1B3C17D17; A1B3C17D18; A1B3C17D19; A1B3C17D20; A1B3C17D21; A1B3C17D21; A1B3C17D22; A1B3C17D23; A1B3C17D24; A1B3C17D25;

A1B3C18; A1B3C18D1; A1B3C18D2; A1B3C18D3; A1B3C18D4; A1B3C18D5; A1B3C18D6; A1B3C18D7; A1B3C18D8; A1B3C18D9; A1B3C18D10; A1B3C18D11; A1B3C18D12; A1B3C18D13; A1B3C18D14; A1B3C18D15; A1B3C18D16; A1B3C18D17; A1B3C18D18; A1B3C18D19; A1B3C18D20; A1B3C18D21; A1B3C18D21; A1B3C18D22; A1B3C18D23; A1B3C18D24; A1B3C18D25;

A1B3C19; A1B3C19D1; A1B3C19D2; A1B3C19D3; A1B3C19D4; A1B3C19D5; A1B3C19D6; A1B3C19D7; A1B3C19D8; A1B3C19D9; A1B3C19D10; A1B3C19D11; A1B3C19D12; A1B3C19D13; A1B3C19D14; A1B3C19D15; A1B3C19D16; A1B3C19D17; A1B3C19D18; A1B3C19D19; A1B3C19D20; A1B3C19D21; A1B3C19D21; A1B3C19D22; A1B3C19D23; A1B3C19D24; A1B3C19D25;

A1B3C20; A1B3C20D1; A1B3C20D2; A1B3C20D3; A1B3C20D4; A1B3C20D5; A1B3C20D6; A1B3C20D7; A1B3C20D8; A1B3C20D9; A1B3C20D10; A1B3C20D11; A1B3C20D12; A1B3C20D13; A1B3C20D14; A1B3C20D15; A1B3C20D16; A1B3C20D17; A1B3C20D18; A1B3C20D19; A1B3C20D20; A1B3C20D21; A1B3C20D21; A1B3C20D22; A1B3C20D23; A1B3C20D24; A1B3C20D25.

In an embodiment, the preferred fungicide A is mancozeb (A1) and the preferred fungicide B is boscalid (B4).

A1B4C1; A1B4C1D1; A1B4C1D2; A1B4C1D3; A1B4C1D4; A1B4C1D5; A1B4C1D6; A1B4C1D7; A1B4C1D8; A1B4C1D9; A1B4C1D10; A1B4C1D11; A1B4C1D12; A1B4C1D13; A1B4C1D14; A1B4C1D15; A1B4C1D16; A1B4C1D17; A1B4C1D18; A1B4C1D19; A1B4C1D20; A1B4C1D21; A1B4C1D21; A1B4C1D22; A1B4C1D23; A1B4C1D24; A1B4C1D25;

A1B4C2; A1B4C2D1; A1B4C2D2; A1B4C2D3; A1B4C2D4; A1B4C2D5; A1B4C2D6; A1B4C2D7; A1B4C2D8; A1B4C2D9; A1B4C2D10; A1B4C2D11; A1B4C2D12; A1B4C2D13; A1B4C2D14; A1B4C2D15; A1B4C2D16; A1B4C2D17; A1B4C2D18; A1B4C2D19; A1B4C2D20; A1B4C2D21; A1B4C2D21; A1B4C2D22; A1B4C2D23; A1B4C2D24; A1B4C2D25;

A1B4C3; A1B4C3D1; A1B4C3D2; A1B4C3D3; A1B4C3D4; A1B4C3D5; A1B4C3D6; A1B4C3D7; A1B4C3D8; A1B4C3D9; A1B4C3D10; A1B4C3D11; A1B4C3D12; A1B4C3D13; A1B4C3D14; A1B4C3D15; A1B4C3D16; A1B4C3D17; A1B4C3D18; A1B4C3D19; A1B4C3D20; A1B4C3D21; A1B4C3D21; A1B4C3D22; A1B4C3D23; A1B4C3D24; A1B4C3D25;

A1B4C4; A1B4C4D1; A1B4C4D2; A1B4C4D3; A1B4C4D4; A1B4C4D5; A1B4C4D6; A1B4C4D7; A1B4C4D8; A1B4C4D9; A1B4C4D10; A1B4C4D11; A1B4C4D12; A1B4C4D13; A1B4C4D14; A1B4C4D15; A1B4C4D16; A1B4C4D17; A1B4C4D18; A1B4C4D19; A1B4C4D20; A1B4C4D21; A1B4C4D21; A1B4C4D22; A1B4C4D23; A1B4C4D24; A1B4C4D25;

A1B4C5; A1B4C5D1; A1B4C5D2; A1B4C5D3; A1B4C5D4; A1B4C5D5; A1B4C5D6; A1B4C5D7; A1B4C5D8; A1B4C5D9; A1B4C5D10; A1B4C5D11; A1B4C5D12; A1B4C5D13; A1B4C5D14; A1B4C5D15; A1B4C5D16; A1B4C5D17; A1B4C5D18; A1B4C5D19; A1B4C5D20; A1B4C5D21; A1B4C5D21; A1B4C5D22; A1B4C5D23; A1B4C5D24; A1B4C5D25;

A1B4C6; A1B4C6D1; A1B4C6D2; A1B4C6D3; A1B4C6D4; A1B4C6D5; A1B4C6D6; A1B4C6D7; A1B4C6D8; A1B4C6D9; A1B4C6D10; A1B4C6D11; A1B4C6D12; A1B4C6D13; A1B4C6D14; A1B4C6D15; A1B4C6D16; A1B4C6D17; A1B4C6D18; A1B4C6D19; A1B4C6D20; A1B4C6D21; A1B4C6D21; A1B4C6D22; A1B4C6D23; A1B4C6D24; A1B4C6D25;

A1B4C7; A1B4C7D1; A1B4C7D2; A1B4C7D3; A1B4C7D4; A1B4C7D5; A1B4C7D6; A1B4C7D7; A1B4C7D8; A1B4C7D9; A1B4C7D10; A1B4C7D11; A1B4C7D12; A1B4C7D13; A1B4C7D14; A1B4C7D15; A1B4C7D16; A1B4C7D17; A1B4C7D18; A1B4C7D19; A1B4C7D20; A1B4C7D21; A1B4C7D21; A1B4C7D22; A1B4C7D23; A1B4C7D24; A1B4C7D25;

A1B4C8; A1B4C8D1; A1B4C8D2; A1B4C8D3; A1B4C8D4; A1B4C8D5; A1B4C8D6; A1B4C8D7; A1B4C8D8; A1B4C8D9; A1B4C8D10; A1B4C8D11; A1B4C8D12; A1B4C8D13; A1B4C8D14; A1B4C8D15; A1B4C8D16; A1B4C8D17; A1B4C8D18; A1B4C8D19; A1B4C8D20; A1B4C8D21; A1B4C8D21; A1B4C8D22; A1B4C8D23; A1B4C8D24; A1B4C8D25;

A1B4C9; A1B4C9D1; A1B4C9D2; A1B4C9D3; A1B4C9D4; A1B4C9D5; A1B4C9D6; A1B4C9D7; A1B4C9D8; A1B4C9D9; A1B4C9D10; A1B4C9D11; A1B4C9D12; A1B4C9D13; A1B4C9D14; A1B4C9D15; A1B4C9D16; A1B4C9D17; A1B4C9D18; A1B4C9D19; A1B4C9D20; A1B4C9D21; A1B4C9D21; A1B4C9D22; A1B4C9D23; A1B4C9D24; A1B4C9D25;

A1B4C10; A1B4C10D1; A1B4C10D2; A1B4C10D3; A1B4C10D4; A1B4C10D5; A1B4C10D6; A1B4C10D7; A1B4C10D8; A1B4C10D9; A1B4C10D10; A1B4C10D11; A1B4C10D12; A1B4C10D13; A1B4C10D14; A1B4C10D15; A1B4C10D16; A1B4C10D17; A1B4C10D18; A1B4C10D19; A1B4C10D20; A1B4C10D21; A1B4C10D21; A1B4C10D22; A1B4C10D23; A1B4C10D24; A1B4C10D25;

A1B4C11; A1B4C11D1; A1B4C11D2; A1B4C11D3; A1B4C11D4; A1B4C11D5; A1B4C11D6; A1B4C11D7; A1B4C11D8; A1B4C11D9; A1B4C11D10; A1B4C11D11; A1B4C11D12; A1B4C11D13; A1B4C11D14; A1B4C11D15; A1B4C11D16; A1B4C11D17; A1B4C11D18; A1B4C11D19; A1B4C11D20; A1B4C11D21; A1B4C11D21; A1B4C11D22; A1B4C11D23; A1B4C11D24; A1B4C11D25;

A1B4C12; A1B4C12D1; A1B4C12D2; A1B4C12D3; A1B4C12D4; A1B4C12D5; A1B4C12D6; A1B4C12D7; A1B4C12D8; A1B4C12D9; A1B4C12D10; A1B4C12D11; A1B4C12D12;

A1B4C12D13; A1B4C12D14; A1B4C12D15;
A1B4C12D16; A1B4C12D17; A1B4C12D18;
A1B4C12D19; A1B4C12D20; A1B4C12D21;
A1B4C12D21; A1B4C12D22; A1B4C12D23;
A1B4C12D24; A1B4C12D25;
A1B4C13; A1B4C13D1; A1B4C13D2; A1B4C13D3;
A1B4C13D4; A1B4C13D5; A1B4C13D6;
A1B4C13D7; A1B4C13D8; A1B4C13D9;
A1B4C13D10; A1B4C13D11; A1B4C13D12;
A1B4C13D13; A1B4C13D14; A1B4C13D15;
A1B4C13D16; A1B4C13D17; A1B4C13D18;
A1B4C13D19; A1B4C13D20; A1B4C13D21;
A1B4C13D21; A1B4C13D22; A1B4C13D23;
A1B4C13D24; A1B4C13D25;
A1B4C14; A1B4C14D1; A1B4C14D2; A1B4C14D3;
A1B4C14D4; A1B4C14D5; A1B4C14D6;
A1B4C14D7; A1B4C14D8; A1B4C14D9;
A1B4C14D10; A1B4C14D11; A1B4C14D12;
A1B4C14D13; A1B4C14D14; A1B4C14D15;
A1B4C14D16; A1B4C14D17; A1B4C14D18;
A1B4C14D19; A1B4C14D20; A1B4C14D21;
A1B4C14D21; A1B4C14D22; A1B4C14D23;
A1B4C14D24; A1B4C14D25;
A1B4C15; A1B4C15D1; A1B4C15D2; A1B4C15D3;
A1B4C15D4; A1B4C15D5; A1B4C15D6;
A1B4C15D7; A1B4C15D8; A1B4C15D9;
A1B4C15D10; A1B4C15D11; A1B4C15D12;
A1B4C15D13; A1B4C15D14; A1B4C15D15;
A1B4C15D16; A1B4C15D17; A1B4C15D18;
A1B4C15D19; A1B4C15D20; A1B4C15D21;
A1B4C15D21; A1B4C15D22; A1B4C15D23;
A1B4C15D24; A1B4C15D25;
A1B4C16; A1B4C16D1; A1B4C16D2; A1B4C16D3;
A1B4C16D4; A1B4C16D5; A1B4C16D6;
A1B4C16D7; A1B4C16D8; A1B4C16D9;
A1B4C16D10; A1B4C16D11; A1B4C16D12;
A1B4C16D13; A1B4C16D14; A1B4C16D15;
A1B4C16D16; A1B4C16D17; A1B4C16D18;
A1B4C16D19; A1B4C16D20; A1B4C16D21;
A1B4C16D21; A1B4C16D22; A1B4C16D23;
A1B4C16D24; A1B4C16D25;
A1B4C17; A1B4C17D1; A1B4C17D2; A1B4C17D3;
A1B4C17D4; A1B4C17D5; A1B4C17D6;
A1B4C17D7; A1B4C17D8; A1B4C17D9;
A1B4C17D10; A1B4C17D11; A1B4C17D12;
A1B4C17D13; A1B4C17D14; A1B4C17D15;
A1B4C17D16; A1B4C17D17; A1B4C17D18;
A1B4C17D19; A1B4C17D20; A1B4C17D21;
A1B4C17D21; A1B4C17D22; A1B4C17D23;
A1B4C17D24; A1B4C17D25;
A1B4C18; A1B4C18D1; A1B4C18D2; A1B4C18D3;
A1B4C18D4; A1B4C18D5; A1B4C18D6;
A1B4C18D7; A1B4C18D8; A1B4C18D9;
A1B4C18D10; A1B4C18D11; A1B4C18D12;
A1B4C18D13; A1B4C18D14; A1B4C18D15;
A1B4C18D16; A1B4C18D17; A1B4C18D18;
A1B4C18D19; A1B4C18D20; A1B4C18D21;
A1B4C18D21; A1B4C18D22; A1B4C18D23;
A1B4C18D24; A1B4C18D25;
A1B4C19; A1B4C19D1; A1B4C19D2; A1B4C19D3;
A1B4C19D4; A1B4C19D5; A1B4C19D6;
A1B4C19D7; A1B4C19D8; A1B4C19D9;
A1B4C19D10; A1B4C19D11; A1B4C19D12;
A1B4C19D13; A1B4C19D14; A1B4C19D15;
A1B4C19D16; A1B4C19D17; A1B4C19D18;
A1B4C19D19; A1B4C19D20; A1B4C19D21;
A1B4C19D21; A1B4C19D22; A1B4C19D23;
A1B4C19D24; A1B4C19D25;
A1B4C20; A1B4C20D1; A1B4C20D2; A1B4C20D3;
A1B4C20D4; A1B4C20D5; A1B4C20D6;
A1B4C20D7; A1B4C20D8; A1B4C20D9;
A1B4C20D10; A1B4C20D11; A1B4C20D12;
A1B4C20D13; A1B4C20D14; A1B4C20D15;
A1B4C20D16; A1B4C20D17; A1B4C20D18;
A1B4C20D19; A1B4C20D20; A1B4C20D21;
A1B4C20D21; A1B4C20D22; A1B4C20D23;
A1B4C20D24; A1B4C20D25.

In an embodiment, the preferred fungicide A is mancozeb (A1) and the preferred fungicide B is fluindapyr (B5).

A1B5C1; A1B5C1D1; A1B5C1D2; A1B5C1D3;
A1B5C1D4; A1B5C1D5; A1B5C1D6; A1B5C1D7;
A1B5C1D8; A1B5C1D9; A1B5C1D10; A1B5C1D11;
A1B5C1D12; A1B5C1D13; A1B5C1D14;
A1B5C1D15; A1B5C1D16; A1B5C1D17;
A1B5C1D18; A1B5C1D19; A1B5C1D20;
A1B5C1D21; A1B5C1D21; A1B5C1D22;
A1B5C1D23; A1B5C1D24; A1B5C1D25;
A1B5C2; A1B5C2D1; A1B5C2D2; A1B5C2D3;
A1B5C2D4; A1B5C2D5; A1B5C2D6; A1B5C2D7;
A1B5C2D8; A1B5C2D9; A1B5C2D10; A1B5C2D11;
A1B5C2D12; A1B5C2D13; A1B5C2D14;
A1B5C2D15; A1B5C2D16; A1B5C2D17;
A1B5C2D18; A1B5C2D19; A1B5C2D20;
A1B5C2D21; A1B5C2D21; A1B5C2D22;
A1B5C2D23; A1B5C2D24; A1B5C2D25;
A1B5C3; A1B5C3D1; A1B5C3D2; A1B5C3D3;
A1B5C3D4; A1B5C3D5; A1B5C3D6; A1B5C3D7;
A1B5C3D8; A1B5C3D9; A1B5C3D10; A1B5C3D11;
A1B5C3D12; A1B5C3D13; A1B5C3D14;
A1B5C3D15; A1B5C3D16; A1B5C3D17;
A1B5C3D18; A1B5C3D19; A1B5C3D20;
A1B5C3D21; A1B5C3D21; A1B5C3D22;
A1B5C3D23; A1B5C3D24; A1B5C3D25;
A1B5C4; A1B5C4D1; A1B5C4D2; A1B5C4D3;
A1B5C4D4; A1B5C4D5; A1B5C4D6; A1B5C4D7;
A1B5C4D8; A1B5C4D9; A1B5C4D10; A1B5C4D11;
A1B5C4D12; A1B5C4D13; A1B5C4D14;
A1B5C4D15; A1B5C4D16; A1B5C4D17;
A1B5C4D18; A1B5C4D19; A1B5C4D20;
A1B5C4D21; A1B5C4D21; A1B5C4D22;
A1B5C4D23; A1B5C4D24; A1B5C4D25;
A1B5C5; A1B5C5D1; A1B5C5D2; A1B5C5D3;
A1B5C5D4; A1B5C5D5; A1B5C5D6; A1B5C5D7;
A1B5C5D8; A1B5C5D9; A1B5C5D10; A1B5C5D11;
A1B5C5D12; A1B5C5D13; A1B5C5D14;
A1B5C5D15; A1B5C5D16; A1B5C5D17;
A1B5C5D18; A1B5C5D19; A1B5C5D20;
A1B5C5D21; A1B5C5D21; A1B5C5D22;
A1B5C5D23; A1B5C5D24; A1B5C5D25;
A1B5C6; A1B5C6D1; A1B5C6D2; A1B5C6D3;
A1B5C6D4; A1B5C6D5; A1B5C6D6; A1B5C6D7;
A1B5C6D8; A1B5C6D9; A1B5C6D10; A1B5C6D11;
A1B5C6D12; A1B5C6D13; A1B5C6D14;
A1B5C6D15; A1B5C6D16; A1B5C6D17;
A1B5C6D18; A1B5C6D19; A1B5C6D20;
A1B5C6D21; A1B5C6D21; A1B5C6D22;
A1B5C6D23; A1B5C6D24; A1B5C6D25;
A1B5C7; A1B5C7D1; A1B5C7D2; A1B5C7D3;
A1B5C7D4; A1B5C7D5; A1B5C7D6; A1B5C7D7;
A1B5C7D8; A1B5C7D9; A1B5C7D10; A1B5C7D11;
A1B5C7D12; A1B5C7D13; A1B5C7D14;
A1B5C7D15; A1B5C7D16; A1B5C7D17;
A1B5C7D18; A1B5C7D19; A1B5C7D20;

A1B5C7D21; A1B5C7D21; A1B5C7D22; A1B5C7D23; A1B5C7D24; A1B5C7D25;
A1B5C8; A1B5C8D1; A1B5C8D2; A1B5C8D3; A1B5C8D4; A1B5C8D5; A1B5C8D6; A1B5C8D7; A1B5C8D8; A1B5C8D9; A1B5C8D10; A1B5C8D11; A1B5C8D12; A1B5C8D13; A1B5C8D14; A1B5C8D15; A1B5C8D16; A1B5C8D17; A1B5C8D18; A1B5C8D19; A1B5C8D20; A1B5C8D21; A1B5C8D21; A1B5C8D22; A1B5C8D23; A1B5C8D24; A1B5C8D25;
A1B5C9; A1B5C9D1; A1B5C9D2; A1B5C9D3; A1B5C9D4; A1B5C9D5; A1B5C9D6; A1B5C9D7; A1B5C9D8; A1B5C9D9; A1B5C9D10; A1B5C9D11; A1B5C9D12; A1B5C9D13; A1B5C9D14; A1B5C9D15; A1B5C9D16; A1B5C9D17; A1B5C9D18; A1B5C9D19; A1B5C9D20; A1B5C9D21; A1B5C9D21; A1B5C9D22; A1B5C9D23; A1B5C9D24; A1B5C9D25;
A1B5C10; A1B5C10D1; A1B5C10D2; A1B5C10D3; A1B5C10D4; A1B5C10D5; A1B5C10D6; A1B5C10D7; A1B5C10D8; A1B5C10D9; A1B5C10D10; A1B5C10D11; A1B5C10D12; A1B5C10D13; A1B5C10D14; A1B5C10D15; A1B5C10D16; A1B5C10D17; A1B5C10D18; A1B5C10D19; A1B5C10D20; A1B5C10D21; A1B5C10D21; A1B5C10D22; A1B5C10D23; A1B5C10D24; A1B5C10D25;
A1B5C11; A1B5C11D1; A1B5C11D2; A1B5C11D3; A1B5C11D4; A1B5C11D5; A1B5C11D6; A1B5C11D7; A1B5C11D8; A1B5C11D9; A1B5C11D10; A1B5C11D11; A1B5C11D12; A1B5C11D13; A1B5C11D14; A1B5C11D15; A1B5C11D16; A1B5C11D17; A1B5C11D18; A1B5C11D19; A1B5C11D20; A1B5C11D21; A1B5C11D21; A1B5C11D22; A1B5C11D23; A1B5C11D24; A1B5C11D25;
A1B5C12; A1B5C12D1; A1B5C12D2; A1B5C12D3; A1B5C12D4; A1B5C12D5; A1B5C12D6; A1B5C12D7; A1B5C12D8; A1B5C12D9; A1B5C12D10; A1B5C12D11; A1B5C12D12; A1B5C12D13; A1B5C12D14; A1B5C12D15; A1B5C12D16; A1B5C12D17; A1B5C12D18; A1B5C12D19; A1B5C12D20; A1B5C12D21; A1B5C12D21; A1B5C12D22; A1B5C12D23; A1B5C12D24; A1B5C12D25;
A1B5C13; A1B5C13D1; A1B5C13D2; A1B5C13D3; A1B5C13D4; A1B5C13D5; A1B5C13D6; A1B5C13D7; A1B5C13D8; A1B5C13D9; A1B5C13D10; A1B5C13D11; A1B5C13D12; A1B5C13D13; A1B5C13D14; A1B5C13D15; A1B5C13D16; A1B5C13D17; A1B5C13D18; A1B5C13D19; A1B5C13D20; A1B5C13D21; A1B5C13D21; A1B5C13D22; A1B5C13D23; A1B5C13D24; A1B5C13D25;
A1B5C14; A1B5C14D1; A1B5C14D2; A1B5C14D3; A1B5C14D4; A1B5C14D5; A1B5C14D6; A1B5C14D7; A1B5C14D8; A1B5C14D9; A1B5C14D10; A1B5C14D11; A1B5C14D12; A1B5C14D13; A1B5C14D14; A1B5C14D15; A1B5C14D16; A1B5C14D17; A1B5C14D18; A1B5C14D19; A1B5C14D20; A1B5C14D21; A1B5C14D21; A1B5C14D22; A1B5C14D23; A1B5C14D24; A1B5C14D25;
A1B5C15; A1B5C15D1; A1B5C15D2; A1B5C15D3; A1B5C15D4; A1B5C15D5; A1B5C15D6; A1B5C15D7; A1B5C15D8; A1B5C15D9; A1B5C15D10; A1B5C15D11; A1B5C15D12; A1B5C15D13; A1B5C15D14; A1B5C15D15; A1B5C15D16; A1B5C15D17; A1B5C15D18; A1B5C15D19; A1B5C15D20; A1B5C15D21; A1B5C15D21; A1B5C15D22; A1B5C15D23; A1B5C15D24; A1B5C15D25;
A1B5C16; A1B5C16D1; A1B5C16D2; A1B5C16D3; A1B5C16D4; A1B5C16D5; A1B5C16D6; A1B5C16D7; A1B5C16D8; A1B5C16D9; A1B5C16D10; A1B5C16D11; A1B5C16D12; A1B5C16D13; A1B5C16D14; A1B5C16D15; A1B5C16D16; A1B5C16D17; A1B5C16D18; A1B5C16D19; A1B5C16D20; A1B5C16D21; A1B5C16D21; A1B5C16D22; A1B5C16D23; A1B5C16D24; A1B5C16D25;
A1B5C17; A1B5C17D1; A1B5C17D2; A1B5C17D3; A1B5C17D4; A1B5C17D5; A1B5C17D6; A1B5C17D7; A1B5C17D8; A1B5C17D9; A1B5C17D10; A1B5C17D11; A1B5C17D12; A1B5C17D13; A1B5C17D14; A1B5C17D15; A1B5C17D16; A1B5C17D17; A1B5C17D18; A1B5C17D19; A1B5C17D20; A1B5C17D21; A1B5C17D21; A1B5C17D22; A1B5C17D23; A1B5C17D24; A1B5C17D25;
A1B5C18; A1B5C18D1; A1B5C18D2; A1B5C18D3; A1B5C18D4; A1B5C18D5; A1B5C18D6; A1B5C18D7; A1B5C18D8; A1B5C18D9; A1B5C18D10; A1B5C18D11; A1B5C18D12; A1B5C18D13; A1B5C18D14; A1B5C18D15; A1B5C18D16; A1B5C18D17; A1B5C18D18; A1B5C18D19; A1B5C18D20; A1B5C18D21; A1B5C18D21; A1B5C18D22; A1B5C18D23; A1B5C18D24; A1B5C18D25;
A1B5C19; A1B5C19D1; A1B5C19D2; A1B5C19D3; A1B5C19D4; A1B5C19D5; A1B5C19D6; A1B5C19D7; A1B5C19D8; A1B5C19D9; A1B5C19D10; A1B5C19D11; A1B5C19D12; A1B5C19D13; A1B5C19D14; A1B5C19D15; A1B5C19D16; A1B5C19D17; A1B5C19D18; A1B5C19D19; A1B5C19D20; A1B5C19D21; A1B5C19D21; A1B5C19D22; A1B5C19D23; A1B5C19D24; A1B5C19D25;
A1B5C20; A1B5C20D1; A1B5C20D2; A1B5C20D3; A1B5C20D4; A1B5C20D5; A1B5C20D6; A1B5C20D7; A1B5C20D8; A1B5C20D9; A1B5C20D10; A1B5C20D11; A1B5C20D12; A1B5C20D13; A1B5C20D14; A1B5C20D15; A1B5C20D16; A1B5C20D17; A1B5C20D18; A1B5C20D19; A1B5C20D20; A1B5C20D21; A1B5C20D21; A1B5C20D22; A1B5C20D23; A1B5C20D24; A1B5C20D25.

In an embodiment, the preferred fungicide A is mancozeb (A1), and the preferred fungicide B is boscalid (B23).

A1B23C1; A1B23C1D1; A1B23C1D2; A1B23C1D3; A1B23C1D4; A1B23C1D5; A1B23C1D6; A1B23C1D7; A1B23C1D8; A1B23C1D9; A1B23C1D10; A1B23C1D11; A1B23C1D12; A1B23C1D13; A1B23C1D14; A1B23C1D15; A1B23C1D16; A1B23C1D17; A1B23C1D18; A1B23C1D19; A1B23C1D20; A1B23C1D21; A1B23C1D21; A1B23C1D22; A1B23C1D23; A1B23C1D24; A1B23C1D25;
A1B23C2; A1B23C2D1; A1B23C2D2; A1B23C2D3; A1B23C2D4; A1B23C2D5; A1B23C2D6; A1B23C2D7; A1B23C2D8; A1B23C2D9; A1B23C2D10; A1B23C2D11; A1B23C2D12; A1B23C2D13; A1B23C2D14; A1B23C2D15; A1B23C2D16; A1B23C2D17; A1B23C2D18;

A1B23C2D19; A1B23C2D20; A1B23C2D21;
A1B23C2D21; A1B23C2D22; A1B23C2D23;
A1B23C2D24; A1B23C2D25;
A1B23C3; A1B23C3D1; A1B23C3D2; A1B23C3D3;
A1B23C3D4; A1B23C3D5; A1B23C3D6;
A1B23C3D7; A1B23C3D8; A1B23C3D9;
A1B23C3D10; A1B23C3D11; A1B23C3D12;
A1B23C3D13; A1B23C3D14; A1B23C3D15;
A1B23C3D16; A1B23C3D17; A1B23C3D18;
A1B23C3D19; A1B23C3D20; A1B23C3D21;
A1B23C3D21; A1B23C3D22; A1B23C3D23;
A1B23C3D24; A1B23C3D25;
A1B23C4; A1B23C4D1; A1B23C4D2; A1B23C4D3;
A1B23C4D4; A1B23C4D5; A1B23C4D6;
A1B23C4D7; A1B23C4D8; A1B23C4D9;
A1B23C4D10; A1B23C4D11; A1B23C4D12;
A1B23C4D13; A1B23C4D14; A1B23C4D15;
A1B23C4D16; A1B23C4D17; A1B23C4D18;
A1B23C4D19; A1B23C4D20; A1B23C4D21;
A1B23C4D21; A1B23C4D22; A1B23C4D23;
A1B23C4D24; A1B23C4D25;
A1B23C5; A1B23C5D1; A1B23C5D2; A1B23C5D3;
A1B23C5D4; A1B23C5D5; A1B23C5D6;
A1B23C5D7; A1B23C5D8; A1B23C5D9;
A1B23C5D10; A1B23C5D11; A1B23C5D12;
A1B23C5D13; A1B23C5D14; A1B23C5D15;
A1B23C5D16; A1B23C5D17; A1B23C5D18;
A1B23C5D19; A1B23C5D20; A1B23C5D21;
A1B23C5D21; A1B23C5D22; A1B23C5D23;
A1B23C5D24; A1B23C5D25;
A1B23C6; A1B23C6D1; A1B23C6D2; A1B23C6D3;
A1B23C6D4; A1B23C6D5; A1B23C6D6;
A1B23C6D7; A1B23C6D8; A1B23C6D9;
A1B23C6D10; A1B23C6D11; A1B23C6D12;
A1B23C6D13; A1B23C6D14; A1B23C6D15;
A1B23C6D16; A1B23C6D17; A1B23C6D18;
A1B23C6D19; A1B23C6D20; A1B23C6D21;
A1B23C6D21; A1B23C6D22; A1B23C6D23;
A1B23C6D24; A1B23C6D25;
A1B23C7; A1B23C7D1; A1B23C7D2; A1B23C7D3;
A1B23C7D4; A1B23C7D5; A1B23C7D6;
A1B23C7D7; A1B23C7D8; A1B23C7D9;
A1B23C7D10; A1B23C7D11; A1B23C7D12;
A1B23C7D13; A1B23C7D14; A1B23C7D15;
A1B23C7D16; A1B23C7D17; A1B23C7D18;
A1B23C7D19; A1B23C7D20; A1B23C7D21;
A1B23C7D21; A1B23C7D22; A1B23C7D23;
A1B23C7D24; A1B23C7D25;
A1B23C8; A1B23C8D1; A1B23C8D2; A1B23C8D3;
A1B23C8D4; A1B23C8D5; A1B23C8D6;
A1B23C8D7; A1B23C8D8; A1B23C8D9;
A1B23C8D10; A1B23C8D11; A1B23C8D12;
A1B23C8D13; A1B23C8D14; A1B23C8D15;
A1B23C8D16; A1B23C8D17; A1B23C8D18;
A1B23C8D19; A1B23C8D20; A1B23C8D21;
A1B23C8D21; A1B23C8D22; A1B23C8D23;
A1B23C8D24; A1B23C8D25;
A1B23C9; A1B23C9D1; A1B23C9D2; A1B23C9D3;
A1B23C9D4; A1B23C9D5; A1B23C9D6;
A1B23C9D7; A1B23C9D8; A1B23C9D9;
A1B23C9D10; A1B23C9D11; A1B23C9D12;
A1B23C9D13; A1B23C9D14; A1B23C9D15;
A1B23C9D16; A1B23C9D17; A1B23C9D18;
A1B23C9D19; A1B23C9D20; A1B23C9D21;
A1B23C9D21; A1B23C9D22; A1B23C9D23;
A1B23C9D24; A1B23C9D25;
A1B23C10; A1B23C10D1; A1B23C10D2;
A1B23C10D3; A1B23C10D4; A1B23C10D5;
A1B23C10D6; A1B23C10D7; A1B23C10D8;
A1B23C10D9; A1B23C10D10; A1B23C10D11;
A1B23C10D12; A1B23C10D13; A1B23C10D14;
A1B23C10D15; A1B23C10D16; A1B23C10D17;
A1B23C10D18; A1B23C10D19; A1B23C10D20;
A1B23C10D21; A1B23C10D21; A1B23C10D22;
A1B23C10D23; A1B23C10D24; A1B23C10D25;
A1B23C11; A1B23C11D1; A1B23C11D2;
A1B23C11D3; A1B23C11D4; A1B23C11D5;
A1B23C11D6; A1B23C11D7; A1B23C11D8;
A1B23C11D9; A1B23C11D10; A1B23C11D11;
A1B23C11D12; A1B23C11D13; A1B23C11D14;
A1B23C11D15; A1B23C11D16; A1B23C11D17;
A1B23C11D18; A1B23C11D19; A1B23C11D20;
A1B23C11D21; A1B23C11D21; A1B23C11D22;
A1B23C11D23; A1B23C11D24; A1B23C11D25;
A1B23C12; A1B23C12D1; A1B23C12D2;
A1B23C12D3; A1B23C12D4; A1B23C12D5;
A1B23C12D6; A1B23C12D7; A1B23C12D8;
A1B23C12D9; A1B23C12D10; A1B23C12D11;
A1B23C12D12; A1B23C12D13; A1B23C12D14;
A1B23C12D15; A1B23C12D16; A1B23C12D17;
A1B23C12D18; A1B23C12D19; A1B23C12D20;
A1B23C12D21; A1B23C12D21; A1B23C12D22;
A1B23C12D23; A1B23C12D24; A1B23C12D25;
A1B23C13; A1B23C13D1; A1B23C13D2;
A1B23C13D3; A1B23C13D4; A1B23C13D5;
A1B23C13D6; A1B23C13D7; A1B23C13D8;
A1B23C13D9; A1B23C13D10; A1B23C13D11;
A1B23C13D12; A1B23C13D13; A1B23C13D14;
A1B23C13D15; A1B23C13D16; A1B23C13D17;
A1B23C13D18; A1B23C13D19; A1B23C13D20;
A1B23C13D21; A1B23C13D21; A1B23C13D22;
A1B23C13D23; A1B23C13D24; A1B23C13D25;
A1B23C14; A1B23C14D1; A1B23C14D2;
A1B23C14D3; A1B23C14D4; A1B23C14D5;
A1B23C14D6; A1B23C14D7; A1B23C14D8;
A1B23C14D9; A1B23C14D10; A1B23C14D11;
A1B23C14D12; A1B23C14D13; A1B23C14D14;
A1B23C14D15; A1B23C14D16; A1B23C14D17;
A1B23C14D18; A1B23C14D19; A1B23C14D20;
A1B23C14D21; A1B23C14D21; A1B23C14D22;
A1B23C14D23; A1B23C14D24; A1B23C14D25;
A1B23C15; A1B23C15D1; A1B23C15D2;
A1B23C15D3; A1B23C15D4; A1B23C15D5;
A1B23C15D6; A1B23C15D7; A1B23C15D8;
A1B23C15D9; A1B23C15D10; A1B23C15D11;
A1B23C15D12; A1B23C15D13; A1B23C15D14;
A1B23C15D15; A1B23C15D16; A1B23C15D17;
A1B23C15D18; A1B23C15D19; A1B23C15D20;
A1B23C15D21; A1B23C15D21; A1B23C15D22;
A1B23C15D23; A1B23C15D24; A1B23C15D25;
A1B23C16; A1B23C16D1; A1B23C16D2;
A1B23C16D3; A1B23C16D4; A1B23C16D5;
A1B23C16D6; A1B23C16D7; A1B23C16D8;
A1B23C16D9; A1B23C16D10; A1B23C16D11;
A1B23C16D12; A1B23C16D13; A1B23C16D14;
A1B23C16D15; A1B23C16D16; A1B23C16D17;
A1B23C16D18; A1B23C16D19; A1B23C16D20;
A1B23C16D21; A1B23C16D21; A1B23C16D22;
A1B23C16D23; A1B23C16D24; A1B23C16D25;
A1B23C17; A1B23C17D1; A1B23C17D2;
A1B23C17D3; A1B23C17D4; A1B23C17D5;
A1B23C17D6; A1B23C17D7; A1B23C17D8;
A1B23C17D9; A1B23C17D10; A1B23C17D11;

A1B23C17D12; A1B23C17D13; A1B23C17D14; A1B23C17D15; A1B23C17D16; A1B23C17D17; A1B23C17D18; A1B23C17D19; A1B23C17D20; A1B23C17D21; A1B23C17D21; A1B23C17D22; A1B23C17D23; A1B23C17D24; A1B23C17D25; A1B23C18; A1B23C18D1; A1B23C18D2; A1B23C18D3; A1B23C18D4; A1B23C18D5; A1B23C18D6; A1B23C18D7; A1B23C18D8; A1B23C18D9; A1B23C18D10; A1B23C18D11; A1B23C18D12; A1B23C18D13; A1B23C18D14; A1B23C18D15; A1B23C18D16; A1B23C18D17; A1B23C18D18; A1B23C18D19; A1B23C18D20; A1B23C18D21; A1B23C18D21; A1B23C18D22; A1B23C18D23; A1B23C18D24; A1B23C18D25; A1B23C19; A1B23C19D1; A1B23C19D2; A1B23C19D3; A1B23C19D4; A1B23C19D5; A1B23C19D6; A1B23C19D7; A1B23C19D8; A1B23C19D9; A1B23C19D10; A1B23C19D11; A1B23C19D12; A1B23C19D13; A1B23C19D14; A1B23C19D15; A1B23C19D16; A1B23C19D17; A1B23C19D18; A1B23C19D19; A1B23C19D20; A1B23C19D21; A1B23C19D21; A1B23C19D22; A1B23C19D23; A1B23C19D24; A1B23C19D25; A1B23C20; A1B23C20D1; A1B23C20D2; A1B23C20D3; A1B23C20D4; A1B23C20D5; A1B23C20D6; A1B23C20D7; A1B23C20D8; A1B23C20D9; A1B23C20D10; A1B23C20D11; A1B23C20D12; A1B23C20D13; A1B23C20D14; A1B23C20D15; A1B23C20D16; A1B23C20D17; A1B23C20D18; A1B23C20D19; A1B23C20D20; A1B23C20D21; A1B23C20D21; A1B23C20D22; A1B23C20D23; A1B23C20D24; A1B23C20D25.

In an embodiment, the preferred fungicide A is folpet (A2).

In a preferred embodiment, the preferred fungicide A is folpet (A2) and the preferred fungicide B is isopyrazam (B1).

A2B1C1; A2B1C1D1; A2B1C1D2; A2B1C1D3; A2B1C1D4; A2B1C1D5; A2B1C1D6; A2B1C1D7; A2B1C1D8; A2B1C1D9; A2B1C1D10; A2B1C1D11; A2B1C1D12; A2B1C1D13; A2B1C1D14; A2B1C1D15; A2B1C1D16; A2B1C1D17; A2B1C1D18; A2B1C1D19; A2B1C1D20; A2B1C1D21; A2B1C1D21; A2B1C1D22; A2B1C1D23; A2B1C1D24; A2B1C1D25;
A2B1C2; A2B1C2D1; A2B1C2D2; A2B1C2D3; A2B1C2D4; A2B1C2D5; A2B1C2D6; A2B1C2D7; A2B1C2D8; A2B1C2D9; A2B1C2D10; A2B1C2D11; A2B1C2D12; A2B1C2D13; A2B1C2D14; A2B1C2D15; A2B1C2D16; A2B1C2D17; A2B1C2D18; A2B1C2D19; A2B1C2D20; A2B1C2D21; A2B1C2D21; A2B1C2D22; A2B1C2D23; A2B1C2D24; A2B1C2D25;
A2B1C3; A2B1C3D1; A2B1C3D2; A2B1C3D3; A2B1C3D4; A2B1C3D5; A2B1C3D6; A2B1C3D7; A2B1C3D8; A2B1C3D9; A2B1C3D10; A2B1C3D11; A2B1C3D12; A2B1C3D13; A2B1C3D14; A2B1C3D15; A2B1C3D16; A2B1C3D17; A2B1C3D18; A2B1C3D19; A2B1C3D20; A2B1C3D21; A2B1C3D21; A2B1C3D22; A2B1C3D23; A2B1C3D24; A2B1C3D25;
A2B1C4; A2B1C4D1; A2B1C4D2; A2B1C4D3; A2B1C4D4; A2B1C4D5; A2B1C4D6; A2B1C4D7; A2B1C4D8; A2B1C4D9; A2B1C4D10; A2B1C4D11; A2B1C4D12; A2B1C4D13; A2B1C4D14; A2B1C4D15; A2B1C4D16; A2B1C4D17; A2B1C4D18; A2B1C4D19; A2B1C4D20; A2B1C4D21; A2B1C4D21; A2B1C4D22; A2B1C4D23; A2B1C4D24; A2B1C4D25;
A2B1C5; A2B1C5D1; A2B1C5D2; A2B1C5D3; A2B1C5D4; A2B1C5D5; A2B1C5D6; A2B1C5D7; A2B1C5D8; A2B1C5D9; A2B1C5D10; A2B1C5D11; A2B1C5D12; A2B1C5D13; A2B1C5D14; A2B1C5D15; A2B1C5D16; A2B1C5D17; A2B1C5D18; A2B1C5D19; A2B1C5D20; A2B1C5D21; A2B1C5D21; A2B1C5D22; A2B1C5D23; A2B1C5D24; A2B1C5D25;
A2B1C6; A2B1C6D1; A2B1C6D2; A2B1C6D3; A2B1C6D4; A2B1C6D5; A2B1C6D6; A2B1C6D7; A2B1C6D8; A2B1C6D9; A2B1C6D10; A2B1C6D11; A2B1C6D12; A2B1C6D13; A2B1C6D14; A2B1C6D15; A2B1C6D16; A2B1C6D17; A2B1C6D18; A2B1C6D19; A2B1C6D20; A2B1C6D21; A2B1C6D21; A2B1C6D22; A2B1C6D23; A2B1C6D24; A2B1C6D25;
A2B1C7; A2B1C7D1; A2B1C7D2; A2B1C7D3; A2B1C7D4; A2B1C7D5; A2B1C7D6; A2B1C7D7; A2B1C7D8; A2B1C7D9; A2B1C7D10; A2B1C7D11; A2B1C7D12; A2B1C7D13; A2B1C7D14; A2B1C7D15; A2B1C7D16; A2B1C7D17; A2B1C7D18; A2B1C7D19; A2B1C7D20; A2B1C7D21; A2B1C7D21; A2B1C7D22; A2B1C7D23; A2B1C7D24; A2B1C7D25;
A2B1C8; A2B1C8D1; A2B1C8D2; A2B1C8D3; A2B1C8D4; A2B1C8D5; A2B1C8D6; A2B1C8D7; A2B1C8D8; A2B1C8D9; A2B1C8D10; A2B1C8D11; A2B1C8D12; A2B1C8D13; A2B1C8D14; A2B1C8D15; A2B1C8D16; A2B1C8D17; A2B1C8D18; A2B1C8D19; A2B1C8D20; A2B1C8D21; A2B1C8D21; A2B1C8D22; A2B1C8D23; A2B1C8D24; A2B1C8D25;
A2B1C9; A2B1C9D1; A2B1C9D2; A2B1C9D3; A2B1C9D4; A2B1C9D5; A2B1C9D6; A2B1C9D7; A2B1C9D8; A2B1C9D9; A2B1C9D10; A2B1C9D11; A2B1C9D12; A2B1C9D13; A2B1C9D14; A2B1C9D15; A2B1C9D16; A2B1C9D17; A2B1C9D18; A2B1C9D19; A2B1C9D20; A2B1C9D21; A2B1C9D21; A2B1C9D22; A2B1C9D23; A2B1C9D24; A2B1C9D25;
A2B1C10; A2B1C10D1; A2B1C10D2; A2B1C10D3; A2B1C10D4; A2B1C10D5; A2B1C10D6; A2B1C10D7; A2B1C10D8; A2B1C10D9; A2B1C10D10; A2B1C10D11; A2B1C10D12; A2B1C10D13; A2B1C10D14; A2B1C10D15; A2B1C10D16; A2B1C10D17; A2B1C10D18; A2B1C10D19; A2B1C10D20; A2B1C10D21; A2B1C10D21; A2B1C10D22; A2B1C10D23; A2B1C10D24; A2B1C10D25;
A2B1C11; A2B1C11D1; A2B1C11D2; A2B1C11D3; A2B1C11D4; A2B1C11D5; A2B1C11D6; A2B1C11D7; A2B1C11D8; A2B1C11D9; A2B1C11D10; A2B1C11D11; A2B1C11D12; A2B1C11D13; A2B1C11D14; A2B1C11D15; A2B1C11D16; A2B1C11D17; A2B1C11D18; A2B1C11D19; A2B1C11D20; A2B1C11D21; A2B1C11D21; A2B1C11D22; A2B1C11D23; A2B1C11D24; A2B1C11D25;
A2B1C12; A2B1C12D1; A2B1C12D2; A2B1C12D3; A2B1C12D4; A2B1C12D5; A2B1C12D6; A2B1C12D7; A2B1C12D8; A2B1C12D9; A2B1C12D10; A2B1C12D11; A2B1C12D12; A2B1C12D13; A2B1C12D14; A2B1C12D15; A2B1C12D16; A2B1C12D17; A2B1C12D18; A2B1C12D19; A2B1C12D20; A2B1C12D21;

A2B1C12D21; A2B1C12D22; A2B1C12D23; A2B1C12D24; A2B1C12D25;

A2B1C13; A2B1C13D1; A2B1C13D2; A2B1C13D3; A2B1C13D4; A2B1C13D5; A2B1C13D6; A2B1C13D7; A2B1C13D8; A2B1C13D9; A2B1C13D10; A2B1C13D11; A2B1C13D12; A2B1C13D13; A2B1C13D14; A2B1C13D15; A2B1C13D16; A2B1C13D17; A2B1C13D18; A2B1C13D19; A2B1C13D20; A2B1C13D21; A2B1C13D21; A2B1C13D22; A2B1C13D23; A2B1C13D24; A2B1C13D25;

A2B1C14; A2B1C14D1; A2B1C14D2; A2B1C14D3; A2B1C14D4; A2B1C14D5; A2B1C14D6; A2B1C14D7; A2B1C14D8; A2B1C14D9; A2B1C14D10; A2B1C14D11; A2B1C14D12; A2B1C14D13; A2B1C14D14; A2B1C14D15; A2B1C14D16; A2B1C14D17; A2B1C14D18; A2B1C14D19; A2B1C14D20; A2B1C14D21; A2B1C14D21; A2B1C14D22; A2B1C14D23; A2B1C14D24; A2B1C14D25;

A2B1C15; A2B1C15D1; A2B1C15D2; A2B1C15D3; A2B1C15D4; A2B1C15D5; A2B1C15D6; A2B1C15D7; A2B1C15D8; A2B1C15D9; A2B1C15D10; A2B1C15D11; A2B1C15D12; A2B1C15D13; A2B1C15D14; A2B1C15D15; A2B1C15D16; A2B1C15D17; A2B1C15D18; A2B1C15D19; A2B1C15D20; A2B1C15D21; A2B1C15D21; A2B1C15D22; A2B1C15D23; A2B1C15D24; A2B1C15D25;

A2B1C16; A2B1C16D1; A2B1C16D2; A2B1C16D3; A2B1C16D4; A2B1C16D5; A2B1C16D6; A2B1C16D7; A2B1C16D8; A2B1C16D9; A2B1C16D10; A2B1C16D11; A2B1C16D12; A2B1C16D13; A2B1C16D14; A2B1C16D15; A2B1C16D16; A2B1C16D17; A2B1C16D18; A2B1C16D19; A2B1C16D20; A2B1C16D21; A2B1C16D21; A2B1C16D22; A2B1C16D23; A2B1C16D24; A2B1C16D25;

A2B1C17; A2B1C17D1; A2B1C17D2; A2B1C17D3; A2B1C17D4; A2B1C17D5; A2B1C17D6; A2B1C17D7; A2B1C17D8; A2B1C17D9; A2B1C17D10; A2B1C17D11; A2B1C17D12; A2B1C17D13; A2B1C17D14; A2B1C17D15; A2B1C17D16; A2B1C17D17; A2B1C17D18; A2B1C17D19; A2B1C17D20; A2B1C17D21; A2B1C17D21; A2B1C17D22; A2B1C17D23; A2B1C17D24; A2B1C17D25;

A2B1C18; A2B1C18D1; A2B1C18D2; A2B1C18D3; A2B1C18D4; A2B1C18D5; A2B1C18D6; A2B1C18D7; A2B1C18D8; A2B1C18D9; A2B1C18D10; A2B1C18D11; A2B1C18D12; A2B1C18D13; A2B1C18D14; A2B1C18D15; A2B1C18D16; A2B1C18D17; A2B1C18D18; A2B1C18D19; A2B1C18D20; A2B1C18D21; A2B1C18D21; A2B1C18D22; A2B1C18D23; A2B1C18D24; A2B1C18D25;

A2B1C19; A2B1C19D1; A2B1C19D2; A2B1C19D3; A2B1C19D4; A2B1C19D5; A2B1C19D6; A2B1C19D7; A2B1C19D8; A2B1C19D9; A2B1C19D10; A2B1C19D11; A2B1C19D12; A2B1C19D13; A2B1C19D14; A2B1C19D15; A2B1C19D16; A2B1C19D17; A2B1C19D18; A2B1C19D19; A2B1C19D20; A2B1C19D21; A2B1C19D21; A2B1C19D22; A2B1C19D23; A2B1C19D24; A2B1C19D25;

A2B1C20; A2B1C20D1; A2B1C20D2; A2B1C20D3; A2B1C20D4; A2B1C20D5; A2B1C20D6; A2B1C20D7; A2B1C20D8; A2B1C20D9; A2B1C20D10; A2B1C20D11; A2B1C20D12; A2B1C20D13; A2B1C20D14; A2B1C20D15; A2B1C20D16; A2B1C20D17; A2B1C20D18; A2B1C20D19; A2B1C20D20; A2B1C20D21; A2B1C20D21; A2B1C20D22; A2B1C20D23; A2B1C20D24; A2B1C20D25.

In a preferred embodiment, the preferred fungicide A is folpet (A2) and the preferred fungicide B is benzovindiflupyr (B2).

A2B2C1; A2B2C1D1; A2B2C1D2; A2B2C1D3; A2B2C1D4; A2B2C1D5; A2B2C1D6; A2B2C1D7; A2B2C1D8; A2B2C1D9; A2B2C1D10; A2B2C1D11; A2B2C1D12; A2B2C1D13; A2B2C1D14; A2B2C1D15; A2B2C1D16; A2B2C1D17; A2B2C1D18; A2B2C1D19; A2B2C1D20; A2B2C1D21; A2B2C1D21; A2B2C1D22; A2B2C1D23; A2B2C1D24; A2B2C1D25;

A2B2C2; A2B2C2D1; A2B2C2D2; A2B2C2D3; A2B2C2D4; A2B2C2D5; A2B2C2D6; A2B2C2D7; A2B2C2D8; A2B2C2D9; A2B2C2D10; A2B2C2D11; A2B2C2D12; A2B2C2D13; A2B2C2D14; A2B2C2D15; A2B2C2D16; A2B2C2D17; A2B2C2D18; A2B2C2D19; A2B2C2D20; A2B2C2D21; A2B2C2D21; A2B2C2D22; A2B2C2D23; A2B2C2D24; A2B2C2D25;

A2B2C3; A2B2C3D1; A2B2C3D2; A2B2C3D3; A2B2C3D4; A2B2C3D5; A2B2C3D6; A2B2C3D7; A2B2C3D8; A2B2C3D9; A2B2C3D10; A2B2C3D11; A2B2C3D12; A2B2C3D13; A2B2C3D14; A2B2C3D15; A2B2C3D16; A2B2C3D17; A2B2C3D18; A2B2C3D19; A2B2C3D20; A2B2C3D21; A2B2C3D21; A2B2C3D22; A2B2C3D23; A2B2C3D24; A2B2C3D25;

A2B2C4; A2B2C4D1; A2B2C4D2; A2B2C4D3; A2B2C4D4; A2B2C4D5; A2B2C4D6; A2B2C4D7; A2B2C4D8; A2B2C4D9; A2B2C4D10; A2B2C4D11; A2B2C4D12; A2B2C4D13; A2B2C4D14; A2B2C4D15; A2B2C4D16; A2B2C4D17; A2B2C4D18; A2B2C4D19; A2B2C4D20; A2B2C4D21; A2B2C4D21; A2B2C4D22; A2B2C4D23; A2B2C4D24; A2B2C4D25;

A2B2C5; A2B2C5D1; A2B2C5D2; A2B2C5D3; A2B2C5D4; A2B2C5D5; A2B2C5D6; A2B2C5D7; A2B2C5D8; A2B2C5D9; A2B2C5D10; A2B2C5D11; A2B2C5D12; A2B2C5D13; A2B2C5D14; A2B2C5D15; A2B2C5D16; A2B2C5D17; A2B2C5D18; A2B2C5D19; A2B2C5D20; A2B2C5D21; A2B2C5D21; A2B2C5D22; A2B2C5D23; A2B2C5D24; A2B2C5D25;

A2B2C6; A2B2C6D1; A2B2C6D2; A2B2C6D3; A2B2C6D4; A2B2C6D5; A2B2C6D6; A2B2C6D7; A2B2C6D8; A2B2C6D9; A2B2C6D10; A2B2C6D11; A2B2C6D12; A2B2C6D13; A2B2C6D14; A2B2C6D15; A2B2C6D16; A2B2C6D17; A2B2C6D18; A2B2C6D19; A2B2C6D20; A2B2C6D21; A2B2C6D21; A2B2C6D22; A2B2C6D23; A2B2C6D24; A2B2C6D25;

A2B2C7; A2B2C7D1; A2B2C7D2; A2B2C7D3; A2B2C7D4; A2B2C7D5; A2B2C7D6; A2B2C7D7; A2B2C7D8; A2B2C7D9; A2B2C7D10; A2B2C7D11; A2B2C7D12; A2B2C7D13; A2B2C7D14; A2B2C7D15; A2B2C7D16; A2B2C7D17; A2B2C7D18; A2B2C7D19; A2B2C7D20; A2B2C7D21; A2B2C7D21; A2B2C7D22; A2B2C7D23; A2B2C7D24; A2B2C7D25;

A2B2C8; A2B2C8D1; A2B2C8D2; A2B2C8D3; A2B2C8D4; A2B2C8D5; A2B2C8D6; A2B2C8D7; A2B2C8D8; A2B2C8D9; A2B2C8D10; A2B2C8D11; A2B2C8D12; A2B2C8D13; A2B2C8D14; A2B2C8D15; A2B2C8D16; A2B2C8D17; A2B2C8D18; A2B2C8D19; A2B2C8D20; A2B2C8D21; A2B2C8D21; A2B2C8D22; A2B2C8D23; A2B2C8D24; A2B2C8D25;

A2B2C9; A2B2C9D1; A2B2C9D2; A2B2C9D3; A2B2C9D4; A2B2C9D5; A2B2C9D6; A2B2C9D7; A2B2C9D8; A2B2C9D9; A2B2C9D10; A2B2C9D11; A2B2C9D12; A2B2C9D13; A2B2C9D14; A2B2C9D15; A2B2C9D16; A2B2C9D17; A2B2C9D18; A2B2C9D19; A2B2C9D20; A2B2C9D21; A2B2C9D21; A2B2C9D22; A2B2C9D23; A2B2C9D24; A2B2C9D25;

A2B2C10; A2B2C10D1; A2B2C10D2; A2B2C10D3; A2B2C10D4; A2B2C10D5; A2B2C10D6; A2B2C10D7; A2B2C10D8; A2B2C10D9; A2B2C10D10; A2B2C10D11; A2B2C10D12; A2B2C10D13; A2B2C10D14; A2B2C10D15; A2B2C10D16; A2B2C10D17; A2B2C10D18; A2B2C10D19; A2B2C10D20; A2B2C10D21; A2B2C10D21; A2B2C10D22; A2B2C10D23; A2B2C10D24; A2B2C10D25;

A2B2C11; A2B2C11D1; A2B2C11D2; A2B2C11D3; A2B2C11D4; A2B2C11D5; A2B2C11D6; A2B2C11D7; A2B2C11D8; A2B2C11D9; A2B2C11D10; A2B2C11D11; A2B2C11D12; A2B2C11D13; A2B2C11D14; A2B2C11D15; A2B2C11D16; A2B2C11D17; A2B2C11D18; A2B2C11D19; A2B2C11D20; A2B2C11D21; A2B2C11D21; A2B2C11D22; A2B2C11D23; A2B2C11D24; A2B2C11D25;

A2B2C12; A2B2C12D1; A2B2C12D2; A2B2C12D3; A2B2C12D4; A2B2C12D5; A2B2C12D6; A2B2C12D7; A2B2C12D8; A2B2C12D9; A2B2C12D10; A2B2C12D11; A2B2C12D12; A2B2C12D13; A2B2C12D14; A2B2C12D15; A2B2C12D16; A2B2C12D17; A2B2C12D18; A2B2C12D19; A2B2C12D20; A2B2C12D21; A2B2C12D21; A2B2C12D22; A2B2C12D23; A2B2C12D24; A2B2C12D25;

A2B2C13; A2B2C13D1; A2B2C13D2; A2B2C13D3; A2B2C13D4; A2B2C13D5; A2B2C13D6; A2B2C13D7; A2B2C13D8; A2B2C13D9; A2B2C13D10; A2B2C13D11; A2B2C13D12; A2B2C13D13; A2B2C13D14; A2B2C13D15; A2B2C13D16; A2B2C13D17; A2B2C13D18; A2B2C13D19; A2B2C13D20; A2B2C13D21; A2B2C13D21; A2B2C13D22; A2B2C13D23; A2B2C13D24; A2B2C13D25;

A2B2C14; A2B2C14D1; A2B2C14D2; A2B2C14D3; A2B2C14D4; A2B2C14D5; A2B2C14D6; A2B2C14D7; A2B2C14D8; A2B2C14D9; A2B2C14D10; A2B2C14D11; A2B2C14D12; A2B2C14D13; A2B2C14D14; A2B2C14D15; A2B2C14D16; A2B2C14D17; A2B2C14D18; A2B2C14D19; A2B2C14D20; A2B2C14D21; A2B2C14D21; A2B2C14D22; A2B2C14D23; A2B2C14D24; A2B2C14D25;

A2B2C15; A2B2C15D1; A2B2C15D2; A2B2C15D3; A2B2C15D4; A2B2C15D5; A2B2C15D6; A2B2C15D7; A2B2C15D8; A2B2C15D9; A2B2C15D10; A2B2C15D11; A2B2C15D12; A2B2C15D13; A2B2C15D14; A2B2C15D15; A2B2C15D16; A2B2C15D17; A2B2C15D18; A2B2C15D19; A2B2C15D20; A2B2C15D21; A2B2C15D21; A2B2C15D22; A2B2C15D23; A2B2C15D24; A2B2C15D25;

A2B2C16; A2B2C16D1; A2B2C16D2; A2B2C16D3; A2B2C16D4; A2B2C16D5; A2B2C16D6; A2B2C16D7; A2B2C16D8; A2B2C16D9; A2B2C16D10; A2B2C16D11; A2B2C16D12; A2B2C16D13; A2B2C16D14; A2B2C16D15; A2B2C16D16; A2B2C16D17; A2B2C16D18; A2B2C16D19; A2B2C16D20; A2B2C16D21; A2B2C16D21; A2B2C16D22; A2B2C16D23; A2B2C16D24; A2B2C16D25;

A2B2C17; A2B2C17D1; A2B2C17D2; A2B2C17D3; A2B2C17D4; A2B2C17D5; A2B2C17D6; A2B2C17D7; A2B2C17D8; A2B2C17D9; A2B2C17D10; A2B2C17D11; A2B2C17D12; A2B2C17D13; A2B2C17D14; A2B2C17D15; A2B2C17D16; A2B2C17D17; A2B2C17D18; A2B2C17D19; A2B2C17D20; A2B2C17D21; A2B2C17D21; A2B2C17D22; A2B2C17D23; A2B2C17D24; A2B2C17D25;

A2B2C18; A2B2C18D1; A2B2C18D2; A2B2C18D3; A2B2C18D4; A2B2C18D5; A2B2C18D6; A2B2C18D7; A2B2C18D8; A2B2C18D9; A2B2C18D10; A2B2C18D11; A2B2C18D12; A2B2C18D13; A2B2C18D14; A2B2C18D15; A2B2C18D16; A2B2C18D17; A2B2C18D18; A2B2C18D19; A2B2C18D20; A2B2C18D21; A2B2C18D21; A2B2C18D22; A2B2C18D23; A2B2C18D24; A2B2C18D25;

A2B2C19; A2B2C19D1; A2B2C19D2; A2B2C19D3; A2B2C19D4; A2B2C19D5; A2B2C19D6; A2B2C19D7; A2B2C19D8; A2B2C19D9; A2B2C19D10; A2B2C19D11; A2B2C19D12; A2B2C19D13; A2B2C19D14; A2B2C19D15; A2B2C19D16; A2B2C19D17; A2B2C19D18; A2B2C19D19; A2B2C19D20; A2B2C19D21; A2B2C19D21; A2B2C19D22; A2B2C19D23; A2B2C19D24; A2B2C19D25;

A2B2C20; A2B2C20D1; A2B2C20D2; A2B2C20D3; A2B2C20D4; A2B2C20D5; A2B2C20D6; A2B2C20D7; A2B2C20D8; A2B2C20D9; A2B2C20D10; A2B2C20D11; A2B2C20D12; A2B2C20D13; A2B2C20D14; A2B2C20D15; A2B2C20D16; A2B2C20D17; A2B2C20D18; A2B2C20D19; A2B2C20D20; A2B2C20D21; A2B2C20D21; A2B2C20D22; A2B2C20D23; A2B2C20D24; A2B2C20D25.

In an embodiment, the preferred fungicide A is folpet (A2), and the preferred fungicide B is penthiopyrad (B3).

A2B3C1; A2B3C1D1; A2B3C1D2; A2B3C1D3; A2B3C1D4; A2B3C1D5; A2B3C1D6; A2B3C1D7; A2B3C1D8; A2B3C1D9; A2B3C1D10; A2B3C1D11; A2B3C1D12; A2B3C1D13; A2B3C1D14; A2B3C1D15; A2B3C1D16; A2B3C1D17; A2B3C1D18; A2B3C1D19; A2B3C1D20; A2B3C1D21; A2B3C1D21; A2B3C1D22; A2B3C1D23; A2B3C1D24; A2B3C1D25;

A2B3C2; A2B3C2D1; A2B3C2D2; A2B3C2D3; A2B3C2D4; A2B3C2D5; A2B3C2D6; A2B3C2D7; A2B3C2D8; A2B3C2D9; A2B3C2D10; A2B3C2D11; A2B3C2D12; A2B3C2D13; A2B3C2D14; A2B3C2D15; A2B3C2D16; A2B3C2D17; A2B3C2D18; A2B3C2D19; A2B3C2D20; A2B3C2D21; A2B3C2D21; A2B3C2D22; A2B3C2D23; A2B3C2D24; A2B3C2D25;

A2B3C3; A2B3C3D1; A2B3C3D2; A2B3C3D3; A2B3C3D4; A2B3C3D5; A2B3C3D6; A2B3C3D7; A2B3C3D8; A2B3C3D9; A2B3C3D10; A2B3C3D11; A2B3C3D12; A2B3C3D13; A2B3C3D14; A2B3C3D15; A2B3C3D16; A2B3C3D17; A2B3C3D18; A2B3C3D19; A2B3C3D20; A2B3C3D21; A2B3C3D21; A2B3C3D22; A2B3C3D23; A2B3C3D24; A2B3C3D25;
A2B3C4; A2B3C4D1; A2B3C4D2; A2B3C4D3; A2B3C4D4; A2B3C4D5; A2B3C4D6; A2B3C4D7; A2B3C4D8; A2B3C4D9; A2B3C4D10; A2B3C4D11; A2B3C4D12; A2B3C4D13; A2B3C4D14; A2B3C4D15; A2B3C4D16; A2B3C4D17; A2B3C4D18; A2B3C4D19; A2B3C4D20; A2B3C4D21; A2B3C4D21; A2B3C4D22; A2B3C4D23; A2B3C4D24; A2B3C4D25;
A2B3C5; A2B3C5D1; A2B3C5D2; A2B3C5D3; A2B3C5D4; A2B3C5D5; A2B3C5D6; A2B3C5D7; A2B3C5D8; A2B3C5D9; A2B3C5D10; A2B3C5D11; A2B3C5D12; A2B3C5D13; A2B3C5D14; A2B3C5D15; A2B3C5D16; A2B3C5D17; A2B3C5D18; A2B3C5D19; A2B3C5D20; A2B3C5D21; A2B3C5D21; A2B3C5D22; A2B3C5D23; A2B3C5D24; A2B3C5D25;
A2B3C6; A2B3C6D1; A2B3C6D2; A2B3C6D3; A2B3C6D4; A2B3C6D5; A2B3C6D6; A2B3C6D7; A2B3C6D8; A2B3C6D9; A2B3C6D10; A2B3C6D11; A2B3C6D12; A2B3C6D13; A2B3C6D14; A2B3C6D15; A2B3C6D16; A2B3C6D17; A2B3C6D18; A2B3C6D19; A2B3C6D20; A2B3C6D21; A2B3C6D21; A2B3C6D22; A2B3C6D23; A2B3C6D24; A2B3C6D25;
A2B3C7; A2B3C7D1; A2B3C7D2; A2B3C7D3; A2B3C7D4; A2B3C7D5; A2B3C7D6; A2B3C7D7; A2B3C7D8; A2B3C7D9; A2B3C7D10; A2B3C7D11; A2B3C7D12; A2B3C7D13; A2B3C7D14; A2B3C7D15; A2B3C7D16; A2B3C7D17; A2B3C7D18; A2B3C7D19; A2B3C7D20; A2B3C7D21; A2B3C7D21; A2B3C7D22; A2B3C7D23; A2B3C7D24; A2B3C7D25;
A2B3C8; A2B3C8D1; A2B3C8D2; A2B3C8D3; A2B3C8D4; A2B3C8D5; A2B3C8D6; A2B3C8D7; A2B3C8D8; A2B3C8D9; A2B3C8D10; A2B3C8D11; A2B3C8D12; A2B3C8D13; A2B3C8D14; A2B3C8D15; A2B3C8D16; A2B3C8D17; A2B3C8D18; A2B3C8D19; A2B3C8D20; A2B3C8D21; A2B3C8D21; A2B3C8D22; A2B3C8D23; A2B3C8D24; A2B3C8D25;
A2B3C9; A2B3C9D1; A2B3C9D2; A2B3C9D3; A2B3C9D4; A2B3C9D5; A2B3C9D6; A2B3C9D7; A2B3C9D8; A2B3C9D9; A2B3C9D10; A2B3C9D11; A2B3C9D12; A2B3C9D13; A2B3C9D14; A2B3C9D15; A2B3C9D16; A2B3C9D17; A2B3C9D18; A2B3C9D19; A2B3C9D20; A2B3C9D21; A2B3C9D21; A2B3C9D22; A2B3C9D23; A2B3C9D24; A2B3C9D25;
A2B3C10; A2B3C10D1; A2B3C10D2; A2B3C10D3; A2B3C10D4; A2B3C10D5; A2B3C10D6; A2B3C10D7; A2B3C10D8; A2B3C10D9; A2B3C10D10; A2B3C10D11; A2B3C10D12; A2B3C10D13; A2B3C10D14; A2B3C10D15; A2B3C10D16; A2B3C10D17; A2B3C10D18; A2B3C10D19; A2B3C10D20; A2B3C10D21; A2B3C10D22; A2B3C10D23; A2B3C10D24; A2B3C10D25;
A2B3C11; A2B3C11D1; A2B3C11D2; A2B3C11D3; A2B3C11D4; A2B3C11D5; A2B3C11D6; A2B3C11D7; A2B3C11D8; A2B3C11D9; A2B3C11D10; A2B3C11D11; A2B3C11D12; A2B3C11D13; A2B3C11D14; A2B3C11D15; A2B3C11D16; A2B3C11D17; A2B3C11D18; A2B3C11D19; A2B3C11D20; A2B3C11D21; A2B3C11D21; A2B3C11D22; A2B3C11D23; A2B3C11D24; A2B3C11D25;
A2B3C12; A2B3C12D1; A2B3C12D2; A2B3C12D3; A2B3C12D4; A2B3C12D5; A2B3C12D6; A2B3C12D7; A2B3C12D8; A2B3C12D9; A2B3C12D10; A2B3C12D11; A2B3C12D12; A2B3C12D13; A2B3C12D14; A2B3C12D15; A2B3C12D16; A2B3C12D17; A2B3C12D18; A2B3C12D19; A2B3C12D20; A2B3C12D21; A2B3C12D21; A2B3C12D22; A2B3C12D23; A2B3C12D24; A2B3C12D25;
A2B3C13; A2B3C13D1; A2B3C13D2; A2B3C13D3; A2B3C13D4; A2B3C13D5; A2B3C13D6; A2B3C13D7; A2B3C13D8; A2B3C13D9; A2B3C13D10; A2B3C13D11; A2B3C13D12; A2B3C13D13; A2B3C13D14; A2B3C13D15; A2B3C13D16; A2B3C13D17; A2B3C13D18; A2B3C13D19; A2B3C13D20; A2B3C13D21; A2B3C13D21; A2B3C13D22; A2B3C13D23; A2B3C13D24; A2B3C13D25;
A2B3C14; A2B3C14D1; A2B3C14D2; A2B3C14D3; A2B3C14D4; A2B3C14D5; A2B3C14D6; A2B3C14D7; A2B3C14D8; A2B3C14D9; A2B3C14D10; A2B3C14D11; A2B3C14D12; A2B3C14D13; A2B3C14D14; A2B3C14D15; A2B3C14D16; A2B3C14D17; A2B3C14D18; A2B3C14D19; A2B3C14D20; A2B3C14D21; A2B3C14D21; A2B3C14D22; A2B3C14D23; A2B3C14D24; A2B3C14D25;
A2B3C15; A2B3C15D1; A2B3C15D2; A2B3C15D3; A2B3C15D4; A2B3C15D5; A2B3C15D6; A2B3C15D7; A2B3C15D8; A2B3C15D9; A2B3C15D10; A2B3C15D11; A2B3C15D12; A2B3C15D13; A2B3C15D14; A2B3C15D15; A2B3C15D16; A2B3C15D17; A2B3C15D18; A2B3C15D19; A2B3C15D20; A2B3C15D21; A2B3C15D21; A2B3C15D22; A2B3C15D23; A2B3C15D24; A2B3C15D25;
A2B3C16; A2B3C16D1; A2B3C16D2; A2B3C16D3; A2B3C16D4; A2B3C16D5; A2B3C16D6; A2B3C16D7; A2B3C16D8; A2B3C16D9; A2B3C16D10; A2B3C16D11; A2B3C16D12; A2B3C16D13; A2B3C16D14; A2B3C16D15; A2B3C16D16; A2B3C16D17; A2B3C16D18; A2B3C16D19; A2B3C16D20; A2B3C16D21; A2B3C16D21; A2B3C16D22; A2B3C16D23; A2B3C16D24; A2B3C16D25;
A2B3C17; A2B3C17D1; A2B3C17D2; A2B3C17D3; A2B3C17D4; A2B3C17D5; A2B3C17D6; A2B3C17D7; A2B3C17D8; A2B3C17D9; A2B3C17D10; A2B3C17D11; A2B3C17D12; A2B3C17D13; A2B3C17D14; A2B3C17D15; A2B3C17D16; A2B3C17D17; A2B3C17D18; A2B3C17D19; A2B3C17D20; A2B3C17D21; A2B3C17D21; A2B3C17D22; A2B3C17D23; A2B3C17D24; A2B3C17D25;
A2B3C18; A2B3C18D1; A2B3C18D2; A2B3C18D3; A2B3C18D4; A2B3C18D5; A2B3C18D6; A2B3C18D7; A2B3C18D8; A2B3C18D9; A2B3C18D10; A2B3C18D11; A2B3C18D12; A2B3C18D13; A2B3C18D14; A2B3C18D15; A2B3C18D16; A2B3C18D17; A2B3C18D18;

A2B3C18D19; A2B3C18D20; A2B3C18D21; A2B3C18D21; A2B3C18D22; A2B3C18D23; A2B3C18D24; A2B3C18D25;
A2B3C19; A2B3C19D1; A2B3C19D2; A2B3C19D3; A2B3C19D4; A2B3C19D5; A2B3C19D6; A2B3C19D7; A2B3C19D8; A2B3C19D9; A2B3C19D10; A2B3C19D11; A2B3C19D12; A2B3C19D13; A2B3C19D14; A2B3C19D15; A2B3C19D16; A2B3C19D17; A2B3C19D18; A2B3C19D19; A2B3C19D20; A2B3C19D21; A2B3C19D21; A2B3C19D22; A2B3C19D23; A2B3C19D24; A2B3C19D25;
A2B3C20; A2B3C20D1; A2B3C20D2; A2B3C20D3; A2B3C20D4; A2B3C20D5; A2B3C20D6; A2B3C20D7; A2B3C20D8; A2B3C20D9; A2B3C20D10; A2B3C20D11; A2B3C20D12; A2B3C20D13; A2B3C20D14; A2B3C20D15; A2B3C20D16; A2B3C20D17; A2B3C20D18; A2B3C20D19; A2B3C20D20; A2B3C20D21; A2B3C20D21; A2B3C20D22; A2B3C20D23; A2B3C20D24; A2B3C20D25.

In an embodiment, the preferred fungicide A is folpet (A2) and the preferred fungicide B is boscalid (B4).

A2B4C1; A2B4C1D1; A2B4C1D2; A2B4C1D3; A2B4C1D4; A2B4C1D5; A2B4C1D6; A2B4C1D7; A2B4C1D8; A2B4C1D9; A2B4C1D10; A2B4C1D11; A2B4C1D12; A2B4C1D13; A2B4C1D14; A2B4C1D15; A2B4C1D16; A2B4C1D17; A2B4C1D18; A2B4C1D19; A2B4C1D20; A2B4C1D21; A2B4C1D21; A2B4C1D22; A2B4C1D23; A2B4C1D24; A2B4C1D25;
A2B4C2; A2B4C2D1; A2B4C2D2; A2B4C2D3; A2B4C2D4; A2B4C2D5; A2B4C2D6; A2B4C2D7; A2B4C2D8; A2B4C2D9; A2B4C2D10; A2B4C2D11; A2B4C2D12; A2B4C2D13; A2B4C2D14; A2B4C2D15; A2B4C2D16; A2B4C2D17; A2B4C2D18; A2B4C2D19; A2B4C2D20; A2B4C2D21; A2B4C2D21; A2B4C2D22; A2B4C2D23; A2B4C2D24; A2B4C2D25;
A2B4C3; A2B4C3D1; A2B4C3D2; A2B4C3D3; A2B4C3D4; A2B4C3D5; A2B4C3D6; A2B4C3D7; A2B4C3D8; A2B4C3D9; A2B4C3D10; A2B4C3D11; A2B4C3D12; A2B4C3D13; A2B4C3D14; A2B4C3D15; A2B4C3D16; A2B4C3D17; A2B4C3D18; A2B4C3D19; A2B4C3D20; A2B4C3D21; A2B4C3D21; A2B4C3D22; A2B4C3D23; A2B4C3D24; A2B4C3D25;
A2B4C4; A2B4C4D1; A2B4C4D2; A2B4C4D3; A2B4C4D4; A2B4C4D5; A2B4C4D6; A2B4C4D7; A2B4C4D8; A2B4C4D9; A2B4C4D10; A2B4C4D11; A2B4C4D12; A2B4C4D13; A2B4C4D14; A2B4C4D15; A2B4C4D16; A2B4C4D17; A2B4C4D18; A2B4C4D19; A2B4C4D20; A2B4C4D21; A2B4C4D21; A2B4C4D22; A2B4C4D23; A2B4C4D24; A2B4C4D25;
A2B4C5; A2B4C5D1; A2B4C5D2; A2B4C5D3; A2B4C5D4; A2B4C5D5; A2B4C5D6; A2B4C5D7; A2B4C5D8; A2B4C5D9; A2B4C5D10; A2B4C5D11; A2B4C5D12; A2B4C5D13; A2B4C5D14; A2B4C5D15; A2B4C5D16; A2B4C5D17; A2B4C5D18; A2B4C5D19; A2B4C5D20; A2B4C5D21; A2B4C5D21; A2B4C5D22; A2B4C5D23; A2B4C5D24; A2B4C5D25;
A2B4C6; A2B4C6D1; A2B4C6D2; A2B4C6D3; A2B4C6D4; A2B4C6D5; A2B4C6D6; A2B4C6D7; A2B4C6D8; A2B4C6D9; A2B4C6D10; A2B4C6D11; A2B4C6D12; A2B4C6D13; A2B4C6D14; A2B4C6D15; A2B4C6D16; A2B4C6D17; A2B4C6D18; A2B4C6D19; A2B4C6D20; A2B4C6D21; A2B4C6D21; A2B4C6D22; A2B4C6D23; A2B4C6D24; A2B4C6D25;
A2B4C7; A2B4C7D1; A2B4C7D2; A2B4C7D3; A2B4C7D4; A2B4C7D5; A2B4C7D6; A2B4C7D7; A2B4C7D8; A2B4C7D9; A2B4C7D10; A2B4C7D11; A2B4C7D12; A2B4C7D13; A2B4C7D14; A2B4C7D15; A2B4C7D16; A2B4C7D17; A2B4C7D18; A2B4C7D19; A2B4C7D20; A2B4C7D21; A2B4C7D21; A2B4C7D22; A2B4C7D23; A2B4C7D24; A2B4C7D25;
A2B4C8; A2B4C8D1; A2B4C8D2; A2B4C8D3; A2B4C8D4; A2B4C8D5; A2B4C8D6; A2B4C8D7; A2B4C8D8; A2B4C8D9; A2B4C8D10; A2B4C8D11; A2B4C8D12; A2B4C8D13; A2B4C8D14; A2B4C8D15; A2B4C8D16; A2B4C8D17; A2B4C8D18; A2B4C8D19; A2B4C8D20; A2B4C8D21; A2B4C8D21; A2B4C8D22; A2B4C8D23; A2B4C8D24; A2B4C8D25;
A2B4C9; A2B4C9D1; A2B4C9D2; A2B4C9D3; A2B4C9D4; A2B4C9D5; A2B4C9D6; A2B4C9D7; A2B4C9D8; A2B4C9D9; A2B4C9D10; A2B4C9D11; A2B4C9D12; A2B4C9D13; A2B4C9D14; A2B4C9D15; A2B4C9D16; A2B4C9D17; A2B4C9D18; A2B4C9D19; A2B4C9D20; A2B4C9D21; A2B4C9D21; A2B4C9D22; A2B4C9D23; A2B4C9D24; A2B4C9D25;
A2B4C10; A2B4C10D1; A2B4C10D2; A2B4C10D3; A2B4C10D4; A2B4C10D5; A2B4C10D6; A2B4C10D7; A2B4C10D8; A2B4C10D9; A2B4C10D10; A2B4C10D11; A2B4C10D12; A2B4C10D13; A2B4C10D14; A2B4C10D15; A2B4C10D16; A2B4C10D17; A2B4C10D18; A2B4C10D19; A2B4C10D20; A2B4C10D21; A2B4C10D21; A2B4C10D22; A2B4C10D23; A2B4C10D24; A2B4C10D25;
A2B4C11; A2B4C11D1; A2B4C11D2; A2B4C11D3; A2B4C11D4; A2B4C11D5; A2B4C11D6; A2B4C11D7; A2B4C11D8; A2B4C11D9; A2B4C11D10; A2B4C11D11; A2B4C11D12; A2B4C11D13; A2B4C11D14; A2B4C11D15; A2B4C11D16; A2B4C11D17; A2B4C11D18; A2B4C11D19; A2B4C11D20; A2B4C11D21; A2B4C11D21; A2B4C11D22; A2B4C11D23; A2B4C11D24; A2B4C11D25;
A2B4C12; A2B4C12D1; A2B4C12D2; A2B4C12D3; A2B4C12D4; A2B4C12D5; A2B4C12D6; A2B4C12D7; A2B4C12D8; A2B4C12D9; A2B4C12D10; A2B4C12D11; A2B4C12D12; A2B4C12D13; A2B4C12D14; A2B4C12D15; A2B4C12D16; A2B4C12D17; A2B4C12D18; A2B4C12D19; A2B4C12D20; A2B4C12D21; A2B4C12D21; A2B4C12D22; A2B4C12D23; A2B4C12D24; A2B4C12D25;
A2B4C13; A2B4C13D1; A2B4C13D2; A2B4C13D3; A2B4C13D4; A2B4C13D5; A2B4C13D6; A2B4C13D7; A2B4C13D8; A2B4C13D9; A2B4C13D10; A2B4C13D11; A2B4C13D12; A2B4C13D13; A2B4C13D14; A2B4C13D15; A2B4C13D16; A2B4C13D17; A2B4C13D18; A2B4C13D19; A2B4C13D20; A2B4C13D21; A2B4C13D21; A2B4C13D22; A2B4C13D23; A2B4C13D24; A2B4C13D25;
A2B4C14; A2B4C14D1; A2B4C14D2; A2B4C14D3; A2B4C14D4; A2B4C14D5; A2B4C14D6; A2B4C14D7; A2B4C14D8; A2B4C14D9;

A2B4C14D10; A2B4C14D11; A2B4C14D12; A2B4C14D13; A2B4C14D14; A2B4C14D15; A2B4C14D16; A2B4C14D17; A2B4C14D18; A2B4C14D19; A2B4C14D20; A2B4C14D21; A2B4C14D21; A2B4C14D22; A2B4C14D23; A2B4C14D24; A2B4C14D25;

A2B4C15; A2B4C15D1; A2B4C15D2; A2B4C15D3; A2B4C15D4; A2B4C15D5; A2B4C15D6; A2B4C15D7; A2B4C15D8; A2B4C15D9; A2B4C15D10; A2B4C15D11; A2B4C15D12; A2B4C15D13; A2B4C15D14; A2B4C15D15; A2B4C15D16; A2B4C15D17; A2B4C15D18; A2B4C15D19; A2B4C15D20; A2B4C15D21; A2B4C15D21; A2B4C15D22; A2B4C15D23; A2B4C15D24; A2B4C15D25;

A2B4C16; A2B4C16D1; A2B4C16D2; A2B4C16D3; A2B4C16D4; A2B4C16D5; A2B4C16D6; A2B4C16D7; A2B4C16D8; A2B4C16D9; A2B4C16D10; A2B4C16D11; A2B4C16D12; A2B4C16D13; A2B4C16D14; A2B4C16D15; A2B4C16D16; A2B4C16D17; A2B4C16D18; A2B4C16D19; A2B4C16D20; A2B4C16D21; A2B4C16D21; A2B4C16D22; A2B4C16D23; A2B4C16D24; A2B4C16D25;

A2B4C17; A2B4C17D1; A2B4C17D2; A2B4C17D3; A2B4C17D4; A2B4C17D5; A2B4C17D6; A2B4C17D7; A2B4C17D8; A2B4C17D9; A2B4C17D10; A2B4C17D11; A2B4C17D12; A2B4C17D13; A2B4C17D14; A2B4C17D15; A2B4C17D16; A2B4C17D17; A2B4C17D18; A2B4C17D19; A2B4C17D20; A2B4C17D21; A2B4C17D21; A2B4C17D22; A2B4C17D23; A2B4C17D24; A2B4C17D25;

A2B4C18; A2B4C18D1; A2B4C18D2; A2B4C18D3; A2B4C18D4; A2B4C18D5; A2B4C18D6; A2B4C18D7; A2B4C18D8; A2B4C18D9; A2B4C18D10; A2B4C18D11; A2B4C18D12; A2B4C18D13; A2B4C18D14; A2B4C18D15; A2B4C18D16; A2B4C18D17; A2B4C18D18; A2B4C18D19; A2B4C18D20; A2B4C18D21; A2B4C18D21; A2B4C18D22; A2B4C18D23; A2B4C18D24; A2B4C18D25;

A2B4C19; A2B4C19D1; A2B4C19D2; A2B4C19D3; A2B4C19D4; A2B4C19D5; A2B4C19D6; A2B4C19D7; A2B4C19D8; A2B4C19D9; A2B4C19D10; A2B4C19D11; A2B4C19D12; A2B4C19D13; A2B4C19D14; A2B4C19D15; A2B4C19D16; A2B4C19D17; A2B4C19D18; A2B4C19D19; A2B4C19D20; A2B4C19D21; A2B4C19D21; A2B4C19D22; A2B4C19D23; A2B4C19D24; A2B4C19D25;

A2B4C20; A2B4C20D1; A2B4C20D2; A2B4C20D3; A2B4C20D4; A2B4C20D5; A2B4C20D6; A2B4C20D7; A2B4C20D8; A2B4C20D9; A2B4C20D10; A2B4C20D11; A2B4C20D12; A2B4C20D13; A2B4C20D14; A2B4C20D15; A2B4C20D16; A2B4C20D17; A2B4C20D18; A2B4C20D19; A2B4C20D20; A2B4C20D21; A2B4C20D21; A2B4C20D22; A2B4C20D23; A2B4C20D24; A2B4C20D25.

In an embodiment, the preferred fungicide A is folpet (A2) and the preferred fungicide B is fluindapyr (B5).

A2B5C1; A2B5C1D1; A2B5C1D2; A2B5C1D3; A2B5C1D4; A2B5C1D5; A2B5C1D6; A2B5C1D7; A2B5C1D8; A2B5C1D9; A2B5C1D10; A2B5C1D11; A2B5C1D12; A2B5C1D13; A2B5C1D14; A2B5C1D15; A2B5C1D16; A2B5C1D17; A2B5C1D18; A2B5C1D19; A2B5C1D20; A2B5C1D21; A2B5C1D21; A2B5C1D22; A2B5C1D23; A2B5C1D24; A2B5C1D25;

A2B5C2; A2B5C2D1; A2B5C2D2; A2B5C2D3; A2B5C2D4; A2B5C2D5; A2B5C2D6; A2B5C2D7; A2B5C2D8; A2B5C2D9; A2B5C2D10; A2B5C2D11; A2B5C2D12; A2B5C2D13; A2B5C2D14; A2B5C2D15; A2B5C2D16; A2B5C2D17; A2B5C2D18; A2B5C2D19; A2B5C2D20; A2B5C2D21; A2B5C2D21; A2B5C2D22; A2B5C2D23; A2B5C2D24; A2B5C2D25;

A2B5C3; A2B5C3D1; A2B5C3D2; A2B5C3D3; A2B5C3D4; A2B5C3D5; A2B5C3D6; A2B5C3D7; A2B5C3D8; A2B5C3D9; A2B5C3D10; A2B5C3D11; A2B5C3D12; A2B5C3D13; A2B5C3D14; A2B5C3D15; A2B5C3D16; A2B5C3D17; A2B5C3D18; A2B5C3D19; A2B5C3D20; A2B5C3D21; A2B5C3D21; A2B5C3D22; A2B5C3D23; A2B5C3D24; A2B5C3D25;

A2B5C4; A2B5C4D1; A2B5C4D2; A2B5C4D3; A2B5C4D4; A2B5C4D5; A2B5C4D6; A2B5C4D7; A2B5C4D8; A2B5C4D9; A2B5C4D10; A2B5C4D11; A2B5C4D12; A2B5C4D13; A2B5C4D14; A2B5C4D15; A2B5C4D16; A2B5C4D17; A2B5C4D18; A2B5C4D19; A2B5C4D20; A2B5C4D21; A2B5C4D21; A2B5C4D22; A2B5C4D23; A2B5C4D24; A2B5C4D25;

A2B5C5; A2B5C5D1; A2B5C5D2; A2B5C5D3; A2B5C5D4; A2B5C5D5; A2B5C5D6; A2B5C5D7; A2B5C5D8; A2B5C5D9; A2B5C5D10; A2B5C5D11; A2B5C5D12; A2B5C5D13; A2B5C5D14; A2B5C5D15; A2B5C5D16; A2B5C5D17; A2B5C5D18; A2B5C5D19; A2B5C5D20; A2B5C5D21; A2B5C5D21; A2B5C5D22; A2B5C5D23; A2B5C5D24; A2B5C5D25;

A2B5C6; A2B5C6D1; A2B5C6D2; A2B5C6D3; A2B5C6D4; A2B5C6D5; A2B5C6D6; A2B5C6D7; A2B5C6D8; A2B5C6D9; A2B5C6D10; A2B5C6D11; A2B5C6D12; A2B5C6D13; A2B5C6D14; A2B5C6D15; A2B5C6D16; A2B5C6D17; A2B5C6D18; A2B5C6D19; A2B5C6D20; A2B5C6D21; A2B5C6D21; A2B5C6D22; A2B5C6D23; A2B5C6D24; A2B5C6D25;

A2B5C7; A2B5C7D1; A2B5C7D2; A2B5C7D3; A2B5C7D4; A2B5C7D5; A2B5C7D6; A2B5C7D7; A2B5C7D8; A2B5C7D9; A2B5C7D10; A2B5C7D11; A2B5C7D12; A2B5C7D13; A2B5C7D14; A2B5C7D15; A2B5C7D16; A2B5C7D17; A2B5C7D18; A2B5C7D19; A2B5C7D20; A2B5C7D21; A2B5C7D21; A2B5C7D22; A2B5C7D23; A2B5C7D24; A2B5C7D25;

A2B5C8; A2B5C8D1; A2B5C8D2; A2B5C8D3; A2B5C8D4; A2B5C8D5; A2B5C8D6; A2B5C8D7; A2B5C8D8; A2B5C8D9; A2B5C8D10; A2B5C8D11; A2B5C8D12; A2B5C8D13; A2B5C8D14; A2B5C8D15; A2B5C8D16; A2B5C8D17; A2B5C8D18; A2B5C8D19; A2B5C8D20; A2B5C8D21; A2B5C8D21; A2B5C8D22; A2B5C8D23; A2B5C8D24; A2B5C8D25;

A2B5C9; A2B5C9D1; A2B5C9D2; A2B5C9D3; A2B5C9D4; A2B5C9D5; A2B5C9D6; A2B5C9D7; A2B5C9D8; A2B5C9D9; A2B5C9D10; A2B5C9D11; A2B5C9D12; A2B5C9D13; A2B5C9D14; A2B5C9D15; A2B5C9D16; A2B5C9D17; A2B5C9D18; A2B5C9D19; A2B5C9D20; A2B5C9D21; A2B5C9D21; A2B5C9D22; A2B5C9D23; A2B5C9D24; A2B5C9D25;

A2B5C10; A2B5C10D1; A2B5C10D2; A2B5C10D3; A2B5C10D4; A2B5C10D5; A2B5C10D6; A2B5C10D7; A2B5C10D8; A2B5C10D9; A2B5C10D10; A2B5C10D11; A2B5C10D12; A2B5C10D13; A2B5C10D14; A2B5C10D15; A2B5C10D16; A2B5C10D17; A2B5C10D18; A2B5C10D19; A2B5C10D20; A2B5C10D21; A2B5C10D21; A2B5C10D22; A2B5C10D23; A2B5C10D24; A2B5C10D25;

A2B5C11; A2B5C11D1; A2B5C11D2; A2B5C11D3; A2B5C11D4; A2B5C11D5; A2B5C11D6; A2B5C11D7; A2B5C11D8; A2B5C11D9; A2B5C11D10; A2B5C11D11; A2B5C11D12; A2B5C11D13; A2B5C11D14; A2B5C11D15; A2B5C11D16; A2B5C11D17; A2B5C11D18; A2B5C11D19; A2B5C11D20; A2B5C11D21; A2B5C11D21; A2B5C11D22; A2B5C11D23; A2B5C11D24; A2B5C11D25;

A2B5C12; A2B5C12D1; A2B5C12D2; A2B5C12D3; A2B5C12D4; A2B5C12D5; A2B5C12D6; A2B5C12D7; A2B5C12D8; A2B5C12D9; A2B5C12D10; A2B5C12D11; A2B5C12D12; A2B5C12D13; A2B5C12D14; A2B5C12D15; A2B5C12D16; A2B5C12D17; A2B5C12D18; A2B5C12D19; A2B5C12D20; A2B5C12D21; A2B5C12D21; A2B5C12D22; A2B5C12D23; A2B5C12D24; A2B5C12D25;

A2B5C13; A2B5C13D1; A2B5C13D2; A2B5C13D3; A2B5C13D4; A2B5C13D5; A2B5C13D6; A2B5C13D7; A2B5C13D8; A2B5C13D9; A2B5C13D10; A2B5C13D11; A2B5C13D12; A2B5C13D13; A2B5C13D14; A2B5C13D15; A2B5C13D16; A2B5C13D17; A2B5C13D18; A2B5C13D19; A2B5C13D20; A2B5C13D21; A2B5C13D21; A2B5C13D22; A2B5C13D23; A2B5C13D24; A2B5C13D25;

A2B5C14; A2B5C14D1; A2B5C14D2; A2B5C14D3; A2B5C14D4; A2B5C14D5; A2B5C14D6; A2B5C14D7; A2B5C14D8; A2B5C14D9; A2B5C14D10; A2B5C14D11; A2B5C14D12; A2B5C14D13; A2B5C14D14; A2B5C14D15; A2B5C14D16; A2B5C14D17; A2B5C14D18; A2B5C14D19; A2B5C14D20; A2B5C14D21; A2B5C14D21; A2B5C14D22; A2B5C14D23; A2B5C14D24; A2B5C14D25;

A2B5C15; A2B5C15D1; A2B5C15D2; A2B5C15D3; A2B5C15D4; A2B5C15D5; A2B5C15D6; A2B5C15D7; A2B5C15D8; A2B5C15D9; A2B5C15D10; A2B5C15D11; A2B5C15D12; A2B5C15D13; A2B5C15D14; A2B5C15D15; A2B5C15D16; A2B5C15D17; A2B5C15D18; A2B5C15D19; A2B5C15D20; A2B5C15D21; A2B5C15D21; A2B5C15D22; A2B5C15D23; A2B5C15D24; A2B5C15D25;

A2B5C16; A2B5C16D1; A2B5C16D2; A2B5C16D3; A2B5C16D4; A2B5C16D5; A2B5C16D6; A2B5C16D7; A2B5C16D8; A2B5C16D9; A2B5C16D10; A2B5C16D11; A2B5C16D12; A2B5C16D13; A2B5C16D14; A2B5C16D15; A2B5C16D16; A2B5C16D17; A2B5C16D18; A2B5C16D19; A2B5C16D20; A2B5C16D21; A2B5C16D21; A2B5C16D22; A2B5C16D23; A2B5C16D24; A2B5C16D25;

A2B5C17; A2B5C17D1; A2B5C17D2; A2B5C17D3; A2B5C17D4; A2B5C17D5; A2B5C17D6; A2B5C17D7; A2B5C17D8; A2B5C17D9; A2B5C17D10; A2B5C17D11; A2B5C17D12; A2B5C17D13; A2B5C17D14; A2B5C17D15; A2B5C17D16; A2B5C17D17; A2B5C17D18; A2B5C17D19; A2B5C17D20; A2B5C17D21; A2B5C17D21; A2B5C17D22; A2B5C17D23; A2B5C17D24; A2B5C17D25;

A2B5C18; A2B5C18D1; A2B5C18D2; A2B5C18D3; A2B5C18D4; A2B5C18D5; A2B5C18D6; A2B5C18D7; A2B5C18D8; A2B5C18D9; A2B5C18D10; A2B5C18D11; A2B5C18D12; A2B5C18D13; A2B5C18D14; A2B5C18D15; A2B5C18D16; A2B5C18D17; A2B5C18D18; A2B5C18D19; A2B5C18D20; A2B5C18D21; A2B5C18D21; A2B5C18D22; A2B5C18D23; A2B5C18D24; A2B5C18D25;

A2B5C19; A2B5C19D1; A2B5C19D2; A2B5C19D3; A2B5C19D4; A2B5C19D5; A2B5C19D6; A2B5C19D7; A2B5C19D8; A2B5C19D9; A2B5C19D10; A2B5C19D11; A2B5C19D12; A2B5C19D13; A2B5C19D14; A2B5C19D15; A2B5C19D16; A2B5C19D17; A2B5C19D18; A2B5C19D19; A2B5C19D20; A2B5C19D21; A2B5C19D21; A2B5C19D22; A2B5C19D23; A2B5C19D24; A2B5C19D25;

A2B5C20; A2B5C20D1; A2B5C20D2; A2B5C20D3; A2B5C20D4; A2B5C20D5; A2B5C20D6; A2B5C20D7; A2B5C20D8; A2B5C20D9; A2B5C20D10; A2B5C20D11; A2B5C20D12; A2B5C20D13; A2B5C20D14; A2B5C20D15; A2B5C20D16; A2B5C20D17; A2B5C20D18; A2B5C20D19; A2B5C20D20; A2B5C20D21; A2B5C20D21; A2B5C20D22; A2B5C20D23; A2B5C20D24; A2B5C20D25.

In an embodiment, the preferred fungicide A is folpet (A2), and the preferred fungicide B is boscalid (B23).

A2B23C1; A2B23C1D1; A2B23C1D2; A2B23C1D3; A2B23C1D4; A2B23C1D5; A2B23C1D6; A2B23C1D7; A2B23C1D8; A2B23C1D9; A2B23C1D10; A2B23C1D11; A2B23C1D12; A2B23C1D13; A2B23C1D14; A2B23C1D15; A2B23C1D16; A2B23C1D17; A2B23C1D18; A2B23C1D19; A2B23C1D20; A2B23C1D21; A2B23C1D21; A2B23C1D22; A2B23C1D23; A2B23C1D24; A2B23C1D25;

A2B23C2; A2B23C2D1; A2B23C2D2; A2B23C2D3; A2B23C2D4; A2B23C2D5; A2B23C2D6; A2B23C2D7; A2B23C2D8; A2B23C2D9; A2B23C2D10; A2B23C2D11; A2B23C2D12; A2B23C2D13; A2B23C2D14; A2B23C2D15; A2B23C2D16; A2B23C2D17; A2B23C2D18; A2B23C2D19; A2B23C2D20; A2B23C2D21; A2B23C2D21; A2B23C2D22; A2B23C2D23; A2B23C2D24; A2B23C2D25;

A2B23C3; A2B23C3D1; A2B23C3D2; A2B23C3D3; A2B23C3D4; A2B23C3D5; A2B23C3D6; A2B23C3D7; A2B23C3D8; A2B23C3D9; A2B23C3D10; A2B23C3D11; A2B23C3D12; A2B23C3D13; A2B23C3D14; A2B23C3D15; A2B23C3D16; A2B23C3D17; A2B23C3D18; A2B23C3D19; A2B23C3D20; A2B23C3D21; A2B23C3D21; A2B23C3D22; A2B23C3D23; A2B23C3D24; A2B23C3D25;

A2B23C4; A2B23C4D1; A2B23C4D2; A2B23C4D3; A2B23C4D4; A2B23C4D5; A2B23C4D6; A2B23C4D7; A2B23C4D8; A2B23C4D9; A2B23C4D10; A2B23C4D11; A2B23C4D12; A2B23C4D13; A2B23C4D14; A2B23C4D15; A2B23C4D16; A2B23C4D17; A2B23C4D18;

A2B23C4D19; A2B23C4D20; A2B23C4D21; A2B23C4D21; A2B23C4D22; A2B23C4D23; A2B23C4D24; A2B23C4D25;
A2B23C5; A2B23C5D1; A2B23C5D2; A2B23C5D3; A2B23C5D4; A2B23C5D5; A2B23C5D6; A2B23C5D7; A2B23C5D8; A2B23C5D9; A2B23C5D10; A2B23C5D11; A2B23C5D12; A2B23C5D13; A2B23C5D14; A2B23C5D15; A2B23C5D16; A2B23C5D17; A2B23C5D18; A2B23C5D19; A2B23C5D20; A2B23C5D21; A2B23C5D21; A2B23C5D22; A2B23C5D23; A2B23C5D24; A2B23C5D25;
A2B23C6; A2B23C6D1; A2B23C6D2; A2B23C6D3; A2B23C6D4; A2B23C6D5; A2B23C6D6; A2B23C6D7; A2B23C6D8; A2B23C6D9; A2B23C6D10; A2B23C6D11; A2B23C6D12; A2B23C6D13; A2B23C6D14; A2B23C6D15; A2B23C6D16; A2B23C6D17; A2B23C6D18; A2B23C6D19; A2B23C6D20; A2B23C6D21; A2B23C6D21; A2B23C6D22; A2B23C6D23; A2B23C6D24; A2B23C6D25;
A2B23C7; A2B23C7D1; A2B23C7D2; A2B23C7D3; A2B23C7D4; A2B23C7D5; A2B23C7D6; A2B23C7D7; A2B23C7D8; A2B23C7D9; A2B23C7D10; A2B23C7D11; A2B23C7D12; A2B23C7D13; A2B23C7D14; A2B23C7D15; A2B23C7D16; A2B23C7D17; A2B23C7D18; A2B23C7D19; A2B23C7D20; A2B23C7D21; A2B23C7D21; A2B23C7D22; A2B23C7D23; A2B23C7D24; A2B23C7D25;
A2B23C8; A2B23C8D1; A2B23C8D2; A2B23C8D3; A2B23C8D4; A2B23C8D5; A2B23C8D6; A2B23C8D7; A2B23C8D8; A2B23C8D9; A2B23C8D10; A2B23C8D11; A2B23C8D12; A2B23C8D13; A2B23C8D14; A2B23C8D15; A2B23C8D16; A2B23C8D17; A2B23C8D18; A2B23C8D19; A2B23C8D20; A2B23C8D21; A2B23C8D21; A2B23C8D22; A2B23C8D23; A2B23C8D24; A2B23C8D25;
A2B23C9; A2B23C9D1; A2B23C9D2; A2B23C9D3; A2B23C9D4; A2B23C9D5; A2B23C9D6; A2B23C9D7; A2B23C9D8; A2B23C9D9; A2B23C9D10; A2B23C9D11; A2B23C9D12; A2B23C9D13; A2B23C9D14; A2B23C9D15; A2B23C9D16; A2B23C9D17; A2B23C9D18; A2B23C9D19; A2B23C9D20; A2B23C9D21; A2B23C9D21; A2B23C9D22; A2B23C9D23; A2B23C9D24; A2B23C9D25;
A2B23C10; A2B23C10D1; A2B23C10D2; A2B23C10D3; A2B23C10D4; A2B23C10D5; A2B23C10D6; A2B23C10D7; A2B23C10D8; A2B23C10D9; A2B23C10D10; A2B23C10D11; A2B23C10D12; A2B23C10D13; A2B23C10D14; A2B23C10D15; A2B23C10D16; A2B23C10D17; A2B23C10D18; A2B23C10D19; A2B23C10D20; A2B23C10D21; A2B23C10D21; A2B23C10D22; A2B23C10D23; A2B23C10D24; A2B23C10D25;
A2B23C11; A2B23C11D1; A2B23C11D2; A2B23C11D3; A2B23C11D4; A2B23C11D5; A2B23C11D6; A2B23C11D7; A2B23C11D8; A2B23C11D9; A2B23C11D10; A2B23C11D11; A2B23C11D12; A2B23C11D13; A2B23C11D14; A2B23C11D15; A2B23C11D16; A2B23C11D17; A2B23C11D18; A2B23C11D19; A2B23C11D20; A2B23C11D21; A2B23C11D21; A2B23C11D22; A2B23C11D23; A2B23C11D24; A2B23C11D25;
A2B23C12; A2B23C12D1; A2B23C12D2; A2B23C12D3; A2B23C12D4; A2B23C12D5; A2B23C12D6; A2B23C12D7; A2B23C12D8; A2B23C12D9; A2B23C12D10; A2B23C12D11; A2B23C12D12; A2B23C12D13; A2B23C12D14; A2B23C12D15; A2B23C12D16; A2B23C12D17; A2B23C12D18; A2B23C12D19; A2B23C12D20; A2B23C12D21; A2B23C12D21; A2B23C12D22; A2B23C12D23; A2B23C12D24; A2B23C12D25;
A2B23C13; A2B23C13D1; A2B23C13D2; A2B23C13D3; A2B23C13D4; A2B23C13D5; A2B23C13D6; A2B23C13D7; A2B23C13D8; A2B23C13D9; A2B23C13D10; A2B23C13D11; A2B23C13D12; A2B23C13D13; A2B23C13D14; A2B23C13D15; A2B23C13D16; A2B23C13D17; A2B23C13D18; A2B23C13D19; A2B23C13D20; A2B23C13D21; A2B23C13D21; A2B23C13D22; A2B23C13D23; A2B23C13D24; A2B23C13D25;
A2B23C14; A2B23C14D1; A2B23C14D2; A2B23C14D3; A2B23C14D4; A2B23C14D5; A2B23C14D6; A2B23C14D7; A2B23C14D8; A2B23C14D9; A2B23C14D10; A2B23C14D11; A2B23C14D12; A2B23C14D13; A2B23C14D14; A2B23C14D15; A2B23C14D16; A2B23C14D17; A2B23C14D18; A2B23C14D19; A2B23C14D20; A2B23C14D21; A2B23C14D21; A2B23C14D22; A2B23C14D23; A2B23C14D24; A2B23C14D25;
A2B23C15; A2B23C15D1; A2B23C15D2; A2B23C15D3; A2B23C15D4; A2B23C15D5; A2B23C15D6; A2B23C15D7; A2B23C15D8; A2B23C15D9; A2B23C15D10; A2B23C15D11; A2B23C15D12; A2B23C15D13; A2B23C15D14; A2B23C15D15; A2B23C15D16; A2B23C15D17; A2B23C15D18; A2B23C15D19; A2B23C15D20; A2B23C15D21; A2B23C15D21; A2B23C15D22; A2B23C15D23; A2B23C15D24; A2B23C15D25;
A2B23C16; A2B23C16D1; A2B23C16D2; A2B23C16D3; A2B23C16D4; A2B23C16D5; A2B23C16D6; A2B23C16D7; A2B23C16D8; A2B23C16D9; A2B23C16D10; A2B23C16D11; A2B23C16D12; A2B23C16D13; A2B23C16D14; A2B23C16D15; A2B23C16D16; A2B23C16D17; A2B23C16D18; A2B23C16D19; A2B23C16D20; A2B23C16D21; A2B23C16D21; A2B23C16D22; A2B23C16D23; A2B23C16D24; A2B23C16D25;
A2B23C17; A2B23C17D1; A2B23C17D2; A2B23C17D3; A2B23C17D4; A2B23C17D5; A2B23C17D6; A2B23C17D7; A2B23C17D8; A2B23C17D9; A2B23C17D10; A2B23C17D11; A2B23C17D12; A2B23C17D13; A2B23C17D14; A2B23C17D15; A2B23C17D16; A2B23C17D17; A2B23C17D18; A2B23C17D19; A2B23C17D20; A2B23C17D21; A2B23C17D21; A2B23C17D22; A2B23C17D23; A2B23C17D24; A2B23C17D25;
A2B23C18; A2B23C18D1; A2B23C18D2; A2B23C18D3; A2B23C18D4; A2B23C18D5; A2B23C18D6; A2B23C18D7; A2B23C18D8; A2B23C18D9; A2B23C18D10; A2B23C18D11; A2B23C18D12; A2B23C18D13; A2B23C18D14; A2B23C18D15; A2B23C18D16; A2B23C18D17; A2B23C18D18; A2B23C18D19; A2B23C18D20; A2B23C18D21; A2B23C18D21; A2B23C18D22; A2B23C18D23; A2B23C18D24; A2B23C18D25;
A2B23C19; A2B23C19D1; A2B23C19D2; A2B23C19D3; A2B23C19D4; A2B23C19D5; A2B23C19D6; A2B23C19D7; A2B23C19D8; A2B23C19D9; A2B23C19D10; A2B23C19D11;

A2B23C19D12; A2B23C19D13; A2B23C19D14; A2B23C19D15; A2B23C19D16; A2B23C19D17; A2B23C19D18; A2B23C19D19; A2B23C19D20; A2B23C19D21; A2B23C19D21; A2B23C19D22; A2B23C19D23; A2B23C19D24; A2B23C19D25;
A2B23C20; A2B23C20D1; A2B23C20D2; A2B23C20D3; A2B23C20D4; A2B23C20D5; A2B23C20D6; A2B23C20D7; A2B23C20D8; A2B23C20D9; A2B23C20D10; A2B23C20D11; A2B23C20D12; A2B23C20D13; A2B23C20D14; A2B23C20D15; A2B23C20D16; A2B23C20D17; A2B23C20D18; A2B23C20D19; A2B23C20D20; A2B23C20D21; A2B23C20D21; A2B23C20D22; A2B23C20D23; A2B23C20D24; A2B23C20D25.

In an embodiment, the preferred fungicide A is tribasic copper sulfate (A3).

In a preferred embodiment, the preferred fungicide A is TBCS (A3) and the preferred fungicide B is isopyrazam (B1).

A3B1C1; A3B1C1D1; A3B1C1D2; A3B1C1D3; A3B1C1D4; A3B1C1D5; A3B1C1D6; A3B1C1D7; A3B1C1D8; A3B1C1D9; A3B1C1D10; A3B1C1D11; A3B1C1D12; A3B1C1D13; A3B1C1D14; A3B1C1D15; A3B1C1D16; A3B1C1D17; A3B1C1D18; A3B1C1D19; A3B1C1D20; A3B1C1D21; A3B1C1D21; A3B1C1D22; A3B1C1D23; A3B1C1D24; A3B1C1D25;

A3B1C2; A3B1C2D1; A3B1C2D2; A3B1C2D3; A3B1C2D4; A3B1C2D5; A3B1C2D6; A3B1C2D7; A3B1C2D8; A3B1C2D9; A3B1C2D10; A3B1C2D11; A3B1C2D12; A3B1C2D13; A3B1C2D14; A3B1C2D15; A3B1C2D16; A3B1C2D17; A3B1C2D18; A3B1C2D19; A3B1C2D20; A3B1C2D21; A3B1C2D21; A3B1C2D22; A3B1C2D23; A3B1C2D24; A3B1C2D25;

A3B1C3; A3B1C3D1; A3B1C3D2; A3B1C3D3; A3B1C3D4; A3B1C3D5; A3B1C3D6; A3B1C3D7; A3B1C3D8; A3B1C3D9; A3B1C3D10; A3B1C3D11; A3B1C3D12; A3B1C3D13; A3B1C3D14; A3B1C3D15; A3B1C3D16; A3B1C3D17; A3B1C3D18; A3B1C3D19; A3B1C3D20; A3B1C3D21; A3B1C3D21; A3B1C3D22; A3B1C3D23; A3B1C3D24; A3B1C3D25;

A3B1C4; A3B1C4D1; A3B1C4D2; A3B1C4D3; A3B1C4D4; A3B1C4D5; A3B1C4D6; A3B1C4D7; A3B1C4D8; A3B1C4D9; A3B1C4D10; A3B1C4D11; A3B1C4D12; A3B1C4D13; A3B1C4D14; A3B1C4D15; A3B1C4D16; A3B1C4D17; A3B1C4D18; A3B1C4D19; A3B1C4D20; A3B1C4D21; A3B1C4D21; A3B1C4D22; A3B1C4D23; A3B1C4D24; A3B1C4D25;

A3B1C5; A3B1C5D1; A3B1C5D2; A3B1C5D3; A3B1C5D4; A3B1C5D5; A3B1C5D6; A3B1C5D7; A3B1C5D8; A3B1C5D9; A3B1C5D10; A3B1C5D11; A3B1C5D12; A3B1C5D13; A3B1C5D14; A3B1C5D15; A3B1C5D16; A3B1C5D17; A3B1C5D18; A3B1C5D19; A3B1C5D20; A3B1C5D21; A3B1C5D21; A3B1C5D22; A3B1C5D23; A3B1C5D24; A3B1C5D25;

A3B1C6; A3B1C6D1; A3B1C6D2; A3B1C6D3; A3B1C6D4; A3B1C6D5; A3B1C6D6; A3B1C6D7; A3B1C6D8; A3B1C6D9; A3B1C6D10; A3B1C6D11; A3B1C6D12; A3B1C6D13; A3B1C6D14; A3B1C6D15; A3B1C6D16; A3B1C6D17; A3B1C6D18; A3B1C6D19; A3B1C6D20; A3B1C6D21; A3B1C6D21; A3B1C6D22; A3B1C6D23; A3B1C6D24; A3B1C6D25;

A3B1C7; A3B1C7D1; A3B1C7D2; A3B1C7D3; A3B1C7D4; A3B1C7D5; A3B1C7D6; A3B1C7D7; A3B1C7D8; A3B1C7D9; A3B1C7D10; A3B1C7D11; A3B1C7D12; A3B1C7D13; A3B1C7D14; A3B1C7D15; A3B1C7D16; A3B1C7D17; A3B1C7D18; A3B1C7D19; A3B1C7D20; A3B1C7D21; A3B1C7D21; A3B1C7D22; A3B1C7D23; A3B1C7D24; A3B1C7D25;

A3B1C8; A3B1C8D1; A3B1C8D2; A3B1C8D3; A3B1C8D4; A3B1C8D5; A3B1C8D6; A3B1C8D7; A3B1C8D8; A3B1C8D9; A3B1C8D10; A3B1C8D11; A3B1C8D12; A3B1C8D13; A3B1C8D14; A3B1C8D15; A3B1C8D16; A3B1C8D17; A3B1C8D18; A3B1C8D19; A3B1C8D20; A3B1C8D21; A3B1C8D21; A3B1C8D22; A3B1C8D23; A3B1C8D24; A3B1C8D25;

A3B1C9; A3B1C9D1; A3B1C9D2; A3B1C9D3; A3B1C9D4; A3B1C9D5; A3B1C9D6; A3B1C9D7; A3B1C9D8; A3B1C9D9; A3B1C9D10; A3B1C9D11; A3B1C9D12; A3B1C9D13; A3B1C9D14; A3B1C9D15; A3B1C9D16; A3B1C9D17; A3B1C9D18; A3B1C9D19; A3B1C9D20; A3B1C9D21; A3B1C9D21; A3B1C9D22; A3B1C9D23; A3B1C9D24; A3B1C9D25;

A3B1C10; A3B1C10D1; A3B1C10D2; A3B1C10D3; A3B1C10D4; A3B1C10D5; A3B1C10D6; A3B1C10D7; A3B1C10D8; A3B1C10D9; A3B1C10D10; A3B1C10D11; A3B1C10D12; A3B1C10D13; A3B1C10D14; A3B1C10D15; A3B1C10D16; A3B1C10D17; A3B1C10D18; A3B1C10D19; A3B1C10D20; A3B1C10D21; A3B1C10D21; A3B1C10D22; A3B1C10D23; A3B1C10D24; A3B1C10D25;

A3B1C11; A3B1C11D1; A3B1C11D2; A3B1C11D3; A3B1C11D4; A3B1C11D5; A3B1C11D6; A3B1C11D7; A3B1C11D8; A3B1C11D9; A3B1C11D10; A3B1C11D11; A3B1C11D12; A3B1C11D13; A3B1C11D14; A3B1C11D15; A3B1C11D16; A3B1C11D17; A3B1C11D18; A3B1C11D19; A3B1C11D20; A3B1C11D21; A3B1C11D21; A3B1C11D22; A3B1C11D23; A3B1C11D24; A3B1C11D25;

A3B1C12; A3B1C12D1; A3B1C12D2; A3B1C12D3; A3B1C12D4; A3B1C12D5; A3B1C12D6; A3B1C12D7; A3B1C12D8; A3B1C12D9; A3B1C12D10; A3B1C12D11; A3B1C12D12; A3B1C12D13; A3B1C12D14; A3B1C12D15; A3B1C12D16; A3B1C12D17; A3B1C12D18; A3B1C12D19; A3B1C12D20; A3B1C12D21; A3B1C12D21; A3B1C12D22; A3B1C12D23; A3B1C12D24; A3B1C12D25;

A3B1C13; A3B1C13D1; A3B1C13D2; A3B1C13D3; A3B1C13D4; A3B1C13D5; A3B1C13D6; A3B1C13D7; A3B1C13D8; A3B1C13D9; A3B1C13D10; A3B1C13D11; A3B1C13D12; A3B1C13D13; A3B1C13D14; A3B1C13D15; A3B1C13D16; A3B1C13D17; A3B1C13D18; A3B1C13D19; A3B1C13D20; A3B1C13D21; A3B1C13D21; A3B1C13D22; A3B1C13D23; A3B1C13D24; A3B1C13D25;

A3B1C14; A3B1C14D1; A3B1C14D2; A3B1C14D3; A3B1C14D4; A3B1C14D5; A3B1C14D6; A3B1C14D7; A3B1C14D8; A3B1C14D9; A3B1C14D10; A3B1C14D11; A3B1C14D12; A3B1C14D13; A3B1C14D14; A3B1C14D15; A3B1C14D16; A3B1C14D17; A3B1C14D18; A3B1C14D19; A3B1C14D20; A3B1C14D21;

A3B1C14D21; A3B1C14D22; A3B1C14D23; A3B1C14D24; A3B1C14D25;

A3B1C15; A3B1C15D1; A3B1C15D2; A3B1C15D3; A3B1C15D4; A3B1C15D5; A3B1C15D6; A3B1C15D7; A3B1C15D8; A3B1C15D9; A3B1C15D10; A3B1C15D11; A3B1C15D12; A3B1C15D13; A3B1C15D14; A3B1C15D15; A3B1C15D16; A3B1C15D17; A3B1C15D18; A3B1C15D19; A3B1C15D20; A3B1C15D21; A3B1C15D21; A3B1C15D22; A3B1C15D23; A3B1C15D24; A3B1C15D25;

A3B1C16; A3B1C16D1; A3B1C16D2; A3B1C16D3; A3B1C16D4; A3B1C16D5; A3B1C16D6; A3B1C16D7; A3B1C16D8; A3B1C16D9; A3B1C16D10; A3B1C16D11; A3B1C16D12; A3B1C16D13; A3B1C16D14; A3B1C16D15; A3B1C16D16; A3B1C16D17; A3B1C16D18; A3B1C16D19; A3B1C16D20; A3B1C16D21; A3B1C16D21; A3B1C16D22; A3B1C16D23; A3B1C16D24; A3B1C16D25;

A3B1C17; A3B1C17D1; A3B1C17D2; A3B1C17D3; A3B1C17D4; A3B1C17D5; A3B1C17D6; A3B1C17D7; A3B1C17D8; A3B1C17D9; A3B1C17D10; A3B1C17D11; A3B1C17D12; A3B1C17D13; A3B1C17D14; A3B1C17D15; A3B1C17D16; A3B1C17D17; A3B1C17D18; A3B1C17D19; A3B1C17D20; A3B1C17D21; A3B1C17D21; A3B1C17D22; A3B1C17D23; A3B1C17D24; A3B1C17D25;

A3B1C18; A3B1C18D1; A3B1C18D2; A3B1C18D3; A3B1C18D4; A3B1C18D5; A3B1C18D6; A3B1C18D7; A3B1C18D8; A3B1C18D9; A3B1C18D10; A3B1C18D11; A3B1C18D12; A3B1C18D13; A3B1C18D14; A3B1C18D15; A3B1C18D16; A3B1C18D17; A3B1C18D18; A3B1C18D19; A3B1C18D20; A3B1C18D21; A3B1C18D21; A3B1C18D22; A3B1C18D23; A3B1C18D24; A3B1C18D25;

A3B1C19; A3B1C19D1; A3B1C19D2; A3B1C19D3; A3B1C19D4; A3B1C19D5; A3B1C19D6; A3B1C19D7; A3B1C19D8; A3B1C19D9; A3B1C19D10; A3B1C19D11; A3B1C19D12; A3B1C19D13; A3B1C19D14; A3B1C19D15; A3B1C19D16; A3B1C19D17; A3B1C19D18; A3B1C19D19; A3B1C19D20; A3B1C19D21; A3B1C19D21; A3B1C19D22; A3B1C19D23; A3B1C19D24; A3B1C19D25;

A3B1C20; A3B1C20D1; A3B1C20D2; A3B1C20D3; A3B1C20D4; A3B1C20D5; A3B1C20D6; A3B1C20D7; A3B1C20D8; A3B1C20D9; A3B1C20D10; A3B1C20D11; A3B1C20D12; A3B1C20D13; A3B1C20D14; A3B1C20D15; A3B1C20D16; A3B1C20D17; A3B1C20D18; A3B1C20D19; A3B1C20D20; A3B1C20D21; A3B1C20D21; A3B1C20D22; A3B1C20D23; A3B1C20D24; A3B1C20D25.

In a preferred embodiment, the preferred fungicide A is TBCS (A3) and the preferred fungicide B is benzovindiflupyr (B2).

A3B2C1; A3B2C1D1; A3B2C1D2; A3B2C1D3; A3B2C1D4; A3B2C1D5; A3B2C1D6; A3B2C1D7; A3B2C1D8; A3B2C1D9; A3B2C1D10; A3B2C1D11; A3B2C1D12; A3B2C1D13; A3B2C1D14; A3B2C1D15; A3B2C1D16; A3B2C1D17; A3B2C1D18; A3B2C1D19; A3B2C1D20; A3B2C1D21; A3B2C1D21; A3B2C1D22; A3B2C1D23; A3B2C1D24; A3B2C1D25;

A3B2C2; A3B2C2D1; A3B2C2D2; A3B2C2D3; A3B2C2D4; A3B2C2D5; A3B2C2D6; A3B2C2D7; A3B2C2D8; A3B2C2D9; A3B2C2D10; A3B2C2D11; A3B2C2D12; A3B2C2D13; A3B2C2D14; A3B2C2D15; A3B2C2D16; A3B2C2D17; A3B2C2D18; A3B2C2D19; A3B2C2D20; A3B2C2D21; A3B2C2D21; A3B2C2D22; A3B2C2D23; A3B2C2D24; A3B2C2D25;

A3B2C3; A3B2C3D1; A3B2C3D2; A3B2C3D3; A3B2C3D4; A3B2C3D5; A3B2C3D6; A3B2C3D7; A3B2C3D8; A3B2C3D9; A3B2C3D10; A3B2C3D11; A3B2C3D12; A3B2C3D13; A3B2C3D14; A3B2C3D15; A3B2C3D16; A3B2C3D17; A3B2C3D18; A3B2C3D19; A3B2C3D20; A3B2C3D21; A3B2C3D21; A3B2C3D22; A3B2C3D23; A3B2C3D24; A3B2C3D25;

A3B2C4; A3B2C4D1; A3B2C4D2; A3B2C4D3; A3B2C4D4; A3B2C4D5; A3B2C4D6; A3B2C4D7; A3B2C4D8; A3B2C4D9; A3B2C4D10; A3B2C4D11; A3B2C4D12; A3B2C4D13; A3B2C4D14; A3B2C4D15; A3B2C4D16; A3B2C4D17; A3B2C4D18; A3B2C4D19; A3B2C4D20; A3B2C4D21; A3B2C4D21; A3B2C4D22; A3B2C4D23; A3B2C4D24; A3B2C4D25;

A3B2C5; A3B2C5D1; A3B2C5D2; A3B2C5D3; A3B2C5D4; A3B2C5D5; A3B2C5D6; A3B2C5D7; A3B2C5D8; A3B2C5D9; A3B2C5D10; A3B2C5D11; A3B2C5D12; A3B2C5D13; A3B2C5D14; A3B2C5D15; A3B2C5D16; A3B2C5D17; A3B2C5D18; A3B2C5D19; A3B2C5D20; A3B2C5D21; A3B2C5D21; A3B2C5D22; A3B2C5D23; A3B2C5D24; A3B2C5D25;

A3B2C6; A3B2C6D1; A3B2C6D2; A3B2C6D3; A3B2C6D4; A3B2C6D5; A3B2C6D6; A3B2C6D7; A3B2C6D8; A3B2C6D9; A3B2C6D10; A3B2C6D11; A3B2C6D12; A3B2C6D13; A3B2C6D14; A3B2C6D15; A3B2C6D16; A3B2C6D17; A3B2C6D18; A3B2C6D19; A3B2C6D20; A3B2C6D21; A3B2C6D21; A3B2C6D22; A3B2C6D23; A3B2C6D24; A3B2C6D25;

A3B2C7; A3B2C7D1; A3B2C7D2; A3B2C7D3; A3B2C7D4; A3B2C7D5; A3B2C7D6; A3B2C7D7; A3B2C7D8; A3B2C7D9; A3B2C7D10; A3B2C7D11; A3B2C7D12; A3B2C7D13; A3B2C7D14; A3B2C7D15; A3B2C7D16; A3B2C7D17; A3B2C7D18; A3B2C7D19; A3B2C7D20; A3B2C7D21; A3B2C7D21; A3B2C7D22; A3B2C7D23; A3B2C7D24; A3B2C7D25;

A3B2C8; A3B2C8D1; A3B2C8D2; A3B2C8D3; A3B2C8D4; A3B2C8D5; A3B2C8D6; A3B2C8D7; A3B2C8D8; A3B2C8D9; A3B2C8D10; A3B2C8D11; A3B2C8D12; A3B2C8D13; A3B2C8D14; A3B2C8D15; A3B2C8D16; A3B2C8D17; A3B2C8D18; A3B2C8D19; A3B2C8D20; A3B2C8D21; A3B2C8D21; A3B2C8D22; A3B2C8D23; A3B2C8D24; A3B2C8D25;

A3B2C9; A3B2C9D1; A3B2C9D2; A3B2C9D3; A3B2C9D4; A3B2C9D5; A3B2C9D6; A3B2C9D7; A3B2C9D8; A3B2C9D9; A3B2C9D10; A3B2C9D11; A3B2C9D12; A3B2C9D13; A3B2C9D14; A3B2C9D15; A3B2C9D16; A3B2C9D17; A3B2C9D18; A3B2C9D19; A3B2C9D20; A3B2C9D21; A3B2C9D21; A3B2C9D22; A3B2C9D23; A3B2C9D24; A3B2C9D25;

A3B2C10; A3B2C10D1; A3B2C10D2; A3B2C10D3; A3B2C10D4; A3B2C10D5; A3B2C10D6; A3B2C10D7; A3B2C10D8; A3B2C10D9;

A3B2C10D10; A3B2C10D11; A3B2C10D12; A3B2C10D13; A3B2C10D14; A3B2C10D15; A3B2C10D16; A3B2C10D17; A3B2C10D18; A3B2C10D19; A3B2C10D20; A3B2C10D21; A3B2C10D21; A3B2C10D22; A3B2C10D23; A3B2C10D24; A3B2C10D25;

A3B2C11; A3B2C11D1; A3B2C11D2; A3B2C11D3; A3B2C11D4; A3B2C11D5; A3B2C11D6; A3B2C11D7; A3B2C11D8; A3B2C11D9; A3B2C11D10; A3B2C11D11; A3B2C11D12; A3B2C11D13; A3B2C11D14; A3B2C11D15; A3B2C11D16; A3B2C11D17; A3B2C11D18; A3B2C11D19; A3B2C11D20; A3B2C11D21; A3B2C11D21; A3B2C11D22; A3B2C11D23; A3B2C11D24; A3B2C11D25;

A3B2C12; A3B2C12D1; A3B2C12D2; A3B2C12D3; A3B2C12D4; A3B2C12D5; A3B2C12D6; A3B2C12D7; A3B2C12D8; A3B2C12D9; A3B2C12D10; A3B2C12D11; A3B2C12D12; A3B2C12D13; A3B2C12D14; A3B2C12D15; A3B2C12D16; A3B2C12D17; A3B2C12D18; A3B2C12D19; A3B2C12D20; A3B2C12D21; A3B2C12D21; A3B2C12D22; A3B2C12D23; A3B2C12D24; A3B2C12D25;

A3B2C13; A3B2C13D1; A3B2C13D2; A3B2C13D3; A3B2C13D4; A3B2C13D5; A3B2C13D6; A3B2C13D7; A3B2C13D8; A3B2C13D9; A3B2C13D10; A3B2C13D11; A3B2C13D12; A3B2C13D13; A3B2C13D14; A3B2C13D15; A3B2C13D16; A3B2C13D17; A3B2C13D18; A3B2C13D19; A3B2C13D20; A3B2C13D21; A3B2C13D21; A3B2C13D22; A3B2C13D23; A3B2C13D24; A3B2C13D25;

A3B2C14; A3B2C14D1; A3B2C14D2; A3B2C14D3; A3B2C14D4; A3B2C14D5; A3B2C14D6; A3B2C14D7; A3B2C14D8; A3B2C14D9; A3B2C14D10; A3B2C14D11; A3B2C14D12; A3B2C14D13; A3B2C14D14; A3B2C14D15; A3B2C14D16; A3B2C14D17; A3B2C14D18; A3B2C14D19; A3B2C14D20; A3B2C14D21; A3B2C14D21; A3B2C14D22; A3B2C14D23; A3B2C14D24; A3B2C14D25;

A3B2C15; A3B2C15D1; A3B2C15D2; A3B2C15D3; A3B2C15D4; A3B2C15D5; A3B2C15D6; A3B2C15D7; A3B2C15D8; A3B2C15D9; A3B2C15D10; A3B2C15D11; A3B2C15D12; A3B2C15D13; A3B2C15D14; A3B2C15D15; A3B2C15D16; A3B2C15D17; A3B2C15D18; A3B2C15D19; A3B2C15D20; A3B2C15D21; A3B2C15D21; A3B2C15D22; A3B2C15D23; A3B2C15D24; A3B2C15D25;

A3B2C16; A3B2C16D1; A3B2C16D2; A3B2C16D3; A3B2C16D4; A3B2C16D5; A3B2C16D6; A3B2C16D7; A3B2C16D8; A3B2C16D9; A3B2C16D10; A3B2C16D11; A3B2C16D12; A3B2C16D13; A3B2C16D14; A3B2C16D15; A3B2C16D16; A3B2C16D17; A3B2C16D18; A3B2C16D19; A3B2C16D20; A3B2C16D21; A3B2C16D21; A3B2C16D22; A3B2C16D23; A3B2C16D24; A3B2C16D25;

A3B2C17; A3B2C17D1; A3B2C17D2; A3B2C17D3; A3B2C17D4; A3B2C17D5; A3B2C17D6; A3B2C17D7; A3B2C17D8; A3B2C17D9; A3B2C17D10; A3B2C17D11; A3B2C17D12; A3B2C17D13; A3B2C17D14; A3B2C17D15; A3B2C17D16; A3B2C17D17; A3B2C17D18; A3B2C17D19; A3B2C17D20; A3B2C17D21; A3B2C17D21; A3B2C17D22; A3B2C17D23; A3B2C17D24; A3B2C17D25;

A3B2C18; A3B2C18D1; A3B2C18D2; A3B2C18D3; A3B2C18D4; A3B2C18D5; A3B2C18D6; A3B2C18D7; A3B2C18D8; A3B2C18D9; A3B2C18D10; A3B2C18D11; A3B2C18D12; A3B2C18D13; A3B2C18D14; A3B2C18D15; A3B2C18D16; A3B2C18D17; A3B2C18D18; A3B2C18D19; A3B2C18D20; A3B2C18D21; A3B2C18D21; A3B2C18D22; A3B2C18D23; A3B2C18D24; A3B2C18D25;

A3B2C19; A3B2C19D1; A3B2C19D2; A3B2C19D3; A3B2C19D4; A3B2C19D5; A3B2C19D6; A3B2C19D7; A3B2C19D8; A3B2C19D9; A3B2C19D10; A3B2C19D11; A3B2C19D12; A3B2C19D13; A3B2C19D14; A3B2C19D15; A3B2C19D16; A3B2C19D17; A3B2C19D18; A3B2C19D19; A3B2C19D20; A3B2C19D21; A3B2C19D21; A3B2C19D22; A3B2C19D23; A3B2C19D24; A3B2C19D25;

A3B2C20; A3B2C20D1; A3B2C20D2; A3B2C20D3; A3B2C20D4; A3B2C20D5; A3B2C20D6; A3B2C20D7; A3B2C20D8; A3B2C20D9; A3B2C20D10; A3B2C20D11; A3B2C20D12; A3B2C20D13; A3B2C20D14; A3B2C20D15; A3B2C20D16; A3B2C20D17; A3B2C20D18; A3B2C20D19; A3B2C20D20; A3B2C20D21; A3B2C20D21; A3B2C20D22; A3B2C20D23; A3B2C20D24; A3B2C20D25.

In an embodiment, the preferred fungicide A is TBCS (A3), and the preferred fungicide B is penthiopyrad (B3).

A3B3C1; A3B3C1D1; A3B3C1D2; A3B3C1D3; A3B3C1D4; A3B3C1D5; A3B3C1D6; A3B3C1D7; A3B3C1D8; A3B3C1D9; A3B3C1D10; A3B3C1D11; A3B3C1D12; A3B3C1D13; A3B3C1D14; A3B3C1D15; A3B3C1D16; A3B3C1D17; A3B3C1D18; A3B3C1D19; A3B3C1D20; A3B3C1D21; A3B3C1D21; A3B3C1D22; A3B3C1D23; A3B3C1D24; A3B3C1D25;

A3B3C2; A3B3C2D1; A3B3C2D2; A3B3C2D3; A3B3C2D4; A3B3C2D5; A3B3C2D6; A3B3C2D7; A3B3C2D8; A3B3C2D9; A3B3C2D10; A3B3C2D11; A3B3C2D12; A3B3C2D13; A3B3C2D14; A3B3C2D15; A3B3C2D16; A3B3C2D17; A3B3C2D18; A3B3C2D19; A3B3C2D20; A3B3C2D21; A3B3C2D21; A3B3C2D22; A3B3C2D23; A3B3C2D24; A3B3C2D25;

A3B3C3; A3B3C3D1; A3B3C3D2; A3B3C3D3; A3B3C3D4; A3B3C3D5; A3B3C3D6; A3B3C3D7; A3B3C3D8; A3B3C3D9; A3B3C3D10; A3B3C3D11; A3B3C3D12; A3B3C3D13; A3B3C3D14; A3B3C3D15; A3B3C3D16; A3B3C3D17; A3B3C3D18; A3B3C3D19; A3B3C3D20; A3B3C3D21; A3B3C3D21; A3B3C3D22; A3B3C3D23; A3B3C3D24; A3B3C3D25;

A3B3C4; A3B3C4D1; A3B3C4D2; A3B3C4D3; A3B3C4D4; A3B3C4D5; A3B3C4D6; A3B3C4D7; A3B3C4D8; A3B3C4D9; A3B3C4D10; A3B3C4D11; A3B3C4D12; A3B3C4D13; A3B3C4D14; A3B3C4D15; A3B3C4D16; A3B3C4D17; A3B3C4D18; A3B3C4D19; A3B3C4D20; A3B3C4D21; A3B3C4D21; A3B3C4D22; A3B3C4D23; A3B3C4D24; A3B3C4D25;

A3B3C5; A3B3C5D1; A3B3C5D2; A3B3C5D3; A3B3C5D4; A3B3C5D5; A3B3C5D6; A3B3C5D7; A3B3C5D8; A3B3C5D9; A3B3C5D10; A3B3C5D11; A3B3C5D12; A3B3C5D13; A3B3C5D14;

A3B3C5D15; A3B3C5D16; A3B3C5D17; A3B3C5D18; A3B3C5D19; A3B3C5D20; A3B3C5D21; A3B3C5D21; A3B3C5D22; A3B3C5D23; A3B3C5D24; A3B3C5D25;
A3B3C6; A3B3C6D1; A3B3C6D2; A3B3C6D3; A3B3C6D4; A3B3C6D5; A3B3C6D6; A3B3C6D7; A3B3C6D8; A3B3C6D9; A3B3C6D10; A3B3C6D11; A3B3C6D12; A3B3C6D13; A3B3C6D14; A3B3C6D15; A3B3C6D16; A3B3C6D17; A3B3C6D18; A3B3C6D19; A3B3C6D20; A3B3C6D21; A3B3C6D21; A3B3C6D22; A3B3C6D23; A3B3C6D24; A3B3C6D25;
A3B3C7; A3B3C7D1; A3B3C7D2; A3B3C7D3; A3B3C7D4; A3B3C7D5; A3B3C7D6; A3B3C7D7; A3B3C7D8; A3B3C7D9; A3B3C7D10; A3B3C7D11; A3B3C7D12; A3B3C7D13; A3B3C7D14; A3B3C7D15; A3B3C7D16; A3B3C7D17; A3B3C7D18; A3B3C7D19; A3B3C7D20; A3B3C7D21; A3B3C7D21; A3B3C7D22; A3B3C7D23; A3B3C7D24; A3B3C7D25;
A3B3C8; A3B3C8D1; A3B3C8D2; A3B3C8D3; A3B3C8D4; A3B3C8D5; A3B3C8D6; A3B3C8D7; A3B3C8D8; A3B3C8D9; A3B3C8D10; A3B3C8D11; A3B3C8D12; A3B3C8D13; A3B3C8D14; A3B3C8D15; A3B3C8D16; A3B3C8D17; A3B3C8D18; A3B3C8D19; A3B3C8D20; A3B3C8D21; A3B3C8D21; A3B3C8D22; A3B3C8D23; A3B3C8D24; A3B3C8D25;
A3B3C9; A3B3C9D1; A3B3C9D2; A3B3C9D3; A3B3C9D4; A3B3C9D5; A3B3C9D6; A3B3C9D7; A3B3C9D8; A3B3C9D9; A3B3C9D10; A3B3C9D11; A3B3C9D12; A3B3C9D13; A3B3C9D14; A3B3C9D15; A3B3C9D16; A3B3C9D17; A3B3C9D18; A3B3C9D19; A3B3C9D20; A3B3C9D21; A3B3C9D21; A3B3C9D22; A3B3C9D23; A3B3C9D24; A3B3C9D25;
A3B3C10; A3B3C10D1; A3B3C10D2; A3B3C10D3; A3B3C10D4; A3B3C10D5; A3B3C10D6; A3B3C10D7; A3B3C10D8; A3B3C10D9; A3B3C10D10; A3B3C10D11; A3B3C10D12; A3B3C10D13; A3B3C10D14; A3B3C10D15; A3B3C10D16; A3B3C10D17; A3B3C10D18; A3B3C10D19; A3B3C10D20; A3B3C10D21; A3B3C10D21; A3B3C10D22; A3B3C10D23; A3B3C10D24; A3B3C10D25;
A3B3C11; A3B3C11D1; A3B3C11D2; A3B3C11D3; A3B3C11D4; A3B3C11D5; A3B3C11D6; A3B3C11D7; A3B3C11D8; A3B3C11D9; A3B3C11D10; A3B3C11D11; A3B3C11D12; A3B3C11D13; A3B3C11D14; A3B3C11D15; A3B3C11D16; A3B3C11D17; A3B3C11D18; A3B3C11D19; A3B3C11D20; A3B3C11D21; A3B3C11D21; A3B3C11D22; A3B3C11D23; A3B3C11D24; A3B3C11D25;
A3B3C12; A3B3C12D1; A3B3C12D2; A3B3C12D3; A3B3C12D4; A3B3C12D5; A3B3C12D6; A3B3C12D7; A3B3C12D8; A3B3C12D9; A3B3C12D10; A3B3C12D11; A3B3C12D12; A3B3C12D13; A3B3C12D14; A3B3C12D15; A3B3C12D16; A3B3C12D17; A3B3C12D18; A3B3C12D19; A3B3C12D20; A3B3C12D21; A3B3C12D21; A3B3C12D22; A3B3C12D23; A3B3C12D24; A3B3C12D25;
A3B3C13; A3B3C13D1; A3B3C13D2; A3B3C13D3; A3B3C13D4; A3B3C13D5; A3B3C13D6; A3B3C13D7; A3B3C13D8; A3B3C13D9; A3B3C13D10; A3B3C13D11; A3B3C13D12; A3B3C13D13; A3B3C13D14; A3B3C13D15; A3B3C13D16; A3B3C13D17; A3B3C13D18; A3B3C13D19; A3B3C13D20; A3B3C13D21; A3B3C13D21; A3B3C13D22; A3B3C13D23; A3B3C13D24; A3B3C13D25;
A3B3C14; A3B3C14D1; A3B3C14D2; A3B3C14D3; A3B3C14D4; A3B3C14D5; A3B3C14D6; A3B3C14D7; A3B3C14D8; A3B3C14D9; A3B3C14D10; A3B3C14D11; A3B3C14D12; A3B3C14D13; A3B3C14D14; A3B3C14D15; A3B3C14D16; A3B3C14D17; A3B3C14D18; A3B3C14D19; A3B3C14D20; A3B3C14D21; A3B3C14D21; A3B3C14D22; A3B3C14D23; A3B3C14D24; A3B3C14D25;
A3B3C15; A3B3C15D1; A3B3C15D2; A3B3C15D3; A3B3C15D4; A3B3C15D5; A3B3C15D6; A3B3C15D7; A3B3C15D8; A3B3C15D9; A3B3C15D10; A3B3C15D11; A3B3C15D12; A3B3C15D13; A3B3C15D14; A3B3C15D15; A3B3C15D16; A3B3C15D17; A3B3C15D18; A3B3C15D19; A3B3C15D20; A3B3C15D21; A3B3C15D21; A3B3C15D22; A3B3C15D23; A3B3C15D24; A3B3C15D25;
A3B3C16; A3B3C16D1; A3B3C16D2; A3B3C16D3; A3B3C16D4; A3B3C16D5; A3B3C16D6; A3B3C16D7; A3B3C16D8; A3B3C16D9; A3B3C16D10; A3B3C16D11; A3B3C16D12; A3B3C16D13; A3B3C16D14; A3B3C16D15; A3B3C16D16; A3B3C16D17; A3B3C16D18; A3B3C16D19; A3B3C16D20; A3B3C16D21; A3B3C16D21; A3B3C16D22; A3B3C16D23; A3B3C16D24; A3B3C16D25;
A3B3C17; A3B3C17D1; A3B3C17D2; A3B3C17D3; A3B3C17D4; A3B3C17D5; A3B3C17D6; A3B3C17D7; A3B3C17D8; A3B3C17D9; A3B3C17D10; A3B3C17D11; A3B3C17D12; A3B3C17D13; A3B3C17D14; A3B3C17D15; A3B3C17D16; A3B3C17D17; A3B3C17D18; A3B3C17D19; A3B3C17D20; A3B3C17D21; A3B3C17D21; A3B3C17D22; A3B3C17D23; A3B3C17D24; A3B3C17D25;
A3B3C18; A3B3C18D1; A3B3C18D2; A3B3C18D3; A3B3C18D4; A3B3C18D5; A3B3C18D6; A3B3C18D7; A3B3C18D8; A3B3C18D9; A3B3C18D10; A3B3C18D11; A3B3C18D12; A3B3C18D13; A3B3C18D14; A3B3C18D15; A3B3C18D16; A3B3C18D17; A3B3C18D18; A3B3C18D19; A3B3C18D20; A3B3C18D21; A3B3C18D21; A3B3C18D22; A3B3C18D23; A3B3C18D24; A3B3C18D25;
A3B3C19; A3B3C19D1; A3B3C19D2; A3B3C19D3; A3B3C19D4; A3B3C19D5; A3B3C19D6; A3B3C19D7; A3B3C19D8; A3B3C19D9; A3B3C19D10; A3B3C19D11; A3B3C19D12; A3B3C19D13; A3B3C19D14; A3B3C19D15; A3B3C19D16; A3B3C19D17; A3B3C19D18; A3B3C19D19; A3B3C19D20; A3B3C19D21; A3B3C19D21; A3B3C19D22; A3B3C19D23; A3B3C19D24; A3B3C19D25;
A3B3C20; A3B3C20D1; A3B3C20D2; A3B3C20D3; A3B3C20D4; A3B3C20D5; A3B3C20D6; A3B3C20D7; A3B3C20D8; A3B3C20D9; A3B3C20D10; A3B3C20D11; A3B3C20D12; A3B3C20D13; A3B3C20D14; A3B3C20D15; A3B3C20D16; A3B3C20D17; A3B3C20D18; A3B3C20D19; A3B3C20D20; A3B3C20D21;

A3B3C20D21; A3B3C20D22; A3B3C20D23; A3B3C20D24; A3B3C20D25.

In an embodiment, the preferred fungicide A is TBCS (A3) and the preferred fungicide B is boscalid (B4).

A3B4C1; A3B4C1D1; A3B4C1D2; A3B4C1D3; A3B4C1D4; A3B4C1D5; A3B4C1D6; A3B4C1D7; A3B4C1D8; A3B4C1D9; A3B4C1D10; A3B4C1D11; A3B4C1D12; A3B4C1D13; A3B4C1D14; A3B4C1D15; A3B4C1D16; A3B4C1D17; A3B4C1D18; A3B4C1D19; A3B4C1D20; A3B4C1D21; A3B4C1D21; A3B4C1D22; A3B4C1D23; A3B4C1D24; A3B4C1D25;

A3B4C2; A3B4C2D1; A3B4C2D2; A3B4C2D3; A3B4C2D4; A3B4C2D5; A3B4C2D6; A3B4C2D7; A3B4C2D8; A3B4C2D9; A3B4C2D10; A3B4C2D11; A3B4C2D12; A3B4C2D13; A3B4C2D14; A3B4C2D15; A3B4C2D16; A3B4C2D17; A3B4C2D18; A3B4C2D19; A3B4C2D20; A3B4C2D21; A3B4C2D21; A3B4C2D22; A3B4C2D23; A3B4C2D24; A3B4C2D25;

A3B4C3; A3B4C3D1; A3B4C3D2; A3B4C3D3; A3B4C3D4; A3B4C3D5; A3B4C3D6; A3B4C3D7; A3B4C3D8; A3B4C3D9; A3B4C3D10; A3B4C3D11; A3B4C3D12; A3B4C3D13; A3B4C3D14; A3B4C3D15; A3B4C3D16; A3B4C3D17; A3B4C3D18; A3B4C3D19; A3B4C3D20; A3B4C3D21; A3B4C3D21; A3B4C3D22; A3B4C3D23; A3B4C3D24; A3B4C3D25;

A3B4C4; A3B4C4D1; A3B4C4D2; A3B4C4D3; A3B4C4D4; A3B4C4D5; A3B4C4D6; A3B4C4D7; A3B4C4D8; A3B4C4D9; A3B4C4D10; A3B4C4D11; A3B4C4D12; A3B4C4D13; A3B4C4D14; A3B4C4D15; A3B4C4D16; A3B4C4D17; A3B4C4D18; A3B4C4D19; A3B4C4D20; A3B4C4D21; A3B4C4D21; A3B4C4D22; A3B4C4D23; A3B4C4D24; A3B4C4D25;

A3B4C5; A3B4C5D1; A3B4C5D2; A3B4C5D3; A3B4C5D4; A3B4C5D5; A3B4C5D6; A3B4C5D7; A3B4C5D8; A3B4C5D9; A3B4C5D10; A3B4C5D11; A3B4C5D12; A3B4C5D13; A3B4C5D14; A3B4C5D15; A3B4C5D16; A3B4C5D17; A3B4C5D18; A3B4C5D19; A3B4C5D20; A3B4C5D21; A3B4C5D21; A3B4C5D22; A3B4C5D23; A3B4C5D24; A3B4C5D25;

A3B4C6; A3B4C6D1; A3B4C6D2; A3B4C6D3; A3B4C6D4; A3B4C6D5; A3B4C6D6; A3B4C6D7; A3B4C6D8; A3B4C6D9; A3B4C6D10; A3B4C6D11; A3B4C6D12; A3B4C6D13; A3B4C6D14; A3B4C6D15; A3B4C6D16; A3B4C6D17; A3B4C6D18; A3B4C6D19; A3B4C6D20; A3B4C6D21; A3B4C6D21; A3B4C6D22; A3B4C6D23; A3B4C6D24; A3B4C6D25;

A3B4C7; A3B4C7D1; A3B4C7D2; A3B4C7D3; A3B4C7D4; A3B4C7D5; A3B4C7D6; A3B4C7D7; A3B4C7D8; A3B4C7D9; A3B4C7D10; A3B4C7D11; A3B4C7D12; A3B4C7D13; A3B4C7D14; A3B4C7D15; A3B4C7D16; A3B4C7D17; A3B4C7D18; A3B4C7D19; A3B4C7D20; A3B4C7D21; A3B4C7D21; A3B4C7D22; A3B4C7D23; A3B4C7D24; A3B4C7D25;

A3B4C8; A3B4C8D1; A3B4C8D2; A3B4C8D3; A3B4C8D4; A3B4C8D5; A3B4C8D6; A3B4C8D7; A3B4C8D8; A3B4C8D9; A3B4C8D10; A3B4C8D11; A3B4C8D12; A3B4C8D13; A3B4C8D14; A3B4C8D15; A3B4C8D16; A3B4C8D17; A3B4C8D18; A3B4C8D19; A3B4C8D20; A3B4C8D21; A3B4C8D21; A3B4C8D22; A3B4C8D23; A3B4C8D24; A3B4C8D25;

A3B4C9; A3B4C9D1; A3B4C9D2; A3B4C9D3; A3B4C9D4; A3B4C9D5; A3B4C9D6; A3B4C9D7; A3B4C9D8; A3B4C9D9; A3B4C9D10; A3B4C9D11; A3B4C9D12; A3B4C9D13; A3B4C9D14; A3B4C9D15; A3B4C9D16; A3B4C9D17; A3B4C9D18; A3B4C9D19; A3B4C9D20; A3B4C9D21; A3B4C9D21; A3B4C9D22; A3B4C9D23; A3B4C9D24; A3B4C9D25;

A3B4C10; A3B4C10D1; A3B4C10D2; A3B4C10D3; A3B4C10D4; A3B4C10D5; A3B4C10D6; A3B4C10D7; A3B4C10D8; A3B4C10D9; A3B4C10D10; A3B4C10D11; A3B4C10D12; A3B4C10D13; A3B4C10D14; A3B4C10D15; A3B4C10D16; A3B4C10D17; A3B4C10D18; A3B4C10D19; A3B4C10D20; A3B4C10D21; A3B4C10D21; A3B4C10D22; A3B4C10D23; A3B4C10D24; A3B4C10D25;

A3B4C11; A3B4C11D1; A3B4C11D2; A3B4C11D3; A3B4C11D4; A3B4C11D5; A3B4C11D6; A3B4C11D7; A3B4C11D8; A3B4C11D9; A3B4C11D10; A3B4C11D11; A3B4C11D12; A3B4C11D13; A3B4C11D14; A3B4C11D15; A3B4C11D16; A3B4C11D17; A3B4C11D18; A3B4C11D19; A3B4C11D20; A3B4C11D21; A3B4C11D21; A3B4C11D22; A3B4C11D23; A3B4C11D24; A3B4C11D25;

A3B4C12; A3B4C12D1; A3B4C12D2; A3B4C12D3; A3B4C12D4; A3B4C12D5; A3B4C12D6; A3B4C12D7; A3B4C12D8; A3B4C12D9; A3B4C12D10; A3B4C12D11; A3B4C12D12; A3B4C12D13; A3B4C12D14; A3B4C12D15; A3B4C12D16; A3B4C12D17; A3B4C12D18; A3B4C12D19; A3B4C12D20; A3B4C12D21; A3B4C12D21; A3B4C12D22; A3B4C12D23; A3B4C12D24; A3B4C12D25;

A3B4C13; A3B4C13D1; A3B4C13D2; A3B4C13D3; A3B4C13D4; A3B4C13D5; A3B4C13D6; A3B4C13D7; A3B4C13D8; A3B4C13D9; A3B4C13D10; A3B4C13D11; A3B4C13D12; A3B4C13D13; A3B4C13D14; A3B4C13D15; A3B4C13D16; A3B4C13D17; A3B4C13D18; A3B4C13D19; A3B4C13D20; A3B4C13D21; A3B4C13D21; A3B4C13D22; A3B4C13D23; A3B4C13D24; A3B4C13D25;

A3B4C14; A3B4C14D1; A3B4C14D2; A3B4C14D3; A3B4C14D4; A3B4C14D5; A3B4C14D6; A3B4C14D7; A3B4C14D8; A3B4C14D9; A3B4C14D10; A3B4C14D11; A3B4C14D12; A3B4C14D13; A3B4C14D14; A3B4C14D15; A3B4C14D16; A3B4C14D17; A3B4C14D18; A3B4C14D19; A3B4C14D20; A3B4C14D21; A3B4C14D21; A3B4C14D22; A3B4C14D23; A3B4C14D24; A3B4C14D25;

A3B4C15; A3B4C15D1; A3B4C15D2; A3B4C15D3; A3B4C15D4; A3B4C15D5; A3B4C15D6; A3B4C15D7; A3B4C15D8; A3B4C15D9; A3B4C15D10; A3B4C15D11; A3B4C15D12; A3B4C15D13; A3B4C15D14; A3B4C15D15; A3B4C15D16; A3B4C15D17; A3B4C15D18; A3B4C15D19; A3B4C15D20; A3B4C15D21; A3B4C15D21; A3B4C15D22; A3B4C15D23; A3B4C15D24; A3B4C15D25;

A3B4C16; A3B4C16D1; A3B4C16D2; A3B4C16D3; A3B4C16D4; A3B4C16D5; A3B4C16D6; A3B4C16D7; A3B4C16D8; A3B4C16D9;

A3B4C16D10; A3B4C16D11; A3B4C16D12; A3B4C16D13; A3B4C16D14; A3B4C16D15; A3B4C16D16; A3B4C16D17; A3B4C16D18; A3B4C16D19; A3B4C16D20; A3B4C16D21; A3B4C16D21; A3B4C16D22; A3B4C16D23; A3B4C16D24; A3B4C16D25;

A3B4C17; A3B4C17D1; A3B4C17D2; A3B4C17D3; A3B4C17D4; A3B4C17D5; A3B4C17D6; A3B4C17D7; A3B4C17D8; A3B4C17D9; A3B4C17D10; A3B4C17D11; A3B4C17D12; A3B4C17D13; A3B4C17D14; A3B4C17D15; A3B4C17D16; A3B4C17D17; A3B4C17D18; A3B4C17D19; A3B4C17D20; A3B4C17D21; A3B4C17D21; A3B4C17D22; A3B4C17D23; A3B4C17D24; A3B4C17D25;

A3B4C18; A3B4C18D1; A3B4C18D2; A3B4C18D3; A3B4C18D4; A3B4C18D5; A3B4C18D6; A3B4C18D7; A3B4C18D8; A3B4C18D9; A3B4C18D10; A3B4C18D11; A3B4C18D12; A3B4C18D13; A3B4C18D14; A3B4C18D15; A3B4C18D16; A3B4C18D17; A3B4C18D18; A3B4C18D19; A3B4C18D20; A3B4C18D21; A3B4C18D21; A3B4C18D22; A3B4C18D23; A3B4C18D24; A3B4C18D25;

A3B4C19; A3B4C19D1; A3B4C19D2; A3B4C19D3; A3B4C19D4; A3B4C19D5; A3B4C19D6; A3B4C19D7; A3B4C19D8; A3B4C19D9; A3B4C19D10; A3B4C19D11; A3B4C19D12; A3B4C19D13; A3B4C19D14; A3B4C19D15; A3B4C19D16; A3B4C19D17; A3B4C19D18; A3B4C19D19; A3B4C19D20; A3B4C19D21; A3B4C19D21; A3B4C19D22; A3B4C19D23; A3B4C19D24; A3B4C19D25;

A3B4C20; A3B4C20D1; A3B4C20D2; A3B4C20D3; A3B4C20D4; A3B4C20D5; A3B4C20D6; A3B4C20D7; A3B4C20D8; A3B4C20D9; A3B4C20D10; A3B4C20D11; A3B4C20D12; A3B4C20D13; A3B4C20D14; A3B4C20D15; A3B4C20D16; A3B4C20D17; A3B4C20D18; A3B4C20D19; A3B4C20D20; A3B4C20D21; A3B4C20D21; A3B4C20D22; A3B4C20D23; A3B4C20D24; A3B4C20D25.

In an embodiment, the preferred fungicide A is TBCS (A3) and the preferred fungicide B is fluindapyr (B5).

A3B5C1; A3B5C1D1; A3B5C1D2; A3B5C1D3; A3B5C1D4; A3B5C1D5; A3B5C1D6; A3B5C1D7; A3B5C1D8; A3B5C1D9; A3B5C1D10; A3B5C1D11; A3B5C1D12; A3B5C1D13; A3B5C1D14; A3B5C1D15; A3B5C1D16; A3B5C1D17; A3B5C1D18; A3B5C1D19; A3B5C1D20; A3B5C1D21; A3B5C1D21; A3B5C1D22; A3B5C1D23; A3B5C1D24; A3B5C1D25;

A3B5C2; A3B5C2D1; A3B5C2D2; A3B5C2D3; A3B5C2D4; A3B5C2D5; A3B5C2D6; A3B5C2D7; A3B5C2D8; A3B5C2D9; A3B5C2D10; A3B5C2D11; A3B5C2D12; A3B5C2D13; A3B5C2D14; A3B5C2D15; A3B5C2D16; A3B5C2D17; A3B5C2D18; A3B5C2D19; A3B5C2D20; A3B5C2D21; A3B5C2D21; A3B5C2D22; A3B5C2D23; A3B5C2D24; A3B5C2D25;

A3B5C3; A3B5C3D1; A3B5C3D2; A3B5C3D3; A3B5C3D4; A3B5C3D5; A3B5C3D6; A3B5C3D7; A3B5C3D8; A3B5C3D9; A3B5C3D10; A3B5C3D11; A3B5C3D12; A3B5C3D13; A3B5C3D14; A3B5C3D15; A3B5C3D16; A3B5C3D17; A3B5C3D18; A3B5C3D19; A3B5C3D20; A3B5C3D21; A3B5C3D21; A3B5C3D22; A3B5C3D23; A3B5C3D24; A3B5C3D25;

A3B5C4; A3B5C4D1; A3B5C4D2; A3B5C4D3; A3B5C4D4; A3B5C4D5; A3B5C4D6; A3B5C4D7; A3B5C4D8; A3B5C4D9; A3B5C4D10; A3B5C4D11; A3B5C4D12; A3B5C4D13; A3B5C4D14; A3B5C4D15; A3B5C4D16; A3B5C4D17; A3B5C4D18; A3B5C4D19; A3B5C4D20; A3B5C4D21; A3B5C4D21; A3B5C4D22; A3B5C4D23; A3B5C4D24; A3B5C4D25;

A3B5C5; A3B5C5D1; A3B5C5D2; A3B5C5D3; A3B5C5D4; A3B5C5D5; A3B5C5D6; A3B5C5D7; A3B5C5D8; A3B5C5D9; A3B5C5D10; A3B5C5D11; A3B5C5D12; A3B5C5D13; A3B5C5D14; A3B5C5D15; A3B5C5D16; A3B5C5D17; A3B5C5D18; A3B5C5D19; A3B5C5D20; A3B5C5D21; A3B5C5D21; A3B5C5D22; A3B5C5D23; A3B5C5D24; A3B5C5D25;

A3B5C6; A3B5C6D1; A3B5C6D2; A3B5C6D3; A3B5C6D4; A3B5C6D5; A3B5C6D6; A3B5C6D7; A3B5C6D8; A3B5C6D9; A3B5C6D10; A3B5C6D11; A3B5C6D12; A3B5C6D13; A3B5C6D14; A3B5C6D15; A3B5C6D16; A3B5C6D17; A3B5C6D18; A3B5C6D19; A3B5C6D20; A3B5C6D21; A3B5C6D21; A3B5C6D22; A3B5C6D23; A3B5C6D24; A3B5C6D25;

A3B5C7; A3B5C7D1; A3B5C7D2; A3B5C7D3; A3B5C7D4; A3B5C7D5; A3B5C7D6; A3B5C7D7; A3B5C7D8; A3B5C7D9; A3B5C7D10; A3B5C7D11; A3B5C7D12; A3B5C7D13; A3B5C7D14; A3B5C7D15; A3B5C7D16; A3B5C7D17; A3B5C7D18; A3B5C7D19; A3B5C7D20; A3B5C7D21; A3B5C7D21; A3B5C7D22; A3B5C7D23; A3B5C7D24; A3B5C7D25;

A3B5C8; A3B5C8D1; A3B5C8D2; A3B5C8D3; A3B5C8D4; A3B5C8D5; A3B5C8D6; A3B5C8D7; A3B5C8D8; A3B5C8D9; A3B5C8D10; A3B5C8D11; A3B5C8D12; A3B5C8D13; A3B5C8D14; A3B5C8D15; A3B5C8D16; A3B5C8D17; A3B5C8D18; A3B5C8D19; A3B5C8D20; A3B5C8D21; A3B5C8D21; A3B5C8D22; A3B5C8D23; A3B5C8D24; A3B5C8D25;

A3B5C9; A3B5C9D1; A3B5C9D2; A3B5C9D3; A3B5C9D4; A3B5C9D5; A3B5C9D6; A3B5C9D7; A3B5C9D8; A3B5C9D9; A3B5C9D10; A3B5C9D11; A3B5C9D12; A3B5C9D13; A3B5C9D14; A3B5C9D15; A3B5C9D16; A3B5C9D17; A3B5C9D18; A3B5C9D19; A3B5C9D20; A3B5C9D21; A3B5C9D21; A3B5C9D22; A3B5C9D23; A3B5C9D24; A3B5C9D25;

A3B5C10; A3B5C10D1; A3B5C10D2; A3B5C10D3; A3B5C10D4; A3B5C10D5; A3B5C10D6; A3B5C10D7; A3B5C10D8; A3B5C10D9; A3B5C10D10; A3B5C10D11; A3B5C10D12; A3B5C10D13; A3B5C10D14; A3B5C10D15; A3B5C10D16; A3B5C10D17; A3B5C10D18; A3B5C10D19; A3B5C10D20; A3B5C10D21; A3B5C10D21; A3B5C10D22; A3B5C10D23; A3B5C10D24; A3B5C10D25;

A3B5C11; A3B5C11D1; A3B5C11D2; A3B5C11D3; A3B5C11D4; A3B5C11D5; A3B5C11D6; A3B5C11D7; A3B5C11D8; A3B5C11D9; A3B5C11D10; A3B5C11D11; A3B5C11D12; A3B5C11D13; A3B5C11D14; A3B5C11D15; A3B5C11D16; A3B5C11D17; A3B5C11D18; A3B5C11D19; A3B5C11D20; A3B5C11D21;

A3B5C11D21; A3B5C11D22; A3B5C11D23; A3B5C11D24; A3B5C11D25;
A3B5C12; A3B5C12D1; A3B5C12D2; A3B5C12D3; A3B5C12D4; A3B5C12D5; A3B5C12D6; A3B5C12D7; A3B5C12D8; A3B5C12D9; A3B5C12D10; A3B5C12D11; A3B5C12D12; A3B5C12D13; A3B5C12D14; A3B5C12D15; A3B5C12D16; A3B5C12D17; A3B5C12D18; A3B5C12D19; A3B5C12D20; A3B5C12D21; A3B5C12D21; A3B5C12D22; A3B5C12D23; A3B5C12D24; A3B5C12D25;
A3B5C13; A3B5C13D1; A3B5C13D2; A3B5C13D3; A3B5C13D4; A3B5C13D5; A3B5C13D6; A3B5C13D7; A3B5C13D8; A3B5C13D9; A3B5C13D10; A3B5C13D11; A3B5C13D12; A3B5C13D13; A3B5C13D14; A3B5C13D15; A3B5C13D16; A3B5C13D17; A3B5C13D18; A3B5C13D19; A3B5C13D20; A3B5C13D21; A3B5C13D21; A3B5C13D22; A3B5C13D23; A3B5C13D24; A3B5C13D25;
A3B5C14; A3B5C14D1; A3B5C14D2; A3B5C14D3; A3B5C14D4; A3B5C14D5; A3B5C14D6; A3B5C14D7; A3B5C14D8; A3B5C14D9; A3B5C14D10; A3B5C14D11; A3B5C14D12; A3B5C14D13; A3B5C14D14; A3B5C14D15; A3B5C14D16; A3B5C14D17; A3B5C14D18; A3B5C14D19; A3B5C14D20; A3B5C14D21; A3B5C14D21; A3B5C14D22; A3B5C14D23; A3B5C14D24; A3B5C14D25;
A3B5C15; A3B5C15D1; A3B5C15D2; A3B5C15D3; A3B5C15D4; A3B5C15D5; A3B5C15D6; A3B5C15D7; A3B5C15D8; A3B5C15D9; A3B5C15D10; A3B5C15D11; A3B5C15D12; A3B5C15D13; A3B5C15D14; A3B5C15D15; A3B5C15D16; A3B5C15D17; A3B5C15D18; A3B5C15D19; A3B5C15D20; A3B5C15D21; A3B5C15D21; A3B5C15D22; A3B5C15D23; A3B5C15D24; A3B5C15D25;
A3B5C16; A3B5C16D1; A3B5C16D2; A3B5C16D3; A3B5C16D4; A3B5C16D5; A3B5C16D6; A3B5C16D7; A3B5C16D8; A3B5C16D9; A3B5C16D10; A3B5C16D11; A3B5C16D12; A3B5C16D13; A3B5C16D14; A3B5C16D15; A3B5C16D16; A3B5C16D17; A3B5C16D18; A3B5C16D19; A3B5C16D20; A3B5C16D21; A3B5C16D21; A3B5C16D22; A3B5C16D23; A3B5C16D24; A3B5C16D25;
A3B5C17; A3B5C17D1; A3B5C17D2; A3B5C17D3; A3B5C17D4; A3B5C17D5; A3B5C17D6; A3B5C17D7; A3B5C17D8; A3B5C17D9; A3B5C17D10; A3B5C17D11; A3B5C17D12; A3B5C17D13; A3B5C17D14; A3B5C17D15; A3B5C17D16; A3B5C17D17; A3B5C17D18; A3B5C17D19; A3B5C17D20; A3B5C17D21; A3B5C17D21; A3B5C17D22; A3B5C17D23; A3B5C17D24; A3B5C17D25;
A3B5C18; A3B5C18D1; A3B5C18D2; A3B5C18D3; A3B5C18D4; A3B5C18D5; A3B5C18D6; A3B5C18D7; A3B5C18D8; A3B5C18D9; A3B5C18D10; A3B5C18D11; A3B5C18D12; A3B5C18D13; A3B5C18D14; A3B5C18D15; A3B5C18D16; A3B5C18D17; A3B5C18D18; A3B5C18D19; A3B5C18D20; A3B5C18D21; A3B5C18D21; A3B5C18D22; A3B5C18D23; A3B5C18D24; A3B5C18D25;
A3B5C19; A3B5C19D1; A3B5C19D2; A3B5C19D3; A3B5C19D4; A3B5C19D5; A3B5C19D6; A3B5C19D7; A3B5C19D8; A3B5C19D9; A3B5C19D10; A3B5C19D11; A3B5C19D12; A3B5C19D13; A3B5C19D14; A3B5C19D15; A3B5C19D16; A3B5C19D17; A3B5C19D18; A3B5C19D19; A3B5C19D20; A3B5C19D21; A3B5C19D21; A3B5C19D22; A3B5C19D23; A3B5C19D24; A3B5C19D25;
A3B5C20; A3B5C20D1; A3B5C20D2; A3B5C20D3; A3B5C20D4; A3B5C20D5; A3B5C20D6; A3B5C20D7; A3B5C20D8; A3B5C20D9; A3B5C20D10; A3B5C20D11; A3B5C20D12; A3B5C20D13; A3B5C20D14; A3B5C20D15; A3B5C20D16; A3B5C20D17; A3B5C20D18; A3B5C20D19; A3B5C20D20; A3B5C20D21; A3B5C20D21; A3B5C20D22; A3B5C20D23; A3B5C20D24; A3B5C20D25.

In an embodiment, the preferred fungicide A is TBCS (A3), and the preferred fungicide B is boscalid (B23).

A3B23C1; A3B23C1D1; A3B23C1D2; A3B23C1D3; A3B23C1D4; A3B23C1D5; A3B23C1D6; A3B23C1D7; A3B23C1D8; A3B23C1D9; A3B23C1D10; A3B23C1D11; A3B23C1D12; A3B23C1D13; A3B23C1D14; A3B23C1D15; A3B23C1D16; A3B23C1D17; A3B23C1D18; A3B23C1D19; A3B23C1D20; A3B23C1D21; A3B23C1D21; A3B23C1D22; A3B23C1D23; A3B23C1D24; A3B23C1D25;
A3B23C2; A3B23C2D1; A3B23C2D2; A3B23C2D3; A3B23C2D4; A3B23C2D5; A3B23C2D6; A3B23C2D7; A3B23C2D8; A3B23C2D9; A3B23C2D10; A3B23C2D11; A3B23C2D12; A3B23C2D13; A3B23C2D14; A3B23C2D15; A3B23C2D16; A3B23C2D17; A3B23C2D18; A3B23C2D19; A3B23C2D20; A3B23C2D21; A3B23C2D21; A3B23C2D22; A3B23C2D23; A3B23C2D24; A3B23C2D25;
A3B23C3; A3B23C3D1; A3B23C3D2; A3B23C3D3; A3B23C3D4; A3B23C3D5; A3B23C3D6; A3B23C3D7; A3B23C3D8; A3B23C3D9; A3B23C3D10; A3B23C3D11; A3B23C3D12; A3B23C3D13; A3B23C3D14; A3B23C3D15; A3B23C3D16; A3B23C3D17; A3B23C3D18; A3B23C3D19; A3B23C3D20; A3B23C3D21; A3B23C3D21; A3B23C3D22; A3B23C3D23; A3B23C3D24; A3B23C3D25;
A3B23C4; A3B23C4D1; A3B23C4D2; A3B23C4D3; A3B23C4D4; A3B23C4D5; A3B23C4D6; A3B23C4D7; A3B23C4D8; A3B23C4D9; A3B23C4D10; A3B23C4D11; A3B23C4D12; A3B23C4D13; A3B23C4D14; A3B23C4D15; A3B23C4D16; A3B23C4D17; A3B23C4D18; A3B23C4D19; A3B23C4D20; A3B23C4D21; A3B23C4D21; A3B23C4D22; A3B23C4D23; A3B23C4D24; A3B23C4D25;
A3B23C5; A3B23C5D1; A3B23C5D2; A3B23C5D3; A3B23C5D4; A3B23C5D5; A3B23C5D6; A3B23C5D7; A3B23C5D8; A3B23C5D9; A3B23C5D10; A3B23C5D11; A3B23C5D12; A3B23C5D13; A3B23C5D14; A3B23C5D15; A3B23C5D16; A3B23C5D17; A3B23C5D18; A3B23C5D19; A3B23C5D20; A3B23C5D21; A3B23C5D21; A3B23C5D22; A3B23C5D23; A3B23C5D24; A3B23C5D25;
A3B23C6; A3B23C6D1; A3B23C6D2; A3B23C6D3; A3B23C6D4; A3B23C6D5; A3B23C6D6; A3B23C6D7; A3B23C6D8; A3B23C6D9; A3B23C6D10; A3B23C6D11; A3B23C6D12;

A3B23C6D13; A3B23C6D14; A3B23C6D15; A3B23C6D16; A3B23C6D17; A3B23C6D18; A3B23C6D19; A3B23C6D20; A3B23C6D21; A3B23C6D21; A3B23C6D22; A3B23C6D23; A3B23C6D24; A3B23C6D25;

A3B23C7; A3B23C7D1; A3B23C7D2; A3B23C7D3; A3B23C7D4; A3B23C7D5; A3B23C7D6; A3B23C7D7; A3B23C7D8; A3B23C7D9; A3B23C7D10; A3B23C7D11; A3B23C7D12; A3B23C7D13; A3B23C7D14; A3B23C7D15; A3B23C7D16; A3B23C7D17; A3B23C7D18; A3B23C7D19; A3B23C7D20; A3B23C7D21; A3B23C7D21; A3B23C7D22; A3B23C7D23; A3B23C7D24; A3B23C7D25;

A3B23C8; A3B23C8D1; A3B23C8D2; A3B23C8D3; A3B23C8D4; A3B23C8D5; A3B23C8D6; A3B23C8D7; A3B23C8D8; A3B23C8D9; A3B23C8D10; A3B23C8D11; A3B23C8D12; A3B23C8D13; A3B23C8D14; A3B23C8D15; A3B23C8D16; A3B23C8D17; A3B23C8D18; A3B23C8D19; A3B23C8D20; A3B23C8D21; A3B23C8D21; A3B23C8D22; A3B23C8D23; A3B23C8D24; A3B23C8D25;

A3B23C9; A3B23C9D1; A3B23C9D2; A3B23C9D3; A3B23C9D4; A3B23C9D5; A3B23C9D6; A3B23C9D7; A3B23C9D8; A3B23C9D9; A3B23C9D10; A3B23C9D11; A3B23C9D12; A3B23C9D13; A3B23C9D14; A3B23C9D15; A3B23C9D16; A3B23C9D17; A3B23C9D18; A3B23C9D19; A3B23C9D20; A3B23C9D21; A3B23C9D21; A3B23C9D22; A3B23C9D23; A3B23C9D24; A3B23C9D25;

A3B23C10; A3B23C10D1; A3B23C10D2; A3B23C10D3; A3B23C10D4; A3B23C10D5; A3B23C10D6; A3B23C10D7; A3B23C10D8; A3B23C10D9; A3B23C10D10; A3B23C10D11; A3B23C10D12; A3B23C10D13; A3B23C10D14; A3B23C10D15; A3B23C10D16; A3B23C10D17; A3B23C10D18; A3B23C10D19; A3B23C10D20; A3B23C10D21; A3B23C10D21; A3B23C10D22; A3B23C10D23; A3B23C10D24; A3B23C10D25;

A3B23C11; A3B23C11D1; A3B23C11D2; A3B23C11D3; A3B23C11D4; A3B23C11D5; A3B23C11D6; A3B23C11D7; A3B23C11D8; A3B23C11D9; A3B23C11D10; A3B23C11D11; A3B23C11D12; A3B23C11D13; A3B23C11D14; A3B23C11D15; A3B23C11D16; A3B23C11D17; A3B23C11D18; A3B23C11D19; A3B23C11D20; A3B23C11D21; A3B23C11D21; A3B23C11D22; A3B23C11D23; A3B23C11D24; A3B23C11D25;

A3B23C12; A3B23C12D1; A3B23C12D2; A3B23C12D3; A3B23C12D4; A3B23C12D5; A3B23C12D6; A3B23C12D7; A3B23C12D8; A3B23C12D9; A3B23C12D10; A3B23C12D11; A3B23C12D12; A3B23C12D13; A3B23C12D14; A3B23C12D15; A3B23C12D16; A3B23C12D17; A3B23C12D18; A3B23C12D19; A3B23C12D20; A3B23C12D21; A3B23C12D21; A3B23C12D22; A3B23C12D23; A3B23C12D24; A3B23C12D25;

A3B23C13; A3B23C13D1; A3B23C13D2; A3B23C13D3; A3B23C13D4; A3B23C13D5; A3B23C13D6; A3B23C13D7; A3B23C13D8; A3B23C13D9; A3B23C13D10; A3B23C13D11; A3B23C13D12; A3B23C13D13; A3B23C13D14; A3B23C13D15; A3B23C13D16; A3B23C13D17; A3B23C13D18; A3B23C13D19; A3B23C13D20; A3B23C13D21; A3B23C13D21; A3B23C13D22; A3B23C13D23; A3B23C13D24; A3B23C13D25;

A3B23C14; A3B23C14D1; A3B23C14D2; A3B23C14D3; A3B23C14D4; A3B23C14D5; A3B23C14D6; A3B23C14D7; A3B23C14D8; A3B23C14D9; A3B23C14D10; A3B23C14D11; A3B23C14D12; A3B23C14D13; A3B23C14D14; A3B23C14D15; A3B23C14D16; A3B23C14D17; A3B23C14D18; A3B23C14D19; A3B23C14D20; A3B23C14D21; A3B23C14D21; A3B23C14D22; A3B23C14D23; A3B23C14D24; A3B23C14D25;

A3B23C15; A3B23C15D1; A3B23C15D2; A3B23C15D3; A3B23C15D4; A3B23C15D5; A3B23C15D6; A3B23C15D7; A3B23C15D8; A3B23C15D9; A3B23C15D10; A3B23C15D11; A3B23C15D12; A3B23C15D13; A3B23C15D14; A3B23C15D15; A3B23C15D16; A3B23C15D17; A3B23C15D18; A3B23C15D19; A3B23C15D20; A3B23C15D21; A3B23C15D21; A3B23C15D22; A3B23C15D23; A3B23C15D24; A3B23C15D25;

A3B23C16; A3B23C16D1; A3B23C16D2; A3B23C16D3; A3B23C16D4; A3B23C16D5; A3B23C16D6; A3B23C16D7; A3B23C16D8; A3B23C16D9; A3B23C16D10; A3B23C16D11; A3B23C16D12; A3B23C16D13; A3B23C16D14; A3B23C16D15; A3B23C16D16; A3B23C16D17; A3B23C16D18; A3B23C16D19; A3B23C16D20; A3B23C16D21; A3B23C16D21; A3B23C16D22; A3B23C16D23; A3B23C16D24; A3B23C16D25;

A3B23C17; A3B23C17D1; A3B23C17D2; A3B23C17D3; A3B23C17D4; A3B23C17D5; A3B23C17D6; A3B23C17D7; A3B23C17D8; A3B23C17D9; A3B23C17D10; A3B23C17D11; A3B23C17D12; A3B23C17D13; A3B23C17D14; A3B23C17D15; A3B23C17D16; A3B23C17D17; A3B23C17D18; A3B23C17D19; A3B23C17D20; A3B23C17D21; A3B23C17D21; A3B23C17D22; A3B23C17D23; A3B23C17D24; A3B23C17D25;

A3B23C18; A3B23C18D1; A3B23C18D2; A3B23C18D3; A3B23C18D4; A3B23C18D5; A3B23C18D6; A3B23C18D7; A3B23C18D8; A3B23C18D9; A3B23C18D10; A3B23C18D11; A3B23C18D12; A3B23C18D13; A3B23C18D14; A3B23C18D15; A3B23C18D16; A3B23C18D17; A3B23C18D18; A3B23C18D19; A3B23C18D20; A3B23C18D21; A3B23C18D21; A3B23C18D22; A3B23C18D23; A3B23C18D24; A3B23C18D25;

A3B23C19; A3B23C19D1; A3B23C19D2; A3B23C19D3; A3B23C19D4; A3B23C19D5; A3B23C19D6; A3B23C19D7; A3B23C19D8; A3B23C19D9; A3B23C19D10; A3B23C19D11; A3B23C19D12; A3B23C19D13; A3B23C19D14; A3B23C19D15; A3B23C19D16; A3B23C19D17; A3B23C19D18; A3B23C19D19; A3B23C19D20; A3B23C19D21; A3B23C19D21; A3B23C19D22; A3B23C19D23; A3B23C19D24; A3B23C19D25;

A3B23C20; A3B23C20D1; A3B23C20D2; A3B23C20D3; A3B23C20D4; A3B23C20D5; A3B23C20D6; A3B23C20D7; A3B23C20D8; A3B23C20D9; A3B23C20D10; A3B23C20D11; A3B23C20D12; A3B23C20D13; A3B23C20D14; A3B23C20D15; A3B23C20D16; A3B23C20D17; A3B23C20D18; A3B23C20D19; A3B23C20D20; A3B23C20D21; A3B23C20D21; A3B23C20D22; A3B23C20D23; A3B23C20D24; A3B23C20D25;

In an embodiment, the preferred fungicide A is chlorothalonil (A4).

In a preferred embodiment, the preferred fungicide A is chlorothalonil (A4) and the preferred fungicide B is isopyrazam (B1).

A4B1C1; A4B1C1D1; A4B1C1D2; A4B1C1D3; A4B1C1D4; A4B1C1D5; A4B1C1D6; A4B1C1D7; A4B1C1D8; A4B1C1D9; A4B1C1D10; A4B1C1D11; A4B1C1D12; A4B1C1D13; A4B1C1D14; A4B1C1D15; A4B1C1D16; A4B1C1D17; A4B1C1D18; A4B1C1D19; A4B1C1D20; A4B1C1D21; A4B1C1D21; A4B1C1D22; A4B1C1D23; A4B1C1D24; A4B1C1D25;

A4B1C2; A4B1C2D1; A4B1C2D2; A4B1C2D3; A4B1C2D4; A4B1C2D5; A4B1C2D6; A4B1C2D7; A4B1C2D8; A4B1C2D9; A4B1C2D10; A4B1C2D11; A4B1C2D12; A4B1C2D13; A4B1C2D14; A4B1C2D15; A4B1C2D16; A4B1C2D17; A4B1C2D18; A4B1C2D19; A4B1C2D20; A4B1C2D21; A4B1C2D21; A4B1C2D22; A4B1C2D23; A4B1C2D24; A4B1C2D25;

A4B1C3; A4B1C3D1; A4B1C3D2; A4B1C3D3; A4B1C3D4; A4B1C3D5; A4B1C3D6; A4B1C3D7; A4B1C3D8; A4B1C3D9; A4B1C3D10; A4B1C3D11; A4B1C3D12; A4B1C3D13; A4B1C3D14; A4B1C3D15; A4B1C3D16; A4B1C3D17; A4B1C3D18; A4B1C3D19; A4B1C3D20; A4B1C3D21; A4B1C3D21; A4B1C3D22; A4B1C3D23; A4B1C3D24; A4B1C3D25;

A4B1C4; A4B1C4D1; A4B1C4D2; A4B1C4D3; A4B1C4D4; A4B1C4D5; A4B1C4D6; A4B1C4D7; A4B1C4D8; A4B1C4D9; A4B1C4D10; A4B1C4D11; A4B1C4D12; A4B1C4D13; A4B1C4D14; A4B1C4D15; A4B1C4D16; A4B1C4D17; A4B1C4D18; A4B1C4D19; A4B1C4D20; A4B1C4D21; A4B1C4D21; A4B1C4D22; A4B1C4D23; A4B1C4D24; A4B1C4D25;

A4B1C5; A4B1C5D1; A4B1C5D2; A4B1C5D3; A4B1C5D4; A4B1C5D5; A4B1C5D6; A4B1C5D7; A4B1C5D8; A4B1C5D9; A4B1C5D10; A4B1C5D11; A4B1C5D12; A4B1C5D13; A4B1C5D14; A4B1C5D15; A4B1C5D16; A4B1C5D17; A4B1C5D18; A4B1C5D19; A4B1C5D20; A4B1C5D21; A4B1C5D21; A4B1C5D22; A4B1C5D23; A4B1C5D24; A4B1C5D25;

A4B1C6; A4B1C6D1; A4B1C6D2; A4B1C6D3; A4B1C6D4; A4B1C6D5; A4B1C6D6; A4B1C6D7; A4B1C6D8; A4B1C6D9; A4B1C6D10; A4B1C6D11; A4B1C6D12; A4B1C6D13; A4B1C6D14; A4B1C6D15; A4B1C6D16; A4B1C6D17; A4B1C6D18; A4B1C6D19; A4B1C6D20; A4B1C6D21; A4B1C6D21; A4B1C6D22; A4B1C6D23; A4B1C6D24; A4B1C6D25;

A4B1C7; A4B1C7D1; A4B1C7D2; A4B1C7D3; A4B1C7D4; A4B1C7D5; A4B1C7D6; A4B1C7D7; A4B1C7D8; A4B1C7D9; A4B1C7D10; A4B1C7D11; A4B1C7D12; A4B1C7D13; A4B1C7D14; A4B1C7D15; A4B1C7D16; A4B1C7D17; A4B1C7D18; A4B1C7D19; A4B1C7D20; A4B1C7D21; A4B1C7D21; A4B1C7D22; A4B1C7D23; A4B1C7D24; A4B1C7D25;

A4B1C8; A4B1C8D1; A4B1C8D2; A4B1C8D3; A4B1C8D4; A4B1C8D5; A4B1C8D6; A4B1C8D7; A4B1C8D8; A4B1C8D9; A4B1C8D10; A4B1C8D11; A4B1C8D12; A4B1C8D13; A4B1C8D14; A4B1C8D15; A4B1C8D16; A4B1C8D17; A4B1C8D18; A4B1C8D19; A4B1C8D20; A4B1C8D21; A4B1C8D21; A4B1C8D22; A4B1C8D23; A4B1C8D24; A4B1C8D25;

A4B1C9; A4B1C9D1; A4B1C9D2; A4B1C9D3; A4B1C9D4; A4B1C9D5; A4B1C9D6; A4B1C9D7; A4B1C9D8; A4B1C9D9; A4B1C9D10; A4B1C9D11; A4B1C9D12; A4B1C9D13; A4B1C9D14; A4B1C9D15; A4B1C9D16; A4B1C9D17; A4B1C9D18; A4B1C9D19; A4B1C9D20; A4B1C9D21; A4B1C9D21; A4B1C9D22; A4B1C9D23; A4B1C9D24; A4B1C9D25;

A4B1C10; A4B1C10D1; A4B1C10D2; A4B1C10D3; A4B1C10D4; A4B1C10D5; A4B1C10D6; A4B1C10D7; A4B1C10D8; A4B1C10D9; A4B1C10D10; A4B1C10D11; A4B1C10D12; A4B1C10D13; A4B1C10D14; A4B1C10D15; A4B1C10D16; A4B1C10D17; A4B1C10D18; A4B1C10D19; A4B1C10D20; A4B1C10D21; A4B1C10D21; A4B1C10D22; A4B1C10D23; A4B1C10D24; A4B1C10D25;

A4B1C11; A4B1C11D1; A4B1C11D2; A4B1C11D3; A4B1C11D4; A4B1C11D5; A4B1C11D6; A4B1C11D7; A4B1C11D8; A4B1C11D9; A4B1C11D10; A4B1C11D11; A4B1C11D12; A4B1C11D13; A4B1C11D14; A4B1C11D15; A4B1C11D16; A4B1C11D17; A4B1C11D18; A4B1C11D19; A4B1C11D20; A4B1C11D21; A4B1C11D21; A4B1C11D22; A4B1C11D23; A4B1C11D24; A4B1C11D25;

A4B1C12; A4B1C12D1; A4B1C12D2; A4B1C12D3; A4B1C12D4; A4B1C12D5; A4B1C12D6; A4B1C12D7; A4B1C12D8; A4B1C12D9; A4B1C12D10; A4B1C12D11; A4B1C12D12; A4B1C12D13; A4B1C12D14; A4B1C12D15; A4B1C12D16; A4B1C12D17; A4B1C12D18; A4B1C12D19; A4B1C12D20; A4B1C12D21; A4B1C12D21; A4B1C12D22; A4B1C12D23; A4B1C12D24; A4B1C12D25;

A4B1C13; A4B1C13D1; A4B1C13D2; A4B1C13D3; A4B1C13D4; A4B1C13D5; A4B1C13D6; A4B1C13D7; A4B1C13D8; A4B1C13D9; A4B1C13D10; A4B1C13D11; A4B1C13D12; A4B1C13D13; A4B1C13D14; A4B1C13D15; A4B1C13D16; A4B1C13D17; A4B1C13D18; A4B1C13D19; A4B1C13D20; A4B1C13D21; A4B1C13D21; A4B1C13D22; A4B1C13D23; A4B1C13D24; A4B1C13D25;

A4B1C14; A4B1C14D1; A4B1C14D2; A4B1C14D3; A4B1C14D4; A4B1C14D5; A4B1C14D6; A4B1C14D7; A4B1C14D8; A4B1C14D9; A4B1C14D10; A4B1C14D11; A4B1C14D12; A4B1C14D13; A4B1C14D14; A4B1C14D15; A4B1C14D16; A4B1C14D17; A4B1C14D18; A4B1C14D19; A4B1C14D20; A4B1C14D21; A4B1C14D21; A4B1C14D22; A4B1C14D23; A4B1C14D24; A4B1C14D25;

A4B1C15; A4B1C15D1; A4B1C15D2; A4B1C15D3; A4B1C15D4; A4B1C15D5; A4B1C15D6; A4B1C15D7; A4B1C15D8; A4B1C15D9; A4B1C15D10; A4B1C15D11; A4B1C15D12; A4B1C15D13; A4B1C15D14; A4B1C15D15; A4B1C15D16; A4B1C15D17; A4B1C15D18; A4B1C15D19; A4B1C15D20; A4B1C15D21; A4B1C15D21; A4B1C15D22; A4B1C15D23; A4B1C15D24; A4B1C15D25;

A4B1C16; A4B1C16D1; A4B1C16D2; A4B1C16D3; A4B1C16D4; A4B1C16D5; A4B1C16D6; A4B1C16D7; A4B1C16D8; A4B1C16D9; A4B1C16D10; A4B1C16D11; A4B1C16D12; A4B1C16D13; A4B1C16D14; A4B1C16D15;

A4B1C16D16; A4B1C16D17; A4B1C16D18; A4B1C16D19; A4B1C16D20; A4B1C16D21; A4B1C16D21; A4B1C16D22; A4B1C16D23; A4B1C16D24; A4B1C16D25;
A4B1C17; A4B1C17D1; A4B1C17D2; A4B1C17D3; A4B1C17D4; A4B1C17D5; A4B1C17D6; A4B1C17D7; A4B1C17D8; A4B1C17D9; A4B1C17D10; A4B1C17D11; A4B1C17D12; A4B1C17D13; A4B1C17D14; A4B1C17D15; A4B1C17D16; A4B1C17D17; A4B1C17D18; A4B1C17D19; A4B1C17D20; A4B1C17D21; A4B1C17D21; A4B1C17D22; A4B1C17D23; A4B1C17D24; A4B1C17D25;
A4B1C18; A4B1C18D1; A4B1C18D2; A4B1C18D3; A4B1C18D4; A4B1C18D5; A4B1C18D6; A4B1C18D7; A4B1C18D8; A4B1C18D9; A4B1C18D10; A4B1C18D11; A4B1C18D12; A4B1C18D13; A4B1C18D14; A4B1C18D15; A4B1C18D16; A4B1C18D17; A4B1C18D18; A4B1C18D19; A4B1C18D20; A4B1C18D21; A4B1C18D21; A4B1C18D22; A4B1C18D23; A4B1C18D24; A4B1C18D25;
A4B1C19; A4B1C19D1; A4B1C19D2; A4B1C19D3; A4B1C19D4; A4B1C19D5; A4B1C19D6; A4B1C19D7; A4B1C19D8; A4B1C19D9; A4B1C19D10; A4B1C19D11; A4B1C19D12; A4B1C19D13; A4B1C19D14; A4B1C19D15; A4B1C19D16; A4B1C19D17; A4B1C19D18; A4B1C19D19; A4B1C19D20; A4B1C19D21; A4B1C19D21; A4B1C19D22; A4B1C19D23; A4B1C19D24; A4B1C19D25;
A4B1C20; A4B1C20D1; A4B1C20D2; A4B1C20D3; A4B1C20D4; A4B1C20D5; A4B1C20D6; A4B1C20D7; A4B1C20D8; A4B1C20D9; A4B1C20D10; A4B1C20D11; A4B1C20D12; A4B1C20D13; A4B1C20D14; A4B1C20D15; A4B1C20D16; A4B1C20D17; A4B1C20D18; A4B1C20D19; A4B1C20D20; A4B1C20D21; A4B1C20D21; A4B1C20D22; A4B1C20D23; A4B1C20D24; A4B1C20D25.

In a preferred embodiment, the preferred fungicide A is chlorothalonil (A4) and the preferred fungicide B is benzovindiflupyr (B2).

A4B2C1; A4B2C1D1; A4B2C1D2; A4B2C1D3; A4B2C1D4; A4B2C1D5; A4B2C1D6; A4B2C1D7; A4B2C1D8; A4B2C1D9; A4B2C1D10; A4B2C1D11; A4B2C1D12; A4B2C1D13; A4B2C1D14; A4B2C1D15; A4B2C1D16; A4B2C1D17; A4B2C1D18; A4B2C1D19; A4B2C1D20; A4B2C1D21; A4B2C1D21; A4B2C1D22; A4B2C1D23; A4B2C1D24; A4B2C1D25;
A4B2C2; A4B2C2D1; A4B2C2D2; A4B2C2D3; A4B2C2D4; A4B2C2D5; A4B2C2D6; A4B2C2D7; A4B2C2D8; A4B2C2D9; A4B2C2D10; A4B2C2D11; A4B2C2D12; A4B2C2D13; A4B2C2D14; A4B2C2D15; A4B2C2D16; A4B2C2D17; A4B2C2D18; A4B2C2D19; A4B2C2D20; A4B2C2D21; A4B2C2D21; A4B2C2D22; A4B2C2D23; A4B2C2D24; A4B2C2D25;
A4B2C3; A4B2C3D1; A4B2C3D2; A4B2C3D3; A4B2C3D4; A4B2C3D5; A4B2C3D6; A4B2C3D7; A4B2C3D8; A4B2C3D9; A4B2C3D10; A4B2C3D11; A4B2C3D12; A4B2C3D13; A4B2C3D14; A4B2C3D15; A4B2C3D16; A4B2C3D17; A4B2C3D18; A4B2C3D19; A4B2C3D20; A4B2C3D21; A4B2C3D21; A4B2C3D22; A4B2C3D23; A4B2C3D24; A4B2C3D25;
A4B2C4; A4B2C4D1; A4B2C4D2; A4B2C4D3; A4B2C4D4; A4B2C4D5; A4B2C4D6; A4B2C4D7; A4B2C4D8; A4B2C4D9; A4B2C4D10; A4B2C4D11; A4B2C4D12; A4B2C4D13; A4B2C4D14; A4B2C4D15; A4B2C4D16; A4B2C4D17; A4B2C4D18; A4B2C4D19; A4B2C4D20; A4B2C4D21; A4B2C4D21; A4B2C4D22; A4B2C4D23; A4B2C4D24; A4B2C4D25;
A4B2C5; A4B2C5D1; A4B2C5D2; A4B2C5D3; A4B2C5D4; A4B2C5D5; A4B2C5D6; A4B2C5D7; A4B2C5D8; A4B2C5D9; A4B2C5D10; A4B2C5D11; A4B2C5D12; A4B2C5D13; A4B2C5D14; A4B2C5D15; A4B2C5D16; A4B2C5D17; A4B2C5D18; A4B2C5D19; A4B2C5D20; A4B2C5D21; A4B2C5D21; A4B2C5D22; A4B2C5D23; A4B2C5D24; A4B2C5D25;
A4B2C6; A4B2C6D1; A4B2C6D2; A4B2C6D3; A4B2C6D4; A4B2C6D5; A4B2C6D6; A4B2C6D7; A4B2C6D8; A4B2C6D9; A4B2C6D10; A4B2C6D11; A4B2C6D12; A4B2C6D13; A4B2C6D14; A4B2C6D15; A4B2C6D16; A4B2C6D17; A4B2C6D18; A4B2C6D19; A4B2C6D20; A4B2C6D21; A4B2C6D21; A4B2C6D22; A4B2C6D23; A4B2C6D24; A4B2C6D25;
A4B2C7; A4B2C7D1; A4B2C7D2; A4B2C7D3; A4B2C7D4; A4B2C7D5; A4B2C7D6; A4B2C7D7; A4B2C7D8; A4B2C7D9; A4B2C7D10; A4B2C7D11; A4B2C7D12; A4B2C7D13; A4B2C7D14; A4B2C7D15; A4B2C7D16; A4B2C7D17; A4B2C7D18; A4B2C7D19; A4B2C7D20; A4B2C7D21; A4B2C7D21; A4B2C7D22; A4B2C7D23; A4B2C7D24; A4B2C7D25;
A4B2C8; A4B2C8D1; A4B2C8D2; A4B2C8D3; A4B2C8D4; A4B2C8D5; A4B2C8D6; A4B2C8D7; A4B2C8D8; A4B2C8D9; A4B2C8D10; A4B2C8D11; A4B2C8D12; A4B2C8D13; A4B2C8D14; A4B2C8D15; A4B2C8D16; A4B2C8D17; A4B2C8D18; A4B2C8D19; A4B2C8D20; A4B2C8D21; A4B2C8D21; A4B2C8D22; A4B2C8D23; A4B2C8D24; A4B2C8D25;
A4B2C9; A4B2C9D1; A4B2C9D2; A4B2C9D3; A4B2C9D4; A4B2C9D5; A4B2C9D6; A4B2C9D7; A4B2C9D8; A4B2C9D9; A4B2C9D10; A4B2C9D11; A4B2C9D12; A4B2C9D13; A4B2C9D14; A4B2C9D15; A4B2C9D16; A4B2C9D17; A4B2C9D18; A4B2C9D19; A4B2C9D20; A4B2C9D21; A4B2C9D21; A4B2C9D22; A4B2C9D23; A4B2C9D24; A4B2C9D25;
A4B2C10; A4B2C10D1; A4B2C10D2; A4B2C10D3; A4B2C10D4; A4B2C10D5; A4B2C10D6; A4B2C10D7; A4B2C10D8; A4B2C10D9; A4B2C10D10; A4B2C10D11; A4B2C10D12; A4B2C10D13; A4B2C10D14; A4B2C10D15; A4B2C10D16; A4B2C10D17; A4B2C10D18; A4B2C10D19; A4B2C10D20; A4B2C10D21; A4B2C10D21; A4B2C10D22; A4B2C10D23; A4B2C10D24; A4B2C10D25;
A4B2C11; A4B2C11D1; A4B2C11D2; A4B2C11D3; A4B2C11D4; A4B2C11D5; A4B2C11D6; A4B2C11D7; A4B2C11D8; A4B2C11D9; A4B2C11D10; A4B2C11D11; A4B2C11D12; A4B2C11D13; A4B2C11D14; A4B2C11D15; A4B2C11D16; A4B2C11D17; A4B2C11D18; A4B2C11D19; A4B2C11D20; A4B2C11D21; A4B2C11D21; A4B2C11D22; A4B2C11D23; A4B2C11D24; A4B2C11D25;

A4B2C12; A4B2C12D1; A4B2C12D2; A4B2C12D3; A4B2C12D4; A4B2C12D5; A4B2C12D6; A4B2C12D7; A4B2C12D8; A4B2C12D9; A4B2C12D10; A4B2C12D11; A4B2C12D12; A4B2C12D13; A4B2C12D14; A4B2C12D15; A4B2C12D16; A4B2C12D17; A4B2C12D18; A4B2C12D19; A4B2C12D20; A4B2C12D21; A4B2C12D21; A4B2C12D22; A4B2C12D23; A4B2C12D24; A4B2C12D25;

A4B2C13; A4B2C13D1; A4B2C13D2; A4B2C13D3; A4B2C13D4; A4B2C13D5; A4B2C13D6; A4B2C13D7; A4B2C13D8; A4B2C13D9; A4B2C13D10; A4B2C13D11; A4B2C13D12; A4B2C13D13; A4B2C13D14; A4B2C13D15; A4B2C13D16; A4B2C13D17; A4B2C13D18; A4B2C13D19; A4B2C13D20; A4B2C13D21; A4B2C13D21; A4B2C13D22; A4B2C13D23; A4B2C13D24; A4B2C13D25;

A4B2C14; A4B2C14D1; A4B2C14D2; A4B2C14D3; A4B2C14D4; A4B2C14D5; A4B2C14D6; A4B2C14D7; A4B2C14D8; A4B2C14D9; A4B2C14D10; A4B2C14D11; A4B2C14D12; A4B2C14D13; A4B2C14D14; A4B2C14D15; A4B2C14D16; A4B2C14D17; A4B2C14D18; A4B2C14D19; A4B2C14D20; A4B2C14D21; A4B2C14D21; A4B2C14D22; A4B2C14D23; A4B2C14D24; A4B2C14D25;

A4B2C15; A4B2C15D1; A4B2C15D2; A4B2C15D3; A4B2C15D4; A4B2C15D5; A4B2C15D6; A4B2C15D7; A4B2C15D8; A4B2C15D9; A4B2C15D10; A4B2C15D11; A4B2C15D12; A4B2C15D13; A4B2C15D14; A4B2C15D15; A4B2C15D16; A4B2C15D17; A4B2C15D18; A4B2C15D19; A4B2C15D20; A4B2C15D21; A4B2C15D21; A4B2C15D22; A4B2C15D23; A4B2C15D24; A4B2C15D25;

A4B2C16; A4B2C16D1; A4B2C16D2; A4B2C16D3; A4B2C16D4; A4B2C16D5; A4B2C16D6; A4B2C16D7; A4B2C16D8; A4B2C16D9; A4B2C16D10; A4B2C16D11; A4B2C16D12; A4B2C16D13; A4B2C16D14; A4B2C16D15; A4B2C16D16; A4B2C16D17; A4B2C16D18; A4B2C16D19; A4B2C16D20; A4B2C16D21; A4B2C16D21; A4B2C16D22; A4B2C16D23; A4B2C16D24; A4B2C16D25;

A4B2C17; A4B2C17D1; A4B2C17D2; A4B2C17D3; A4B2C17D4; A4B2C17D5; A4B2C17D6; A4B2C17D7; A4B2C17D8; A4B2C17D9; A4B2C17D10; A4B2C17D11; A4B2C17D12; A4B2C17D13; A4B2C17D14; A4B2C17D15; A4B2C17D16; A4B2C17D17; A4B2C17D18; A4B2C17D19; A4B2C17D20; A4B2C17D21; A4B2C17D21; A4B2C17D22; A4B2C17D23; A4B2C17D24; A4B2C17D25;

A4B2C18; A4B2C18D1; A4B2C18D2; A4B2C18D3; A4B2C18D4; A4B2C18D5; A4B2C18D6; A4B2C18D7; A4B2C18D8; A4B2C18D9; A4B2C18D10; A4B2C18D11; A4B2C18D12; A4B2C18D13; A4B2C18D14; A4B2C18D15; A4B2C18D16; A4B2C18D17; A4B2C18D18; A4B2C18D19; A4B2C18D20; A4B2C18D21; A4B2C18D21; A4B2C18D22; A4B2C18D23; A4B2C18D24; A4B2C18D25;

A4B2C19; A4B2C19D1; A4B2C19D2; A4B2C19D3; A4B2C19D4; A4B2C19D5; A4B2C19D6; A4B2C19D7; A4B2C19D8; A4B2C19D9; A4B2C19D10; A4B2C19D11; A4B2C19D12; A4B2C19D13; A4B2C19D14; A4B2C19D15; A4B2C19D16; A4B2C19D17; A4B2C19D18; A4B2C19D19; A4B2C19D20; A4B2C19D21; A4B2C19D21; A4B2C19D22; A4B2C19D23; A4B2C19D24; A4B2C19D25;

A4B2C20; A4B2C20D1; A4B2C20D2; A4B2C20D3; A4B2C20D4; A4B2C20D5; A4B2C20D6; A4B2C20D7; A4B2C20D8; A4B2C20D9; A4B2C20D10; A4B2C20D11; A4B2C20D12; A4B2C20D13; A4B2C20D14; A4B2C20D15; A4B2C20D16; A4B2C20D17; A4B2C20D18; A4B2C20D19; A4B2C20D20; A4B2C20D21; A4B2C20D21; A4B2C20D22; A4B2C20D23; A4B2C20D24; A4B2C20D25.

In an embodiment, the preferred fungicide A is chlorothalonil (A4), and the preferred fungicide B is penthiopyrad (B3).

A4B3C1; A4B3C1D1; A4B3C1D2; A4B3C1D3; A4B3C1D4; A4B3C1D5; A4B3C1D6; A4B3C1D7; A4B3C1D8; A4B3C1D9; A4B3C1D10; A4B3C1D11; A4B3C1D12; A4B3C1D13; A4B3C1D14; A4B3C1D15; A4B3C1D16; A4B3C1D17; A4B3C1D18; A4B3C1D19; A4B3C1D20; A4B3C1D21; A4B3C1D21; A4B3C1D22; A4B3C1D23; A4B3C1D24; A4B3C1D25;

A4B3C2; A4B3C2D1; A4B3C2D2; A4B3C2D3; A4B3C2D4; A4B3C2D5; A4B3C2D6; A4B3C2D7; A4B3C2D8; A4B3C2D9; A4B3C2D10; A4B3C2D11; A4B3C2D12; A4B3C2D13; A4B3C2D14; A4B3C2D15; A4B3C2D16; A4B3C2D17; A4B3C2D18; A4B3C2D19; A4B3C2D20; A4B3C2D21; A4B3C2D21; A4B3C2D22; A4B3C2D23; A4B3C2D24; A4B3C2D25;

A4B3C3; A4B3C3D1; A4B3C3D2; A4B3C3D3; A4B3C3D4; A4B3C3D5; A4B3C3D6; A4B3C3D7; A4B3C3D8; A4B3C3D9; A4B3C3D10; A4B3C3D11; A4B3C3D12; A4B3C3D13; A4B3C3D14; A4B3C3D15; A4B3C3D16; A4B3C3D17; A4B3C3D18; A4B3C3D19; A4B3C3D20; A4B3C3D21; A4B3C3D21; A4B3C3D22; A4B3C3D23; A4B3C3D24; A4B3C3D25;

A4B3C4; A4B3C4D1; A4B3C4D2; A4B3C4D3; A4B3C4D4; A4B3C4D5; A4B3C4D6; A4B3C4D7; A4B3C4D8; A4B3C4D9; A4B3C4D10; A4B3C4D11; A4B3C4D12; A4B3C4D13; A4B3C4D14; A4B3C4D15; A4B3C4D16; A4B3C4D17; A4B3C4D18; A4B3C4D19; A4B3C4D20; A4B3C4D21; A4B3C4D21; A4B3C4D22; A4B3C4D23; A4B3C4D24; A4B3C4D25;

A4B3C5; A4B3C5D1; A4B3C5D2; A4B3C5D3; A4B3C5D4; A4B3C5D5; A4B3C5D6; A4B3C5D7; A4B3C5D8; A4B3C5D9; A4B3C5D10; A4B3C5D11; A4B3C5D12; A4B3C5D13; A4B3C5D14; A4B3C5D15; A4B3C5D16; A4B3C5D17; A4B3C5D18; A4B3C5D19; A4B3C5D20; A4B3C5D21; A4B3C5D21; A4B3C5D22; A4B3C5D23; A4B3C5D24; A4B3C5D25;

A4B3C6; A4B3C6D1; A4B3C6D2; A4B3C6D3; A4B3C6D4; A4B3C6D5; A4B3C6D6; A4B3C6D7; A4B3C6D8; A4B3C6D9; A4B3C6D10; A4B3C6D11; A4B3C6D12; A4B3C6D13; A4B3C6D14; A4B3C6D15; A4B3C6D16; A4B3C6D17; A4B3C6D18; A4B3C6D19; A4B3C6D20; A4B3C6D21; A4B3C6D21; A4B3C6D22; A4B3C6D23; A4B3C6D24; A4B3C6D25;

A4B3C7; A4B3C7D1; A4B3C7D2; A4B3C7D3; A4B3C7D4; A4B3C7D5; A4B3C7D6; A4B3C7D7;

A4B3C7D8; A4B3C7D9; A4B3C7D10; A4B3C7D11; A4B3C7D12; A4B3C7D13; A4B3C7D14; A4B3C7D15; A4B3C7D16; A4B3C7D17; A4B3C7D18; A4B3C7D19; A4B3C7D20; A4B3C7D21; A4B3C7D21; A4B3C7D22; A4B3C7D23; A4B3C7D24; A4B3C7D25;

A4B3C8; A4B3C8D1; A4B3C8D2; A4B3C8D3; A4B3C8D4; A4B3C8D5; A4B3C8D6; A4B3C8D7; A4B3C8D8; A4B3C8D9; A4B3C8D10; A4B3C8D11; A4B3C8D12; A4B3C8D13; A4B3C8D14; A4B3C8D15; A4B3C8D16; A4B3C8D17; A4B3C8D18; A4B3C8D19; A4B3C8D20; A4B3C8D21; A4B3C8D21; A4B3C8D22; A4B3C8D23; A4B3C8D24; A4B3C8D25;

A4B3C9; A4B3C9D1; A4B3C9D2; A4B3C9D3; A4B3C9D4; A4B3C9D5; A4B3C9D6; A4B3C9D7; A4B3C9D8; A4B3C9D9; A4B3C9D10; A4B3C9D11; A4B3C9D12; A4B3C9D13; A4B3C9D14; A4B3C9D15; A4B3C9D16; A4B3C9D17; A4B3C9D18; A4B3C9D19; A4B3C9D20; A4B3C9D21; A4B3C9D21; A4B3C9D22; A4B3C9D23; A4B3C9D24; A4B3C9D25;

A4B3C10; A4B3C10D1; A4B3C10D2; A4B3C10D3; A4B3C10D4; A4B3C10D5; A4B3C10D6; A4B3C10D7; A4B3C10D8; A4B3C10D9; A4B3C10D10; A4B3C10D11; A4B3C10D12; A4B3C10D13; A4B3C10D14; A4B3C10D15; A4B3C10D16; A4B3C10D17; A4B3C10D18; A4B3C10D19; A4B3C10D20; A4B3C10D21; A4B3C10D21; A4B3C10D22; A4B3C10D23; A4B3C10D24; A4B3C10D25;

A4B3C11; A4B3C11D1; A4B3C11D2; A4B3C11D3; A4B3C11D4; A4B3C11D5; A4B3C11D6; A4B3C11D7; A4B3C11D8; A4B3C11D9; A4B3C11D10; A4B3C11D11; A4B3C11D12; A4B3C11D13; A4B3C11D14; A4B3C11D15; A4B3C11D16; A4B3C11D17; A4B3C11D18; A4B3C11D19; A4B3C11D20; A4B3C11D21; A4B3C11D21; A4B3C11D22; A4B3C11D23; A4B3C11D24; A4B3C11D25;

A4B3C12; A4B3C12D1; A4B3C12D2; A4B3C12D3; A4B3C12D4; A4B3C12D5; A4B3C12D6; A4B3C12D7; A4B3C12D8; A4B3C12D9; A4B3C12D10; A4B3C12D11; A4B3C12D12; A4B3C12D13; A4B3C12D14; A4B3C12D15; A4B3C12D16; A4B3C12D17; A4B3C12D18; A4B3C12D19; A4B3C12D20; A4B3C12D21; A4B3C12D21; A4B3C12D22; A4B3C12D23; A4B3C12D24; A4B3C12D25;

A4B3C13; A4B3C13D1; A4B3C13D2; A4B3C13D3; A4B3C13D4; A4B3C13D5; A4B3C13D6; A4B3C13D7; A4B3C13D8; A4B3C13D9; A4B3C13D10; A4B3C13D11; A4B3C13D12; A4B3C13D13; A4B3C13D14; A4B3C13D15; A4B3C13D16; A4B3C13D17; A4B3C13D18; A4B3C13D19; A4B3C13D20; A4B3C13D21; A4B3C13D21; A4B3C13D22; A4B3C13D23; A4B3C13D24; A4B3C13D25;

A4B3C14; A4B3C14D1; A4B3C14D2; A4B3C14D3; A4B3C14D4; A4B3C14D5; A4B3C14D6; A4B3C14D7; A4B3C14D8; A4B3C14D9; A4B3C14D10; A4B3C14D11; A4B3C14D12; A4B3C14D13; A4B3C14D14; A4B3C14D15; A4B3C14D16; A4B3C14D17; A4B3C14D18; A4B3C14D19; A4B3C14D20; A4B3C14D21; A4B3C14D21; A4B3C14D22; A4B3C14D23; A4B3C14D24; A4B3C14D25;

A4B3C15; A4B3C15D1; A4B3C15D2; A4B3C15D3; A4B3C15D4; A4B3C15D5; A4B3C15D6; A4B3C15D7; A4B3C15D8; A4B3C15D9; A4B3C15D10; A4B3C15D11; A4B3C15D12; A4B3C15D13; A4B3C15D14; A4B3C15D15; A4B3C15D16; A4B3C15D17; A4B3C15D18; A4B3C15D19; A4B3C15D20; A4B3C15D21; A4B3C15D21; A4B3C15D22; A4B3C15D23; A4B3C15D24; A4B3C15D25;

A4B3C16; A4B3C16D1; A4B3C16D2; A4B3C16D3; A4B3C16D4; A4B3C16D5; A4B3C16D6; A4B3C16D7; A4B3C16D8; A4B3C16D9; A4B3C16D10; A4B3C16D11; A4B3C16D12; A4B3C16D13; A4B3C16D14; A4B3C16D15; A4B3C16D16; A4B3C16D17; A4B3C16D18; A4B3C16D19; A4B3C16D20; A4B3C16D21; A4B3C16D21; A4B3C16D22; A4B3C16D23; A4B3C16D24; A4B3C16D25;

A4B3C17; A4B3C17D1; A4B3C17D2; A4B3C17D3; A4B3C17D4; A4B3C17D5; A4B3C17D6; A4B3C17D7; A4B3C17D8; A4B3C17D9; A4B3C17D10; A4B3C17D11; A4B3C17D12; A4B3C17D13; A4B3C17D14; A4B3C17D15; A4B3C17D16; A4B3C17D17; A4B3C17D18; A4B3C17D19; A4B3C17D20; A4B3C17D21; A4B3C17D21; A4B3C17D22; A4B3C17D23; A4B3C17D24; A4B3C17D25;

A4B3C18; A4B3C18D1; A4B3C18D2; A4B3C18D3; A4B3C18D4; A4B3C18D5; A4B3C18D6; A4B3C18D7; A4B3C18D8; A4B3C18D9; A4B3C18D10; A4B3C18D11; A4B3C18D12; A4B3C18D13; A4B3C18D14; A4B3C18D15; A4B3C18D16; A4B3C18D17; A4B3C18D18; A4B3C18D19; A4B3C18D20; A4B3C18D21; A4B3C18D21; A4B3C18D22; A4B3C18D23; A4B3C18D24; A4B3C18D25;

A4B3C19; A4B3C19D1; A4B3C19D2; A4B3C19D3; A4B3C19D4; A4B3C19D5; A4B3C19D6; A4B3C19D7; A4B3C19D8; A4B3C19D9; A4B3C19D10; A4B3C19D11; A4B3C19D12; A4B3C19D13; A4B3C19D14; A4B3C19D15; A4B3C19D16; A4B3C19D17; A4B3C19D18; A4B3C19D19; A4B3C19D20; A4B3C19D21; A4B3C19D21; A4B3C19D22; A4B3C19D23; A4B3C19D24; A4B3C19D25;

A4B3C20; A4B3C20D1; A4B3C20D2; A4B3C20D3; A4B3C20D4; A4B3C20D5; A4B3C20D6; A4B3C20D7; A4B3C20D8; A4B3C20D9; A4B3C20D10; A4B3C20D11; A4B3C20D12; A4B3C20D13; A4B3C20D14; A4B3C20D15; A4B3C20D16; A4B3C20D17; A4B3C20D18; A4B3C20D19; A4B3C20D20; A4B3C20D21; A4B3C20D21; A4B3C20D22; A4B3C20D23; A4B3C20D24; A4B3C20D25.

In an embodiment, the preferred fungicide A is chlorothalonil (A4) and the preferred fungicide B is boscalid (B4).

A4B4C1; A4B4C1D1; A4B4C1D2; A4B4C1D3; A4B4C1D4; A4B4C1D5; A4B4C1D6; A4B4C1D7; A4B4C1D8; A4B4C1D9; A4B4C1D10; A4B4C1D11; A4B4C1D12; A4B4C1D13; A4B4C1D14; A4B4C1D15; A4B4C1D16; A4B4C1D17; A4B4C1D18; A4B4C1D19; A4B4C1D20; A4B4C1D21; A4B4C1D22; A4B4C1D23; A4B4C1D24; A4B4C1D25;

A4B4C2; A4B4C2D1; A4B4C2D2; A4B4C2D3; A4B4C2D4; A4B4C2D5; A4B4C2D6; A4B4C2D7; A4B4C2D8; A4B4C2D9; A4B4C2D10; A4B4C2D11;

A4B4C2D12; A4B4C2D13; A4B4C2D14; A4B4C2D15; A4B4C2D16; A4B4C2D17; A4B4C2D18; A4B4C2D19; A4B4C2D20; A4B4C2D21; A4B4C2D21; A4B4C2D22; A4B4C2D23; A4B4C2D24; A4B4C2D25;
A4B4C3; A4B4C3D1; A4B4C3D2; A4B4C3D3; A4B4C3D4; A4B4C3D5; A4B4C3D6; A4B4C3D7; A4B4C3D8; A4B4C3D9; A4B4C3D10; A4B4C3D11; A4B4C3D12; A4B4C3D13; A4B4C3D14; A4B4C3D15; A4B4C3D16; A4B4C3D17; A4B4C3D18; A4B4C3D19; A4B4C3D20; A4B4C3D21; A4B4C3D21; A4B4C3D22; A4B4C3D23; A4B4C3D24; A4B4C3D25;
A4B4C4; A4B4C4D1; A4B4C4D2; A4B4C4D3; A4B4C4D4; A4B4C4D5; A4B4C4D6; A4B4C4D7; A4B4C4D8; A4B4C4D9; A4B4C4D10; A4B4C4D11; A4B4C4D12; A4B4C4D13; A4B4C4D14; A4B4C4D15; A4B4C4D16; A4B4C4D17; A4B4C4D18; A4B4C4D19; A4B4C4D20; A4B4C4D21; A4B4C4D21; A4B4C4D22; A4B4C4D23; A4B4C4D24; A4B4C4D25;
A4B4C5; A4B4C5D1; A4B4C5D2; A4B4C5D3; A4B4C5D4; A4B4C5D5; A4B4C5D6; A4B4C5D7; A4B4C5D8; A4B4C5D9; A4B4C5D10; A4B4C5D11; A4B4C5D12; A4B4C5D13; A4B4C5D14; A4B4C5D15; A4B4C5D16; A4B4C5D17; A4B4C5D18; A4B4C5D19; A4B4C5D20; A4B4C5D21; A4B4C5D21; A4B4C5D22; A4B4C5D23; A4B4C5D24; A4B4C5D25;
A4B4C6; A4B4C6D1; A4B4C6D2; A4B4C6D3; A4B4C6D4; A4B4C6D5; A4B4C6D6; A4B4C6D7; A4B4C6D8; A4B4C6D9; A4B4C6D10; A4B4C6D11; A4B4C6D12; A4B4C6D13; A4B4C6D14; A4B4C6D15; A4B4C6D16; A4B4C6D17; A4B4C6D18; A4B4C6D19; A4B4C6D20; A4B4C6D21; A4B4C6D21; A4B4C6D22; A4B4C6D23; A4B4C6D24; A4B4C6D25;
A4B4C7; A4B4C7D1; A4B4C7D2; A4B4C7D3; A4B4C7D4; A4B4C7D5; A4B4C7D6; A4B4C7D7; A4B4C7D8; A4B4C7D9; A4B4C7D10; A4B4C7D11; A4B4C7D12; A4B4C7D13; A4B4C7D14; A4B4C7D15; A4B4C7D16; A4B4C7D17; A4B4C7D18; A4B4C7D19; A4B4C7D20; A4B4C7D21; A4B4C7D21; A4B4C7D22; A4B4C7D23; A4B4C7D24; A4B4C7D25;
A4B4C8; A4B4C8D1; A4B4C8D2; A4B4C8D3; A4B4C8D4; A4B4C8D5; A4B4C8D6; A4B4C8D7; A4B4C8D8; A4B4C8D9; A4B4C8D10; A4B4C8D11; A4B4C8D12; A4B4C8D13; A4B4C8D14; A4B4C8D15; A4B4C8D16; A4B4C8D17; A4B4C8D18; A4B4C8D19; A4B4C8D20; A4B4C8D21; A4B4C8D21; A4B4C8D22; A4B4C8D23; A4B4C8D24; A4B4C8D25;
A4B4C9; A4B4C9D1; A4B4C9D2; A4B4C9D3; A4B4C9D4; A4B4C9D5; A4B4C9D6; A4B4C9D7; A4B4C9D8; A4B4C9D9; A4B4C9D10; A4B4C9D11; A4B4C9D12; A4B4C9D13; A4B4C9D14; A4B4C9D15; A4B4C9D16; A4B4C9D17; A4B4C9D18; A4B4C9D19; A4B4C9D20; A4B4C9D21; A4B4C9D21; A4B4C9D22; A4B4C9D23; A4B4C9D24; A4B4C9D25;
A4B4C10; A4B4C10D1; A4B4C10D2; A4B4C10D3; A4B4C10D4; A4B4C10D5; A4B4C10D6; A4B4C10D7; A4B4C10D8; A4B4C10D9; A4B4C10D10; A4B4C10D11; A4B4C10D12; A4B4C10D13; A4B4C10D14; A4B4C10D15; A4B4C10D16; A4B4C10D17; A4B4C10D18; A4B4C10D19; A4B4C10D20; A4B4C10D21; A4B4C10D21; A4B4C10D22; A4B4C10D23; A4B4C10D24; A4B4C10D25;
A4B4C11; A4B4C11D1; A4B4C11D2; A4B4C11D3; A4B4C11D4; A4B4C11D5; A4B4C11D6; A4B4C11D7; A4B4C11D8; A4B4C11D9; A4B4C11D10; A4B4C11D11; A4B4C11D12; A4B4C11D13; A4B4C11D14; A4B4C11D15; A4B4C11D16; A4B4C11D17; A4B4C11D18; A4B4C11D19; A4B4C11D20; A4B4C11D21; A4B4C11D21; A4B4C11D22; A4B4C11D23; A4B4C11D24; A4B4C11D25;
A4B4C12; A4B4C12D1; A4B4C12D2; A4B4C12D3; A4B4C12D4; A4B4C12D5; A4B4C12D6; A4B4C12D7; A4B4C12D8; A4B4C12D9; A4B4C12D10; A4B4C12D11; A4B4C12D12; A4B4C12D13; A4B4C12D14; A4B4C12D15; A4B4C12D16; A4B4C12D17; A4B4C12D18; A4B4C12D19; A4B4C12D20; A4B4C12D21; A4B4C12D21; A4B4C12D22; A4B4C12D23; A4B4C12D24; A4B4C12D25;
A4B4C13; A4B4C13D1; A4B4C13D2; A4B4C13D3; A4B4C13D4; A4B4C13D5; A4B4C13D6; A4B4C13D7; A4B4C13D8; A4B4C13D9; A4B4C13D10; A4B4C13D11; A4B4C13D12; A4B4C13D13; A4B4C13D14; A4B4C13D15; A4B4C13D16; A4B4C13D17; A4B4C13D18; A4B4C13D19; A4B4C13D20; A4B4C13D21; A4B4C13D21; A4B4C13D22; A4B4C13D23; A4B4C13D24; A4B4C13D25;
A4B4C14; A4B4C14D1; A4B4C14D2; A4B4C14D3; A4B4C14D4; A4B4C14D5; A4B4C14D6; A4B4C14D7; A4B4C14D8; A4B4C14D9; A4B4C14D10; A4B4C14D11; A4B4C14D12; A4B4C14D13; A4B4C14D14; A4B4C14D15; A4B4C14D16; A4B4C14D17; A4B4C14D18; A4B4C14D19; A4B4C14D20; A4B4C14D21; A4B4C14D21; A4B4C14D22; A4B4C14D23; A4B4C14D24; A4B4C14D25;
A4B4C15; A4B4C15D1; A4B4C15D2; A4B4C15D3; A4B4C15D4; A4B4C15D5; A4B4C15D6; A4B4C15D7; A4B4C15D8; A4B4C15D9; A4B4C15D10; A4B4C15D11; A4B4C15D12; A4B4C15D13; A4B4C15D14; A4B4C15D15; A4B4C15D16; A4B4C15D17; A4B4C15D18; A4B4C15D19; A4B4C15D20; A4B4C15D21; A4B4C15D21; A4B4C15D22; A4B4C15D23; A4B4C15D24; A4B4C15D25;
A4B4C16; A4B4C16D1; A4B4C16D2; A4B4C16D3; A4B4C16D4; A4B4C16D5; A4B4C16D6; A4B4C16D7; A4B4C16D8; A4B4C16D9; A4B4C16D10; A4B4C16D11; A4B4C16D12; A4B4C16D13; A4B4C16D14; A4B4C16D15; A4B4C16D16; A4B4C16D17; A4B4C16D18; A4B4C16D19; A4B4C16D20; A4B4C16D21; A4B4C16D21; A4B4C16D22; A4B4C16D23; A4B4C16D24; A4B4C16D25;
A4B4C17; A4B4C17D1; A4B4C17D2; A4B4C17D3; A4B4C17D4; A4B4C17D5; A4B4C17D6; A4B4C17D7; A4B4C17D8; A4B4C17D9; A4B4C17D10; A4B4C17D11; A4B4C17D12; A4B4C17D13; A4B4C17D14; A4B4C17D15; A4B4C17D16; A4B4C17D17; A4B4C17D18; A4B4C17D19; A4B4C17D20; A4B4C17D21; A4B4C17D21; A4B4C17D22; A4B4C17D23; A4B4C17D24; A4B4C17D25;

A4B4C18; A4B4C18D1; A4B4C18D2; A4B4C18D3; A4B4C18D4; A4B4C18D5; A4B4C18D6; A4B4C18D7; A4B4C18D8; A4B4C18D9; A4B4C18D10; A4B4C18D11; A4B4C18D12; A4B4C18D13; A4B4C18D14; A4B4C18D15; A4B4C18D16; A4B4C18D17; A4B4C18D18; A4B4C18D19; A4B4C18D20; A4B4C18D21; A4B4C18D21; A4B4C18D22; A4B4C18D23; A4B4C18D24; A4B4C18D25;

A4B4C19; A4B4C19D1; A4B4C19D2; A4B4C19D3; A4B4C19D4; A4B4C19D5; A4B4C19D6; A4B4C19D7; A4B4C19D8; A4B4C19D9; A4B4C19D10; A4B4C19D11; A4B4C19D12; A4B4C19D13; A4B4C19D14; A4B4C19D15; A4B4C19D16; A4B4C19D17; A4B4C19D18; A4B4C19D19; A4B4C19D20; A4B4C19D21; A4B4C19D21; A4B4C19D22; A4B4C19D23; A4B4C19D24; A4B4C19D25;

A4B4C20; A4B4C20D1; A4B4C20D2; A4B4C20D3; A4B4C20D4; A4B4C20D5; A4B4C20D6; A4B4C20D7; A4B4C20D8; A4B4C20D9; A4B4C20D10; A4B4C20D11; A4B4C20D12; A4B4C20D13; A4B4C20D14; A4B4C20D15; A4B4C20D16; A4B4C20D17; A4B4C20D18; A4B4C20D19; A4B4C20D20; A4B4C20D21; A4B4C20D21; A4B4C20D22; A4B4C20D23; A4B4C20D24; A4B4C20D25.

In an embodiment, the preferred fungicide A is chlorothalonil (A4) and the preferred fungicide B is fluindapyr (B5).

A4B5C1; A4B5C1D1; A4B5C1D2; A4B5C1D3; A4B5C1D4; A4B5C1D5; A4B5C1D6; A4B5C1D7; A4B5C1D8; A4B5C1D9; A4B5C1D10; A4B5C1D11; A4B5C1D12; A4B5C1D13; A4B5C1D14; A4B5C1D15; A4B5C1D16; A4B5C1D17; A4B5C1D18; A4B5C1D19; A4B5C1D20; A4B5C1D21; A4B5C1D21; A4B5C1D22; A4B5C1D23; A4B5C1D24; A4B5C1D25;

A4B5C2; A4B5C2D1; A4B5C2D2; A4B5C2D3; A4B5C2D4; A4B5C2D5; A4B5C2D6; A4B5C2D7; A4B5C2D8; A4B5C2D9; A4B5C2D10; A4B5C2D11; A4B5C2D12; A4B5C2D13; A4B5C2D14; A4B5C2D15; A4B5C2D16; A4B5C2D17; A4B5C2D18; A4B5C2D19; A4B5C2D20; A4B5C2D21; A4B5C2D21; A4B5C2D22; A4B5C2D23; A4B5C2D24; A4B5C2D25;

A4B5C3; A4B5C3D1; A4B5C3D2; A4B5C3D3; A4B5C3D4; A4B5C3D5; A4B5C3D6; A4B5C3D7; A4B5C3D8; A4B5C3D9; A4B5C3D10; A4B5C3D11; A4B5C3D12; A4B5C3D13; A4B5C3D14; A4B5C3D15; A4B5C3D16; A4B5C3D17; A4B5C3D18; A4B5C3D19; A4B5C3D20; A4B5C3D21; A4B5C3D21; A4B5C3D22; A4B5C3D23; A4B5C3D24; A4B5C3D25;

A4B5C4; A4B5C4D1; A4B5C4D2; A4B5C4D3; A4B5C4D4; A4B5C4D5; A4B5C4D6; A4B5C4D7; A4B5C4D8; A4B5C4D9; A4B5C4D10; A4B5C4D11; A4B5C4D12; A4B5C4D13; A4B5C4D14; A4B5C4D15; A4B5C4D16; A4B5C4D17; A4B5C4D18; A4B5C4D19; A4B5C4D20; A4B5C4D21; A4B5C4D21; A4B5C4D22; A4B5C4D23; A4B5C4D24; A4B5C4D25;

A4B5C5; A4B5C5D1; A4B5C5D2; A4B5C5D3; A4B5C5D4; A4B5C5D5; A4B5C5D6; A4B5C5D7; A4B5C5D8; A4B5C5D9; A4B5C5D10; A4B5C5D11; A4B5C5D12; A4B5C5D13; A4B5C5D14; A4B5C5D15; A4B5C5D16; A4B5C5D17; A4B5C5D18; A4B5C5D19; A4B5C5D20; A4B5C5D21; A4B5C5D21; A4B5C5D22; A4B5C5D23; A4B5C5D24; A4B5C5D25;

A4B5C6; A4B5C6D1; A4B5C6D2; A4B5C6D3; A4B5C6D4; A4B5C6D5; A4B5C6D6; A4B5C6D7; A4B5C6D8; A4B5C6D9; A4B5C6D10; A4B5C6D11; A4B5C6D12; A4B5C6D13; A4B5C6D14; A4B5C6D15; A4B5C6D16; A4B5C6D17; A4B5C6D18; A4B5C6D19; A4B5C6D20; A4B5C6D21; A4B5C6D21; A4B5C6D22; A4B5C6D23; A4B5C6D24; A4B5C6D25;

A4B5C7; A4B5C7D1; A4B5C7D2; A4B5C7D3; A4B5C7D4; A4B5C7D5; A4B5C7D6; A4B5C7D7; A4B5C7D8; A4B5C7D9; A4B5C7D10; A4B5C7D11; A4B5C7D12; A4B5C7D13; A4B5C7D14; A4B5C7D15; A4B5C7D16; A4B5C7D17; A4B5C7D18; A4B5C7D19; A4B5C7D20; A4B5C7D21; A4B5C7D21; A4B5C7D22; A4B5C7D23; A4B5C7D24; A4B5C7D25;

A4B5C8; A4B5C8D1; A4B5C8D2; A4B5C8D3; A4B5C8D4; A4B5C8D5; A4B5C8D6; A4B5C8D7; A4B5C8D8; A4B5C8D9; A4B5C8D10; A4B5C8D11; A4B5C8D12; A4B5C8D13; A4B5C8D14; A4B5C8D15; A4B5C8D16; A4B5C8D17; A4B5C8D18; A4B5C8D19; A4B5C8D20; A4B5C8D21; A4B5C8D21; A4B5C8D22; A4B5C8D23; A4B5C8D24; A4B5C8D25;

A4B5C9; A4B5C9D1; A4B5C9D2; A4B5C9D3; A4B5C9D4; A4B5C9D5; A4B5C9D6; A4B5C9D7; A4B5C9D8; A4B5C9D9; A4B5C9D10; A4B5C9D11; A4B5C9D12; A4B5C9D13; A4B5C9D14; A4B5C9D15; A4B5C9D16; A4B5C9D17; A4B5C9D18; A4B5C9D19; A4B5C9D20; A4B5C9D21; A4B5C9D21; A4B5C9D22; A4B5C9D23; A4B5C9D24; A4B5C9D25;

A4B5C10; A4B5C10D1; A4B5C10D2; A4B5C10D3; A4B5C10D4; A4B5C10D5; A4B5C10D6; A4B5C10D7; A4B5C10D8; A4B5C10D9; A4B5C10D10; A4B5C10D11; A4B5C10D12; A4B5C10D13; A4B5C10D14; A4B5C10D15; A4B5C10D16; A4B5C10D17; A4B5C10D18; A4B5C10D19; A4B5C10D20; A4B5C10D21; A4B5C10D21; A4B5C10D22; A4B5C10D23; A4B5C10D24; A4B5C10D25;

A4B5C11; A4B5C11D1; A4B5C11D2; A4B5C11D3; A4B5C11D4; A4B5C11D5; A4B5C11D6; A4B5C11D7; A4B5C11D8; A4B5C11D9; A4B5C11D10; A4B5C11D11; A4B5C11D12; A4B5C11D13; A4B5C11D14; A4B5C11D15; A4B5C11D16; A4B5C11D17; A4B5C11D18; A4B5C11D19; A4B5C11D20; A4B5C11D21; A4B5C11D21; A4B5C11D22; A4B5C11D23; A4B5C11D24; A4B5C11D25;

A4B5C12; A4B5C12D1; A4B5C12D2; A4B5C12D3; A4B5C12D4; A4B5C12D5; A4B5C12D6; A4B5C12D7; A4B5C12D8; A4B5C12D9; A4B5C12D10; A4B5C12D11; A4B5C12D12; A4B5C12D13; A4B5C12D14; A4B5C12D15; A4B5C12D16; A4B5C12D17; A4B5C12D18; A4B5C12D19; A4B5C12D20; A4B5C12D21; A4B5C12D21; A4B5C12D22; A4B5C12D23; A4B5C12D24; A4B5C12D25;

A4B5C13; A4B5C13D1; A4B5C13D2; A4B5C13D3; A4B5C13D4; A4B5C13D5; A4B5C13D6; A4B5C13D7; A4B5C13D8; A4B5C13D9; A4B5C13D10; A4B5C13D11; A4B5C13D12; A4B5C13D13; A4B5C13D14; A4B5C13D15;

A4B5C13D16; A4B5C13D17; A4B5C13D18; A4B5C13D19; A4B5C13D20; A4B5C13D21; A4B5C13D21; A4B5C13D22; A4B5C13D23; A4B5C13D24; A4B5C13D25;

A4B5C14; A4B5C14D1; A4B5C14D2; A4B5C14D3; A4B5C14D4; A4B5C14D5; A4B5C14D6; A4B5C14D7; A4B5C14D8; A4B5C14D9; A4B5C14D10; A4B5C14D11; A4B5C14D12; A4B5C14D13; A4B5C14D14; A4B5C14D15; A4B5C14D16; A4B5C14D17; A4B5C14D18; A4B5C14D19; A4B5C14D20; A4B5C14D21; A4B5C14D21; A4B5C14D22; A4B5C14D23; A4B5C14D24; A4B5C14D25;

A4B5C15; A4B5C15D1; A4B5C15D2; A4B5C15D3; A4B5C15D4; A4B5C15D5; A4B5C15D6; A4B5C15D7; A4B5C15D8; A4B5C15D9; A4B5C15D10; A4B5C15D11; A4B5C15D12; A4B5C15D13; A4B5C15D14; A4B5C15D15; A4B5C15D16; A4B5C15D17; A4B5C15D18; A4B5C15D19; A4B5C15D20; A4B5C15D21; A4B5C15D21; A4B5C15D22; A4B5C15D23; A4B5C15D24; A4B5C15D25;

A4B5C16; A4B5C16D1; A4B5C16D2; A4B5C16D3; A4B5C16D4; A4B5C16D5; A4B5C16D6; A4B5C16D7; A4B5C16D8; A4B5C16D9; A4B5C16D10; A4B5C16D11; A4B5C16D12; A4B5C16D13; A4B5C16D14; A4B5C16D15; A4B5C16D16; A4B5C16D17; A4B5C16D18; A4B5C16D19; A4B5C16D20; A4B5C16D21; A4B5C16D21; A4B5C16D22; A4B5C16D23; A4B5C16D24; A4B5C16D25;

A4B5C17; A4B5C17D1; A4B5C17D2; A4B5C17D3; A4B5C17D4; A4B5C17D5; A4B5C17D6; A4B5C17D7; A4B5C17D8; A4B5C17D9; A4B5C17D10; A4B5C17D11; A4B5C17D12; A4B5C17D13; A4B5C17D14; A4B5C17D15; A4B5C17D16; A4B5C17D17; A4B5C17D18; A4B5C17D19; A4B5C17D20; A4B5C17D21; A4B5C17D21; A4B5C17D22; A4B5C17D23; A4B5C17D24; A4B5C17D25;

A4B5C18; A4B5C18D1; A4B5C18D2; A4B5C18D3; A4B5C18D4; A4B5C18D5; A4B5C18D6; A4B5C18D7; A4B5C18D8; A4B5C18D9; A4B5C18D10; A4B5C18D11; A4B5C18D12; A4B5C18D13; A4B5C18D14; A4B5C18D15; A4B5C18D16; A4B5C18D17; A4B5C18D18; A4B5C18D19; A4B5C18D20; A4B5C18D21; A4B5C18D21; A4B5C18D22; A4B5C18D23; A4B5C18D24; A4B5C18D25;

A4B5C19; A4B5C19D1; A4B5C19D2; A4B5C19D3; A4B5C19D4; A4B5C19D5; A4B5C19D6; A4B5C19D7; A4B5C19D8; A4B5C19D9; A4B5C19D10; A4B5C19D11; A4B5C19D12; A4B5C19D13; A4B5C19D14; A4B5C19D15; A4B5C19D16; A4B5C19D17; A4B5C19D18; A4B5C19D19; A4B5C19D20; A4B5C19D21; A4B5C19D21; A4B5C19D22; A4B5C19D23; A4B5C19D24; A4B5C19D25;

A4B5C20; A4B5C20D1; A4B5C20D2; A4B5C20D3; A4B5C20D4; A4B5C20D5; A4B5C20D6; A4B5C20D7; A4B5C20D8; A4B5C20D9; A4B5C20D10; A4B5C20D11; A4B5C20D12; A4B5C20D13; A4B5C20D14; A4B5C20D15; A4B5C20D16; A4B5C20D17; A4B5C20D18; A4B5C20D19; A4B5C20D20; A4B5C20D21; A4B5C20D21; A4B5C20D22; A4B5C20D23; A4B5C20D24; A4B5C20D25.

In an embodiment, the preferred fungicide A is chlorothalonil (A4), and the preferred fungicide B is boscalid (B23).

A4B23C1; A4B23C1D1; A4B23C1D2; A4B23C1D3; A4B23C1D4; A4B23C1D5; A4B23C1D6; A4B23C1D7; A4B23C1D8; A4B23C1D9; A4B23C1D10; A4B23C1D11; A4B23C1D12; A4B23C1D13; A4B23C1D14; A4B23C1D15; A4B23C1D16; A4B23C1D17; A4B23C1D18; A4B23C1D19; A4B23C1D20; A4B23C1D21; A4B23C1D21; A4B23C1D22; A4B23C1D23; A4B23C1D24; A4B23C1D25;

A4B23C2; A4B23C2D1; A4B23C2D2; A4B23C2D3; A4B23C2D4; A4B23C2D5; A4B23C2D6; A4B23C2D7; A4B23C2D8; A4B23C2D9; A4B23C2D10; A4B23C2D11; A4B23C2D12; A4B23C2D13; A4B23C2D14; A4B23C2D15; A4B23C2D16; A4B23C2D17; A4B23C2D18; A4B23C2D19; A4B23C2D20; A4B23C2D21; A4B23C2D21; A4B23C2D22; A4B23C2D23; A4B23C2D24; A4B23C2D25;

A4B23C3; A4B23C3D1; A4B23C3D2; A4B23C3D3; A4B23C3D4; A4B23C3D5; A4B23C3D6; A4B23C3D7; A4B23C3D8; A4B23C3D9; A4B23C3D10; A4B23C3D11; A4B23C3D12; A4B23C3D13; A4B23C3D14; A4B23C3D15; A4B23C3D16; A4B23C3D17; A4B23C3D18; A4B23C3D19; A4B23C3D20; A4B23C3D21; A4B23C3D21; A4B23C3D22; A4B23C3D23; A4B23C3D24; A4B23C3D25;

A4B23C4; A4B23C4D1; A4B23C4D2; A4B23C4D3; A4B23C4D4; A4B23C4D5; A4B23C4D6; A4B23C4D7; A4B23C4D8; A4B23C4D9; A4B23C4D10; A4B23C4D11; A4B23C4D12; A4B23C4D13; A4B23C4D14; A4B23C4D15; A4B23C4D16; A4B23C4D17; A4B23C4D18; A4B23C4D19; A4B23C4D20; A4B23C4D21; A4B23C4D21; A4B23C4D22; A4B23C4D23; A4B23C4D24; A4B23C4D25;

A4B23C5; A4B23C5D1; A4B23C5D2; A4B23C5D3; A4B23C5D4; A4B23C5D5; A4B23C5D6; A4B23C5D7; A4B23C5D8; A4B23C5D9; A4B23C5D10; A4B23C5D11; A4B23C5D12; A4B23C5D13; A4B23C5D14; A4B23C5D15; A4B23C5D16; A4B23C5D17; A4B23C5D18; A4B23C5D19; A4B23C5D20; A4B23C5D21; A4B23C5D21; A4B23C5D22; A4B23C5D23; A4B23C5D24; A4B23C5D25;

A4B23C6; A4B23C6D1; A4B23C6D2; A4B23C6D3; A4B23C6D4; A4B23C6D5; A4B23C6D6; A4B23C6D7; A4B23C6D8; A4B23C6D9; A4B23C6D10; A4B23C6D11; A4B23C6D12; A4B23C6D13; A4B23C6D14; A4B23C6D15; A4B23C6D16; A4B23C6D17; A4B23C6D18; A4B23C6D19; A4B23C6D20; A4B23C6D21; A4B23C6D21; A4B23C6D22; A4B23C6D23; A4B23C6D24; A4B23C6D25;

A4B23C7; A4B23C7D1; A4B23C7D2; A4B23C7D3; A4B23C7D4; A4B23C7D5; A4B23C7D6; A4B23C7D7; A4B23C7D8; A4B23C7D9; A4B23C7D10; A4B23C7D11; A4B23C7D12; A4B23C7D13; A4B23C7D14; A4B23C7D15; A4B23C7D16; A4B23C7D17; A4B23C7D18; A4B23C7D19; A4B23C7D20; A4B23C7D21; A4B23C7D21; A4B23C7D22; A4B23C7D23; A4B23C7D24; A4B23C7D25;

A4B23C8; A4B23C8D1; A4B23C8D2; A4B23C8D3; A4B23C8D4; A4B23C8D5; A4B23C8D6; A4B23C8D7; A4B23C8D8; A4B23C8D9; A4B23C8D10; A4B23C8D11; A4B23C8D12; A4B23C8D13; A4B23C8D14; A4B23C8D15; A4B23C8D16; A4B23C8D17; A4B23C8D18; A4B23C8D19; A4B23C8D20; A4B23C8D21; A4B23C8D21; A4B23C8D22; A4B23C8D23; A4B23C8D24; A4B23C8D25;

A4B23C9; A4B23C9D1; A4B23C9D2; A4B23C9D3; A4B23C9D4; A4B23C9D5; A4B23C9D6; A4B23C9D7; A4B23C9D8; A4B23C9D9; A4B23C9D10; A4B23C9D11; A4B23C9D12; A4B23C9D13; A4B23C9D14; A4B23C9D15; A4B23C9D16; A4B23C9D17; A4B23C9D18; A4B23C9D19; A4B23C9D20; A4B23C9D21; A4B23C9D21; A4B23C9D22; A4B23C9D23; A4B23C9D24; A4B23C9D25;

A4B23C10; A4B23C10D1; A4B23C10D2; A4B23C10D3; A4B23C10D4; A4B23C10D5; A4B23C10D6; A4B23C10D7; A4B23C10D8; A4B23C10D9; A4B23C10D10; A4B23C10D11; A4B23C10D12; A4B23C10D13; A4B23C10D14; A4B23C10D15; A4B23C10D16; A4B23C10D17; A4B23C10D18; A4B23C10D19; A4B23C10D20; A4B23C10D21; A4B23C10D21; A4B23C10D22; A4B23C10D23; A4B23C10D24; A4B23C10D25;

A4B23C11; A4B23C11D1; A4B23C11D2; A4B23C11D3; A4B23C11D4; A4B23C11D5; A4B23C11D6; A4B23C11D7; A4B23C11D8; A4B23C11D9; A4B23C11D10; A4B23C11D11; A4B23C11D12; A4B23C11D13; A4B23C11D14; A4B23C11D15; A4B23C11D16; A4B23C11D17; A4B23C11D18; A4B23C11D19; A4B23C11D20; A4B23C11D21; A4B23C11D21; A4B23C11D22; A4B23C11D23; A4B23C11D24; A4B23C11D25;

A4B23C12; A4B23C12D1; A4B23C12D2; A4B23C12D3; A4B23C12D4; A4B23C12D5; A4B23C12D6; A4B23C12D7; A4B23C12D8; A4B23C12D9; A4B23C12D10; A4B23C12D11; A4B23C12D12; A4B23C12D13; A4B23C12D14; A4B23C12D15; A4B23C12D16; A4B23C12D17; A4B23C12D18; A4B23C12D19; A4B23C12D20; A4B23C12D21; A4B23C12D21; A4B23C12D22; A4B23C12D23; A4B23C12D24; A4B23C12D25;

A4B23C13; A4B23C13D1; A4B23C13D2; A4B23C13D3; A4B23C13D4; A4B23C13D5; A4B23C13D6; A4B23C13D7; A4B23C13D8; A4B23C13D9; A4B23C13D10; A4B23C13D11; A4B23C13D12; A4B23C13D13; A4B23C13D14; A4B23C13D15; A4B23C13D16; A4B23C13D17; A4B23C13D18; A4B23C13D19; A4B23C13D20; A4B23C13D21; A4B23C13D21; A4B23C13D22; A4B23C13D23; A4B23C13D24; A4B23C13D25;

A4B23C14; A4B23C14D1; A4B23C14D2; A4B23C14D3; A4B23C14D4; A4B23C14D5; A4B23C14D6; A4B23C14D7; A4B23C14D8; A4B23C14D9; A4B23C14D10; A4B23C14D11; A4B23C14D12; A4B23C14D13; A4B23C14D14; A4B23C14D15; A4B23C14D16; A4B23C14D17; A4B23C14D18; A4B23C14D19; A4B23C14D20; A4B23C14D21; A4B23C14D21; A4B23C14D22; A4B23C14D23; A4B23C14D24; A4B23C14D25;

A4B23C15; A4B23C15D1; A4B23C15D2; A4B23C15D3; A4B23C15D4; A4B23C15D5; A4B23C15D6; A4B23C15D7; A4B23C15D8; A4B23C15D9; A4B23C15D10; A4B23C15D11; A4B23C15D12; A4B23C15D13; A4B23C15D14; A4B23C15D15; A4B23C15D16; A4B23C15D17; A4B23C15D18; A4B23C15D19; A4B23C15D20; A4B23C15D21; A4B23C15D21; A4B23C15D22; A4B23C15D23; A4B23C15D24; A4B23C15D25;

A4B23C16; A4B23C16D1; A4B23C16D2; A4B23C16D3; A4B23C16D4; A4B23C16D5; A4B23C16D6; A4B23C16D7; A4B23C16D8; A4B23C16D9; A4B23C16D10; A4B23C16D11; A4B23C16D12; A4B23C16D13; A4B23C16D14; A4B23C16D15; A4B23C16D16; A4B23C16D17; A4B23C16D18; A4B23C16D19; A4B23C16D20; A4B23C16D21; A4B23C16D21; A4B23C16D22; A4B23C16D23; A4B23C16D24; A4B23C16D25;

A4B23C17; A4B23C17D1; A4B23C17D2; A4B23C17D3; A4B23C17D4; A4B23C17D5; A4B23C17D6; A4B23C17D7; A4B23C17D8; A4B23C17D9; A4B23C17D10; A4B23C17D11; A4B23C17D12; A4B23C17D13; A4B23C17D14; A4B23C17D15; A4B23C17D16; A4B23C17D17; A4B23C17D18; A4B23C17D19; A4B23C17D20; A4B23C17D21; A4B23C17D21; A4B23C17D22; A4B23C17D23; A4B23C17D24; A4B23C17D25;

A4B23C18; A4B23C18D1; A4B23C18D2; A4B23C18D3; A4B23C18D4; A4B23C18D5; A4B23C18D6; A4B23C18D7; A4B23C18D8; A4B23C18D9; A4B23C18D10; A4B23C18D11; A4B23C18D12; A4B23C18D13; A4B23C18D14; A4B23C18D15; A4B23C18D16; A4B23C18D17; A4B23C18D18; A4B23C18D19; A4B23C18D20; A4B23C18D21; A4B23C18D21; A4B23C18D22; A4B23C18D23; A4B23C18D24; A4B23C18D25;

A4B23C19; A4B23C19D1; A4B23C19D2; A4B23C19D3; A4B23C19D4; A4B23C19D5; A4B23C19D6; A4B23C19D7; A4B23C19D8; A4B23C19D9; A4B23C19D10; A4B23C19D11; A4B23C19D12; A4B23C19D13; A4B23C19D14; A4B23C19D15; A4B23C19D16; A4B23C19D17; A4B23C19D18; A4B23C19D19; A4B23C19D20; A4B23C19D21; A4B23C19D21; A4B23C19D22; A4B23C19D23; A4B23C19D24; A4B23C19D25;

A4B23C20; A4B23C20D1; A4B23C20D2; A4B23C20D3; A4B23C20D4; A4B23C20D5; A4B23C20D6; A4B23C20D7; A4B23C20D8; A4B23C20D9; A4B23C20D10; A4B23C20D11; A4B23C20D12; A4B23C20D13; A4B23C20D14; A4B23C20D15; A4B23C20D16; A4B23C20D17; A4B23C20D18; A4B23C20D19; A4B23C20D20; A4B23C20D21; A4B23C20D21; A4B23C20D22; A4B23C20D23; A4B23C20D24; A4B23C20D25.

In a preferred embodiment, the preferred fungicide A is sulphur (A5).

In a preferred embodiment, the preferred fungicide A is sulphur (A5) and the preferred fungicide B is isopyrazam (B1).

A5B1C1; A5B1C1D1; A5B1C1D2; A5B1C1D3; A5B1C1D4; A5B1C1D5; A5B1C1D6; A5B1C1D7; A5B1C1D8; A5B1C1D9; A5B1C1D10; A5B1C1D11; A5B1C1D12; A5B1C1D13; A5B1C1D14; A5B1C1D15; A5B1C1D16; A5B1C1D17; A5B1C1D18; A5B1C1D19; A5B1C1D20; A5B1C1D21; A5B1C1D21; A5B1C1D22; A5B1C1D23; A5B1C1D24; A5B1C1D25;

A5B1C2; A5B1C2D1; A5B1C2D2; A5B1C2D3; A5B1C2D4; A5B1C2D5; A5B1C2D6; A5B1C2D7; A5B1C2D8; A5B1C2D9; A5B1C2D10; A5B1C2D11; A5B1C2D12; A5B1C2D13; A5B1C2D14;

A5B1C2D15; A5B1C2D16; A5B1C2D17; A5B1C2D18; A5B1C2D19; A5B1C2D20; A5B1C2D21; A5B1C2D21; A5B1C2D22; A5B1C2D23; A5B1C2D24; A5B1C2D25;
A5B1C3; A5B1C3D1; A5B1C3D2; A5B1C3D3; A5B1C3D4; A5B1C3D5; A5B1C3D6; A5B1C3D7; A5B1C3D8; A5B1C3D9; A5B1C3D10; A5B1C3D11; A5B1C3D12; A5B1C3D13; A5B1C3D14; A5B1C3D15; A5B1C3D16; A5B1C3D17; A5B1C3D18; A5B1C3D19; A5B1C3D20; A5B1C3D21; A5B1C3D21; A5B1C3D22; A5B1C3D23; A5B1C3D24; A5B1C3D25;
A5B1C4; A5B1C4D1; A5B1C4D2; A5B1C4D3; A5B1C4D4; A5B1C4D5; A5B1C4D6; A5B1C4D7; A5B1C4D8; A5B1C4D9; A5B1C4D10; A5B1C4D11; A5B1C4D12; A5B1C4D13; A5B1C4D14; A5B1C4D15; A5B1C4D16; A5B1C4D17; A5B1C4D18; A5B1C4D19; A5B1C4D20; A5B1C4D21; A5B1C4D21; A5B1C4D22; A5B1C4D23; A5B1C4D24; A5B1C4D25;
A5B1C5; A5B1C5D1; A5B1C5D2; A5B1C5D3; A5B1C5D4; A5B1C5D5; A5B1C5D6; A5B1C5D7; A5B1C5D8; A5B1C5D9; A5B1C5D10; A5B1C5D11; A5B1C5D12; A5B1C5D13; A5B1C5D14; A5B1C5D15; A5B1C5D16; A5B1C5D17; A5B1C5D18; A5B1C5D19; A5B1C5D20; A5B1C5D21; A5B1C5D21; A5B1C5D22; A5B1C5D23; A5B1C5D24; A5B1C5D25;
A5B1C6; A5B1C6D1; A5B1C6D2; A5B1C6D3; A5B1C6D4; A5B1C6D5; A5B1C6D6; A5B1C6D7; A5B1C6D8; A5B1C6D9; A5B1C6D10; A5B1C6D11; A5B1C6D12; A5B1C6D13; A5B1C6D14; A5B1C6D15; A5B1C6D16; A5B1C6D17; A5B1C6D18; A5B1C6D19; A5B1C6D20; A5B1C6D21; A5B1C6D21; A5B1C6D22; A5B1C6D23; A5B1C6D24; A5B1C6D25;
A5B1C7; A5B1C7D1; A5B1C7D2; A5B1C7D3; A5B1C7D4; A5B1C7D5; A5B1C7D6; A5B1C7D7; A5B1C7D8; A5B1C7D9; A5B1C7D10; A5B1C7D11; A5B1C7D12; A5B1C7D13; A5B1C7D14; A5B1C7D15; A5B1C7D16; A5B1C7D17; A5B1C7D18; A5B1C7D19; A5B1C7D20; A5B1C7D21; A5B1C7D21; A5B1C7D22; A5B1C7D23; A5B1C7D24; A5B1C7D25;
A5B1C8; A5B1C8D1; A5B1C8D2; A5B1C8D3; A5B1C8D4; A5B1C8D5; A5B1C8D6; A5B1C8D7; A5B1C8D8; A5B1C8D9; A5B1C8D10; A5B1C8D11; A5B1C8D12; A5B1C8D13; A5B1C8D14; A5B1C8D15; A5B1C8D16; A5B1C8D17; A5B1C8D18; A5B1C8D19; A5B1C8D20; A5B1C8D21; A5B1C8D21; A5B1C8D22; A5B1C8D23; A5B1C8D24; A5B1C8D25;
A5B1C9; A5B1C9D1; A5B1C9D2; A5B1C9D3; A5B1C9D4; A5B1C9D5; A5B1C9D6; A5B1C9D7; A5B1C9D8; A5B1C9D9; A5B1C9D10; A5B1C9D11; A5B1C9D12; A5B1C9D13; A5B1C9D14; A5B1C9D15; A5B1C9D16; A5B1C9D17; A5B1C9D18; A5B1C9D19; A5B1C9D20; A5B1C9D21; A5B1C9D21; A5B1C9D22; A5B1C9D23; A5B1C9D24; A5B1C9D25;
A5B1C10; A5B1C10D1; A5B1C10D2; A5B1C10D3; A5B1C10D4; A5B1C10D5; A5B1C10D6; A5B1C10D7; A5B1C10D8; A5B1C10D9; A5B1C10D10; A5B1C10D11; A5B1C10D12; A5B1C10D13; A5B1C10D14; A5B1C10D15; A5B1C10D16; A5B1C10D17; A5B1C10D18; A5B1C10D19; A5B1C10D20; A5B1C10D21; A5B1C10D21; A5B1C10D22; A5B1C10D23; A5B1C10D24; A5B1C10D25;
A5B1C11; A5B1C11D1; A5B1C11D2; A5B1C11D3; A5B1C11D4; A5B1C11D5; A5B1C11D6; A5B1C11D7; A5B1C11D8; A5B1C11D9; A5B1C11D10; A5B1C11D11; A5B1C11D12; A5B1C11D13; A5B1C11D14; A5B1C11D15; A5B1C11D16; A5B1C11D17; A5B1C11D18; A5B1C11D19; A5B1C11D20; A5B1C11D21; A5B1C11D21; A5B1C11D22; A5B1C11D23; A5B1C11D24; A5B1C11D25;
A5B1C12; A5B1C12D1; A5B1C12D2; A5B1C12D3; A5B1C12D4; A5B1C12D5; A5B1C12D6; A5B1C12D7; A5B1C12D8; A5B1C12D9; A5B1C12D10; A5B1C12D11; A5B1C12D12; A5B1C12D13; A5B1C12D14; A5B1C12D15; A5B1C12D16; A5B1C12D17; A5B1C12D18; A5B1C12D19; A5B1C12D20; A5B1C12D21; A5B1C12D21; A5B1C12D22; A5B1C12D23; A5B1C12D24; A5B1C12D25;
A5B1C13; A5B1C13D1; A5B1C13D2; A5B1C13D3; A5B1C13D4; A5B1C13D5; A5B1C13D6; A5B1C13D7; A5B1C13D8; A5B1C13D9; A5B1C13D10; A5B1C13D11; A5B1C13D12; A5B1C13D13; A5B1C13D14; A5B1C13D15; A5B1C13D16; A5B1C13D17; A5B1C13D18; A5B1C13D19; A5B1C13D20; A5B1C13D21; A5B1C13D21; A5B1C13D22; A5B1C13D23; A5B1C13D24; A5B1C13D25;
A5B1C14; A5B1C14D1; A5B1C14D2; A5B1C14D3; A5B1C14D4; A5B1C14D5; A5B1C14D6; A5B1C14D7; A5B1C14D8; A5B1C14D9; A5B1C14D10; A5B1C14D11; A5B1C14D12; A5B1C14D13; A5B1C14D14; A5B1C14D15; A5B1C14D16; A5B1C14D17; A5B1C14D18; A5B1C14D19; A5B1C14D20; A5B1C14D21; A5B1C14D21; A5B1C14D22; A5B1C14D23; A5B1C14D24; A5B1C14D25;
A5B1C15; A5B1C15D1; A5B1C15D2; A5B1C15D3; A5B1C15D4; A5B1C15D5; A5B1C15D6; A5B1C15D7; A5B1C15D8; A5B1C15D9; A5B1C15D10; A5B1C15D11; A5B1C15D12; A5B1C15D13; A5B1C15D14; A5B1C15D15; A5B1C15D16; A5B1C15D17; A5B1C15D18; A5B1C15D19; A5B1C15D20; A5B1C15D21; A5B1C15D21; A5B1C15D22; A5B1C15D23; A5B1C15D24; A5B1C15D25;
A5B1C16; A5B1C16D1; A5B1C16D2; A5B1C16D3; A5B1C16D4; A5B1C16D5; A5B1C16D6; A5B1C16D7; A5B1C16D8; A5B1C16D9; A5B1C16D10; A5B1C16D11; A5B1C16D12; A5B1C16D13; A5B1C16D14; A5B1C16D15; A5B1C16D16; A5B1C16D17; A5B1C16D18; A5B1C16D19; A5B1C16D20; A5B1C16D21; A5B1C16D21; A5B1C16D22; A5B1C16D23; A5B1C16D24; A5B1C16D25;
A5B1C17; A5B1C17D1; A5B1C17D2; A5B1C17D3; A5B1C17D4; A5B1C17D5; A5B1C17D6; A5B1C17D7; A5B1C17D8; A5B1C17D9; A5B1C17D10; A5B1C17D11; A5B1C17D12; A5B1C17D13; A5B1C17D14; A5B1C17D15; A5B1C17D16; A5B1C17D17; A5B1C17D18; A5B1C17D19; A5B1C17D20; A5B1C17D21; A5B1C17D21; A5B1C17D22; A5B1C17D23; A5B1C17D24; A5B1C17D25;
A5B1C18; A5B1C18D1; A5B1C18D2; A5B1C18D3; A5B1C18D4; A5B1C18D5; A5B1C18D6;

A5B1C18D7; A5B1C18D8; A5B1C18D9; A5B1C18D10; A5B1C18D11; A5B1C18D12; A5B1C18D13; A5B1C18D14; A5B1C18D15; A5B1C18D16; A5B1C18D17; A5B1C18D18; A5B1C18D19; A5B1C18D20; A5B1C18D21; A5B1C18D21; A5B1C18D22; A5B1C18D23; A5B1C18D24; A5B1C18D25;

A5B1C19; A5B1C19D1; A5B1C19D2; A5B1C19D3; A5B1C19D4; A5B1C19D5; A5B1C19D6; A5B1C19D7; A5B1C19D8; A5B1C19D9; A5B1C19D10; A5B1C19D11; A5B1C19D12; A5B1C19D13; A5B1C19D14; A5B1C19D15; A5B1C19D16; A5B1C19D17; A5B1C19D18; A5B1C19D19; A5B1C19D20; A5B1C19D21; A5B1C19D21; A5B1C19D22; A5B1C19D23; A5B1C19D24; A5B1C19D25;

A5B1C20; A5B1C20D1; A5B1C20D2; A5B1C20D3; A5B1C20D4; A5B1C20D5; A5B1C20D6; A5B1C20D7; A5B1C20D8; A5B1C20D9; A5B1C20D10; A5B1C20D11; A5B1C20D12; A5B1C20D13; A5B1C20D14; A5B1C20D15; A5B1C20D16; A5B1C20D17; A5B1C20D18; A5B1C20D19; A5B1C20D20; A5B1C20D21; A5B1C20D21; A5B1C20D22; A5B1C20D23; A5B1C20D24; A5B1C20D25.

In a preferred embodiment, the preferred fungicide A is sulphur (A5) and the preferred fungicide B is benzovindiflupyr (B2).

A5B2C1; A5B2C1D1; A5B2C1D2; A5B2C1D3; A5B2C1D4; A5B2C1D5; A5B2C1D6; A5B2C1D7; A5B2C1D8; A5B2C1D9; A5B2C1D10; A5B2C1D11; A5B2C1D12; A5B2C1D13; A5B2C1D14; A5B2C1D15; A5B2C1D16; A5B2C1D17; A5B2C1D18; A5B2C1D19; A5B2C1D20; A5B2C1D21; A5B2C1D21; A5B2C1D22; A5B2C1D23; A5B2C1D24; A5B2C1D25;

A5B2C2; A5B2C2D1; A5B2C2D2; A5B2C2D3; A5B2C2D4; A5B2C2D5; A5B2C2D6; A5B2C2D7; A5B2C2D8; A5B2C2D9; A5B2C2D10; A5B2C2D11; A5B2C2D12; A5B2C2D13; A5B2C2D14; A5B2C2D15; A5B2C2D16; A5B2C2D17; A5B2C2D18; A5B2C2D19; A5B2C2D20; A5B2C2D21; A5B2C2D21; A5B2C2D22; A5B2C2D23; A5B2C2D24; A5B2C2D25;

A5B2C3; A5B2C3D1; A5B2C3D2; A5B2C3D3; A5B2C3D4; A5B2C3D5; A5B2C3D6; A5B2C3D7; A5B2C3D8; A5B2C3D9; A5B2C3D10; A5B2C3D11; A5B2C3D12; A5B2C3D13; A5B2C3D14; A5B2C3D15; A5B2C3D16; A5B2C3D17; A5B2C3D18; A5B2C3D19; A5B2C3D20; A5B2C3D21; A5B2C3D21; A5B2C3D22; A5B2C3D23; A5B2C3D24; A5B2C3D25;

A5B2C4; A5B2C4D1; A5B2C4D2; A5B2C4D3; A5B2C4D4; A5B2C4D5; A5B2C4D6; A5B2C4D7; A5B2C4D8; A5B2C4D9; A5B2C4D10; A5B2C4D11; A5B2C4D12; A5B2C4D13; A5B2C4D14; A5B2C4D15; A5B2C4D16; A5B2C4D17; A5B2C4D18; A5B2C4D19; A5B2C4D20; A5B2C4D21; A5B2C4D21; A5B2C4D22; A5B2C4D23; A5B2C4D24; A5B2C4D25;

A5B2C5; A5B2C5D1; A5B2C5D2; A5B2C5D3; A5B2C5D4; A5B2C5D5; A5B2C5D6; A5B2C5D7; A5B2C5D8; A5B2C5D9; A5B2C5D10; A5B2C5D11; A5B2C5D12; A5B2C5D13; A5B2C5D14; A5B2C5D15; A5B2C5D16; A5B2C5D17; A5B2C5D18; A5B2C5D19; A5B2C5D20; A5B2C5D21; A5B2C5D21; A5B2C5D22; A5B2C5D23; A5B2C5D24; A5B2C5D25;

A5B2C6; A5B2C6D1; A5B2C6D2; A5B2C6D3; A5B2C6D4; A5B2C6D5; A5B2C6D6; A5B2C6D7; A5B2C6D8; A5B2C6D9; A5B2C6D10; A5B2C6D11; A5B2C6D12; A5B2C6D13; A5B2C6D14; A5B2C6D15; A5B2C6D16; A5B2C6D17; A5B2C6D18; A5B2C6D19; A5B2C6D20; A5B2C6D21; A5B2C6D21; A5B2C6D22; A5B2C6D23; A5B2C6D24; A5B2C6D25;

A5B2C7; A5B2C7D1; A5B2C7D2; A5B2C7D3; A5B2C7D4; A5B2C7D5; A5B2C7D6; A5B2C7D7; A5B2C7D8; A5B2C7D9; A5B2C7D10; A5B2C7D11; A5B2C7D12; A5B2C7D13; A5B2C7D14; A5B2C7D15; A5B2C7D16; A5B2C7D17; A5B2C7D18; A5B2C7D19; A5B2C7D20; A5B2C7D21; A5B2C7D21; A5B2C7D22; A5B2C7D23; A5B2C7D24; A5B2C7D25;

A5B2C8; A5B2C8D1; A5B2C8D2; A5B2C8D3; A5B2C8D4; A5B2C8D5; A5B2C8D6; A5B2C8D7; A5B2C8D8; A5B2C8D9; A5B2C8D10; A5B2C8D11; A5B2C8D12; A5B2C8D13; A5B2C8D14; A5B2C8D15; A5B2C8D16; A5B2C8D17; A5B2C8D18; A5B2C8D19; A5B2C8D20; A5B2C8D21; A5B2C8D21; A5B2C8D22; A5B2C8D23; A5B2C8D24; A5B2C8D25;

A5B2C9; A5B2C9D1; A5B2C9D2; A5B2C9D3; A5B2C9D4; A5B2C9D5; A5B2C9D6; A5B2C9D7; A5B2C9D8; A5B2C9D9; A5B2C9D10; A5B2C9D11; A5B2C9D12; A5B2C9D13; A5B2C9D14; A5B2C9D15; A5B2C9D16; A5B2C9D17; A5B2C9D18; A5B2C9D19; A5B2C9D20; A5B2C9D21; A5B2C9D21; A5B2C9D22; A5B2C9D23; A5B2C9D24; A5B2C9D25;

A5B2C10; A5B2C10D1; A5B2C10D2; A5B2C10D3; A5B2C10D4; A5B2C10D5; A5B2C10D6; A5B2C10D7; A5B2C10D8; A5B2C10D9; A5B2C10D10; A5B2C10D11; A5B2C10D12; A5B2C10D13; A5B2C10D14; A5B2C10D15; A5B2C10D16; A5B2C10D17; A5B2C10D18; A5B2C10D19; A5B2C10D20; A5B2C10D21; A5B2C10D21; A5B2C10D22; A5B2C10D23; A5B2C10D24; A5B2C10D25;

A5B2C11; A5B2C11D1; A5B2C11D2; A5B2C11D3; A5B2C11D4; A5B2C11D5; A5B2C11D6; A5B2C11D7; A5B2C11D8; A5B2C11D9; A5B2C11D10; A5B2C11D11; A5B2C11D12; A5B2C11D13; A5B2C11D14; A5B2C11D15; A5B2C11D16; A5B2C11D17; A5B2C11D18; A5B2C11D19; A5B2C11D20; A5B2C11D21; A5B2C11D21; A5B2C11D22; A5B2C11D23; A5B2C11D24; A5B2C11D25;

A5B2C12; A5B2C12D1; A5B2C12D2; A5B2C12D3; A5B2C12D4; A5B2C12D5; A5B2C12D6; A5B2C12D7; A5B2C12D8; A5B2C12D9; A5B2C12D10; A5B2C12D11; A5B2C12D12; A5B2C12D13; A5B2C12D14; A5B2C12D15; A5B2C12D16; A5B2C12D17; A5B2C12D18; A5B2C12D19; A5B2C12D20; A5B2C12D21; A5B2C12D21; A5B2C12D22; A5B2C12D23; A5B2C12D24; A5B2C12D25;

A5B2C13; A5B2C13D1; A5B2C13D2; A5B2C13D3; A5B2C13D4; A5B2C13D5; A5B2C13D6; A5B2C13D7; A5B2C13D8; A5B2C13D9; A5B2C13D10; A5B2C13D11; A5B2C13D12; A5B2C13D13; A5B2C13D14; A5B2C13D15; A5B2C13D16; A5B2C13D17; A5B2C13D18;

A5B2C13D19; A5B2C13D20; A5B2C13D21; A5B2C13D21; A5B2C13D22; A5B2C13D23; A5B2C13D24; A5B2C13D25;
A5B2C14; A5B2C14D1; A5B2C14D2; A5B2C14D3; A5B2C14D4; A5B2C14D5; A5B2C14D6; A5B2C14D7; A5B2C14D8; A5B2C14D9; A5B2C14D10; A5B2C14D11; A5B2C14D12; A5B2C14D13; A5B2C14D14; A5B2C14D15; A5B2C14D16; A5B2C14D17; A5B2C14D18; A5B2C14D19; A5B2C14D20; A5B2C14D21; A5B2C14D21; A5B2C14D22; A5B2C14D23; A5B2C14D24; A5B2C14D25;
A5B2C15; A5B2C15D1; A5B2C15D2; A5B2C15D3; A5B2C15D4; A5B2C15D5; A5B2C15D6; A5B2C15D7; A5B2C15D8; A5B2C15D9; A5B2C15D10; A5B2C15D11; A5B2C15D12; A5B2C15D13; A5B2C15D14; A5B2C15D15; A5B2C15D16; A5B2C15D17; A5B2C15D18; A5B2C15D19; A5B2C15D20; A5B2C15D21; A5B2C15D21; A5B2C15D22; A5B2C15D23; A5B2C15D24; A5B2C15D25;
A5B2C16; A5B2C16D1; A5B2C16D2; A5B2C16D3; A5B2C16D4; A5B2C16D5; A5B2C16D6; A5B2C16D7; A5B2C16D8; A5B2C16D9; A5B2C16D10; A5B2C16D11; A5B2C16D12; A5B2C16D13; A5B2C16D14; A5B2C16D15; A5B2C16D16; A5B2C16D17; A5B2C16D18; A5B2C16D19; A5B2C16D20; A5B2C16D21; A5B2C16D21; A5B2C16D22; A5B2C16D23; A5B2C16D24; A5B2C16D25;
A5B2C17; A5B2C17D1; A5B2C17D2; A5B2C17D3; A5B2C17D4; A5B2C17D5; A5B2C17D6; A5B2C17D7; A5B2C17D8; A5B2C17D9; A5B2C17D10; A5B2C17D11; A5B2C17D12; A5B2C17D13; A5B2C17D14; A5B2C17D15; A5B2C17D16; A5B2C17D17; A5B2C17D18; A5B2C17D19; A5B2C17D20; A5B2C17D21; A5B2C17D21; A5B2C17D22; A5B2C17D23; A5B2C17D24; A5B2C17D25;
A5B2C18; A5B2C18D1; A5B2C18D2; A5B2C18D3; A5B2C18D4; A5B2C18D5; A5B2C18D6; A5B2C18D7; A5B2C18D8; A5B2C18D9; A5B2C18D10; A5B2C18D11; A5B2C18D12; A5B2C18D13; A5B2C18D14; A5B2C18D15; A5B2C18D16; A5B2C18D17; A5B2C18D18; A5B2C18D19; A5B2C18D20; A5B2C18D21; A5B2C18D21; A5B2C18D22; A5B2C18D23; A5B2C18D24; A5B2C18D25;
A5B2C19; A5B2C19D1; A5B2C19D2; A5B2C19D3; A5B2C19D4; A5B2C19D5; A5B2C19D6; A5B2C19D7; A5B2C19D8; A5B2C19D9; A5B2C19D10; A5B2C19D11; A5B2C19D12; A5B2C19D13; A5B2C19D14; A5B2C19D15; A5B2C19D16; A5B2C19D17; A5B2C19D18; A5B2C19D19; A5B2C19D20; A5B2C19D21; A5B2C19D21; A5B2C19D22; A5B2C19D23; A5B2C19D24; A5B2C19D25;
A5B2C20; A5B2C20D1; A5B2C20D2; A5B2C20D3; A5B2C20D4; A5B2C20D5; A5B2C20D6; A5B2C20D7; A5B2C20D8; A5B2C20D9; A5B2C20D10; A5B2C20D11; A5B2C20D12; A5B2C20D13; A5B2C20D14; A5B2C20D15; A5B2C20D16; A5B2C20D17; A5B2C20D18; A5B2C20D19; A5B2C20D20; A5B2C20D21; A5B2C20D21; A5B2C20D22; A5B2C20D23; A5B2C20D24; A5B2C20D25.

In an embodiment, the preferred fungicide A is sulphur (A5), and the preferred fungicide B is penthiopyrad (B3).

A5B3C1; A5B3C1D1; A5B3C1D2; A5B3C1D3; A5B3C1D4; A5B3C1D5; A5B3C1D6; A5B3C1D7; A5B3C1D8; A5B3C1D9; A5B3C1D10; A5B3C1D11; A5B3C1D12; A5B3C1D13; A5B3C1D14; A5B3C1D15; A5B3C1D16; A5B3C1D17; A5B3C1D18; A5B3C1D19; A5B3C1D20; A5B3C1D21; A5B3C1D21; A5B3C1D22; A5B3C1D23; A5B3C1D24; A5B3C1D25;
A5B3C2; A5B3C2D1; A5B3C2D2; A5B3C2D3; A5B3C2D4; A5B3C2D5; A5B3C2D6; A5B3C2D7; A5B3C2D8; A5B3C2D9; A5B3C2D10; A5B3C2D11; A5B3C2D12; A5B3C2D13; A5B3C2D14; A5B3C2D15; A5B3C2D16; A5B3C2D17; A5B3C2D18; A5B3C2D19; A5B3C2D20; A5B3C2D21; A5B3C2D21; A5B3C2D22; A5B3C2D23; A5B3C2D24; A5B3C2D25;
A5B3C3; A5B3C3D1; A5B3C3D2; A5B3C3D3; A5B3C3D4; A5B3C3D5; A5B3C3D6; A5B3C3D7; A5B3C3D8; A5B3C3D9; A5B3C3D10; A5B3C3D11; A5B3C3D12; A5B3C3D13; A5B3C3D14; A5B3C3D15; A5B3C3D16; A5B3C3D17; A5B3C3D18; A5B3C3D19; A5B3C3D20; A5B3C3D21; A5B3C3D21; A5B3C3D22; A5B3C3D23; A5B3C3D24; A5B3C3D25;
A5B3C4; A5B3C4D1; A5B3C4D2; A5B3C4D3; A5B3C4D4; A5B3C4D5; A5B3C4D6; A5B3C4D7; A5B3C4D8; A5B3C4D9; A5B3C4D10; A5B3C4D11; A5B3C4D12; A5B3C4D13; A5B3C4D14; A5B3C4D15; A5B3C4D16; A5B3C4D17; A5B3C4D18; A5B3C4D19; A5B3C4D20; A5B3C4D21; A5B3C4D21; A5B3C4D22; A5B3C4D23; A5B3C4D24; A5B3C4D25;
A5B3C5; A5B3C5D1; A5B3C5D2; A5B3C5D3; A5B3C5D4; A5B3C5D5; A5B3C5D6; A5B3C5D7; A5B3C5D8; A5B3C5D9; A5B3C5D10; A5B3C5D11; A5B3C5D12; A5B3C5D13; A5B3C5D14; A5B3C5D15; A5B3C5D16; A5B3C5D17; A5B3C5D18; A5B3C5D19; A5B3C5D20; A5B3C5D21; A5B3C5D21; A5B3C5D22; A5B3C5D23; A5B3C5D24; A5B3C5D25;
A5B3C6; A5B3C6D1; A5B3C6D2; A5B3C6D3; A5B3C6D4; A5B3C6D5; A5B3C6D6; A5B3C6D7; A5B3C6D8; A5B3C6D9; A5B3C6D10; A5B3C6D11; A5B3C6D12; A5B3C6D13; A5B3C6D14; A5B3C6D15; A5B3C6D16; A5B3C6D17; A5B3C6D18; A5B3C6D19; A5B3C6D20; A5B3C6D21; A5B3C6D21; A5B3C6D22; A5B3C6D23; A5B3C6D24; A5B3C6D25;
A5B3C7; A5B3C7D1; A5B3C7D2; A5B3C7D3; A5B3C7D4; A5B3C7D5; A5B3C7D6; A5B3C7D7; A5B3C7D8; A5B3C7D9; A5B3C7D10; A5B3C7D11; A5B3C7D12; A5B3C7D13; A5B3C7D14; A5B3C7D15; A5B3C7D16; A5B3C7D17; A5B3C7D18; A5B3C7D19; A5B3C7D20; A5B3C7D21; A5B3C7D21; A5B3C7D22; A5B3C7D23; A5B3C7D24; A5B3C7D25;
A5B3C8; A5B3C8D1; A5B3C8D2; A5B3C8D3; A5B3C8D4; A5B3C8D5; A5B3C8D6; A5B3C8D7; A5B3C8D8; A5B3C8D9; A5B3C8D10; A5B3C8D11; A5B3C8D12; A5B3C8D13; A5B3C8D14; A5B3C8D15; A5B3C8D16; A5B3C8D17; A5B3C8D18; A5B3C8D19; A5B3C8D20; A5B3C8D21; A5B3C8D21; A5B3C8D22; A5B3C8D23; A5B3C8D24; A5B3C8D25;

A5B3C9; A5B3C9D1; A5B3C9D2; A5B3C9D3; A5B3C9D4; A5B3C9D5; A5B3C9D6; A5B3C9D7; A5B3C9D8; A5B3C9D9; A5B3C9D10; A5B3C9D11; A5B3C9D12; A5B3C9D13; A5B3C9D14; A5B3C9D15; A5B3C9D16; A5B3C9D17; A5B3C9D18; A5B3C9D19; A5B3C9D20; A5B3C9D21; A5B3C9D21; A5B3C9D22; A5B3C9D23; A5B3C9D24; A5B3C9D25;

A5B3C10; A5B3C10D1; A5B3C10D2; A5B3C10D3; A5B3C10D4; A5B3C10D5; A5B3C10D6; A5B3C10D7; A5B3C10D8; A5B3C10D9; A5B3C10D10; A5B3C10D11; A5B3C10D12; A5B3C10D13; A5B3C10D14; A5B3C10D15; A5B3C10D16; A5B3C10D17; A5B3C10D18; A5B3C10D19; A5B3C10D20; A5B3C10D21; A5B3C10D21; A5B3C10D22; A5B3C10D23; A5B3C10D24; A5B3C10D25;

A5B3C11; A5B3C11D1; A5B3C11D2; A5B3C11D3; A5B3C11D4; A5B3C11D5; A5B3C11D6; A5B3C11D7; A5B3C11D8; A5B3C11D9; A5B3C11D10; A5B3C11D11; A5B3C11D12; A5B3C11D13; A5B3C11D14; A5B3C11D15; A5B3C11D16; A5B3C11D17; A5B3C11D18; A5B3C11D19; A5B3C11D20; A5B3C11D21; A5B3C11D21; A5B3C11D22; A5B3C11D23; A5B3C11D24; A5B3C11D25;

A5B3C12; A5B3C12D1; A5B3C12D2; A5B3C12D3; A5B3C12D4; A5B3C12D5; A5B3C12D6; A5B3C12D7; A5B3C12D8; A5B3C12D9; A5B3C12D10; A5B3C12D11; A5B3C12D12; A5B3C12D13; A5B3C12D14; A5B3C12D15; A5B3C12D16; A5B3C12D17; A5B3C12D18; A5B3C12D19; A5B3C12D20; A5B3C12D21; A5B3C12D21; A5B3C12D22; A5B3C12D23; A5B3C12D24; A5B3C12D25;

A5B3C13; A5B3C13D1; A5B3C13D2; A5B3C13D3; A5B3C13D4; A5B3C13D5; A5B3C13D6; A5B3C13D7; A5B3C13D8; A5B3C13D9; A5B3C13D10; A5B3C13D11; A5B3C13D12; A5B3C13D13; A5B3C13D14; A5B3C13D15; A5B3C13D16; A5B3C13D17; A5B3C13D18; A5B3C13D19; A5B3C13D20; A5B3C13D21; A5B3C13D21; A5B3C13D22; A5B3C13D23; A5B3C13D24; A5B3C13D25;

A5B3C14; A5B3C14D1; A5B3C14D2; A5B3C14D3; A5B3C14D4; A5B3C14D5; A5B3C14D6; A5B3C14D7; A5B3C14D8; A5B3C14D9; A5B3C14D10; A5B3C14D11; A5B3C14D12; A5B3C14D13; A5B3C14D14; A5B3C14D15; A5B3C14D16; A5B3C14D17; A5B3C14D18; A5B3C14D19; A5B3C14D20; A5B3C14D21; A5B3C14D21; A5B3C14D22; A5B3C14D23; A5B3C14D24; A5B3C14D25;

A5B3C15; A5B3C15D1; A5B3C15D2; A5B3C15D3; A5B3C15D4; A5B3C15D5; A5B3C15D6; A5B3C15D7; A5B3C15D8; A5B3C15D9; A5B3C15D10; A5B3C15D11; A5B3C15D12; A5B3C15D13; A5B3C15D14; A5B3C15D15; A5B3C15D16; A5B3C15D17; A5B3C15D18; A5B3C15D19; A5B3C15D20; A5B3C15D21; A5B3C15D21; A5B3C15D22; A5B3C15D23; A5B3C15D24; A5B3C15D25;

A5B3C16; A5B3C16D1; A5B3C16D2; A5B3C16D3; A5B3C16D4; A5B3C16D5; A5B3C16D6; A5B3C16D7; A5B3C16D8; A5B3C16D9; A5B3C16D10; A5B3C16D11; A5B3C16D12; A5B3C16D13; A5B3C16D14; A5B3C16D15; A5B3C16D16; A5B3C16D17; A5B3C16D18; A5B3C16D19; A5B3C16D20; A5B3C16D21; A5B3C16D21; A5B3C16D22; A5B3C16D23; A5B3C16D24; A5B3C16D25;

A5B3C17; A5B3C17D1; A5B3C17D2; A5B3C17D3; A5B3C17D4; A5B3C17D5; A5B3C17D6; A5B3C17D7; A5B3C17D8; A5B3C17D9; A5B3C17D10; A5B3C17D11; A5B3C17D12; A5B3C17D13; A5B3C17D14; A5B3C17D15; A5B3C17D16; A5B3C17D17; A5B3C17D18; A5B3C17D19; A5B3C17D20; A5B3C17D21; A5B3C17D21; A5B3C17D22; A5B3C17D23; A5B3C17D24; A5B3C17D25;

A5B3C18; A5B3C18D1; A5B3C18D2; A5B3C18D3; A5B3C18D4; A5B3C18D5; A5B3C18D6; A5B3C18D7; A5B3C18D8; A5B3C18D9; A5B3C18D10; A5B3C18D11; A5B3C18D12; A5B3C18D13; A5B3C18D14; A5B3C18D15; A5B3C18D16; A5B3C18D17; A5B3C18D18; A5B3C18D19; A5B3C18D20; A5B3C18D21; A5B3C18D21; A5B3C18D22; A5B3C18D23; A5B3C18D24; A5B3C18D25;

A5B3C19; A5B3C19D1; A5B3C19D2; A5B3C19D3; A5B3C19D4; A5B3C19D5; A5B3C19D6; A5B3C19D7; A5B3C19D8; A5B3C19D9; A5B3C19D10; A5B3C19D11; A5B3C19D12; A5B3C19D13; A5B3C19D14; A5B3C19D15; A5B3C19D16; A5B3C19D17; A5B3C19D18; A5B3C19D19; A5B3C19D20; A5B3C19D21; A5B3C19D21; A5B3C19D22; A5B3C19D23; A5B3C19D24; A5B3C19D25;

A5B3C20; A5B3C20D1; A5B3C20D2; A5B3C20D3; A5B3C20D4; A5B3C20D5; A5B3C20D6; A5B3C20D7; A5B3C20D8; A5B3C20D9; A5B3C20D10; A5B3C20D11; A5B3C20D12; A5B3C20D13; A5B3C20D14; A5B3C20D15; A5B3C20D16; A5B3C20D17; A5B3C20D18; A5B3C20D19; A5B3C20D20; A5B3C20D21; A5B3C20D21; A5B3C20D22; A5B3C20D23; A5B3C20D24; A5B3C20D25.

In an embodiment, the preferred fungicide A is sulphur (A5) and the preferred fungicide B is boscalid (B4).

A5B4C1; A5B4C1D1; A5B4C1D2; A5B4C1D3; A5B4C1D4; A5B4C1D5; A5B4C1D6; A5B4C1D7; A5B4C1D8; A5B4C1D9; A5B4C1D10; A5B4C1D11; A5B4C1D12; A5B4C1D13; A5B4C1D14; A5B4C1D15; A5B4C1D16; A5B4C1D17; A5B4C1D18; A5B4C1D19; A5B4C1D20; A5B4C1D21; A5B4C1D21; A5B4C1D22; A5B4C1D23; A5B4C1D24; A5B4C1D25;

A5B4C2; A5B4C2D1; A5B4C2D2; A5B4C2D3; A5B4C2D4; A5B4C2D5; A5B4C2D6; A5B4C2D7; A5B4C2D8; A5B4C2D9; A5B4C2D10; A5B4C2D11; A5B4C2D12; A5B4C2D13; A5B4C2D14; A5B4C2D15; A5B4C2D16; A5B4C2D17; A5B4C2D18; A5B4C2D19; A5B4C2D20; A5B4C2D21; A5B4C2D21; A5B4C2D22; A5B4C2D23; A5B4C2D24; A5B4C2D25;

A5B4C3; A5B4C3D1; A5B4C3D2; A5B4C3D3; A5B4C3D4; A5B4C3D5; A5B4C3D6; A5B4C3D7; A5B4C3D8; A5B4C3D9; A5B4C3D10; A5B4C3D11; A5B4C3D12; A5B4C3D13; A5B4C3D14; A5B4C3D15; A5B4C3D16; A5B4C3D17; A5B4C3D18; A5B4C3D19; A5B4C3D20; A5B4C3D21; A5B4C3D21; A5B4C3D22; A5B4C3D23; A5B4C3D24; A5B4C3D25;

A5B4C4; A5B4C4D1; A5B4C4D2; A5B4C4D3; A5B4C4D4; A5B4C4D5; A5B4C4D6; A5B4C4D7; A5B4C4D8; A5B4C4D9; A5B4C4D10; A5B4C4D11; A5B4C4D12; A5B4C4D13; A5B4C4D14; A5B4C4D15; A5B4C4D16; A5B4C4D17; A5B4C4D18; A5B4C4D19; A5B4C4D20; A5B4C4D21; A5B4C4D21; A5B4C4D22; A5B4C4D23; A5B4C4D24; A5B4C4D25;

A5B4C5; A5B4C5D1; A5B4C5D2; A5B4C5D3; A5B4C5D4; A5B4C5D5; A5B4C5D6; A5B4C5D7; A5B4C5D8; A5B4C5D9; A5B4C5D10; A5B4C5D11; A5B4C5D12; A5B4C5D13; A5B4C5D14; A5B4C5D15; A5B4C5D16; A5B4C5D17; A5B4C5D18; A5B4C5D19; A5B4C5D20; A5B4C5D21; A5B4C5D21; A5B4C5D22; A5B4C5D23; A5B4C5D24; A5B4C5D25;

A5B4C6; A5B4C6D1; A5B4C6D2; A5B4C6D3; A5B4C6D4; A5B4C6D5; A5B4C6D6; A5B4C6D7; A5B4C6D8; A5B4C6D9; A5B4C6D10; A5B4C6D11; A5B4C6D12; A5B4C6D13; A5B4C6D14; A5B4C6D15; A5B4C6D16; A5B4C6D17; A5B4C6D18; A5B4C6D19; A5B4C6D20; A5B4C6D21; A5B4C6D21; A5B4C6D22; A5B4C6D23; A5B4C6D24; A5B4C6D25;

A5B4C7; A5B4C7D1; A5B4C7D2; A5B4C7D3; A5B4C7D4; A5B4C7D5; A5B4C7D6; A5B4C7D7; A5B4C7D8; A5B4C7D9; A5B4C7D10; A5B4C7D11; A5B4C7D12; A5B4C7D13; A5B4C7D14; A5B4C7D15; A5B4C7D16; A5B4C7D17; A5B4C7D18; A5B4C7D19; A5B4C7D20; A5B4C7D21; A5B4C7D21; A5B4C7D22; A5B4C7D23; A5B4C7D24; A5B4C7D25;

A5B4C8; A5B4C8D1; A5B4C8D2; A5B4C8D3; A5B4C8D4; A5B4C8D5; A5B4C8D6; A5B4C8D7; A5B4C8D8; A5B4C8D9; A5B4C8D10; A5B4C8D11; A5B4C8D12; A5B4C8D13; A5B4C8D14; A5B4C8D15; A5B4C8D16; A5B4C8D17; A5B4C8D18; A5B4C8D19; A5B4C8D20; A5B4C8D21; A5B4C8D21; A5B4C8D22; A5B4C8D23; A5B4C8D24; A5B4C8D25;

A5B4C9; A5B4C9D1; A5B4C9D2; A5B4C9D3; A5B4C9D4; A5B4C9D5; A5B4C9D6; A5B4C9D7; A5B4C9D8; A5B4C9D9; A5B4C9D10; A5B4C9D11; A5B4C9D12; A5B4C9D13; A5B4C9D14; A5B4C9D15; A5B4C9D16; A5B4C9D17; A5B4C9D18; A5B4C9D19; A5B4C9D20; A5B4C9D21; A5B4C9D21; A5B4C9D22; A5B4C9D23; A5B4C9D24; A5B4C9D25;

A5B4C10; A5B4C10D1; A5B4C10D2; A5B4C10D3; A5B4C10D4; A5B4C10D5; A5B4C10D6; A5B4C10D7; A5B4C10D8; A5B4C10D9; A5B4C10D10; A5B4C10D11; A5B4C10D12; A5B4C10D13; A5B4C10D14; A5B4C10D15; A5B4C10D16; A5B4C10D17; A5B4C10D18; A5B4C10D19; A5B4C10D20; A5B4C10D21; A5B4C10D21; A5B4C10D22; A5B4C10D23; A5B4C10D24; A5B4C10D25;

A5B4C11; A5B4C11D1; A5B4C11D2; A5B4C11D3; A5B4C11D4; A5B4C11D5; A5B4C11D6; A5B4C11D7; A5B4C11D8; A5B4C11D9; A5B4C11D10; A5B4C11D11; A5B4C11D12; A5B4C11D13; A5B4C11D14; A5B4C11D15; A5B4C11D16; A5B4C11D17; A5B4C11D18; A5B4C11D19; A5B4C11D20; A5B4C11D21; A5B4C11D21; A5B4C11D22; A5B4C11D23; A5B4C11D24; A5B4C11D25;

A5B4C12; A5B4C12D1; A5B4C12D2; A5B4C12D3; A5B4C12D4; A5B4C12D5; A5B4C12D6; A5B4C12D7; A5B4C12D8; A5B4C12D9; A5B4C12D10; A5B4C12D11; A5B4C12D12; A5B4C12D13; A5B4C12D14; A5B4C12D15; A5B4C12D16; A5B4C12D17; A5B4C12D18; A5B4C12D19; A5B4C12D20; A5B4C12D21; A5B4C12D21; A5B4C12D22; A5B4C12D23; A5B4C12D24; A5B4C12D25;

A5B4C13; A5B4C13D1; A5B4C13D2; A5B4C13D3; A5B4C13D4; A5B4C13D5; A5B4C13D6; A5B4C13D7; A5B4C13D8; A5B4C13D9; A5B4C13D10; A5B4C13D11; A5B4C13D12; A5B4C13D13; A5B4C13D14; A5B4C13D15; A5B4C13D16; A5B4C13D17; A5B4C13D18; A5B4C13D19; A5B4C13D20; A5B4C13D21; A5B4C13D21; A5B4C13D22; A5B4C13D23; A5B4C13D24; A5B4C13D25;

A5B4C14; A5B4C14D1; A5B4C14D2; A5B4C14D3; A5B4C14D4; A5B4C14D5; A5B4C14D6; A5B4C14D7; A5B4C14D8; A5B4C14D9; A5B4C14D10; A5B4C14D11; A5B4C14D12; A5B4C14D13; A5B4C14D14; A5B4C14D15; A5B4C14D16; A5B4C14D17; A5B4C14D18; A5B4C14D19; A5B4C14D20; A5B4C14D21; A5B4C14D21; A5B4C14D22; A5B4C14D23; A5B4C14D24; A5B4C14D25;

A5B4C15; A5B4C15D1; A5B4C15D2; A5B4C15D3; A5B4C15D4; A5B4C15D5; A5B4C15D6; A5B4C15D7; A5B4C15D8; A5B4C15D9; A5B4C15D10; A5B4C15D11; A5B4C15D12; A5B4C15D13; A5B4C15D14; A5B4C15D15; A5B4C15D16; A5B4C15D17; A5B4C15D18; A5B4C15D19; A5B4C15D20; A5B4C15D21; A5B4C15D21; A5B4C15D22; A5B4C15D23; A5B4C15D24; A5B4C15D25;

A5B4C16; A5B4C16D1; A5B4C16D2; A5B4C16D3; A5B4C16D4; A5B4C16D5; A5B4C16D6; A5B4C16D7; A5B4C16D8; A5B4C16D9; A5B4C16D10; A5B4C16D11; A5B4C16D12; A5B4C16D13; A5B4C16D14; A5B4C16D15; A5B4C16D16; A5B4C16D17; A5B4C16D18; A5B4C16D19; A5B4C16D20; A5B4C16D21; A5B4C16D21; A5B4C16D22; A5B4C16D23; A5B4C16D24; A5B4C16D25;

A5B4C17; A5B4C17D1; A5B4C17D2; A5B4C17D3; A5B4C17D4; A5B4C17D5; A5B4C17D6; A5B4C17D7; A5B4C17D8; A5B4C17D9; A5B4C17D10; A5B4C17D11; A5B4C17D12; A5B4C17D13; A5B4C17D14; A5B4C17D15; A5B4C17D16; A5B4C17D17; A5B4C17D18; A5B4C17D19; A5B4C17D20; A5B4C17D21; A5B4C17D21; A5B4C17D22; A5B4C17D23; A5B4C17D24; A5B4C17D25;

A5B4C18; A5B4C18D1; A5B4C18D2; A5B4C18D3; A5B4C18D4; A5B4C18D5; A5B4C18D6; A5B4C18D7; A5B4C18D8; A5B4C18D9; A5B4C18D10; A5B4C18D11; A5B4C18D12; A5B4C18D13; A5B4C18D14; A5B4C18D15; A5B4C18D16; A5B4C18D17; A5B4C18D18; A5B4C18D19; A5B4C18D20; A5B4C18D21; A5B4C18D21; A5B4C18D22; A5B4C18D23; A5B4C18D24; A5B4C18D25;

A5B4C19; A5B4C19D1; A5B4C19D2; A5B4C19D3; A5B4C19D4; A5B4C19D5; A5B4C19D6; A5B4C19D7; A5B4C19D8; A5B4C19D9; A5B4C19D10; A5B4C19D11; A5B4C19D12;

A5B4C19D13; A5B4C19D14; A5B4C19D15; A5B4C19D16; A5B4C19D17; A5B4C19D18; A5B4C19D19; A5B4C19D20; A5B4C19D21; A5B4C19D21; A5B4C19D22; A5B4C19D23; A5B4C19D24; A5B4C19D25;

A5B4C20; A5B4C20D1; A5B4C20D2; A5B4C20D3; A5B4C20D4; A5B4C20D5; A5B4C20D6; A5B4C20D7; A5B4C20D8; A5B4C20D9; A5B4C20D10; A5B4C20D11; A5B4C20D12; A5B4C20D13; A5B4C20D14; A5B4C20D15; A5B4C20D16; A5B4C20D17; A5B4C20D18; A5B4C20D19; A5B4C20D20; A5B4C20D21; A5B4C20D21; A5B4C20D22; A5B4C20D23; A5B4C20D24; A5B4C20D25.

In an embodiment, the preferred fungicide A is sulphur (A5) and the preferred fungicide B is fluindapyr (B5).

A5B5C1; A5B5C1D1; A5B5C1D2; A5B5C1D3; A5B5C1D4; A5B5C1D5; A5B5C1D6; A5B5C1D7; A5B5C1D8; A5B5C1D9; A5B5C1D10; A5B5C1D11; A5B5C1D12; A5B5C1D13; A5B5C1D14; A5B5C1D15; A5B5C1D16; A5B5C1D17; A5B5C1D18; A5B5C1D19; A5B5C1D20; A5B5C1D21; A5B5C1D21; A5B5C1D22; A5B5C1D23; A5B5C1D24; A5B5C1D25;

A5B5C2; A5B5C2D1; A5B5C2D2; A5B5C2D3; A5B5C2D4; A5B5C2D5; A5B5C2D6; A5B5C2D7; A5B5C2D8; A5B5C2D9; A5B5C2D10; A5B5C2D11; A5B5C2D12; A5B5C2D13; A5B5C2D14; A5B5C2D15; A5B5C2D16; A5B5C2D17; A5B5C2D18; A5B5C2D19; A5B5C2D20; A5B5C2D21; A5B5C2D21; A5B5C2D22; A5B5C2D23; A5B5C2D24; A5B5C2D25;

A5B5C3; A5B5C3D1; A5B5C3D2; A5B5C3D3; A5B5C3D4; A5B5C3D5; A5B5C3D6; A5B5C3D7; A5B5C3D8; A5B5C3D9; A5B5C3D10; A5B5C3D11; A5B5C3D12; A5B5C3D13; A5B5C3D14; A5B5C3D15; A5B5C3D16; A5B5C3D17; A5B5C3D18; A5B5C3D19; A5B5C3D20; A5B5C3D21; A5B5C3D21; A5B5C3D22; A5B5C3D23; A5B5C3D24; A5B5C3D25;

A5B5C4; A5B5C4D1; A5B5C4D2; A5B5C4D3; A5B5C4D4; A5B5C4D5; A5B5C4D6; A5B5C4D7; A5B5C4D8; A5B5C4D9; A5B5C4D10; A5B5C4D11; A5B5C4D12; A5B5C4D13; A5B5C4D14; A5B5C4D15; A5B5C4D16; A5B5C4D17; A5B5C4D18; A5B5C4D19; A5B5C4D20; A5B5C4D21; A5B5C4D21; A5B5C4D22; A5B5C4D23; A5B5C4D24; A5B5C4D25;

A5B5C5; A5B5C5D1; A5B5C5D2; A5B5C5D3; A5B5C5D4; A5B5C5D5; A5B5C5D6; A5B5C5D7; A5B5C5D8; A5B5C5D9; A5B5C5D10; A5B5C5D11; A5B5C5D12; A5B5C5D13; A5B5C5D14; A5B5C5D15; A5B5C5D16; A5B5C5D17; A5B5C5D18; A5B5C5D19; A5B5C5D20; A5B5C5D21; A5B5C5D21; A5B5C5D22; A5B5C5D23; A5B5C5D24; A5B5C5D25;

A5B5C6; A5B5C6D1; A5B5C6D2; A5B5C6D3; A5B5C6D4; A5B5C6D5; A5B5C6D6; A5B5C6D7; A5B5C6D8; A5B5C6D9; A5B5C6D10; A5B5C6D11; A5B5C6D12; A5B5C6D13; A5B5C6D14; A5B5C6D15; A5B5C6D16; A5B5C6D17; A5B5C6D18; A5B5C6D19; A5B5C6D20; A5B5C6D21; A5B5C6D21; A5B5C6D22; A5B5C6D23; A5B5C6D24; A5B5C6D25;

A5B5C7; A5B5C7D1; A5B5C7D2; A5B5C7D3; A5B5C7D4; A5B5C7D5; A5B5C7D6; A5B5C7D7; A5B5C7D8; A5B5C7D9; A5B5C7D10; A5B5C7D11; A5B5C7D12; A5B5C7D13; A5B5C7D14; A5B5C7D15; A5B5C7D16; A5B5C7D17; A5B5C7D18; A5B5C7D19; A5B5C7D20; A5B5C7D21; A5B5C7D21; A5B5C7D22; A5B5C7D23; A5B5C7D24; A5B5C7D25;

A5B5C8; A5B5C8D1; A5B5C8D2; A5B5C8D3; A5B5C8D4; A5B5C8D5; A5B5C8D6; A5B5C8D7; A5B5C8D8; A5B5C8D9; A5B5C8D10; A5B5C8D11; A5B5C8D12; A5B5C8D13; A5B5C8D14; A5B5C8D15; A5B5C8D16; A5B5C8D17; A5B5C8D18; A5B5C8D19; A5B5C8D20; A5B5C8D21; A5B5C8D21; A5B5C8D22; A5B5C8D23; A5B5C8D24; A5B5C8D25;

A5B5C9; A5B5C9D1; A5B5C9D2; A5B5C9D3; A5B5C9D4; A5B5C9D5; A5B5C9D6; A5B5C9D7; A5B5C9D8; A5B5C9D9; A5B5C9D10; A5B5C9D11; A5B5C9D12; A5B5C9D13; A5B5C9D14; A5B5C9D15; A5B5C9D16; A5B5C9D17; A5B5C9D18; A5B5C9D19; A5B5C9D20; A5B5C9D21; A5B5C9D21; A5B5C9D22; A5B5C9D23; A5B5C9D24; A5B5C9D25;

A5B5C10; A5B5C10D1; A5B5C10D2; A5B5C10D3; A5B5C10D4; A5B5C10D5; A5B5C10D6; A5B5C10D7; A5B5C10D8; A5B5C10D9; A5B5C10D10; A5B5C10D11; A5B5C10D12; A5B5C10D13; A5B5C10D14; A5B5C10D15; A5B5C10D16; A5B5C10D17; A5B5C10D18; A5B5C10D19; A5B5C10D20; A5B5C10D21; A5B5C10D21; A5B5C10D22; A5B5C10D23; A5B5C10D24; A5B5C10D25;

A5B5C11; A5B5C11D1; A5B5C11D2; A5B5C11D3; A5B5C11D4; A5B5C11D5; A5B5C11D6; A5B5C11D7; A5B5C11D8; A5B5C11D9; A5B5C11D10; A5B5C11D11; A5B5C11D12; A5B5C11D13; A5B5C11D14; A5B5C11D15; A5B5C11D16; A5B5C11D17; A5B5C11D18; A5B5C11D19; A5B5C11D20; A5B5C11D21; A5B5C11D21; A5B5C11D22; A5B5C11D23; A5B5C11D24; A5B5C11D25;

A5B5C12; A5B5C12D1; A5B5C12D2; A5B5C12D3; A5B5C12D4; A5B5C12D5; A5B5C12D6; A5B5C12D7; A5B5C12D8; A5B5C12D9; A5B5C12D10; A5B5C12D11; A5B5C12D12; A5B5C12D13; A5B5C12D14; A5B5C12D15; A5B5C12D16; A5B5C12D17; A5B5C12D18; A5B5C12D19; A5B5C12D20; A5B5C12D21; A5B5C12D21; A5B5C12D22; A5B5C12D23; A5B5C12D24; A5B5C12D25;

A5B5C13; A5B5C13D1; A5B5C13D2; A5B5C13D3; A5B5C13D4; A5B5C13D5; A5B5C13D6; A5B5C13D7; A5B5C13D8; A5B5C13D9; A5B5C13D10; A5B5C13D11; A5B5C13D12; A5B5C13D13; A5B5C13D14; A5B5C13D15; A5B5C13D16; A5B5C13D17; A5B5C13D18; A5B5C13D19; A5B5C13D20; A5B5C13D21; A5B5C13D21; A5B5C13D22; A5B5C13D23; A5B5C13D24; A5B5C13D25;

A5B5C14; A5B5C14D1; A5B5C14D2; A5B5C14D3; A5B5C14D4; A5B5C14D5; A5B5C14D6; A5B5C14D7; A5B5C14D8; A5B5C14D9; A5B5C14D10; A5B5C14D11; A5B5C14D12; A5B5C14D13; A5B5C14D14; A5B5C14D15; A5B5C14D16; A5B5C14D17; A5B5C14D18; A5B5C14D19; A5B5C14D20; A5B5C14D21; A5B5C14D21; A5B5C14D22; A5B5C14D23; A5B5C14D24; A5B5C14D25;

A5B5C15; A5B5C15D1; A5B5C15D2; A5B5C15D3; A5B5C15D4; A5B5C15D5; A5B5C15D6; A5B5C15D7; A5B5C15D8; A5B5C15D9; A5B5C15D10; A5B5C15D11; A5B5C15D12; A5B5C15D13; A5B5C15D14; A5B5C15D15; A5B5C15D16; A5B5C15D17; A5B5C15D18; A5B5C15D19; A5B5C15D20; A5B5C15D21; A5B5C15D21; A5B5C15D22; A5B5C15D23; A5B5C15D24; A5B5C15D25;

A5B5C16; A5B5C16D1; A5B5C16D2; A5B5C16D3; A5B5C16D4; A5B5C16D5; A5B5C16D6; A5B5C16D7; A5B5C16D8; A5B5C16D9; A5B5C16D10; A5B5C16D11; A5B5C16D12; A5B5C16D13; A5B5C16D14; A5B5C16D15; A5B5C16D16; A5B5C16D17; A5B5C16D18; A5B5C16D19; A5B5C16D20; A5B5C16D21; A5B5C16D21; A5B5C16D22; A5B5C16D23; A5B5C16D24; A5B5C16D25;

A5B5C17; A5B5C17D1; A5B5C17D2; A5B5C17D3; A5B5C17D4; A5B5C17D5; A5B5C17D6; A5B5C17D7; A5B5C17D8; A5B5C17D9; A5B5C17D10; A5B5C17D11; A5B5C17D12; A5B5C17D13; A5B5C17D14; A5B5C17D15; A5B5C17D16; A5B5C17D17; A5B5C17D18; A5B5C17D19; A5B5C17D20; A5B5C17D21; A5B5C17D21; A5B5C17D22; A5B5C17D23; A5B5C17D24; A5B5C17D25;

A5B5C18; A5B5C18D1; A5B5C18D2; A5B5C18D3; A5B5C18D4; A5B5C18D5; A5B5C18D6; A5B5C18D7; A5B5C18D8; A5B5C18D9; A5B5C18D10; A5B5C18D11; A5B5C18D12; A5B5C18D13; A5B5C18D14; A5B5C18D15; A5B5C18D16; A5B5C18D17; A5B5C18D18; A5B5C18D19; A5B5C18D20; A5B5C18D21; A5B5C18D21; A5B5C18D22; A5B5C18D23; A5B5C18D24; A5B5C18D25;

A5B5C19; A5B5C19D1; A5B5C19D2; A5B5C19D3; A5B5C19D4; A5B5C19D5; A5B5C19D6; A5B5C19D7; A5B5C19D8; A5B5C19D9; A5B5C19D10; A5B5C19D11; A5B5C19D12; A5B5C19D13; A5B5C19D14; A5B5C19D15; A5B5C19D16; A5B5C19D17; A5B5C19D18; A5B5C19D19; A5B5C19D20; A5B5C19D21; A5B5C19D21; A5B5C19D22; A5B5C19D23; A5B5C19D24; A5B5C19D25;

A5B5C20; A5B5C20D1; A5B5C20D2; A5B5C20D3; A5B5C20D4; A5B5C20D5; A5B5C20D6; A5B5C20D7; A5B5C20D8; A5B5C20D9; A5B5C20D10; A5B5C20D11; A5B5C20D12; A5B5C20D13; A5B5C20D14; A5B5C20D15; A5B5C20D16; A5B5C20D17; A5B5C20D18; A5B5C20D19; A5B5C20D20; A5B5C20D21; A5B5C20D21; A5B5C20D22; A5B5C20D23; A5B5C20D24; A5B5C20D25.

In an embodiment, the preferred fungicide A is sulphur (A5), and the preferred fungicide B is boscalid (B23).

A5B23C1; A5B23C1D1; A5B23C1D2; A5B23C1D3; A5B23C1D4; A5B23C1D5; A5B23C1D6; A5B23C1D7; A5B23C1D8; A5B23C1D9; A5B23C1D10; A5B23C1D11; A5B23C1D12; A5B23C1D13; A5B23C1D14; A5B23C1D15; A5B23C1D16; A5B23C1D17; A5B23C1D18; A5B23C1D19; A5B23C1D20; A5B23C1D21; A5B23C1D21; A5B23C1D22; A5B23C1D23; A5B23C1D24; A5B23C1D25;

A5B23C2; A5B23C2D1; A5B23C2D2; A5B23C2D3; A5B23C2D4; A5B23C2D5; A5B23C2D6; A5B23C2D7; A5B23C2D8; A5B23C2D9; A5B23C2D10; A5B23C2D11; A5B23C2D12; A5B23C2D13; A5B23C2D14; A5B23C2D15; A5B23C2D16; A5B23C2D17; A5B23C2D18; A5B23C2D19; A5B23C2D20; A5B23C2D21; A5B23C2D21; A5B23C2D22; A5B23C2D23; A5B23C2D24; A5B23C2D25;

A5B23C3; A5B23C3D1; A5B23C3D2; A5B23C3D3; A5B23C3D4; A5B23C3D5; A5B23C3D6; A5B23C3D7; A5B23C3D8; A5B23C3D9; A5B23C3D10; A5B23C3D11; A5B23C3D12; A5B23C3D13; A5B23C3D14; A5B23C3D15; A5B23C3D16; A5B23C3D17; A5B23C3D18; A5B23C3D19; A5B23C3D20; A5B23C3D21; A5B23C3D21; A5B23C3D22; A5B23C3D23; A5B23C3D24; A5B23C3D25;

A5B23C4; A5B23C4D1; A5B23C4D2; A5B23C4D3; A5B23C4D4; A5B23C4D5; A5B23C4D6; A5B23C4D7; A5B23C4D8; A5B23C4D9; A5B23C4D10; A5B23C4D11; A5B23C4D12; A5B23C4D13; A5B23C4D14; A5B23C4D15; A5B23C4D16; A5B23C4D17; A5B23C4D18; A5B23C4D19; A5B23C4D20; A5B23C4D21; A5B23C4D21; A5B23C4D22; A5B23C4D23; A5B23C4D24; A5B23C4D25;

A5B23C5; A5B23C5D1; A5B23C5D2; A5B23C5D3; A5B23C5D4; A5B23C5D5; A5B23C5D6; A5B23C5D7; A5B23C5D8; A5B23C5D9; A5B23C5D10; A5B23C5D11; A5B23C5D12; A5B23C5D13; A5B23C5D14; A5B23C5D15; A5B23C5D16; A5B23C5D17; A5B23C5D18; A5B23C5D19; A5B23C5D20; A5B23C5D21; A5B23C5D21; A5B23C5D22; A5B23C5D23; A5B23C5D24; A5B23C5D25;

A5B23C6; A5B23C6D1; A5B23C6D2; A5B23C6D3; A5B23C6D4; A5B23C6D5; A5B23C6D6; A5B23C6D7; A5B23C6D8; A5B23C6D9; A5B23C6D10; A5B23C6D11; A5B23C6D12; A5B23C6D13; A5B23C6D14; A5B23C6D15; A5B23C6D16; A5B23C6D17; A5B23C6D18; A5B23C6D19; A5B23C6D20; A5B23C6D21; A5B23C6D21; A5B23C6D22; A5B23C6D23; A5B23C6D24; A5B23C6D25;

A5B23C7; A5B23C7D1; A5B23C7D2; A5B23C7D3; A5B23C7D4; A5B23C7D5; A5B23C7D6; A5B23C7D7; A5B23C7D8; A5B23C7D9; A5B23C7D10; A5B23C7D11; A5B23C7D12; A5B23C7D13; A5B23C7D14; A5B23C7D15; A5B23C7D16; A5B23C7D17; A5B23C7D18; A5B23C7D19; A5B23C7D20; A5B23C7D21; A5B23C7D21; A5B23C7D22; A5B23C7D23; A5B23C7D24; A5B23C7D25;

A5B23C8; A5B23C8D1; A5B23C8D2; A5B23C8D3; A5B23C8D4; A5B23C8D5; A5B23C8D6; A5B23C8D7; A5B23C8D8; A5B23C8D9; A5B23C8D10; A5B23C8D11; A5B23C8D12; A5B23C8D13; A5B23C8D14; A5B23C8D15; A5B23C8D16; A5B23C8D17; A5B23C8D18; A5B23C8D19; A5B23C8D20; A5B23C8D21; A5B23C8D21; A5B23C8D22; A5B23C8D23; A5B23C8D24; A5B23C8D25;

A5B23C9; A5B23C9D1; A5B23C9D2; A5B23C9D3; A5B23C9D4; A5B23C9D5; A5B23C9D6; A5B23C9D7; A5B23C9D8; A5B23C9D9; A5B23C9D10; A5B23C9D11; A5B23C9D12; A5B23C9D13; A5B23C9D14; A5B23C9D15; A5B23C9D16; A5B23C9D17; A5B23C9D18;

A5B23C9D19; A5B23C9D20; A5B23C9D21; A5B23C9D21; A5B23C9D22; A5B23C9D23; A5B23C9D24; A5B23C9D25;
A5B23C10; A5B23C10D1; A5B23C10D2; A5B23C10D3; A5B23C10D4; A5B23C10D5; A5B23C10D6; A5B23C10D7; A5B23C10D8; A5B23C10D9; A5B23C10D10; A5B23C10D11; A5B23C10D12; A5B23C10D13; A5B23C10D14; A5B23C10D15; A5B23C10D16; A5B23C10D17; A5B23C10D18; A5B23C10D19; A5B23C10D20; A5B23C10D21; A5B23C10D21; A5B23C10D22; A5B23C10D23; A5B23C10D24; A5B23C10D25;
A5B23C11; A5B23C11D1; A5B23C11D2; A5B23C11D3; A5B23C11D4; A5B23C11D5; A5B23C11D6; A5B23C11D7; A5B23C11D8; A5B23C11D9; A5B23C11D10; A5B23C11D11; A5B23C11D12; A5B23C11D13; A5B23C11D14; A5B23C11D15; A5B23C11D16; A5B23C11D17; A5B23C11D18; A5B23C11D19; A5B23C11D20; A5B23C11D21; A5B23C11D21; A5B23C11D22; A5B23C11D23; A5B23C11D24; A5B23C11D25;
A5B23C12; A5B23C12D1; A5B23C12D2; A5B23C12D3; A5B23C12D4; A5B23C12D5; A5B23C12D6; A5B23C12D7; A5B23C12D8; A5B23C12D9; A5B23C12D10; A5B23C12D11; A5B23C12D12; A5B23C12D13; A5B23C12D14; A5B23C12D15; A5B23C12D16; A5B23C12D17; A5B23C12D18; A5B23C12D19; A5B23C12D20; A5B23C12D21; A5B23C12D21; A5B23C12D22; A5B23C12D23; A5B23C12D24; A5B23C12D25;
A5B23C13; A5B23C13D1; A5B23C13D2; A5B23C13D3; A5B23C13D4; A5B23C13D5; A5B23C13D6; A5B23C13D7; A5B23C13D8; A5B23C13D9; A5B23C13D10; A5B23C13D11; A5B23C13D12; A5B23C13D13; A5B23C13D14; A5B23C13D15; A5B23C13D16; A5B23C13D17; A5B23C13D18; A5B23C13D19; A5B23C13D20; A5B23C13D21; A5B23C13D21; A5B23C13D22; A5B23C13D23; A5B23C13D24; A5B23C13D25;
A5B23C14; A5B23C14D1; A5B23C14D2; A5B23C14D3; A5B23C14D4; A5B23C14D5; A5B23C14D6; A5B23C14D7; A5B23C14D8; A5B23C14D9; A5B23C14D10; A5B23C14D11; A5B23C14D12; A5B23C14D13; A5B23C14D14; A5B23C14D15; A5B23C14D16; A5B23C14D17; A5B23C14D18; A5B23C14D19; A5B23C14D20; A5B23C14D21; A5B23C14D21; A5B23C14D22; A5B23C14D23; A5B23C14D24; A5B23C14D25;
A5B23C15; A5B23C15D1; A5B23C15D2; A5B23C15D3; A5B23C15D4; A5B23C15D5; A5B23C15D6; A5B23C15D7; A5B23C15D8; A5B23C15D9; A5B23C15D10; A5B23C15D11; A5B23C15D12; A5B23C15D13; A5B23C15D14; A5B23C15D15; A5B23C15D16; A5B23C15D17; A5B23C15D18; A5B23C15D19; A5B23C15D20; A5B23C15D21; A5B23C15D21; A5B23C15D22; A5B23C15D23; A5B23C15D24; A5B23C15D25;
A5B23C16; A5B23C16D1; A5B23C16D2; A5B23C16D3; A5B23C16D4; A5B23C16D5; A5B23C16D6; A5B23C16D7; A5B23C16D8; A5B23C16D9; A5B23C16D10; A5B23C16D11; A5B23C16D12; A5B23C16D13; A5B23C16D14; A5B23C16D15; A5B23C16D16; A5B23C16D17; A5B23C16D18; A5B23C16D19; A5B23C16D20; A5B23C16D21; A5B23C16D21; A5B23C16D22; A5B23C16D23; A5B23C16D24; A5B23C16D25;
A5B23C17; A5B23C17D1; A5B23C17D2; A5B23C17D3; A5B23C17D4; A5B23C17D5; A5B23C17D6; A5B23C17D7; A5B23C17D8; A5B23C17D9; A5B23C17D10; A5B23C17D11; A5B23C17D12; A5B23C17D13; A5B23C17D14; A5B23C17D15; A5B23C17D16; A5B23C17D17; A5B23C17D18; A5B23C17D19; A5B23C17D20; A5B23C17D21; A5B23C17D21; A5B23C17D22; A5B23C17D23; A5B23C17D24; A5B23C17D25;
A5B23C18; A5B23C18D1; A5B23C18D2; A5B23C18D3; A5B23C18D4; A5B23C18D5; A5B23C18D6; A5B23C18D7; A5B23C18D8; A5B23C18D9; A5B23C18D10; A5B23C18D11; A5B23C18D12; A5B23C18D13; A5B23C18D14; A5B23C18D15; A5B23C18D16; A5B23C18D17; A5B23C18D18; A5B23C18D19; A5B23C18D20; A5B23C18D21; A5B23C18D21; A5B23C18D22; A5B23C18D23; A5B23C18D24; A5B23C18D25;
A5B23C19; A5B23C19D1; A5B23C19D2; A5B23C19D3; A5B23C19D4; A5B23C19D5; A5B23C19D6; A5B23C19D7; A5B23C19D8; A5B23C19D9; A5B23C19D10; A5B23C19D11; A5B23C19D12; A5B23C19D13; A5B23C19D14; A5B23C19D15; A5B23C19D16; A5B23C19D17; A5B23C19D18; A5B23C19D19; A5B23C19D20; A5B23C19D21; A5B23C19D21; A5B23C19D22; A5B23C19D23; A5B23C19D24; A5B23C19D25;
A5B23C20; A5B23C20D1; A5B23C20D2; A5B23C20D3; A5B23C20D4; A5B23C20D5; A5B23C20D6; A5B23C20D7; A5B23C20D8; A5B23C20D9; A5B23C20D10; A5B23C20D11; A5B23C20D12; A5B23C20D13; A5B23C20D14; A5B23C20D15; A5B23C20D16; A5B23C20D17; A5B23C20D18; A5B23C20D19; A5B23C20D20; A5B23C20D21; A5B23C20D21; A5B23C20D22; A5B23C20D23; A5B23C20D24; A5B23C20D25.

In a preferred embodiment, the preferred fungicide A is mancozeb (A1) or folpet (A2) or tribasic copper sulfate (A3) or chlorothalonil (A4) or sulphur (A5), and the preferred fungicide B is bixafen (B6).

In an embodiment, the preferred combinations according to the invention may be selected from the following specific combinations, which are intended to be exemplary:

(A1-A6)B6C1; (A1-A6)B6C1D1; (A1-A6)B6C1D2; (A1-A6)B6C1D3; (A1-A6)B6C1D4; (A1-A6)B6C1D5; (A1-A6)B6C1D6; (A1-A6)B6C1D7; (A1-A6)B6C1D8; (A1-A6)B6C1D9; (A1-A6)B6C1D10; (A1-A6)B6C1D11; (A1-A6)B6C1D12; (A1-A6)B6C1D13; (A1-A6)B6C1D14; (A1-A6)B6C1D15; (A1-A6)B6C1D16; (A1-A6)B6C1D17; (A1-A6)B6C1D18; (A1-A6)B6C1D19; (A1-A6)B6C1D20; (A1-A6)B6C1D21; (A1-A6)B6C1D21; (A1-A6)B6C1D22; (A1-A6)B6C1D23; (A1-A6)B6C1D24; (A1-A6)B6C1D25;

(A1-A6)B6C2; (A1-A6)B6C2D1; (A1-A6)B6C2D2; (A1-A6)B6C2D3; (A1-A6)B6C2D4; (A1-A6)B6C2D5; (A1-A6)B6C2D6; (A1-A6)B6C2D7; (A1-A6)B6C2D8; (A1-A6)B6C2D9; (A1-A6)B6C2D10; (A1-A6)B6C2D11; (A1-A6)B6C2D12; (A1-A6)B6C2D13; (A1-A6)B6C2D14; (A1-A6)B6C2D15; (A1-A6)B6C2D16; (A1-A6)B6C2D17; (A1-A6)B6C2D18; (A1-A6)B6C2D19; (A1-A6)B6C2D20; (A1-A6)B6C2D21; (A1-A6)B6C2D21; (A1-A6)B6C2D22; (A1-A6)B6C2D23; (A1-A6)B6C2D24; (A1-A6)B6C2D25;

(A1-A6)B6C3; (A1-A6)B6C3D1; (A1-A6)B6C3D2; (A1-A6)B6C3D3; (A1-A6)B6C3D4; (A1-A6)

B6C3D5; (A1-A6)B6C3D6; (A1-A6)B6C3D7; (A1-A6)B6C3D8; (A1-A6)B6C3D9; (A1-A6)B6C3D10; (A1-A6)B6C3D11; (A1-A6)B6C3D12; (A1-A6)B6C3D13; (A1-A6)B6C3D14; (A1-A6)B6C3D15; (A1-A6)B6C3D16; (A1-A6)B6C3D17; (A1-A6)B6C3D18; (A1-A6)B6C3D19; (A1-A6)B6C3D20; (A1-A6)B6C3D21; (A1-A6)B6C3D21; (A1-A6)B6C3D22; (A1-A6)B6C3D23; (A1-A6)B6C3D24; (A1-A6)B6C3D25;

(A1-A6)B6C4; (A1-A6)B6C4D1; (A1-A6)B6C4D2; (A1-A6)B6C4D3; (A1-A6)B6C4D4; (A1-A6)B6C4D5; (A1-A6)B6C4D6; (A1-A6)B6C4D7; (A1-A6)B6C4D8; (A1-A6)B6C4D9; (A1-A6)B6C4D10; (A1-A6)B6C4D11; (A1-A6)B6C4D12; (A1-A6)B6C4D13; (A1-A6)B6C4D14; (A1-A6)B6C4D15; (A1-A6)B6C4D16; (A1-A6)B6C4D17; (A1-A6)B6C4D18; (A1-A6)B6C4D19; (A1-A6)B6C4D20; (A1-A6)B6C4D21; (A1-A6)B6C4D21; (A1-A6)B6C4D22; (A1-A6)B6C4D23; (A1-A6)B6C4D24; (A1-A6)B6C4D25;

(A1-A6)B6C5; (A1-A6)B6C5D1; (A1-A6)B6C5D2; (A1-A6)B6C5D3; (A1-A6)B6C5D4; (A1-A6)B6C5D5; (A1-A6)B6C5D6; (A1-A6)B6C5D7; (A1-A6)B6C5D8; (A1-A6)B6C5D9; (A1-A6)B6C5D10; (A1-A6)B6C5D11; (A1-A6)B6C5D12; (A1-A6)B6C5D13; (A1-A6)B6C5D14; (A1-A6)B6C5D15; (A1-A6)B6C5D16; (A1-A6)B6C5D17; (A1-A6)B6C5D18; (A1-A6)B6C5D19; (A1-A6)B6C5D20; (A1-A6)B6C5D21; (A1-A6)B6C5D21; (A1-A6)B6C5D22; (A1-A6)B6C5D23; (A1-A6)B6C5D24; (A1-A6)B6C5D25;

(A1-A6)B6C6; (A1-A6)B6C6D1; (A1-A6)B6C6D2; (A1-A6)B6C6D3; (A1-A6)B6C6D4; (A1-A6)B6C6D5; (A1-A6)B6C6D6; (A1-A6)B6C6D7; (A1-A6)B6C6D8; (A1-A6)B6C6D9; (A1-A6)B6C6D10; (A1-A6)B6C6D11; (A1-A6)B6C6D12; (A1-A6)B6C6D13; (A1-A6)B6C6D14; (A1-A6)B6C6D15; (A1-A6)B6C6D16; (A1-A6)B6C6D17; (A1-A6)B6C6D18; (A1-A6)B6C6D19; (A1-A6)B6C6D20; (A1-A6)B6C6D21; (A1-A6)B6C6D21; (A1-A6)B6C6D22; (A1-A6)B6C6D23; (A1-A6)B6C6D24; (A1-A6)B6C6D25;

(A1-A6)B6C7; (A1-A6)B6C7D1; (A1-A6)B6C7D2; (A1-A6)B6C7D3; (A1-A6)B6C7D4; (A1-A6)B6C7D5; (A1-A6)B6C7D6; (A1-A6)B6C7D7; (A1-A6)B6C7D8; (A1-A6)B6C7D9; (A1-A6)B6C7D10; (A1-A6)B6C7D11; (A1-A6)B6C7D12; (A1-A6)B6C7D13; (A1-A6)B6C7D14; (A1-A6)B6C7D15; (A1-A6)B6C7D16; (A1-A6)B6C7D17; (A1-A6)B6C7D18; (A1-A6)B6C7D19; (A1-A6)B6C7D20; (A1-A6)B6C7D21; (A1-A6)B6C7D21; (A1-A6)B6C7D22; (A1-A6)B6C7D23; (A1-A6)B6C7D24; (A1-A6)B6C7D25;

(A1-A6)B6C8; (A1-A6)B6C8D1; (A1-A6)B6C8D2; (A1-A6)B6C8D3; (A1-A6)B6C8D4; (A1-A6)B6C8D5; (A1-A6)B6C8D6; (A1-A6)B6C8D7; (A1-A6)B6C8D8; (A1-A6)B6C8D9; (A1-A6)B6C8D10; (A1-A6)B6C8D11; (A1-A6)B6C8D12; (A1-A6)B6C8D13; (A1-A6)B6C8D14; (A1-A6)B6C8D15; (A1-A6)B6C8D16; (A1-A6)B6C8D17; (A1-A6)B6C8D18; (A1-A6)B6C8D19; (A1-A6)B6C8D20; (A1-A6)B6C8D21; (A1-A6)B6C8D21; (A1-A6)B6C8D22; (A1-A6)B6C8D23; (A1-A6)B6C8D24; (A1-A6)B6C8D25;

(A1-A6)B6C9; (A1-A6)B6C9D1; (A1-A6)B6C9D2; (A1-A6)B6C9D3; (A1-A6)B6C9D4; (A1-A6)B6C9D5; (A1-A6)B6C9D6; (A1-A6)B6C9D7; (A1-A6)B6C9D8; (A1-A6)B6C9D9; (A1-A6)B6C9D10; (A1-A6)B6C9D11; (A1-A6)B6C9D12; (A1-A6)B6C9D13; (A1-A6)B6C9D14; (A1-A6)B6C9D15; (A1-A6)B6C9D16; (A1-A6)B6C9D17; (A1-A6)B6C9D18; (A1-A6)B6C9D19; (A1-A6)B6C9D20; (A1-A6)B6C9D21; (A1-A6)B6C9D21; (A1-A6)B6C9D22; (A1-A6)B6C9D23; (A1-A6)B6C9D24; (A1-A6)B6C9D25;

(A1-A6)B6C10; (A1-A6)B6C10D1; (A1-A6)B6C10D2; (A1-A6)B6C10D3; (A1-A6)B6C10D4; (A1-A6)B6C10D5; (A1-A6)B6C10D6; (A1-A6)B6C10D7; (A1-A6)B6C10D8; (A1-A6)B6C10D9; (A1-A6)B6C10D10; (A1-A6)B6C10D11; (A1-A6)B6C10D12; (A1-A6)B6C10D13; (A1-A6)B6C10D14; (A1-A6)B6C10D15; (A1-A6)B6C10D16; (A1-A6)B6C10D17; (A1-A6)B6C10D18; (A1-A6)B6C10D19; (A1-A6)B6C10D20; (A1-A6)B6C10D21; (A1-A6)B6C10D21; (A1-A6)B6C10D22; (A1-A6)B6C10D23; (A1-A6)B6C10D24; (A1-A6)B6C10D25;

(A1-A6)B6C11; (A1-A6)B6C11D1; (A1-A6)B6C11D2; (A1-A6)B6C11D3; (A1-A6)B6C11D4; (A1-A6)B6C11D5; (A1-A6)B6C11D6; (A1-A6)B6C11D7; (A1-A6)B6C11D8; (A1-A6)B6C11D9; (A1-A6)B6C11D10; (A1-A6)B6C11D11; (A1-A6)B6C11D12; (A1-A6)B6C11D13; (A1-A6)B6C11D14; (A1-A6)B6C11D15; (A1-A6)B6C11D16; (A1-A6)B6C11D17; (A1-A6)B6C11D18; (A1-A6)B6C11D19; (A1-A6)B6C11D20; (A1-A6)B6C11D21; (A1-A6)B6C11D21; (A1-A6)B6C11D22; (A1-A6)B6C11D23; (A1-A6)B6C11D24; (A1-A6)B6C11D25;

(A1-A6)B6C12; (A1-A6)B6C12D1; (A1-A6)B6C12D2; (A1-A6)B6C12D3; (A1-A6)B6C12D4; (A1-A6)B6C12D5; (A1-A6)B6C12D6; (A1-A6)B6C12D7; (A1-A6)B6C12D8; (A1-A6)B6C12D9; (A1-A6)B6C12D10; (A1-A6)B6C12D11; (A1-A6)B6C12D12; (A1-A6)B6C12D13; (A1-A6)B6C12D14; (A1-A6)B6C12D15; (A1-A6)B6C12D16; (A1-A6)B6C12D17; (A1-A6)B6C12D18; (A1-A6)B6C12D19; (A1-A6)B6C12D20; (A1-A6)B6C12D21; (A1-A6)B6C12D21; (A1-A6)B6C12D22; (A1-A6)B6C12D23; (A1-A6)B6C12D24; (A1-A6)B6C12D25;

(A1-A6)B6C13; (A1-A6)B6C13D1; (A1-A6)B6C13D2; (A1-A6)B6C13D3; (A1-A6)B6C13D4; (A1-A6)B6C13D5; (A1-A6)B6C13D6; (A1-A6)B6C13D7; (A1-A6)B6C13D8; (A1-A6)B6C13D9; (A1-A6)B6C13D10; (A1-A6)B6C13D11; (A1-A6)B6C13D12; (A1-A6)B6C13D13; (A1-A6)B6C13D14; (A1-A6)B6C13D15; (A1-A6)B6C13D16; (A1-A6)B6C13D17; (A1-A6)B6C13D18; (A1-A6)B6C13D19; (A1-A6)B6C13D20; (A1-A6)B6C13D21; (A1-A6)B6C13D21; (A1-A6)B6C13D22; (A1-A6)B6C13D23; (A1-A6)B6C13D24; (A1-A6)B6C13D25;

(A1-A6)B6C14; (A1-A6)B6C14D1; (A1-A6)B6C14D2; (A1-A6)B6C14D3; (A1-A6)B6C14D4; (A1-A6)B6C14D5; (A1-A6)B6C14D6; (A1-A6)B6C14D7; (A1-A6)B6C14D8; (A1-A6)B6C14D9; (A1-A6)B6C14D10; (A1-A6)B6C14D11; (A1-A6)B6C14D12; (A1-A6)B6C14D13; (A1-A6)B6C14D14; (A1-A6)B6C14D15; (A1-A6)B6C14D16; (A1-A6)B6C14D17; (A1-A6)B6C14D18; (A1-A6)B6C14D19; (A1-A6)B6C14D20; (A1-A6)B6C14D21; (A1-A6)B6C14D21; (A1-A6)B6C14D22; (A1-A6)B6C14D23; (A1-A6)B6C14D24; (A1-A6)B6C14D25;

(A1-A6)B6C15; (A1-A6)B6C15D1; (A1-A6)B6C15D2; (A1-A6)B6C15D3; (A1-A6)B6C15D4; (A1-A6)B6C15D5; (A1-A6)B6C15D6; (A1-A6)B6C15D7; (A1-A6)B6C15D8; (A1-A6)B6C15D9; (A1-A6)

B6C15D10; (A1-A6)B6C15D11; (A1-A6)B6C15D12; (A1-A6)B6C15D13; (A1-A6)B6C15D14; (A1-A6) B6C15D15; (A1-A6)B6C15D16; (A1-A6)B6C15D17; (A1-A6)B6C15D18; (A1-A6)B6C15D19; (A1-A6) B6C15D20; (A1-A6)B6C15D21; (A1-A6)B6C15D21; (A1-A6)B6C15D22; (A1-A6)B6C15D23; (A1-A6) B6C15D24; (A1-A6)B6C15D25;

(A1-A6)B6C16; (A1-A6)B6C16D1; (A1-A6)B6C16D2; (A1-A6)B6C16D3; (A1-A6)B6C16D4; (A1-A6) B6C16D5; (A1-A6)B6C16D6; (A1-A6)B6C16D7; (A1-A6)B6C16D8; (A1-A6)B6C16D9; (A1-A6) B6C16D10; (A1-A6)B6C16D11; (A1-A6)B6C16D12; (A1-A6)B6C16D13; (A1-A6)B6C16D14; (A1-A6) B6C16D15; (A1-A6)B6C16D16; (A1-A6)B6C16D17; (A1-A6)B6C16D18; (A1-A6)B6C16D19; (A1-A6) B6C16D20; (A1-A6)B6C16D21; (A1-A6)B6C16D21; (A1-A6)B6C16D22; (A1-A6)B6C16D23; (A1-A6) B6C16D24; (A1-A6)B6C16D25;

(A1-A6)B6C17; (A1-A6)B6C17D1; (A1-A6)B6C17D2; (A1-A6)B6C17D3; (A1-A6)B6C17D4; (A1-A6) B6C17D5; (A1-A6)B6C17D6; (A1-A6)B6C17D7; (A1-A6)B6C17D8; (A1-A6)B6C17D9; (A1-A6) B6C17D10; (A1-A6)B6C17D11; (A1-A6)B6C17D12; (A1-A6)B6C17D13; (A1-A6)B6C17D14; (A1-A6) B6C17D15; (A1-A6)B6C17D16; (A1-A6)B6C17D17; (A1-A6)B6C17D18; (A1-A6)B6C17D19; (A1-A6) B6C17D20; (A1-A6)B6C17D21; (A1-A6)B6C17D21; (A1-A6)B6C17D22; (A1-A6)B6C17D23; (A1-A6) B6C17D24; (A1-A6)B6C17D25;

(A1-A6)B6C18; (A1-A6)B6C18D1; (A1-A6)B6C18D2; (A1-A6)B6C18D3; (A1-A6)B6C18D4; (A1-A6) B6C18D5; (A1-A6)B6C18D6; (A1-A6)B6C18D7; (A1-A6)B6C18D8; (A1-A6)B6C18D9; (A1-A6) B6C18D10; (A1-A6)B6C18D11; (A1-A6)B6C18D12; (A1-A6)B6C18D13; (A1-A6)B6C18D14; (A1-A6) B6C18D15; (A1-A6)B6C18D16; (A1-A6)B6C18D17; (A1-A6)B6C18D18; (A1-A6)B6C18D19; (A1-A6) B6C18D20; (A1-A6)B6C18D21; (A1-A6)B6C18D21; (A1-A6)B6C18D22; (A1-A6)B6C18D23; (A1-A6) B6C18D24; (A1-A6)B6C18D25;

(A1-A6)B6C19; (A1-A6)B6C19D1; (A1-A6)B6C19D2; (A1-A6)B6C19D3; (A1-A6)B6C19D4; (A1-A6) B6C19D5; (A1-A6)B6C19D6; (A1-A6)B6C19D7; (A1-A6)B6C19D8; (A1-A6)B6C19D9; (A1-A6) B6C19D10; (A1-A6)B6C19D11; (A1-A6)B6C19D12; (A1-A6)B6C19D13; (A1-A6)B6C19D14; (A1-A6) B6C19D15; (A1-A6)B6C19D16; (A1-A6)B6C19D17; (A1-A6)B6C19D18; (A1-A6)B6C19D19; (A1-A6) B6C19D20; (A1-A6)B6C19D21; (A1-A6)B6C19D21; (A1-A6)B6C19D22; (A1-A6)B6C19D23; (A1-A6) B6C19D24; (A1-A6)B6C19D25;

(A1-A6)B6C20; (A1-A6)B6C20D1; (A1-A6)B6C20D2; (A1-A6)B6C20D3; (A1-A6)B6C20D4; (A1-A6) B6C20D5; (A1-A6)B6C20D6; (A1-A6)B6C20D7; (A1-A6)B6C20D8; (A1-A6)B6C20D9; (A1-A6) B6C20D10; (A1-A6)B6C20D11; (A1-A6)B6C20D12; (A1-A6)B6C20D13; (A1-A6)B6C20D14; (A1-A6) B6C20D15; (A1-A6)B6C20D16; (A1-A6)B6C20D17; (A1-A6)B6C20D18; (A1-A6)B6C20D19; (A1-A6) B6C20D20; (A1-A6)B6C20D21; (A1-A6)B6C20D21; (A1-A6)B6C20D22; (A1-A6)B6C20D23; (A1-A6) B6C20D24; (A1-A6)B6C20D25.

The combinations of the present invention may be formulated in the form of a composition.

In an embodiment, the present invention may provide a composition comprising:
  (a) at least one succinate dehydrogenase inhibitor fungicide;
  (b) at least one multi-site fungicide;
  (c) at least one other fungicide; and
  (d) at least one agrochemically acceptable excipient.

In an embodiment, the succinate dehydrogenase inhibitor fungicide, the multi-site fungicide and the other third and optional fourth fungicides may be selected according to any one of the preferred embodiments described hereinabove.

In an embodiment, the present invention may provide a composition comprising:
  (a) at least one succinate dehydrogenase inhibitor fungicide;
  (b) at least one dithiocarbamate fungicide;
  (c) at least one other fungicide;
  (d) at least one other agrochemical active; and
  (e) at least one agrochemically acceptable excipient.

The agrochemical active may be selected from herbicides, insecticides, miticides, acaricide, fertilizers, plant growth regulators, biocides and the like.

The amount of a composition according to the invention to be applied, will depend on various factors, such as the subject of the treatment, such as, for example plants, soil or seeds; the type of treatment, such as, for example spraying, dusting or seed dressing; the purpose of the treatment, such as, for example prophylactic or therapeutic disease control; in case of disease control the type of fungi to be controlled or the application time. This amount of the combinations of the present invention to be applied can be readily deduced by a skilled agronomist.

Thus in an embodiment, the present invention may provide compositions comprising:
  (a) at least one pyrazaole carboxamide selected from benzovindiflupyr, bixafen, fluxapyroxad, furametpyr, isopyrazam, penflufen, penthiopyrad, and sedaxane;
  (b) at least one other fungicide; and
  (c) at last one multi-site fungicide;
said fungicides being combined in agrochemically acceptable amounts.

In an embodiment, the total amount of succinate dehydrogenase inhibitor in the composition may typically be in the range of 0.1 to 99% by weight, preferably 0.2 to 90% by weight. The total amount of multi-site fungicide in the composition may be in the range of 0.1 to 99% by weight. The total amount of ergostrol biosynthesis inhibitor in the composition may be in the range of 0.1 to 99% by weight. The total amount of Quinone outside inhibitor in the composition may be in the range of 0.1 to 99% by weight.

In an embodiment, the constituent fungicides of the combination of the present invention may be admixed in ratio of (1-80):(1-80):(1-80) of the multi-site fungicide, succinate dehydrogenase inhibitor fungicide and the third fungicide respectively.

In an embodiment, the constituents of the composition of the present invention may be tank mixed and sprayed at the locus of the infection, or may be alternatively be mixed with surfactants and then sprayed.

In an embodiment, the constituents of the composition of the present invention may be used for foliar application, ground or applications to plant propagation materials.

In an embodiment, the compositions of the present invention may typically be produce by mixing the actives in the composition with an inert carrier, and adding surfactants and other adjuvants and carriers as needed and formulated into solid, or liquid formulations, including but not limited to wettable powders, granules, dusts, Soluble (liquid) concentrates, suspension concentrates, oil in water emulsion, water in oil emulsion, emulsifiable concentrates, capsule suspensions, ZC formulations, oil dispersions or other known formulation types. The composition may also be used for treatment of a plant propagation material such as seeds etc.

Examples of the solid carrier used in formulation include fine powders or granules such as minerals such as kaolin clay, attapulgite clay, bentonite, montmorillonite, acid white clay, pyrophyllite, talc, diatomaceous earth and calcite; natural organic materials such as corn rachis powder and walnut husk powder; synthetic organic materials such as urea; salts such as calcium carbonate and ammonium sulfate; synthetic inorganic materials such as synthetic hydrated silicon oxide; and as a liquid carrier, aromatic hydrocarbons such as xylene, alkylbenzene and methylnaphthalene; alcohols such as 2-propanol, ethyleneglycol, propylene glycol, and ethylene glycol monoethyl ether; ketones such as acetone, cyclohexanone and isophorone; vegetable oil such as soybean oil and cotton seed oil; petroleum aliphatic hydrocarbons, esters, dimethylsulfoxide, acetonitrile and water.

Examples of the surfactant include anionic surfactants such as alkyl sulfate ester salts, alkylaryl sulfonate salts, dialkyl sulfosuccinate salts, polyoxyethylene alkylaryl ether phosphate ester salts, lignosulfonate salts and naphthalene sulfonate formaldehyde polycondensates; and nonionic surfactants such as polyoxyethylene alkyl aryl ethers, polyoxyethylene alkylpolyoxypropylene block copolymers and sorbitan fatty acid esters and cationic surfactants such as alkyltrimethylammonium salts.

Examples of the other formulation auxiliary agents include water-soluble polymers such as polyvinyl alcohol and polyvinylpyrrolidone, polysaccharides such as Arabic gum, alginic acid and the salt thereof, CMC (carboxymethyl-cellulose), Xanthan gum, inorganic materials such as aluminum magnesium silicate and alumina sol, preservatives, coloring agents and stabilization agents such as PAP (acid phosphate isopropyl) and BHT.

The compositions according to the present invention is effective for the following plant diseases:

Disease in rice: Blast (*Magnaporthe grisea*), Helminthosporium leaf spot (*Cochliobolus miyabeanus*), sheath blight (*Rhizoctonia solani*), and bakanae disease (*Gibberella fujikuroi*).

Diseases in wheat: powdery mildew (*Erysiphe graminis*), Fusariuin head blight (*Fusarium graminearum, F. avenacerum, F. culmorum, Microdochium nivale*), rust (*Puccinia striiformis, P. graminis, P. recondita*), pink snow mold (*Micronectriella nivale*), Typhula snow blight (*Typhula* sp.), loose smut (*Ustilago tritici*), bunt (*Tilletia caries*), eyespot (*Pseudocercosporella herpotrichoides*), leaf blotch (*Mycosphaerella graminicola*), glume blotch (*Stagonospora nodorum*), septoria, and yellow spot (*Pyrenophora tritici-repentis*).

Diseases of barley: powdery mildew (*Erysiphe graminis*), Fusarium head blight (*Fusarium graminearum, F. avenacerum, F. culmorum, Microdochium nivale*), rust (*Puccinia striiformis, P. graminis, P. hordei*), loose smut (*Ustilago nuda*), scald (*Rhynchosporium secalis*), net blotch (*Pyrenophora teres*), spot blotch (*Cochliobolus sativus*), leaf stripe (*Pyrenophora graminea*), and Rhizoctonia damping-off (*Rhizoctonia solani*).

Diseases in corn: smut (*Ustilago maydis*), brown spot (*Cochliobolus heterostrophus*), copper spot (*Gloeocercospora sorghi*), southern rust (*Puccinia polysora*), gray leaf spot (*Cercospora zeae-maydis*), white spot (*Phaeosphaeria mydis*) and/or *Pantoea ananatis*) and Rhizoctonia damping-off (*Rhizoctonia solani*).

Diseases of citrus: melanose (*Diaporthe citri*), scab (*Elsinoe fawcetti*), penicillium rot (*Penicillium digitatum, P. italicum*), and brown rot (*Phytophthora parasitica, Phytophthora citrophthora*).

Diseases of apple: blossom blight (*Monilinia mali*), canker (*Valsa ceratosperma*), powdery mildew (*Podosphaera leucotricha*), Alternaria leaf spot (*Alternaria alternata* apple pathotype), scab (*Venturia inaequalis*), powdery mildew, bitter rot (*Colletotrichum acutatum*), crown rot (*Phytophtora cactorum*), blotch (*Diplocarpon mali*), and ring rot (*Botryosphaeria berengeriana*).

Diseases of pear: scab (*Venturia nashicola, V. pirina*), powdery mildew, black spot (*Alternaria alternata* Japanese pear pathotype), rust (*Gymnosporangium haraeanum*), and phytophthora fruit rot (*Phytophtora cactorum*).

Diseases of peach: brown rot (*Monilinia fructicola*), powdery mildew, scab (*Cladosporium carpophilum*), and phomopsis rot (*Phomopsis* sp.).

Diseases of grape: anthracnose (*Elsinoe ampelina*), ripe rot (*Glomerella cingulata*), powdery mildew (*Uncinula necator*), rust (*Phakopsora ampelopsidis*), black rot (*Guignardia bidwellii*), botrytis, and downy mildew (*Plasmopara viticola*).

Diseases of Japanese persimmon: anthracnose (*Gloeosporium kaki*), and leaf spot (*Cercospora kaki, Mycosphaerella nawae*).

Diseases of gourd: anthracnose (*Colletotrichum lagenarium*), powdery mildew (*Sphaerotheca fuliginea*), gummy stem blight (*Mycosphaerella melonis*), Fusarium wilt (*Fusarium oxysporum*), downy mildew (*Pseudoperonospora cubensis*), Phytophthora rot (*Phytophthora* sp.), and damping-off (*Pythium* sp).

Diseases of tomato: early blight (*Alternaria solani*), leaf mold (*Cladosporium fulvum*), and late blight (*Phytophthora infestans*).

Diseases of eggplant: brown spot (*Phomopsis vexans*), and powdery mildew (*Erysiphe cichoracearum*) Diseases of cruciferous vegetables: Alternaria leaf spot (*Alternaria japonica*), white spot (*Cercosporella brassicae*), clubroot (*Plasmodiophora brassicae*), and downy mildew (*Peronospora parasitica*).

Diseases of onion: rust (*Puccinia allii*), and downy mildew (*Peronospora destructor*).

Diseases of soybean: purple seed stain (*Cercospora kikuchii*), sphaceloma scad (*Elsinoe glycines*), pod and stem blight (*Diaporthe phaseolorum* var. *sojae*), septoria brown spot (*Septoria glycines*), frogeye leaf spot (*Cercospora sojina*), rust (*Phakopsora pachyrhizi*), Yellow rust, brown stem rot (*Phytophthora sojae*), and Rhizoctonia damping-off (*Rhizoctonia solani*).

Diseases of kidney bean: anthracnose (*Colletotrichum lindemthianum*). Diseases of peanut: leaf spot (*Cercospora personata*), brown leaf spot (*Cercospora arachidicola*) and southern blight (*Sclerotium rolfsii*).

Diseases of garden pea: powdery mildew (*Erysiphe pisi*), and root rot (*Fusarium solani* f. sp. *pisi*).

Diseases of potato: early blight (*Alternaria solani*), late blight (*Phytophthora infestans*), pink rot (*Phytophthora erythroseptica*), and powdery scab (*Spongospora subterranean* f. sp. *subterranea*).

Diseases of strawberry: powdery mildew (*Sphaerotheca humuli*), and anthracnose (*Glomerella cingulata*).

Diseases of tea: net blister blight (*Exobasidium reticulatum*), white scab (*Elsinoe leucospila*), gray blight (*Pestalotiopsis* sp.), and anthracnose (*Colletotrichum theae-sinensis*).

Diseases of tobacco: brown spot (*Alternaria longipes*), powdery mildew (*Erysiphe cichoracearum*), anthracnose (*Colletotrichum tabacum*), downy mildew (*Peronospora tabacina*), and black shank (*Phytophthora nicotianae*).

Diseases of rapeseed: sclerotinia rot (*Sclerotinia sclerotiorum*), and *Rhizoctonia* damping-off (*Rhizoctonia solani*). Diseases of cotton: *Rhizoctonia* damping-off (*Rhizoctonia solani*).

Diseases of sugar beat: *Cercospora* leaf spot (*Cercospora beticola*), leaf blight (*Thanatephorus cucumeris*), Root rot (*Thanatephorus cucumeris*), and *Aphanomyces* root rot (*Aphanomyces cochlioides*).

Diseases of rose: black spot (*Diplocarpon rosae*), powdery mildew (*Sphaerotheca pannosa*), and downy mildew (*Peronospora sparsa*). Diseases of chrysanthemum and asteraceous plants: downy mildew (*Bremia lactucae*), leaf blight (*Septoria chrysanthemi-indici*), and white rust (*Puccinia horiana*).

Diseases of various groups: diseases caused by *Pythium* spp. (*Pythium aphanidermatum, Pythium debarianum, Pythium graminicola, Pythium irregulare, Pythium ultimum*), gray mold. (*Botrytis cinerea*), and *Sclerotinia* rot (*Sclerotinia sclerotiorum*).

Disease of Japanese radish: *Alternaria* leaf spot (*Alternaria brassicicola*).

Diseases of turfgrass: dollar spot (*Sclerotinia homeocarpa*), and brown patch and large patch (*Rhizoctonia solani*).

Disease of banana: Black sigatoka (*Mycosphaerella fijiensis*), Yellow sigatoka (*Mycosphaerella musicola*).

Disease of sunflower: downy mildew (*Plasmopara halstedii*).

Seed diseases or diseases in the early stages of the growth of various plants caused by *Aspergillus* spp., *Penicillium* spp., *Fusarium* spp., *Gibberella* spp., *Tricoderma* spp., *Thielaviopsis* spp., *Rhizopus* spp., *Mucor* spp., *Corticium* spp., *Phoma* spp., *Rhizoctonia* spp. and *Diplodia* spp.

Viral diseases of various plants mediated by *Polymixa* spp. or *Olpidium* spp. and so on.

The compositions of the present invention can be used in agricultural lands such as fields, paddy fields, lawns and orchards or in non-agricultural lands. The present invention may be used to control diseases in agricultural lands for cultivating the plants without any phytotoxicity to the plant.

Examples of the crops on which the present compositions may be used include but are not limited to corn, rice, wheat, barley, rye, oat, sorghum, cotton, soybean, peanut, buckwheat, beet, rapeseed, sunflower, sugar cane, tobacco, etc.; vegetables: solanaceous vegetables such as eggplant, tomato, pimento, pepper, potato, etc., cucurbit vegetables such as cucumber, pumpkin, zucchini, water melon, melon, squash, etc., cruciferous vegetables such as radish, white turnip, horseradish, kohlrabi, Chinese cabbage, cabbage, leaf mustard, broccoli, cauliflower, etc., asteraceous vegetables such as burdock, crown daisy, artichoke, lettuce, etc, liliaceous vegetables such as green onion, onion, garlic, and asparagus, ammiaceous vegetables such as carrot, parsley, celery, parsnip, etc., chenopodiaceous vegetables such as spinach, Swiss chard, etc., lamiaceous vegetables such as *Perilla frutescens*, mint, basil, etc, strawberry, sweet potato, *Dioscorea japonica, colocasia*, etc., flowers, foliage plants, turf grasses, fruits: pome fruits such apple, pear, quince, etc, stone fleshy fruits such as peach, plum, nectarine, *Prunus* mume, cherry fruit, apricot, prune, etc., citrus fruits such as orange, lemon, rime, grapefruit, etc., nuts such as chestnuts, walnuts, hazelnuts, almond, pistachio, cashew nuts, macadamia nuts, etc. berries such as blueberry, cranberry, blackberry, raspberry, etc., grape, kaki fruit, olive, plum, banana, coffee, date palm, coconuts, etc., trees other than fruit trees; tea, mulberry, flowering plant, trees such as ash, birch, dogwood, *Eucalyptus, Ginkgo biloba*, lilac, maple, *Quercus*, poplar, Judas tree, *Liquidambar formosana*, plane tree, *zelkova*, Japanese arborvitae, fir wood, hemlock, juniper, *Pinus, Picea*, and *Taxus* cuspidate, etc.

In an embodiment, the constituent fungicides of the combination of the present invention may be admixed in ratio of (1-80):(1-80):(1-80):(1:80)

In an aspect, the present invention may provide methods of controlling fungal diseases comprising applying a combination comprising:
 (a) at least one succinate dehydrogenase inhibitor fungicide;
 (b) at least one other fungicide; and
 (c) at least one multi-site fungicide.

In an embodiment, the succinate dehydrogenase inhibitor fungicide, the quinone outside inhibitor fungicide, the ergosterol biosynthesis inhibitor fungicide, and the dithiocarbamate fungicide may be selected according to any of the preferred embodiments of the combinations described hereinabove.

The combinations of the present invention may be sold as a pre-mix composition or a kit of parts such that individual actives may be mixed before spraying. Alternatively, the kit of parts may contain succinate dehydrogenase inhibitor fungicide and the dithiocarbamate fungicide pre-mixed and the third active may be admixed with an adjuvant such that the two components may be tank mixed before spraying.

The composition of the present invention maybe applied simultaneously as a tank mix or a formulation or may be applied sequentially. The application may be made to the soil before emergence of the plants, either pre-planting or post-planting. The application may be made as a foliar spray at different timings during crop development, with either one or two applications early or late post-emergence.

The compositions according to the invention can be applied before or after infection of the useful plants or the propagation material thereof by the fungi.

As will be demonstrated in the examples, the addition of a dithiocarbamate fungicide to a combination of succinate dehydrogenase inhibitors which are combined with Quinone outside inhibitors and/or ergosterol biosynthesis inhibitors, greatly improved the disease control as well as improved yield and demonstrated a synergistic effect. The lower the mixture performance in the disease control, the greater the additional benefit of the mancozeb when added to the compositions of the present invention.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

EXAMPLES

Studies were conducted to study the addition of multi-site fungicide to succinate dehydrogenase inhibitor fungicides and at least one other fungicide and the contribution of the multi-site fungicide to the efficacy of these mixtures. Experiments were conducted over a period of two years to study the effect of the addition of multi-site fungicides on the efficacy of succinate dehydrogenase inhibitors alone and when combined with a co-fungicide. Doses tested were at rates of 2000 g/ha for tribasic copper sulfate (TBCS), 150 ml/ha for the ergosterol biosynthesis inhibitor, 200 ml/ha for the Quinone outside inhibitor, 1000 g/ha and 200 ml/ha for succinate dehydrogenase inhibitor fungicides. The combinations were tested for efficacy of disease control in soybean for the control of Asian soybean rust. The trials were carried out at various locations in India. The test were conducted on soybean cultivar Monsoy 9144 RR. A commercially available actives were used.

TABLE 1

Table 1 shows the efficacy of tribasic copper sulfate (TBCS) when added to combinations containing succinate dehydrogenase inhibitor fungicides and ergosterol biosynthesis inhibitor.

| Treatment | Dose rates (ml/g/ha) | Mean percent disease control | |
|---|---|---|---|
| | | 2015/16 | 2016/17 |
| Prothioconazole + Benzovindiflupyr | 150 + 200 | 89.34 | 88.47 |
| Prothioconazole + Benzovindiflupyr + TBCS | 150 + 200 + 2000 | 92.01 | 92.32 |
| Prothioconazole + Isopyrazam | 150 + 1000 | 89.34 | 88.47 |
| Prothioconazole + Isopyrazam + TBCS | 150 + 1000 + 2000 | 92.01 | 91.04 |
| Prothioconazole + Penthoipyrad | 150 + 1000 | 90.68 | 89.75 |
| Prothioconazole + Penthiopyrad + TBCS | 150 + 1000 + 2000 | 92.01 | 92.32 |

Table 1 clearly demonstrates the increase in control when tribasic copper sulfate (TBCS) is added to the combination of ergosterol biosynthesis inhibitors and succinate dehydrogenase inhibitor fungicides.

TABLE 2

Table 2 demonstrates effiacacy when tribasic copper sulfate (TBCS) is added to combinations of succinate dehydrogenase inhibitor fungicides and quinone outside inhibitor fungicides and ergosterol biosynthesis inhibitors.

| Treatment | Dose rates (ml/g/ha) | Mean percent disease control | |
|---|---|---|---|
| | | 2015/16 | 2016/17 |
| Prothioconazole + Benzovindiflupyr + Azoxystrobin | 150 + 200 + 500 | 90.68 | 89.75 |
| Prothioconazole + Benzovindiflupyr + Azoxystrobin + TBCS | 150 + 200 + 500 + 2000 | 94.68 | 94.88 |

Table 2 clearly demonstrates the importance of adding tribasic copper sulfate (TBCS) to the combination. The addition of TBCS improved disease control.

TABLE 3

Table 3 shows the efficacy of chlorothalonil when added to combinations containing succinate dehydrogenase inhibitor fungicides and ergosterol biosynthesis inhibitor.

| Treatment | Dose rates (ml/g/ha) | Mean percent disease control | |
|---|---|---|---|
| | | 2015/16 | 2016/17 |
| Prothioconazole + Benzovindifloupyr | 150 + 200 | 90.78 | 88.35 |
| Prothioconazole + Benzovindifloupyr + Chlorothalonil | 150 + 200 + 1500 | 92.32 | 92.44 |
| Prothioconazole + Isopyrazam | 150 + 1000 | 87.71 | 86.38 |
| Prothioconazole + Isopyrazam + Chlorothalonil | 150 + 1000 + 1500 | 90.78 | 90.92 |
| Prothioconazole + Penthiopyrad | 150 + 1000 | 89.24 | 87.89 |
| Prothioconazole + Penthiopyrad + Chlorothalonil | 150 + 1000 + 1500 | 92.32 | 92.44 |

Table 3 clearly demonstrates the increase in control when chlorothalonil is added to the combination of ergosterol biosynthesis inhibitors and succinate dehydrogenase inhibitor fungicides.

TABLE 4

Table 4 demonstrates efficacy when chlorothalonil is added to combinations of succinate dehydrogenase inhibitor fungicides and quinone outside inhibitor fungicides and ergosterol biosynthesis inhibitors.

| Treatment | Dose rates (ml/g/ha) | Mean percent disease control 2015/16 | Mean percent disease control 2016/17 |
|---|---|---|---|
| Prothioconazole + Benzovindifloupyr + Azoxystrobin | 150 + 200 + 500 | 90.02 | 91.8 |
| Prothioconazole + Benzovindifloupyr + Azoxystrobin + Chlorothalonil | 150 + 200 + 500 + 1500 | 95.4 | 95.54 |

Table 4 clearly demonstrates the importance of adding chlorothalonil (TBCS) to the combination. The addition of chlorothalonil improved disease control It was thus found that the incorporation of multi-site fungicide greatly increased efficacy and disease control of the succinate dehydrogenase inhibitor fungicide treatments when mixed with other fungicides. It was thus concluded that the addition of multi-site fungicide such as chlorothalonil, and TBCS greatly enhanced the efficacy of the combination and surprisingly gave a synergistic effect. The addition of a multi-site fungicide increased disease control and improved yield of plants. The instant invention is more specifically explained by above examples. However, it should be understood that the scope of the present invention is not limited by the examples in any manner. It will be appreciated by any person skilled in this art that the present invention includes aforesaid examples and further can be modified and altered within the technical scope of the present invention.

The invention claimed is:

1. A fungicidal combination consisting of:
   the succinate dehydrogenase inhibitor fungicide fluindapyr,
   the multi-site contact inorganic fungicide copper oxychloride, or sulfur, and
   a third fungicide comprising the ergosterol biosynthesis inhibitor fungicide, difenoconazole.

2. The fungicidal combination of claim 1, comprising a weight ratio of (1-80):(1-80):(1-80) of the multi-site contact fungicide, the succinate dehydrogenase inhibitor fungicide and the third fungicide respectively.

3. A fungicidal composition comprising the combination of claim 1 and an agrochemically acceptable excipient.

4. The fungicidal composition of claim 3, wherein the composition is in the form of a wettable powder, granules, dust, a soluble (liquid) concentrate, a suspension concentrate, an oil in water emulsion, a water in oil emulsion, an emulsifiable concentrate, a capsule suspension, a ZC formulation, or an oil dispersion.

5. A method of applying the fungicidal combination of claim 1, comprising foliar application, or application to plant propagation materials.

6. A method of controlling fungal disease comprising applying to the locus of the plant the fungicidal combination of claim 1.

* * * * *